US007890927B2

(12) United States Patent
Eldridge et al.

(10) Patent No.: US 7,890,927 B2
(45) Date of Patent: Feb. 15, 2011

(54) APPARATUS AND METHOD FOR CONFIGURING AND EDITING A CONTROL SYSTEM WITH LIVE DATA

(75) Inventors: Keith Eldridge, North Easton, MA (US); Brian Mackay, Coppell, TX (US); Mark Johnson, North Attleboro, MA (US); Scott Volk, North Easton, MA (US); Kenneth A. Burke, South Easton, MA (US); Paul Meskonis, Norwood, MA (US); Robert Hall, South Easton, MA (US); Steven Dardinski, Westford, MA (US)

(73) Assignee: Invensys Systems, Inc., Foxboro, MA (US)

( * ) Notice: Subject to any disclaimer, the term of this patent is extended or adjusted under 35 U.S.C. 154(b) by 165 days.

(21) Appl. No.: 12/247,872

(22) Filed: Oct. 8, 2008

(65) Prior Publication Data
US 2009/0125130 A1    May 14, 2009

Related U.S. Application Data

(63) Continuation of application No. 11/434,005, filed on May 15, 2006, now abandoned, which is a continuation of application No. 09/572,343, filed on May 17, 2000, now Pat. No. 7,272,815, which is a continuation of application No. 09/448,223, filed on Nov. 23, 1999, now Pat. No. 7,089,530, and a continuation of application No. 09/448,374, filed on Nov. 23, 1999, now Pat. No. 7,096,465, and a continuation of application No. 09/448,845, filed on Nov. 23, 1999, now Pat. No. 6,754,885, application No. 12/247,872, which is a continuation of application No. 11/355,311, filed on Feb. 14, 2006, which is a continuation of application No. 09/448,223.

(60) Provisional application No. 60/134,597, filed on May 17, 1999.

(51) Int. Cl.
*G06F 9/44* (2006.01)
*G05B 19/42* (2006.01)

(52) U.S. Cl. .................. 717/110; 717/100; 717/105; 700/86; 700/87

(58) Field of Classification Search .............. 717/100, 717/105, 110; 700/86–87
See application file for complete search history.

(56) References Cited

U.S. PATENT DOCUMENTS 3,096,434 A    7/1963    King (Continued)

FOREIGN PATENT DOCUMENTS

EP    0411869    2/1991

(Continued)

OTHER PUBLICATIONS

U.S. Appl. No. 09/721,409, filed Nov. 21, 2000, Venkatraman et al.
"1995 World Batch Forum: Meeting of the Minds [Agenda]," (May 22-24, 1995) Newtown Square, Pennsylvania, (2 pages).

(Continued)

*Primary Examiner*—Ramesh B Patel
(74) *Attorney, Agent, or Firm*—Nutter McClennen & Fish LLP; David J. Powsner

(57) ABSTRACT

Methods and apparatus for configuring process, environmental, industrial and other control systems generate and/or utilize models representing configurations of control systems and/or the systems controlled by them. Records of changes to the models or the configurations represented by them are maintained, thereby, for example, providing bases for determining current states, prior states and histories of changes. Objects in the model have characteristics, such as an object type characteristic and an area characteristic. Users can have corresponding permissions. A security mechanism apparatus controls access by users to the objects. Composite objects are defined by definition objects and are displayed in encapsulated or expanded formats. Objects can include an edit control type identifier that determines how they are presented for editing. Functionality responds to user commands by transferring characteristics of a first object depicted by the graphical user interface to a second object. Configuration-time formulas contained objects are evaluated to constants prior to downloading to the control system.

32 Claims, 93 Drawing Sheets

Process Control System

U.S. PATENT DOCUMENTS

| | | |
|---|---|---|
| 3,404,264 A | 10/1968 | Kugler |
| 3,665,172 A | 5/1972 | Spaargaren et al. |
| 3,701,280 A | 10/1972 | Stroman |
| 3,802,590 A | 4/1974 | Culver |
| 3,810,119 A | 5/1974 | Zieve et al. |
| 3,825,905 A | 7/1974 | Allen, Jr. |
| 4,006,464 A | 2/1977 | Landell |
| RE29,383 E | 9/1977 | Gallatin et al. |
| 4,058,975 A | 11/1977 | Gilbert et al. |
| 4,096,566 A | 6/1978 | Borie et al. |
| 4,276,593 A | 6/1981 | Hansen |
| 4,302,820 A | 11/1981 | Struger et al. |
| 4,312,068 A | 1/1982 | Goss et al. |
| 4,323,966 A | 4/1982 | Whiteside et al. |
| 4,347,563 A | 8/1982 | Paredes et al. |
| 4,351,023 A | 9/1982 | Richer |
| 4,377,000 A | 3/1983 | Staab |
| 4,410,942 A | 10/1983 | Milligan et al. |
| 4,413,314 A | 11/1983 | Slater et al. |
| 4,423,486 A | 12/1983 | Berner |
| 4,428,044 A | 1/1984 | Liron |
| 4,435,762 A | 3/1984 | Milligan et al. |
| 4,443,861 A | 4/1984 | Slater |
| 4,456,997 A | 6/1984 | Spitza et al. |
| 4,466,098 A | 8/1984 | Southard |
| 4,471,457 A | 9/1984 | Videki, II |
| 4,488,226 A | 12/1984 | Wagner, Jr. et al. |
| 4,493,027 A | 1/1985 | Katz et al. |
| 4,530,234 A | 7/1985 | Cullick et al. |
| 4,609,995 A | 9/1986 | Hasebe et al. |
| 4,615,001 A | 9/1986 | Hudgins, Jr. |
| 4,628,437 A | 12/1986 | Poschmann et al. |
| 4,639,852 A | 1/1987 | Motomiya et al. |
| 4,641,269 A | 2/1987 | Japenga et al. |
| 4,641,276 A | 2/1987 | Dunki-Jacobs |
| 4,648,064 A | 3/1987 | Morley |
| 4,649,479 A | 3/1987 | Advani et al. |
| 4,663,704 A | 5/1987 | Jones et al. |
| 4,672,530 A | 6/1987 | Schuss |
| 4,675,812 A | 6/1987 | Capowski et al. |
| 4,682,158 A | 7/1987 | Ito et al. |
| 4,682,304 A | 7/1987 | Tierney |
| 4,683,530 A | 7/1987 | Quatse |
| 4,692,859 A | 9/1987 | Ott |
| 4,692,918 A | 9/1987 | Elliott et al. |
| 4,703,421 A | 10/1987 | Abrant et al. |
| 4,704,676 A | 11/1987 | Flanagan et al. |
| 4,709,325 A | 11/1987 | Yajima et al. |
| 4,719,593 A | 1/1988 | Threewitt et al. |
| 4,727,477 A | 2/1988 | Gavril |
| 4,733,366 A | 3/1988 | Deyesso et al. |
| 4,740,955 A | 4/1988 | Litterer et al. |
| 4,742,349 A | 5/1988 | Miesterfeld et al. |
| 4,750,109 A | 6/1988 | Kita et al. |
| 4,790,762 A | 12/1988 | Harms et al. |
| 4,805,107 A | 2/1989 | Kieckhafer et al. |
| 4,816,996 A | 3/1989 | Hill et al. |
| 4,817,094 A | 3/1989 | Lebizay et al. |
| 4,872,106 A | 10/1989 | Slater |
| 4,896,290 A | 1/1990 | Rhodes et al. |
| 4,897,777 A | 1/1990 | Janke et al. |
| RE33,162 E | 2/1990 | Yoshida et al. |
| 4,910,658 A | 3/1990 | Dudash et al. |
| 4,910,691 A | 3/1990 | Skeirik |
| 4,918,690 A | 4/1990 | Markkula, Jr. et al. |
| 4,934,196 A | 6/1990 | Romano |
| 4,958,277 A | 9/1990 | Hill et al. |
| 4,959,774 A | 9/1990 | Davis |
| 4,965,717 A | 10/1990 | Cutts, Jr. et al. |
| 4,965,742 A | 10/1990 | Skeirik |
| 4,965,880 A | 10/1990 | Petitjean et al. |
| 4,991,076 A | 2/1991 | Zifferer et al. |
| 4,991,170 A | 2/1991 | Kem |
| 5,008,805 A | 4/1991 | Fiebig et al. |
| 5,050,165 A | 9/1991 | Yoshioka et al. |
| 5,068,778 A | 11/1991 | Kosem et al. |
| 5,121,318 A | 6/1992 | Lipner et al. |
| 5,122,948 A | 6/1992 | Zapolin |
| 5,124,908 A | 6/1992 | Broadbent |
| 5,129,087 A | 7/1992 | Will |
| 5,131,092 A | 7/1992 | Sackmann et al. |
| 5,134,574 A | 7/1992 | Beaverstock et al. |
| 5,136,704 A | 8/1992 | Danielsen et al. |
| 5,138,708 A | 8/1992 | Vosbury |
| 5,140,677 A | 8/1992 | Fleming et al. |
| 5,146,589 A | 9/1992 | Peet, Jr. et al. |
| 5,150,289 A | 9/1992 | Badavas |
| 5,151,978 A | 9/1992 | Bronikowski et al. |
| 5,151,981 A | 9/1992 | Westcott et al. |
| 5,159,673 A | 10/1992 | Sackmann et al. |
| 5,162,986 A | 11/1992 | Graber et al. |
| 5,163,055 A | 11/1992 | Lee et al. |
| 5,164,894 A | 11/1992 | Cunningham-Reid et al. |
| 5,166,685 A | 11/1992 | Campbell, Jr. et al. |
| 5,167,009 A | 11/1992 | Skeirik |
| 5,168,276 A | 12/1992 | Huston et al. |
| 5,168,441 A | 12/1992 | Onarheim et al. |
| 5,175,698 A | 12/1992 | Barbanell |
| 5,175,829 A | 12/1992 | Stumpf et al. |
| 5,181,978 A | 1/1993 | Ochiai et al. |
| 5,193,175 A | 3/1993 | Cutts, Jr. et al. |
| 5,197,114 A | 3/1993 | Skeirik |
| 5,202,961 A | 4/1993 | Mills et al. |
| 5,212,784 A | 5/1993 | Sparks |
| 5,224,203 A | 6/1993 | Skeirik |
| 5,233,615 A | 8/1993 | Goetz |
| 5,245,704 A | 9/1993 | Weber et al. |
| 5,249,274 A | 9/1993 | Sztipanovits et al. |
| 5,251,125 A | 10/1993 | Karnowski et al. |
| 5,255,367 A | 10/1993 | Bruckert et al. |
| 5,258,999 A | 11/1993 | Wernimont et al. |
| 5,271,013 A | 12/1993 | Gleeson |
| 5,276,901 A | 1/1994 | Howell et al. |
| 5,283,729 A | 2/1994 | Lloyd |
| 5,289,365 A | 2/1994 | Caldwell et al. |
| 5,291,390 A | 3/1994 | Satou et al. |
| 5,295,258 A | 3/1994 | Jewett et al. |
| 5,295,263 A | 3/1994 | Kojima et al. |
| 5,297,143 A | 3/1994 | Fridrich et al. |
| 5,301,346 A | 4/1994 | Notarianni et al. |
| 5,302,952 A | 4/1994 | Campbell, Jr. et al. |
| 5,303,227 A | 4/1994 | Herold et al. |
| 5,303,375 A | 4/1994 | Collins et al. |
| 5,303,392 A | 4/1994 | Carney et al. |
| 5,307,346 A | 4/1994 | Fieldhouse et al. |
| 5,307,372 A | 4/1994 | Sawyer et al. |
| 5,307,463 A | 4/1994 | Hyatt et al. |
| 5,309,556 A | 5/1994 | Sismilich |
| 5,310,998 A | 5/1994 | Okuno et al. |
| 5,317,726 A | 5/1994 | Horst |
| 5,325,339 A | 6/1994 | Yost et al. |
| 5,327,144 A | 7/1994 | Stilp et al. |
| 5,335,221 A | 8/1994 | Snowbarger et al. |
| 5,339,362 A | 8/1994 | Harris |
| 5,339,680 A | 8/1994 | Bronkal et al. |
| 5,347,181 A | 9/1994 | Ashby et al. |
| 5,349,343 A | 9/1994 | Oliver |
| 5,352,033 A | 10/1994 | Gresham et al. |
| 5,353,217 A | 10/1994 | Berghs et al. |
| 5,359,721 A | 10/1994 | Kempf et al. |
| 5,367,640 A | 11/1994 | Hamilton et al. |
| 5,371,895 A | 12/1994 | Bristol |
| 5,377,315 A | 12/1994 | Leggett et al. |
| 5,381,529 A | 1/1995 | Matsushima et al. |

| | | | | | |
|---|---|---|---|---|---|
| 5,384,910 A | 1/1995 | Torres | 5,539,909 A | 7/1996 | Tanaka et al. |
| 5,386,373 A | 1/1995 | Keeler et al. | 5,541,810 A | 7/1996 | Donhauser et al. |
| 5,386,417 A | 1/1995 | Daugherty et al. | 5,544,008 A | 8/1996 | Dimmick et al. |
| 5,390,321 A | 2/1995 | Proesel | 5,544,321 A | 8/1996 | Theimer et al. |
| 5,392,280 A | 2/1995 | Zheng | 5,548,528 A | 8/1996 | Keeler et al. |
| 5,392,389 A | 2/1995 | Fleming | 5,549,137 A | 8/1996 | Lenz et al. |
| 5,394,522 A | 2/1995 | Sanchez-Frank et al. | 5,550,980 A | 8/1996 | Pascucci et al. |
| 5,398,331 A | 3/1995 | Huang et al. | 5,551,047 A | 8/1996 | Mori et al. |
| 5,400,140 A | 3/1995 | Johnston et al. | 5,555,213 A | 9/1996 | DeLong |
| 5,405,779 A | 4/1995 | McCabe et al. | 5,555,416 A | 9/1996 | Owens et al. |
| 5,408,603 A | 4/1995 | Van de Lavoir et al. | 5,555,437 A | 9/1996 | Packer |
| 5,410,492 A | 4/1995 | Gross et al. | 5,555,510 A | 9/1996 | Verseput et al. |
| 5,410,717 A | 4/1995 | Floro | 5,557,559 A * | 9/1996 | Rhodes ...................... 702/118 |
| 5,420,977 A | 5/1995 | Sztipanovits et al. | 5,559,691 A | 9/1996 | Monta et al. |
| 5,421,017 A | 5/1995 | Scholz et al. | 5,559,963 A | 9/1996 | Gregg et al. |
| 5,426,732 A | 6/1995 | Boies et al. | 5,563,400 A | 10/1996 | Le Roux et al. |
| 5,428,734 A | 6/1995 | Haynes et al. | 5,564,055 A | 10/1996 | Asnaashari et al. |
| 5,428,769 A | 6/1995 | Glaser et al. | 5,566,320 A | 10/1996 | Hubert et al. |
| 5,428,781 A | 6/1995 | Duault et al. | 5,568,378 A | 10/1996 | Wojsznis |
| 5,432,711 A | 7/1995 | Jackson et al. | 5,570,300 A | 10/1996 | Henry et al. |
| 5,434,952 A | 7/1995 | Yen et al. | 5,572,673 A | 11/1996 | Shurts |
| 5,434,997 A | 7/1995 | Landry et al. | 5,576,946 A | 11/1996 | Bender et al. |
| 5,437,007 A | 7/1995 | Bailey et al. | 5,579,220 A | 11/1996 | Barthel et al. |
| 5,440,237 A | 8/1995 | Brown et al. | 5,579,487 A | 11/1996 | Meyerson et al. |
| 5,442,639 A | 8/1995 | Crowder et al. | 5,581,760 A | 12/1996 | Atkinson et al. |
| 5,444,851 A | 8/1995 | Woest | 5,586,066 A | 12/1996 | White et al. |
| 5,444,861 A | 8/1995 | Adamec et al. | 5,586,112 A | 12/1996 | Tabata et al. |
| 5,450,403 A | 9/1995 | Ichii et al. | 5,586,156 A | 12/1996 | Gaubatz |
| 5,450,425 A | 9/1995 | Gunn et al. | 5,586,329 A | 12/1996 | Knudsen et al. |
| 5,450,764 A | 9/1995 | Johnston et al. | 5,586,330 A | 12/1996 | Knudsen et al. |
| 5,451,939 A | 9/1995 | Price et al. | 5,587,899 A | 12/1996 | Ho et al. |
| 5,452,201 A | 9/1995 | Pieronek et al. | 5,594,858 A | 1/1997 | Blevins |
| 5,457,797 A | 10/1995 | Butterworth et al. | 5,594,899 A | 1/1997 | Knudsen et al. |
| 5,459,825 A | 10/1995 | Anderson et al. | 5,596,331 A | 1/1997 | Bonaffini et al. |
| 5,459,839 A | 10/1995 | Swarts et al. | 5,596,752 A | 1/1997 | Knudsen et al. |
| 5,461,710 A | 10/1995 | Bloomfield et al. | 5,598,536 A | 1/1997 | Slaughter, III et al. |
| 5,463,735 A | 10/1995 | Pascucci et al. | 5,598,566 A | 1/1997 | Pascucci et al. |
| 5,467,264 A | 11/1995 | Rauch et al. | 5,600,845 A | 2/1997 | Gilson |
| 5,469,570 A | 11/1995 | Shibata et al. | 5,604,737 A | 2/1997 | Iwami et al. |
| 5,475,856 A | 12/1995 | Kogge | 5,604,871 A | 2/1997 | Pecone |
| 5,481,715 A | 1/1996 | Hamilton et al. | 5,608,607 A | 3/1997 | Dittmer |
| 5,481,718 A | 1/1996 | Ryu et al. | 5,608,608 A | 3/1997 | Flint et al. |
| 5,481,741 A | 1/1996 | McKaskle et al. | 5,611,057 A | 3/1997 | Pecone et al. |
| 5,483,660 A | 1/1996 | Yishay et al. | 5,613,148 A | 3/1997 | Bezviner et al. |
| 5,485,617 A | 1/1996 | Stutz et al. | 5,613,164 A | 3/1997 | DiAngelo et al. |
| 5,485,620 A | 1/1996 | Sadre et al. | 5,613,190 A | 3/1997 | Hylton |
| 5,490,276 A | 2/1996 | Doli, Jr. et al. | 5,617,540 A | 4/1997 | Civanlar et al. |
| 5,491,625 A | 2/1996 | Pressnall et al. | 5,621,871 A | 4/1997 | Jaremko et al. |
| 5,491,791 A | 2/1996 | Glowny et al. | 5,621,890 A | 4/1997 | Notarianni et al. |
| 5,493,534 A | 2/1996 | Mok | 5,623,592 A | 4/1997 | Carlson et al. |
| 5,499,023 A | 3/1996 | Goldschmidt | 5,623,670 A | 4/1997 | Bohannon et al. |
| 5,499,365 A | 3/1996 | Anderson et al. | 5,627,979 A | 5/1997 | Chang et al. |
| 5,499,371 A | 3/1996 | Henninger et al. | 5,629,872 A | 5/1997 | Gross et al. |
| 5,500,934 A | 3/1996 | Austin et al. | 5,629,949 A | 5/1997 | Zook |
| 5,501,608 A | 3/1996 | Scheer et al. | 5,630,056 A | 5/1997 | Horvath et al. |
| 5,504,672 A | 4/1996 | Hardiman et al. | 5,630,152 A | 5/1997 | DeLuca et al. |
| 5,504,895 A | 4/1996 | Kurosawa et al. | 5,642,259 A | 6/1997 | Ma et al. |
| 5,504,902 A | 4/1996 | McGrath et al. | 5,642,511 A | 6/1997 | Chow et al. |
| 5,509,811 A | 4/1996 | Homic | 5,649,121 A | 7/1997 | Budman et al. |
| 5,513,095 A | 4/1996 | Pajonk et al. | 5,655,092 A | 8/1997 | Ojala et al. |
| 5,513,192 A | 4/1996 | Janku et al. | 5,659,680 A | 8/1997 | Cunningham et al. |
| 5,513,354 A | 4/1996 | Dwork et al. | 5,659,727 A | 8/1997 | Velissaropoulos et al. |
| 5,517,655 A | 5/1996 | Collins et al. | 5,664,101 A | 9/1997 | Picache |
| 5,519,605 A | 5/1996 | Cawlfield | 5,664,168 A | 9/1997 | Yishay et al. |
| 5,519,701 A | 5/1996 | Colmant et al. | 5,671,374 A | 9/1997 | Postman et al. |
| 5,522,044 A | 5/1996 | Pascucci et al. | 5,676,141 A | 10/1997 | Hollub |
| 5,526,353 A | 6/1996 | Henley et al. | 5,680,404 A | 10/1997 | Gray et al. |
| 5,530,643 A | 6/1996 | Hodorowski | 5,680,409 A | 10/1997 | Qin et al. |
| 5,530,868 A | 6/1996 | Record et al. | 5,682,317 A | 10/1997 | Keeler et al. |
| 5,531,328 A | 7/1996 | Rochelo et al. | 5,682,476 A | 10/1997 | Tapperson et al. |
| 5,534,912 A | 7/1996 | Kostreski | 5,687,316 A | 11/1997 | Graziano et al. |
| 5,537,548 A | 7/1996 | Fin et al. | 5,700,090 A | 12/1997 | Eryurek |
| 5,539,638 A | 7/1996 | Keeler et al. | 5,701,414 A | 12/1997 | Cheng et al. |

| | | | | | |
|---|---|---|---|---|---|
| 5,701,484 A | 12/1997 | Artsy | 5,854,750 A | 12/1998 | Phillips et al. |
| 5,704,011 A | 12/1997 | Hansen et al. | 5,854,944 A | 12/1998 | Catherwood et al. |
| 5,708,779 A | 1/1998 | Graziano et al. | 5,859,966 A | 1/1999 | Hayman et al. |
| 5,713,045 A | 1/1998 | Berdahl | 5,862,052 A | 1/1999 | Nixon et al. |
| 5,715,178 A | 2/1998 | Scarola et al. | 5,864,773 A | 1/1999 | Barna et al. |
| 5,716,221 A | 2/1998 | Kantner | 5,867,704 A | 2/1999 | Tanaka et al. |
| 5,717,880 A | 2/1998 | Imai et al. | 5,872,973 A | 2/1999 | Mitchell et al. |
| 5,717,925 A | 2/1998 | Harper et al. | 5,872,992 A | 2/1999 | Tietjen et al. |
| 5,719,761 A | 2/1998 | Gatti et al. | 5,873,089 A | 2/1999 | Regache |
| 5,726,912 A | 3/1998 | Krall, Jr. et al. | 5,874,990 A | 2/1999 | Kato et al. |
| 5,727,128 A | 3/1998 | Morrison | 5,875,430 A | 2/1999 | Koether |
| 5,732,218 A | 3/1998 | Bland et al. | 5,876,122 A | 3/1999 | Eryurek |
| 5,734,902 A | 3/1998 | Atkins et al. | 5,878,415 A | 3/1999 | Olds |
| 5,737,529 A | 4/1998 | Dolin, Jr. et al. | 5,880,775 A | 3/1999 | Ross |
| 5,742,596 A | 4/1998 | Baratz et al. | 5,903,455 A | 5/1999 | Sharpe, Jr. et al. |
| 5,742,762 A | 4/1998 | Scholl et al. | 5,903,894 A | 5/1999 | Reneris |
| 5,746,511 A | 5/1998 | Eryurek et al. | 5,909,368 A | 6/1999 | Nixon et al. |
| 5,748,467 A | 5/1998 | Qin et al. | 5,909,586 A | 6/1999 | Anderson |
| 5,748,912 A | 5/1998 | Lee | 5,917,840 A | 6/1999 | Cheney et al. |
| 5,751,574 A | 5/1998 | Loebig et al. | 5,920,479 A | 7/1999 | Sojoodi et al. |
| 5,752,007 A | 5/1998 | Morrison | 5,928,345 A | 7/1999 | Tetzlaff et al. |
| 5,752,008 A | 5/1998 | Bowling | 5,930,768 A | 7/1999 | Hooban |
| 5,752,246 A | 5/1998 | Rogers et al. | 5,940,294 A | 8/1999 | Dove |
| 5,754,772 A | 5/1998 | Leaf | 5,940,839 A | 8/1999 | Chen et al. |
| 5,758,073 A | 5/1998 | Liang et al. | 5,956,487 A | 9/1999 | Venkatraman et al. |
| 5,758,075 A | 5/1998 | Graziano et al. | 5,960,205 A | 9/1999 | Mao et al. |
| 5,761,033 A | 6/1998 | Wilhelm | 5,960,214 A | 9/1999 | Sharpe, Jr. et al. |
| 5,761,090 A | 6/1998 | Gross et al. | 5,966,304 A | 10/1999 | Cook et al. |
| 5,761,518 A | 6/1998 | Boehling et al. | 5,969,967 A | 10/1999 | Aahlad et al. |
| 5,764,906 A | 6/1998 | Edelstein et al. | 5,974,497 A | 10/1999 | Teshome |
| 5,768,119 A | 6/1998 | Havekost et al. | 5,975,737 A | 11/1999 | Crater et al. |
| 5,768,510 A | 6/1998 | Gish | 5,978,578 A | 11/1999 | Azarya et al. |
| 5,774,378 A | 6/1998 | Yang et al. | 5,978,933 A | 11/1999 | Wyld et al. |
| 5,774,670 A | 6/1998 | Montulli | 5,980,078 A | 11/1999 | Krivoshein et al. |
| 5,777,874 A | 7/1998 | Flood et al. | 5,980,090 A | 11/1999 | Royal, Jr. et al. |
| 5,784,557 A | 7/1998 | Oprescu | 5,982,362 A | 11/1999 | Crater et al. |
| 5,787,247 A | 7/1998 | Norin et al. | 5,988,852 A | 11/1999 | Nakanishi et al. |
| 5,787,272 A | 7/1998 | Gupta et al. | 5,994,998 A | 11/1999 | Fisher et al. |
| 5,790,791 A | 8/1998 | Chong et al. | 5,995,916 A | 11/1999 | Nixon et al. |
| 5,793,963 A | 8/1998 | Tapperson et al. | 6,002,104 A | 12/1999 | Hsu |
| 5,794,071 A | 8/1998 | Watanabe et al. | 6,008,985 A | 12/1999 | Lake et al. |
| 5,796,602 A | 8/1998 | Wellan et al. | 6,014,591 A | 1/2000 | Ikeda et al. |
| 5,797,038 A | 8/1998 | Crawford et al. | 6,014,612 A | 1/2000 | Larson et al. |
| 5,801,770 A | 9/1998 | Paff et al. | 6,016,515 A | 1/2000 | Shaw et al. |
| 5,801,942 A | 9/1998 | Nixon et al. | 6,018,627 A | 1/2000 | Iyengar et al. |
| 5,802,389 A | 9/1998 | McNutt | 6,018,816 A | 1/2000 | Tateyama |
| 5,805,442 A | 9/1998 | Crater et al. | 6,026,336 A | 2/2000 | Sakurai et al. |
| 5,805,889 A | 9/1998 | Van De Vanter | 6,026,352 A | 2/2000 | Burns et al. |
| 5,805,922 A | 9/1998 | Sim et al. | 6,032,208 A | 2/2000 | Nixon et al. |
| 5,812,394 A | 9/1998 | Lewis et al. | H001845 H | 3/2000 | Kelly |
| 5,815,152 A | 9/1998 | Collier et al. | 6,033,257 A | 3/2000 | Lake et al. |
| 5,815,710 A | 9/1998 | Martin et al. | 6,035,264 A | 3/2000 | Donaldson et al. |
| 5,822,220 A | 10/1998 | Baines | 6,038,486 A | 3/2000 | Saitoh et al. |
| 5,828,563 A | 10/1998 | Suzuki et al. | 6,049,578 A | 4/2000 | Senechal et al. |
| 5,828,567 A | 10/1998 | Eryurek et al. | 6,049,775 A | 4/2000 | Gertner et al. |
| 5,828,851 A | 10/1998 | Nixon et al. | 6,052,629 A | 4/2000 | Leatherman et al. |
| 5,828,882 A | 10/1998 | Hinckley | 6,055,633 A | 4/2000 | Schrier et al. |
| 5,831,669 A | 11/1998 | Adrain | 6,061,603 A | 5/2000 | Papadopoulos et al. |
| 5,832,268 A | 11/1998 | Anderson et al. | 6,070,250 A | 5/2000 | Yeager et al. |
| 5,832,418 A | 11/1998 | Meyer | 6,073,109 A | 6/2000 | Flores et al. |
| 5,835,704 A | 11/1998 | Li et al. | 6,076,124 A | 6/2000 | Korowitz et al. |
| 5,838,563 A | 11/1998 | Dove et al. | 6,078,320 A | 6/2000 | Dove et al. |
| 5,838,920 A | 11/1998 | Rosborough | 6,078,848 A | 6/2000 | Bernstein et al. |
| 5,838,969 A | 11/1998 | Jacklin et al. | 6,085,120 A | 7/2000 | Schwerdtfeger et al. |
| 5,841,360 A | 11/1998 | Binder et al. | 6,094,600 A | 7/2000 | Sharpe, Jr. et al. |
| 5,841,654 A | 11/1998 | Verissimo et al. | 6,095,674 A | 8/2000 | Verissimo et al. |
| 5,841,963 A | 11/1998 | Nakamikawa et al. | 6,098,116 A | 8/2000 | Nixon et al. |
| 5,844,601 A | 12/1998 | McPheely et al. | 6,104,875 A | 8/2000 | Gallagher et al. |
| 5,844,796 A | 12/1998 | Araki et al. | 6,105,132 A | 8/2000 | Fritch et al. |
| 5,844,804 A | 12/1998 | Schussler et al. | 6,108,662 A | 8/2000 | Hoskins et al. |
| 5,845,078 A | 12/1998 | Tezuka et al. | 6,115,468 A | 9/2000 | De Nicolo |
| 5,847,957 A | 12/1998 | Cohen et al. | 6,129,449 A | 10/2000 | McCain et al. |
| 5,848,393 A | 12/1998 | Goodridge et al. | 6,134,559 A | 10/2000 | Brumme et al. |

| | | | |
|---|---|---|---|
| 6,139,177 A | 10/2000 | Venkatraman et al. | |
| 6,140,911 A | 10/2000 | Fisher et al. | |
| 6,151,625 A | 11/2000 | Swales et al. | |
| 6,154,875 A | 11/2000 | Tanaka et al. | |
| 6,157,864 A | 12/2000 | Schwenke et al. | |
| 6,170,007 B1 | 1/2001 | Venkatraman et al. | |
| 6,173,414 B1 | 1/2001 | Zumkehr et al. | |
| 6,176,421 B1 | 1/2001 | Royal, Jr. et al. | |
| 6,183,289 B1 | 2/2001 | Lake et al. | |
| 6,195,591 B1 | 2/2001 | Nixon et al. | |
| 6,195,694 B1 | 2/2001 | Chen et al. | |
| 6,195,774 B1 | 2/2001 | Jacobson | |
| 6,199,068 B1 | 3/2001 | Carpenter | |
| 6,199,195 B1 | 3/2001 | Goodwin et al. | |
| 6,201,996 B1 | 3/2001 | Crater et al. | |
| 6,212,440 B1 | 4/2001 | Suzuki et al. | |
| 6,212,608 B1 | 4/2001 | Bak | |
| 6,216,158 B1 | 4/2001 | Luo et al. | |
| 6,218,930 B1 | 4/2001 | Katzenberg et al. | |
| 6,260,187 B1 | 7/2001 | Cirne | |
| 6,266,724 B1 | 7/2001 | Harari et al. | |
| 6,268,789 B1 | 7/2001 | Diamant et al. | |
| 6,269,473 B1 | 7/2001 | Freed et al. | |
| 6,272,529 B1 | 8/2001 | Lum | |
| 6,272,556 B1 | 8/2001 | Gish | |
| 6,282,454 B1 | 8/2001 | Papadopoulos et al. | |
| 6,285,966 B1 | 9/2001 | Brown et al. | |
| 6,295,513 B1 | 9/2001 | Thackston | |
| 6,311,101 B1 | 10/2001 | Kastner et al. | |
| 6,314,464 B1 | 11/2001 | Murata et al. | |
| 6,327,511 B1 | 12/2001 | Naismith et al. | |
| 6,332,163 B1 | 12/2001 | Bowman-Amuah | |
| 6,334,161 B1 | 12/2001 | Suzuki et al. | |
| 6,345,382 B1 | 2/2002 | Hughes | |
| 6,349,287 B1 | 2/2002 | Hayashi | |
| 6,353,859 B1 | 3/2002 | McKeehan et al. | |
| 6,353,860 B1 | 3/2002 | Hare et al. | |
| 6,370,573 B1 | 4/2002 | Bowman-Amuah | |
| 6,405,099 B1 | 6/2002 | Nagai et al. | |
| 6,405,210 B1 | 6/2002 | Doyle et al. | |
| 6,412,070 B1 | 6/2002 | Van Dyke et al. | |
| 6,418,499 B1 | 7/2002 | Korowitz et al. | |
| 6,424,883 B1 | 7/2002 | Hosokawa et al. | |
| 6,430,564 B1 | 8/2002 | Judge et al. | |
| 6,442,442 B1 | 8/2002 | Weinhofer | |
| 6,445,962 B1 | 9/2002 | Blevins et al. | |
| 6,449,624 B1 | 9/2002 | Hammack et al. | |
| 6,449,715 B1 | 9/2002 | Krivoshein | |
| 6,480,955 B1 | 11/2002 | DeKoning et al. | |
| 6,496,892 B1 | 12/2002 | Lake et al. | |
| 6,499,048 B1 | 12/2002 | Williams | |
| 6,501,995 B1 | 12/2002 | Kinney et al. | |
| 6,510,352 B1 | 1/2003 | Badavas et al. | |
| 6,526,455 B1 | 2/2003 | Kamimura | |
| 6,526,516 B1 | 2/2003 | Ishikawa et al. | |
| 6,574,515 B1 | 6/2003 | Kirkpatrick et al. | |
| 6,598,224 B1 | 7/2003 | Maeda et al. | |
| 6,612,022 B1 | 9/2003 | Gale et al. | |
| 6,622,147 B1 | 9/2003 | Smiga et al. | |
| 6,640,308 B1 | 10/2003 | Keyghobad et al. | |
| 6,654,353 B1 | 11/2003 | Tokura et al. | |
| 6,671,763 B1 | 12/2003 | Korowitz et al. | |
| 6,675,193 B1 | 1/2004 | Slavin et al. | |
| 6,701,284 B1 | 3/2004 | Huntley et al. | |
| 6,718,533 B1 | 4/2004 | Schneider et al. | |
| 6,738,388 B1 | 5/2004 | Stevenson et al. | |
| 6,754,885 B1 * | 6/2004 | Dardinski et al. | 717/113 |
| 6,760,687 B2 | 7/2004 | Apel et al. | |
| 6,775,707 B1 | 8/2004 | Bennett et al. | |
| 6,788,980 B1 | 9/2004 | Johnson | |
| 6,792,321 B2 | 9/2004 | Sepe, Jr. | |
| 6,799,148 B2 | 9/2004 | Ling et al. | |
| 6,799,195 B1 | 9/2004 | Thibault et al. | |
| 6,806,847 B2 | 10/2004 | Nixon et al. | |
| 6,850,973 B1 | 2/2005 | Larson et al. | |
| 6,853,867 B1 | 2/2005 | Klindt et al. | |
| 6,868,538 B1 | 3/2005 | Nixon et al. | |
| 6,874,082 B2 | 3/2005 | Tateyama et al. | |
| 6,895,409 B2 | 5/2005 | Uluakar et al. | |
| 6,928,396 B2 | 8/2005 | Thackston | |
| 6,978,194 B2 | 12/2005 | McIlhany et al. | |
| 6,983,227 B1 | 1/2006 | Thalhammer-Reyero | |
| 7,020,532 B2 | 3/2006 | Johnson et al. | |
| 7,024,282 B2 | 4/2006 | Coogan et al. | |
| 7,086,009 B2 * | 8/2006 | Resnick et al. | 715/771 |
| 7,089,530 B1 * | 8/2006 | Dardinski et al. | 717/105 |
| 7,096,465 B1 * | 8/2006 | Dardinski et al. | 717/178 |
| 7,146,231 B2 | 12/2006 | Schleiss et al. | |
| 7,151,966 B1 | 12/2006 | Baier et al. | |
| 7,162,510 B2 | 1/2007 | Jammes | |
| 7,177,052 B2 | 2/2007 | Lapstun et al. | |
| 7,199,784 B2 | 4/2007 | Mathiowetz et al. | |
| 7,245,271 B2 | 7/2007 | Nixon et al. | |
| 7,272,815 B1 * | 9/2007 | Eldridge et al. | 717/101 |
| 7,275,062 B2 | 9/2007 | Deitz et al. | |
| 7,337,256 B2 | 2/2008 | Korowitz et al. | |
| 2001/0007133 A1 | 7/2001 | Moriconi et al. | |
| 2001/0007183 A1 | 7/2001 | Weder | |
| 2001/0025307 A1 | 9/2001 | Venkatraman et al. | |
| 2001/0034777 A1 | 10/2001 | Venkatraman et al. | |
| 2001/0034778 A1 | 10/2001 | Venkatraman et al. | |
| 2001/0034779 A1 | 10/2001 | Venkatraman et al. | |
| 2001/0034780 A1 | 10/2001 | Venkatraman et al. | |
| 2001/0034781 A1 | 10/2001 | Venkatraman et al. | |
| 2001/0037489 A1 | 11/2001 | Stripf et al. | |
| 2001/0044836 A1 | 11/2001 | Venkatraman et al. | |
| 2001/0052109 A1 | 12/2001 | Nagashima et al. | |
| 2002/0013629 A1 | 1/2002 | Nixon et al. | |
| 2002/0067370 A1 | 6/2002 | Forney et al. | |
| 2002/0133636 A1 | 9/2002 | Venkatraman et al. | |
| 2002/0150156 A1 | 10/2002 | Calvin | |
| 2002/0194393 A1 | 12/2002 | Hrischuk et al. | |
| 2003/0009250 A1 * | 1/2003 | Resnick et al. | 700/94 |
| 2003/0051068 A1 | 3/2003 | Eldridge et al. | |
| 2003/0167269 A1 | 9/2003 | Gupta | |
| 2003/0208558 A1 | 11/2003 | Venkatraman et al. | |
| 2004/0103165 A1 | 5/2004 | Nixon et al. | |
| 2005/0138226 A1 | 6/2005 | Tateyama et al. | |
| 2006/0206860 A1 * | 9/2006 | Dardinski et al. | 717/105 |
| 2006/0206866 A1 * | 9/2006 | Eldrige et al. | 717/122 |
| 2007/0006149 A1 * | 1/2007 | Resnick et al. | 717/116 |
| 2007/0019560 A1 | 1/2007 | Brewer et al. | |
| 2007/0061786 A1 * | 3/2007 | Zhou et al. | 717/136 |
| 2007/0083552 A1 | 4/2007 | Allen et al. | |
| 2007/0244517 A1 | 10/2007 | Callaghan | |
| 2007/0244571 A1 | 10/2007 | Wilson et al. | |
| 2009/0118845 A1 * | 5/2009 | Eldridge et al. | 700/86 |
| 2009/0118846 A1 * | 5/2009 | Eldridge et al. | 700/86 |
| 2009/0125128 A1 * | 5/2009 | Eldridge et al. | 700/86 |
| 2009/0125129 A1 * | 5/2009 | Eldridge et al. | 700/86 |
| 2009/0125130 A1 | 5/2009 | Eldridge et al. | |
| 2009/0125131 A1 * | 5/2009 | Eldridge et al. | 700/87 |
| 2009/0132996 A1 * | 5/2009 | Eldridge et al. | 717/108 |
| 2010/0222902 A1 | 9/2010 | Eldridge et al. | |

FOREIGN PATENT DOCUMENTS

| | | |
|---|---|---|
| WO | WO-9504314 A1 | 2/1995 |
| WO | WO-9623377 A1 | 8/1996 |
| WO | WO-9631047 A2 | 10/1996 |
| WO | WO-9707486 A1 | 2/1997 |
| WO | WO-9820649 A1 | 5/1998 |
| WO | WO-9836518 A2 | 8/1998 |

WO    WO-9854843 A1    12/1998

OTHER PUBLICATIONS

"A sensation in supervisory control," Manufacturing Systems (Windows NT in manufacturing Supplement), Oct. 1996, pp. 12A-24A.
"Agenda," ISA/SP50—1988-180, ISA Draft.
"Agenda," World Batch Forum 1994 (Mar. 6-9, 1994), Tempe, AZ, (9 pages).
"At Interop, Will ToasterNet Be on the Hot List?" Data Communications, vol. 19, No. 13, Oct. 1990, p. 214.
"Automatic Control Systems," George J. Thayer, et al., pp. 1-60, 1989.
"Automation Controller accepts Customization," News Release, Control Technology, Jul. 12, 1985, (DialogWeb search result).
"Automation Controller features fast 80186 Processor, Integrated Software," News Release, Control Technology (US), Apr. 22, 1986, (DialogWeb search result).
"Automation Programming Environment runs on IBM (R)-PC," News Release, Control Technology (US), Mar. 29, 1988, (DialogWeb search result).
"Automation System Monitors, Controls Fab HVAC, Other Systems," Microcontamination (Aug. 1994).
"Breaking News for Invensys Software Systems Employees: iBaan and FactorySuite 2000 Integration Announced," internal e-mail dated Mar. 23, 2001.
"Briefs," Network World, May 29, 1995, p. 19.
"Bsy's List of Internet Accessible Coke Machines," web page print-out (Feb. 12, 1999) from http://www-cse.ucsd.edu/users/bsy/coke.html (1 page).
"CAD/CAM Software creates Automation 'Programming Environment'," News Release, Control Technology (US), Oct. 3, 1988, (DialogWeb search result).
"CMU SCS Coke Machine: Current Status," web page print-out (Feb. 12, 1999) from http://www.cs.cmu.edu/.about.coke/ (1 page).
"Compact System combines Motion Control, Machine Control," News Release, Control Technology, May 28, 1985, (DialogWeb search result).
"Company Profiles: What Users Need," Power vol. 139 No. 6 (Jun. 1995), p. 81.
"Control System Features Plug-and-Play Technology, Scalability," Chemical Processing (May 1996), p. 33.
"DeltaV(tm) System: We Do Smart Plants." Brochure issued by Fisher-Rosemount Systems (1998).
"DeltaV.sup.TM. System Overview: We Do More." Brochure issued by Fisher-Rosemount Systems (1998).
"DeltaV.TM. System Overview: Do More." Brochure issued by Fisher-Rosemount Systems (1998).
"Disk Drive with Embedded Hyper-Text Markup Language Server," IBM TDB, vol. 38, n. 12, Dec. 1995, pp. 479-480.
"Dual-Axis Servo Module for Small Controller," News Release, Control Technology (US), Sep. 11, 1990, (DialogWeb search result).
"Editors' Product Picks," Chemical Processing (May 1996), p. 34.
"Elsag Bailey Automation," (in Italian, no date).
"Embedded Systems Conference Addresses the Increasing Complexity of Electronic Systems Design; Technical Program and Exhibits Help Embedded Systems Design Professionals Keep Pace with Rapid Change," PR Newswire, Dec. 27, 1995.
"ErgoTech upgrades ErgoCim; First 'plug and play' component software for manufacturing," Business Wire, Feb. 15, 1996.
"Fisher-Rosemount Is: Managing the Process Better," Fisher Controls International, Inc. and Rosemount Inc. 1993, (19 pages).
"Gensym Announces Its Initiative for Leveraging Intelligent Systems with Internet/Intranet Technology," Business Wire, Oct. 7, 1997.
"Gensym Introduces G2 WebMiner for accessing and reasoning about data from the World Wide Web," Business Wire, May 15, 1996.
"Gensym introduces Internet connectivity for its G2 family of intelligent real-time software," Business Wire, Mar. 18, 1996.
"I/A Series Model 51 FoxRemote II Installation and Configuration Guide," Apr. 8, 1998 (Preliminary), pp. i-iv, 1-2.
"Industries Fashion NASA Products Into Commercial Work", Anne Eisele, Space News, v9, n14, p. 14, Apr. 6, 1998, 1 page.
"Industry's top embedded operating software supports Java; pSOSystem enables Embedded Internet applications and Low-cost Internet appliances," Business Wire, Feb. 1, 1996.
"Inexpensive Automation Controller features Message Display Capability," News Release, Control Technology (US), May 19, 1989, (DialogWeb search result).
"Information technology in manufacturing," Manufacturing Systems, vol. 14, No. 12, Dec. 1996, pp. 54-78.
"Innovative Small Controller Family offers Full Integration," News Release, Control Technology, Aug. 17, 1989, (DialogWeb search result).
"Integrated Systems; Industry's top embedded operating software supports Java," M2 Presswire, Mar. 4, 1996.
"Internet windows to the world," New Media Age, Oct. 26, 1995, p. 4.
"Introducing Bailey Evolution 90.TM. . . . The sound investment strategy for process automation," Bailey infi 90 (brochure).
"Jim Henry's 1996 ASEE Paper," web page print-out from http://chem.engr.utc.edu/Documents/ASEE-96-full.html (5 pages).
"Linear Actuators offer Plug-Compatibility with Controller," News Release, Control Technology (US), Nov. 21, 1985, (DialogWeb search result).
"Low-Cost Automation Controller features Motion Control, Communications," News Release, Control Technology (US), Mar. 7, 1988, (DialogWeb search result).
"Make Your Automation Plan a Reality: MAX1000," Leeds & Northrup Technical Overview, no date.
"Modular Valve Assemblies Connect to Controller with Ribbon Cable," New Product Release, Control Technology (US), Jan. 8, 1986, (DialogWeb search result).
"Multi-Tasking Controller provides High-level Instructions for Motion Control, Sequencing," News Release, Control Technology Corporation, Aug. 22, 1986, (DialogWeb search result).
"NCR Fieldbus Slave Controller Advance Information," ISA-SP50-1988-161, ISA Draft.
"New at IPC/92! Ethernet link provides Global PLC Registers," News Release, Control Technology (US), Nov. 20, 1992, (DialogWeb search result).
"New at IPC/92! High-Capacity Integrated Motion Controller," News Release, Control Technology (US) Nov. 20, 1992, (DialogWeb search result).
"New Equipment/Literature," Control System vol. 139, No. 4 (Apr. 1995), p. 114.
"New Open Architecture Group Works on Control Standards," Control Engineering Online (Aug. 1997).
"New Products Provide Interactive Graphics Over Web Using Netscape Plug-Ins and Java," PR Newswire, May 20, 1996.
"New Small Automation Controller features Precision Analog I/O Modules," News Release, Control Technology (US), May 30, 1989, (DialogWeb search result).
"New State-Logic Microcontroller," News Release, Control Technology Corp., Jun. 1, 1996 (DialogWeb search result).
"New Telemecanique Programmable Controllers Feature Multiple Programming Languages," (Feb. 11, 1985).
"On-Line Vending Machine and Catalog Product Icons," IBM TDB, v. 38, n. 4 (Apr. 1995), pp. 113-116.
"Operator's Console creates 'Friendly' Machines," News Release, Control Technology (US), May 19, 1986, (DialogWeb search result).
"Operator's Console for Automated Machines," News Release, Control Technology, Aug. 15, 1985, (DialogWeb search result).
"Peter Beebee's Home Page," web page print-out (Feb. 12, 1999) from http://www-swiss.ai.mit.edu/htbin/ptbbgate/jwz/?fetch+personal%2Fmain.text.html (2 pages).
"Pipeline: Announced," InfoWorld, May 29, 1995, p. 45.
"Plant Operations Framework," AMR Report (May/Jun. 1995), (6 pages).
"Plug-Compatible Controls and Actuators Speed System Development," News Release, Control Technology (US), Jan. 13, 1986, (DialogWeb search result).
"Policy Manual," 1994 World Batch Forum (Mar. 6-9, 1994), (15 pages).
"Process Manager Specification and Technical Data," UC03-300 Sep. 1991 Honeywell.COPYRGT. 1990, (43 pages).

"Programmable Controller offers control of Stepping and Servo Motors," News Release, Control Technology, May 31, 1985, (DialogWeb search result).

"Radio Field Bus," ISA/SP50—1988-184, ISA Draft.

"Real-Time Innovations Email NewsLetter," Apr. 1998, http://www.rti.com/corporate/newsletter04-98, 2 pages.

"RTI Announces Major New Component-Based Programming System for Building Complex Electromechanical Systems", PR Newswire, Mar. 16, 1998, 3 pages.

"SDRD Using 1553B Data Link Services," ISA/SP50-1988-243 (1988).

"SECS-11 Communication Board Plugs into Automation Controller," News Release, Control Technology, Aug. 26, 1985, (DialogWeb search result).

"Signal Conditioners Designed for Fisher-Rosemount System Delta V," issued by M-Systems Co., Ltd. (Dec. 1997).

"Small Multi-Tasking Controller for Cost-sensitive Aplications," News Release, Control Technology US, Nov. 8, 1988, (DialogWeb search result).

"SP88 Mes Task-Force Europe Position Document," 1994 World Batch Forum (Mar. 6-9, 1994), (pp. 1-30).

"Special Topic: PC-Based Control," A Supplement to Software Strategies, pp. 3-5, 7-8, 10-15, 20-21.

"Suggested Outline for Application Sub-committee Document: Fieldbus Architecture Subcommittee Document," ISA/SP50—1988-175, ISA Draft.

"System Provides Stepping Motor Control in Workcell Environment," News Release, Control Technology Corp., Dec. 5, 1986, (DialogWeb search result).

"TDC 3000 Overview," Honeywell, no date.

"TDC 3000 Process Manager.TM.: Process Connected Solutions for the Advanced Controls Requirements of the 1990s," Honeywell, no date.

"The 'Only' Coke Machine on the Internet," web page print-out (Feb. 12, 1999) from http://www.cs.cmu.edu/.about.coke/history_long.txt (3 pages).

"The Object Primer", Scott Ambler, pp. 1-248. Jan. 4, 1996.

"The Switzerland Coke Machine Credits," web page print-out (Feb. 12, 1999) from http://www-swiss.ai.mit.edu/htbin/coke/ (1 page).

"Toshiba Integrated Control System," Technical Manual Third Edition (Nov. 1990).

"Tour an actual TribeLink via WebManage," web page print-out from http://www.tribe.com/products/webmanage/quick_view.htm. (1 page).

"Tribe Announces Revolutionary Use of the Internet; Launches Innovative Remote Management Solution; New WebManage Technology Provides Network Management via World Wide Web," Business Wire, May 22, 1995.

"Tribe Computer Works' Net Products Can be Managed via World Wide Web," IAC (SM) Newsletter Database.TM., DataTrends Publications, Inc., No. 11, vol. 7, May 30, 1995.

"Tribe Launches First Networking Device Capable of Being Managed via Internet Web Browser; TribeLink2 Enables Remote Computing and Internet Access," Business Wire, May 22, 1995.

"Tribe Launches Innovative Remote Management Solution; New WebManage Technology Provides Network Management Via the World Wide Web," web page print-out (Jul. 12, 1999) from http://www.tribe.com/products/webmanage/wm_pr. (1 page).

"TribeRoute," web page print-out (Jul. 12, 1999) from http://www.tribe.com/products/tr/index. (3 pages).

"TribeStar," web page print-out from http://www.tribe.com/products/tribestar/index.htm (3 pages).

"UDC 6000 Process Controller: From Stand-alone Control to Full System Integration Honeywell Has a Solution for You," Honeywell, no date.

"Unbundling the DCS" (no publication information).

"User Layer Structure," SP-50 Technical Report (Jul. 25, 1990).

"User Layer Technical Report," ISA/SP-50 1990-389C, ISA Draft.

"Wide-range, Fully Compatible Family of Process Automation & Management Systems," Copyright 1993 by Elsag Bailey Group as an Unpublished Work, (24 pages).

"Wizards wheel over SCADA systems; Supervisory Control and Data Acquisition," Control and Instrumentation, No. 12, vol. 28, Dec. 1996, p. 23.

"WWWF'94: Papers Received," web page print-out (Apr. 7, 2000) from http://www.ncsa.uiuc.edu/SDG/IT94/Agenda/Papers-received.html (8 pages).

AC I/O Modules Available for Low-Cost Automation Controller, News Release, Control Technology Corporation, Jun. 28, 1989, (DialogWeb search result).

Adler, David J. et al. "Does a Manufacturing Execution System Reduce the Cost of Production for Bulk Pharmaceuticals?" 1995 World Batch Forum (May 22-24, 1995), (13 pages).

Andrews, "15 MB in a Matchbook" (Jan. 1995)http://www.byte.com/art/9501/sec4/art5.htm.

ANSI/ASME PTC 19.1-1985, "Part 1—Measurement Uncertainty", Apr. 30, 1986, entire document.

Application of PRIAM Model to Safety Systems on Offshore Oil/Gas Platforms. Silvertech Ltd., Jan. 9, 1995.

Ash, Raymond H. et al. "Strategic Needs in Batch Manufacturing," 1995 World Batch Forum (May 22-24, 1995), (8 pages).

Bader, F. P. "Building a Better Batch Control Foundation with IEC 1131-3 Control Languages," 1994 World Batch Forum (Mar. 6-9, 1994), (23 pages).

Batch Control. Part I: Models and Terminology. (Approved Feb. 28, 1995) ISA-S88.01 1995.

Baxter, Richard V., Jr. "Implementing Open Networking in a Motor Drive," The Imbedded Internet Workshop Real World Applications Session (Oct. 1, 1999) San Jose, CA.

Beestermoller, H.J., et al. "An Online and offline programmable Multi-Loop Controller for Distributed Systems," IEEE (1994), pp. 15-20.

Benkhallat, Yazid, et al. "Interoperability of sensors and distributed systems," Sensors and Actuators A vol. 37-38 (1993), 247-254.

Benner, Stephen J. "MES in Batch Process Manufacturing. A MES Vendor view" 1995 World Batch Forum (May 22-24, 1995), (8 pages).

Bernard, Viki, "Remote-access ware emerge: Shiva, Nortel, and Tribe leading list of innovators," PCWeek, No. 21, vol. 12, May 29, 1995, p. 47.

Bishop, Brian. "Realtime System-Design Tool Models Electromechanical Systems" Personal Eng & Instrumentation News, v15, n4, p. 21, Apr. 1998.

Blevins, Terry. "Characterisitics of Function Block Requirements for the Process Industry and Manufacturing Automation," Fisher-Rosemount, Oct. 31, 1995.

Bristol, E H., "Not a Batch Language; A Control Language!" 1995 World Batch Forum (May 22-24, 1995), (14 pages).

Brown, Jerry et al. "Meeting the Challenge of Automation Technology," 1996 World Batch Forum (May 22-24, 1995), (11 pages).

Brown, Jerry et al. "Trends and Opportunities in Batch Control System Architectures," 1994 World Batch Forum (Mar. 6-9, 1994), (pp. 1-12).

Browne, Malcolme W. "South Pole Ready for Internet Revolution," the New York Times, Section C, col. 1, p. 1, Jan. 10, 1995.

Brunn, P. "Collision Avoidance for Two Robots Sharing a Common Workspace," (1995) The Institution of Electrical Engineers.

Bullotta, Rick. "Designing Effective User Interfaces for Batch Processes," 1994 World Batch Forum (Mar. 6-9, 1994), (pp. 1-19).

Burton, P.I. "A personal history of batch control," Measurement + Control vol. 27 (Apr. 1994), pp. 69-73.

Burton, P.I., et al. "Field Bus Based on MIL-STD-1553B: Proposal to ISA-Sp-50" ERA Technology Ltd. (Apr. 6, 1988) ISA/SP50-1988-148.

Capetta, L., et al. "From Current Actuators and Transmitters Towards Intelligent Actuation and Measurement: PRIAM Approach," BIAS 93.

Caro, Richard H. "Field Bus Applications," ISA (1989) Paper #89-0569, pp. 989-994.

Caro, Richard H. "The Fifth Generation Process Control Architecture," ISA (1988) Paper #88-1487, pp. 659-667.

Caro, Richard H. "The Fifth Generation Process Control Architecture," ISA Transactions vol. 28 No. 4 (1989), pp. 23-28.

Chettle, Tim. "Multiplexing techniques optimise data collection," Electrotechnology (Oct./Nov. 1995).
Coleman, Vernon. "National Electrical Manufacturers Association Field Bus Report to ISA SP50," (Oct. 1988) ISA/SP50-1988-234.
Conference Record of the 1993 IEEE Industry Applications Conference, Part III (excerpt) (pp. 24-31).
Contents, Proceedings of the Second International Workshop on Configurable Distributed Systems, Mar. 21-23, 1994, Pittsburgh, PA.
ControlShell Version 5.1 User's Manual, Real-Time Innovations, Jun. 1996, whole manual.
ControlShell Version 6.0 User's Manual, Real-Time Innovations, Jan. 1999, whole manual.
Cox, Mark J. and Baruch, Dr. John E. F. "Robotic Telescopes: An Interactive Exhibit on the World-Wide Web," web page print-out from http://www.ncsa.uiuc.edu/SDG/IT94/Proceedings/Museum/cox/markcox.html (11 pages), 1994.
Craig, Lynn W. "SP-88 Defines Batch Control," INTECH Mar. 1994, pp. 34-37.
Crowder, R. S. "A Communication Architecture for Automation & Control," ISA, pp. 669-673.
Crowder, R. S. "Generic Data Link Transactions for Simple Devices," Proposal to ISA SP 50 & IEC/SC65C/WG6 (Oct. 15, 1988) ISA Document.
Deitel, H.M. & Deitel, P.J. "C++ How to Program" . 1994. Prentice Hall pp. 159 & 357.
Delahostria. Communication Model Application Layer. (Oct. 14, 1988) ISA/SP50-1988 247, ISA Draft.
Delfino, B. and Pinceti, P. "Fieldbus Applications for Electrical Industrial Systems," IEEE (1993), pp. 2084-2090.
Demetratekes, Pam. "Go with the info flow; state-of-the-art automation in the food industry; includes related article on computer software for food processors," Food Processing, vol. 57, No. 7, Jul. 1996, p. 47.
Derso, Danyi. "Halozati szabalyozas," Meres es Automatika vol. 37 (1989), pp. 208-213.
Distributed Engineering, Institute of Computer-Aided Circuit Design—Test and Test Systems Division, University of Erlangen-Nurnberg, Germany, web page print-out (8 pages).
Dryden, Patrick, "Tribes WebManage Enables Remote Fixes," ComputerWorld, May 22, 1995, p. 14.
Duffey, C.K., et al. "High-Level Control Language Customizes Application Programs," IEEE Computer Applications in Power (1991), pp. 15-18.
Editing Committee Draft Application Layer, Version 12, Oct. 1991.
Editing Committee Draft Application Layer, Version 6, Dec. 1990.
Editing Committee Draft Application Layer, Version 8, May 1991.
Elmer-Dewitt, Philip, "Snowballs in Cyberspace; With a modem and a soldering iron, you too can build an Internet site that is really cool and totally useless," Time, Jan. 16, 1995, p. 57.
Esprit Project 6188, "PRIAM Dictionary: Major Terms and Definitions Used in the PRIAM Project," Prenormative Requirements for Intelligent Actuation and Measurement, May 1995.
Esprit Project 8244, "User Requirements for Intelligent Transmitters and Actuators," European Intelligent Actuation and Measurement User Group, Nov. 24, 1995.
Ferraiolo et al., a Role-Based Access Control Model and Reference Implementation Whinin a Corporate Intranet, ACM, Feb. 1999.
Fieldbus Inc. "The Foundation™ filedbus Primer," Revision 1.1, Released Jun. 24, 2001, 36 pages.
Fieldbus Standard for Use in Industrial Control Systems. Part 2: Physical Layer Specification and Service Definition. (1992) ANSI/ISA-S50.02.
Fisher, Thomas G P.E. "SP88 Update—Now and the Future," 1995 World Batch Forum (May 22-24, 1995), (59 pages).
Foster, Kirsten. "surf's up; lights, camera, but no action; Steve is a Tech-Nomad. He wanders the streets with a camera on his head. And he wants you to join him," The Independent (London), Aug. 13, 1995, p. 10.
Foxboro Fieldbus Proposal (Presented to ISA SP-50 Committee Feb. 24, 1988) ISA/SP50-1988-123B, ISA Draft.
Foxboro, "I/A Series $A^2$™ Software-FoxCTS-Change Tracking Software-Product Specifications," 1997-2003, pp: 1-8.
Foxboro, "I/a Series Software FoxDraw," 1996 (8 pages).
Foxboro, "I/A Series Software-FoxCTS™ —Change Tracking Software-Product Specifications," 1997-2006, pp: 1-12.
Foxboro, "I/A Series-Object Manager Calls-Oct. 31, 1995," pp: 1-124.
Foxboro, "Intelligent Automation Series Human Interface Software", 20 pgs., 1997.
Friscia, Anthony et al. "MES: Manufacturing's Missing Link is a Tool for Change," 1994 World Batch Forum (Mar. 6-9, 1994), (7 pages).
Fulcher, Jim and Dilger, Karen Abramic, "Soft control, Internet spark ISA/96," Manufacturing Systems, vol. 14, No. 12, Dec. 1996, pp. 40-46.
Furness, Harry. "Fieldbus: The Differences Start From the Bottom Up," Control Engineering (Mar. 1994), pp. 75-77.
Gertz, Matthew, et al. "A Human-Machine Interface for Distributed Virtual Laboratories," IEEE Robotics & Automation Magazine 1 (Dec. 1994) No. 4 (New York) pp. 5-13.
Gillespie, David P., Ph.D. "Comprehensive Information Management: EPA, OSHA, and Beyond," 1995 World Batch Forum (May 22-24, 1995), (14 pages).
Gleick, James. "Fast Forward: Really Remote Control," The New York Times, Section 6, col. 3, p. 42, Dec. 3, 1995.
Goldberg, Ken et al. "Desktop Teleoperation via the World Wide Web," IEEE International Conference on Robotics and Automation, pp. 654-659.
Goldberg, Ken, et al. "Beyond the Web: manipulating the real world," Computer Networks and ISDN Systems 28 (1995) pp. 209-219.
Goldstein, Ira and Hardin, Joseph, "Guest editorial," Computer Networks and ISDN Systems 28 (1995) p. 1.
Grant, Dr. R. Peter, "The Impact of Reengineering on the Batch Manufacturing Workplace," 1995 World Batch Forum (May 22-24, 1995), (5 pages).
Gyorki, John R. "PLCs drive standard buses," Machine Design (May 11, 1995), pp. 83-90.
Hashemian, et al., "In-Situ Response Time Testing of Thermocouples", ISA 1989, Paper #89-0056, pp. 587-593.
Henry, "A Fault-Tolerant Interface for Self-Validating Sensors", Oxford University, Digest No. 1990/145 (Nov. 1990).
Henry, "A New Approach to Sensor Validation", IMC, Mar. 17, 1992.
Henry, "Intelligent Behaviour for Self-Validating Sensors", University of Oxford, Report No. OUEL 1912/92.
Henry, "Signal Processing, Data Handling and Communications: The Case for Measurement Validation," University of Oxford, Report No. OUEL 1912/92.
Henry, et al., "A Standard Interface for Self-Validating Sensors", University of Oxford, Report No. OUEL 1884/91.
Henry, et al., "The Implication of Digital Communications on Sensor Validation," University of Oxford, Report No. OUEL 1912/92.
Henry, Jim, Ph.D., P.E. "Implementation of Practical Control Systems: Problems and Solutions," web page print-out from http://chem.engr.utc.edu/Documents/Macscitech/MACSCITECHpaper1.html (22 pages).
Henry, Jim, Ph.D., P.E. "LabVIEW Applications in Engineering Labs: Controls, Chemical, Environmental," ASEE Conference, Anaheim, CA, Jun. 25-28, 1995, web page print-out from http://chem.engr.utc.edu/Documents/Asee-95-full.html (22 pages).
Hohenstein, David. "Between the host and device . . . ," Intech (Jul. 2000), (6 pages).
Holding, David and Wood, Graham. "Communications in microprocessor industrial implementation," Microprocessors and Microsystems vol. 3 No. 10 (Dec. 1979), pp. 443-451.
ICCard Design Sep./Oct. 1995.
Invensys, "FoxDraw Display Builder and Configurator", 8 pgs., 2004.
Johnson, Dick. "Pressure Sensing Advances: Are They in Your Process' Future?" Control Engineering (Apr. 1995), pp. 67-72.
Johnsson, et al., "High-Level Grafcet and Batch Control", Nov. 1994, Symposium ADPM.
Kelly, D. Mark. "Digital fieldbus cluster cuts plant's wiring costs up to 20%," INTECH (Apr. 1995), pp. 62-64.
Kissling, Jeffrey L. "Flexible Software Structure and Change Management," 1995 World Batch Forum (May 22-24, 1995), (16 pages).

Kline, "The Purposes of Uncertainty Analysis", vol. 107, Journal of Fluids Engineering, pp. 153-160 (Jun. 1985).

Ko, Diffu, "Trobe defines net management role for Web browser software," Network World, May 22, 1995, p. 14.

Koher H. J., et al.,"Integrating UML Diagrams for Production Control Systems," ACM p. 241-251, 2000.

Kostas, et al., "Real-Time Voice Over Packet-Switched Networks", pp. 18-27, IEEE Network (Jan./Feb. 1988).

Koth, H. and Oeder, K. "The Advantages of Intelligent Field Modules for Nuclear Power Plant Operation and Maintenance," Kemtechnik 60 (1996) 5-6, pp. 215-219.

Lenhart, Gerald W. "A Field Bus Approach to Local Control Networks," ISA, Paper #93-281 1993.

Lenhart, Gerald W. "Fieldbus-Based Local Control Networks," INTECH (Aug. 1994), p. 31-34.

Leon, Mark, "Tektronix to add Web software on new printers," InfoWorld, Dec. 4, 1995, p. 6.

License information from license.txt file as referenced/linked from VanNess, Shawn A. "GEO—the General Expression Object: Overview" Version 3.1 (beta1) © 1997-1999.

Loos, Peter. "Production Management—Linking Business Applications to Process Control," 1995 World Batch Forum (May 22-24, 1995), (pp. 1-16).

Loose, Graham. "Fieldbus—the user's perspective," Measurement + Control vol. 27 (Mar. 1994), pp. 47-51.

Martin, "Design and Strategy For Distributed Data Processing", Chptrs. 19 & 20, pp. 272-305 (1981).

Meeting Minutes, Ad Hoc Function Block Meeting, Jun. 14, 1990, Chapel Hill, NC.

Meeting Minutes, Process Control Working Group of SP50.4, Jan. 21-23, 1991, Atlanta, GA.

Meeting Minutes, SP50, International Electrotechnical Commission, Technical Committee No. 65: Industrial-Process Measurement and Control, Sub-Committee 65C: Digital Data Communications for Measurement and Control and Working Group 6: Field BusStandard f.

Meeting Minutes, SP50, Signal Compatibility of Electrical Instruments, Dec. 5-7, 1990, Orlando, FL.

Meeting Minutes, SP50.4 Application Layer, Oct. 19-21, 1988, Houston, TX.

Meeting Minutes, Windows Working Group of Application Subcommittee, Mar. 1-3, 1989, New Orleans, LA.

Meeting Notes, International Electrotechnical Commission Sub Committee No. 65C: Digital Communications Working Group 7, Process Control Function Blocks Report to AMT/7. Apr. 4, 1996.

Mirabella, Orazio. "A Short Presentation of IEC Fieldbus Application Layer," Informatics and Communication Institute, Engineering Faculty, University of Catania, Italy.

Miyoshi et al., "A Real-Time Java Server for Real-Time Match", 1997, IEEE, pp. 319-325.

Momal, F. and Pinto-Pereira, C. "Using World-Wide-Web for Control Systems," from Proceedings 1995 International Conference on Accelerator and Large Experimental Physics Control Systems, Chicago, IL, Oct. 30-Nov. 3, 1995.

Morel, G., et al. "Discrete Event Automation Engineering: Outline of the PRIAM Project."

Mori, et al., "The PCMCIA Developer's Guide, Second Edition," Sycard Technology 1994.

NOAH: Network Oriented Application Harmonisation based on General Purpose Field Communication System. Project description rev. 1.0, Oct. 25, 1995. P-NET, PROFIBUS, WorldFIP.

Nobuhiko, Tsuji, et al. "An Advanced Optical Fieldbus Instrumentation System Using 16×16 Reflection Type Optical Star Coupler and Low Powered Transmitter," pp. 755-764.

Notte, Angelo J. "Multitasking Capability Simplifies Process Control Design" (no date).

Object-Oriented Information Systems Planning and Implementation, David A. Taylor, Wiley Professional Computing, published Apr. 10, 1992, pp. 1-357.

Ochoa, David. "Effects of Alliances and Acquisitions on the Batch Automation User," 1995 World Batch Forum (May 22-24, 1996), (43 pages).

Output to Valve, Revision No. 1.4, Jan. 18, 1991, (Draft Document), Instrument Society of America.

Owen, S., et al. "A modular reconfigurable approach to the creation of flexible manufacturing cells for educational purposes," Fast Reconfiguration of Robotic and Automation Resources (Colloquium) Oct. 20, 1995, The Institution of ElectricalEngineers.

Pace, Hugh W. "Valve Actuators Ready for Fieldbus," Control Engineer (Oct. 1995), pp. 65-73.

Pages from Aspentech.com website as of Apr. 1999, retrieved from Internet archive http://web.archive.org.

Pages from Aspentech.com website as of Dec. 1997, retrieved from Internet archive http://web.archive.org.

Pages from Aspentech.com website as of Dec. 1998, retrieved from Internet archive http://web.archive.org.

Pages from Aspentech.com website as of Jan. 1997, retrieved from Internet archive http://web.archive.org.

Pages from Aspentech.com website as of Mar. 2000, retrieved from Internet archive http://web.archive.org.

Pages from Aspentech.com website as of Oct. 1996, retrieved from Internet archive http://web.archive.org.

Pages from SL.com website as of Apr. 1999, retrieved from Internet archive http://web.archive.org.

Pages from SL.com website as of Dec. 1998, retrieved from Internet archive http://web.archive.org.

Pages from SL.com website as of Feb. 1997, retrieved from Internet archive http://web.archive.org.

Pages from SL.com website as of May 2000, retrieved from Internet archive http://web.archive.org.

Pappalardo, Denise, "Digi Introduces IP/IPX Router," InternetWeek, Apr. 24, 1995, p. 15.

Pappalardo, Denise, "Router Can Be Managed via Net," InternetWeek, May 22, 1995, p. 6.

Peshek, Clifford J., et al. "Recent Developments and Future Trends in PLC Programming Languages and Programming Tools for Real-Time Control," IEEE Cement Industry Technical Conference (May 1993) Toronto, Canada, pp. 219-230.

Petti, Thomas F. and Dhurjati, Prasad S. "A Coupled Knowledge Based System Using Fuzzy Optimization for Advisory Control," IChE Journal vol. 38 (Sep. 1992) No. 9, pp. 1369-1378.

Pfeifer T. and Fussel B. "Sensorbetriebssystem fur messtechnische Problemstellungen in der Produktionstechnik," Technisches Messen vol. 58 (1991) Nos. 7/8.

Phinney, Thomas L. "An Analysis of Contending Proposals in ISA SP-50 for an ISA/IEC Field Instrument Bus," ISA (1988) Paper #88/1489.

Pinto, Jim. "The Great Fieldbus Debate—is Over," Action Instruments (www.actionio.com) (originally published in Industrial Controls Intelligence, Nov. 1999).

Preface: Field Bus Process Control User Layer Technical Support, Feb. 10, 1993.

Press Release from Real-Time Innovation announcing ControlShell version 6.0 for sale/for use, Apr. 1998, 2 pages.

Product Specification, I/A Series.RTM. RBATCH II.

PROWAY-LAN Industrial Data Highway. (Approved Feb. 3, 1986) ISA—S72.01-1985.

Reklaitis, G. V. "Scheduling Approaches for the Batch Process Industries," 1995 World Batch Forum (May 22-24, 1995), (17 pages).

Report from IEC TC65 Working Group 6 Function Blocks, May 1, 1995.

Rodriguez, Karen, "Tribe sets software," Interactive Age, vol. 2, No. 15, May 22, 1995, p, 25.

Rosenof, Howard P. "Dynamic Scheduling for a Brewery," 1995 World Batch Forum (May 22-24, 1995), (6 pages).

Scharf, Ronald, et al, "Using Mosaic for Remote Test System Control Supports Distributed Engineering," Institute of Computer-Aided Circuit Design—Test and Testsystems Division, University of Erlangen-Nurnberg, Germany, web page print-out fromhttp://www.ncsa.uiuc.edu/SDG/IT94/Proceedings/CSCW/scharf/scharf.html (8 pages), 1994.

Schreiber Philip et al. "Process Automation Using SP88," 1995 World Batch Forum (May 22-24, 1995), (7 pages).

Schuur, C. "Comments on 'Analysis and Suggestions for ISA-SP50' as submitted to the SP50 Committee by Honeywell Inc." (Mar. 11, 1988) ISA-SP50—1988-155, ISA Draft.

Schuur, Chris and Warrior, Jay. "Phillips Token Passing Field Bus Controller Timed Token Mode," ISA/SP50—1988-186, ISA Draft.

Silverman, Dwight. "'Attaboy' for the best software and hardware of 1994," The Houston Chronicle, Dec. 25, 1994, p. 2.

Skabowski, E. L. "Recommendations for Consideration at Oct. 1988 Application Layer Subcommittee Meeting," (Oct. 3, 1986).

Slater, A. F. "Controlled by the Web," Computer Networks and ISDN Systems 27 (1994) pp. 289-295.
SNAP Foundation Template "Using the SNAP Development Environment," Version 8.0, Chapters 1-4, 1997.
Solvie, Michael J. "Configuration of Distributed Time-Critical Fieldbus Systems," IEEE (1994), p. 211.
Soreide, N. N., et al. "Mosaic access to real-time data from the TOGA-TAO array of moored buoys," Computer Networks and ISDN Systems 28 (1995), pp. 189-197.
Stapleton, Nick. "802.3 Working Group DTE Power via MDI Call for interest," 3Com (Jul. 1999), (15 pages).
Stevens, et al. "TCP/IP Illustrated, vol. 1. The Protocols," TCP/IP Illustrated vol. 1, XP-002106390, pp. 85-96.
Strack, Bob. "The HAWK is Soaring," Chemical Processing (May 1996) p. 11.
Strobhar, David A. "Evolution of Operator Decision Making," 1995 World Batch Forum (May 22-24, 1995), (6 pages).
Strothman, Jim and Ham, John. "Alliances, Fieldbus, Windows Stir ISA/94 Anaheim Pot," INTECH (Dec. 1994), pp. 32-35.
Strothman, Jim and Ham, John. "ISA/95 New Orleans: 'Open', NT winds (not Opal) blow strong," INTECH (Nov. 1995), pp. 45-48.
Table of Contents, Automation & Technology Department, 1993.
Table of Contents, Automation & Technology Department, 1995.
Table of Contents, Industrial Computing Society (no date).
Table of Contents, ISA/88, Houston, TX, (no date).
Table of Contents, ISA/89, (no date).
Table of Contents, Proceedings of the 20th International Conference on Industrial Electronics Control and Instrumentation, vols. 1-3, Sep. 5-9, 1994, Bologna, Italy.
Table of Contents, Proceedings of the 7th Mediterranean Electrotechnical Conference, vol. 1, Apr. 12-14, 1994, Antalya, Turkey.
Table of Contents, Proceedings of the Industrial Computing Conference, vol. 3, Sep. 19-24, 1993, Chicago, IL. Industrial Computing Society.
Taylor, "Object Oriented Information Systems", 368 pgs., Apr. 10, 1992.
Taylor, Ken and Trevelyan, James, "A Telerobot on the World Wide Web," printed from http://telerobot.mech.uwa.edu.au/ROBOT/telerobo.htm (14 pages).
The Foxboro Company, "FoxCMS Change Management System Software," 48 pgs., Aug. 14, 1996.
Tinham, "Networks & surprises at C&I and ISA shows; Control and Instrumentation Exhibition and Conference; Instrument Society of America; includes related articles," vol. 26; No. 6, p. 43; ISSN: 0010-8022 (Jun. 1994).
Tinham, Brian, "Getting SCADA by web browsner? Supervisory Control and Data Acquisition," Control and Instrumentation, No. 12, vol. 28, Dec. 1996, p. 5.
Tobin, David. "Southeast Paper Installs Largest Foxboro Distributed Control System."
Toner, Mike. "Web's view of world far and wide," The Houston Chronicle, Nov. 5, 1995, p. 6.
Tweney, "Java on Your Mobile Phone?", http://www.business2.com (Mar. 14, 2002).
U.S. Appl. No. 09/448,223, filed Nov. 23, 1999, Dardinksi, Steven.
U.S. Appl. No. 09/448,374, filed Nov. 23, 1999, Dardinksi, Steven.
U.S. Appl. No. 09/573,151, filed Apr. 17, 2000, Linscott, Richard L.
Van de Pol. "OmniChem: Real Time Production scheduling in a batch oriented environment," 1994 World Batch Forum (Mar. 6-9, 1994), (23 pages).
VanNess, Shawn A. "GEO—The General Expression Object: Expression Syntax" Version 3.1 (beta1) © 1997-1999.
VanNess, Shawn A. "GEO—the General Expression Object: Interface Documentation" Version 3.1 (beta1) © 1997-1999.
VanNess, Shawn A. "GEO—the General Expression Object: Overview" Version 3.1 (beta1) © 1997-1999.
VanNess, Shawn A. "GEO—the General Expression Object: Sample Client Code" Version 3.1 (beta1) © 1997-1999.
VanNess, Shawn A. "GEO—The General Expression Object: Support" Version 3.1 (beta1) © 1997-1999.
VanNess, Shawn A. "GEO—the General Expression Object: Technical Info" Version 3.1 (beta1) © 1997-1999.
VanNess, Shawn A. "GEO—the General Expression Object: the Math Library" Version 3.1 (beta1) © 1997-1999.
Vardy, Joel M. "Integrating Manufacturing Into the Corporate Reengineering Effort for the Batch Industries," 1995 World Batch Forum (May 22-24, 1995), (24 pages).
Webb, Marcus. "Computer System Implementation, Batch Standards and Validation," 1995 World Batch Forum (May 22-24, 1995), (11 pages).
Weinert, a., et al. "RT/OS—realtime programming and application environment for the COSY control system," Nuclear Instruments and Methods in Physics Research A vol. 352 (1994), pp. 277-279.
Welch, Nathalie, "Tribe to manage via Web; Tribe Computer Works Inc.'s TribeLink2 Product Announcement," MacWEEK, vol. 9, No. 21, May 22, 1995, p. 18.
WG1 List of Criteria (Appendix 1), (Oct. 21, 1988) ISA/SP50-1988-242, ISA Draft.
Wilder, Clinton, "Network Management: Russing Nets Via the Web—Trib's WebManage uses popular interface," InformationWeek, May 29, 1995, p. 62.
Wolfe, Alexander, "Strong Brew," Electronic Engineering Times, Apr. 8, 1996, p. 73.
Wood, G. G. "Current Fieldbus activities," computer communications vol. 11 (Jun. 1988) No. 3, pp. 118-123.
Wood, G. G. "Evolution of communication standards for the process industry," Measurement + Control vol. 19 (Jul./Aug. 1986), pp. 183-188.
Wood, G. G. "Survey of LANs and Standards," Computer Standards & Interfaces vol. 6 (1987), pp. 27-36.
Wood, G. G. "The Argus Consul System for On-Line Computer Control," Electrical Engineering Transactions (Mar. 1969), pp. 114-118.
Wood, G. G. "The Challenge of Standards for Plant Communication," Ifac Distributed Computer Control Systems (1982), pp. 191-192.
Wood, G. G. "Towards digital information control," Measurement + Control vol. 21 (Jul./Aug. 1988), pp. 179-180.
Wood, Graeme G. "Data Transmission, Processing and Presentation," pp. 46-54.
Wood, Graeme, G. "Standardisation Work for Communication Among Distributed Industrial Computer Control Systems—A Status Report," INRIA (1984), pp. 67-69.
Wood, Graeme. "Fieldbus Status 1995," Computing & Control Engineering Journal (Dec. 1995), pp. 251-253.
Wood, Graeme. "Generic Link Transactions for Simple Devices in Fieldbus." ISA/SP50—1988—240 (Sep. 20, 1988).
Young, Stephen L. "Technology . . . The Enabler for Tommorrow's Agile Enterprise," 1995 World Batch Forum (May 22-24, 1995), (10 pages).
Zeff, Joe. "Maui Sunset in Real Time (Modems not Optional)," The New York Times, Nov. 27, 1995, Section D, col. 2, p. 5.
Choi, K.J. et al., "A Modeling Method Of Softwared Configuration Change Control," 1997, IEEE Online, "htttp:/ieeexplorer.ieee.org/stamp/stamp.jsp?tp=&arnumber=619990&userType=inst".
Conradi, R. et al., "Verson Models for Softward Configuration Management," Jun. 1998, ACM Computing Surveys, vol. 30, No. 2.
Goodstein, L.P. et al., "Representation of Process State Structure and Control," Apr. 1987, Riso National Laboratory.
Lu, S. et al., "An Object-Oriented Power Plant Adaptive Control System Design Tool," Sep. 1995, IEEE Transactions on Energy Conversion, vol. 10, No. 3.
Robinson, D. et al., "Modelling and Synthesis of Configuration Controllers for Dynamically Reconfigurable Logic Systems Using the DCS CAD Framework," 1999, Field-Programmable Logic and Applications, FPL '99, pp. 41-50.

* cited by examiner

Process Control System

Exemplary Controlled Process

Control Strategy Configurator Components

Component Interaction Diagram

IDA Framework Object Model Components

Object Model Notation Conventions

Parameterized Object model

Creating a Parameter List

Parameter Definition Editor

Parameter Editor Example

Object Types

Object Type Hierarchy Example

Creating New Object Types

Type Awareness Example

Connection Object Model

Parameterized Object-Override-Endpoint Triad

Object Connection Type Object Model

Example of Simultaneous Parent/Child Object Connectivity

Parameter Connection Type Object Model

Example of Simultaneous Source/Sink Parameter Connectivity

Parent/Child Connectivity Example-Case #1

Parent/Child Connectivity Example-Case #2

Parent/Child Connectivity Example-Case #3

Source/Sink Connectivity Example

Appearance Object Model

Appearance Definition Example

Placeholders Object Model

Combined Placeholder/ Appearance Object Model

MFC Document/ View Architecture

The IDA Application Class Architecture

The IDA Document Architecture

IDA Hierarchy Classes

The IDA View Classes

The IDA Frame Classes

Sheet Templates Object Model

Sample Use of Macros in Sheet Template

Sheet Template Editor

The IDA Report Manager Object Model

Applying Filter Rules to POC

Filter Editor

Composite Report Template Editor

Report Editor

Organizational Folders

Version Control-Basic Concepts

Object Check-Out

Object Check-In

Revision Editor

Create Revision Dialog Box

Parameterized Object Versions

Version Control Object Model

Version History

Object Compare Utility

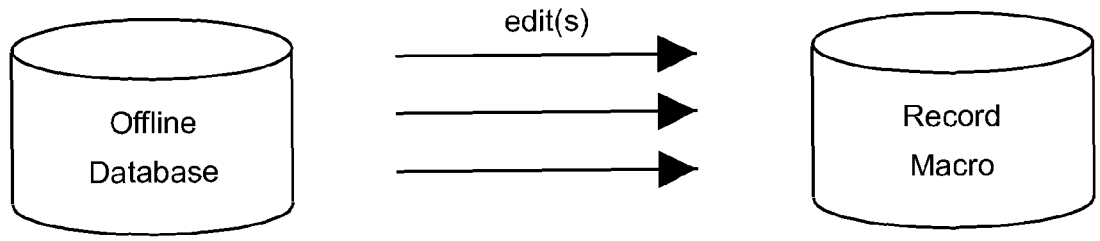
FIG. 54
Historical Archive with Playback Macro
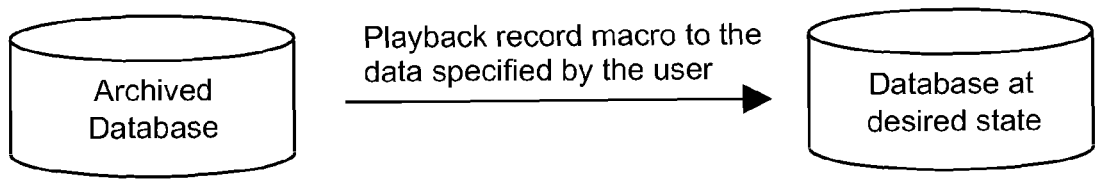
FIG. 55
Performing a Macro Playback
| Object: PID2 | | Object Audit Trail: V1.0 to V1.2 | | |
|---|---|---|---|---|
| Version | Date | User | Modification | Reason for Modification |
| V1.0 | 09/27/97 | MBJ | Object created. | |
| V1.1 | 09/29/97 | MBJ | PBAND changed from 40 to 50. | FBM added to loop A. |
| V1.2 | 10/04/97 | JKL | PBAND readjusted to 45. | Finetuning loop parameters. |
FIG. 56
Sample Audit Trail Report Undo Manager Object Model Users and Security Object Model Users and Groups Example Process Area and Assignable Objects Example IDA Permissions Hierarchy Switch Group/User Capability Managing Groups Assigning Users to Groups Groups, Object Types and Permissions Managing Process Areas Groups and Process Area Permissions System Tree View Block Definition Editor Block Definition Classes Simple Loop Composite Block Definition Composite Block in Loop Expanded Composite Block In Loop Block with Connections Anatomy of a Block Placeholder Block Connection Dialog Template/Definition Internal Connections Template/Definition Exposed Connections Parameter Property Sheet Composite Block Property Sheet Parameter Formula Builder Control Object Derivations Block Object Model Modifier Block Object Model Modifier Block Parameter Override Precedence Composite Block Definition Object Model Loop Template Object Model Simple Loop Object Model Composite Block Object Model Template-Derived Loop Object Model Object Placeholder Deviations Persistent Document Object Derivations PLB to Ladder Relationship Ladder Editor View Ladder Objects Persistent Document Objects PLB Block Model Block Execution Scheduler Editor Station Statistics Dialog Block Execution Editor Object Model

| TAG List | | | | | | | | |
|---|---|---|---|---|---|---|---|---|
| Compnd | Tag | L_tag | Descrp1 | Descrp2 | Type | Comp | Param | Iom_id | Iomide |
| 01CP30 PLB | GV0144 | GV0144 | CONTACT INPUT | | PLB | A1 | CIN 8 | 01FM21 | |
| 01CP30 PLB | X0120A | X0120 | INPUT 1 TO LADDER | LOGIC | PLB | A1 | CIN 4 | 01FM21 | |
| 01CP30 PLB | X0120B | X0120 | INPUT 2 TO LADDER | LOGIC | PLB | A2 | CIN 5 | 01FM21 | |
| 01CP30 PLB | X0120C | X0120 | INPUT 3 TO LADDER | LOGIC | PLB | A3 | CIN 6 | 01FM21 | |
| 01CP30 PLB | X0120D | X0120 | INPUT 4 TO LADDER | LOGIC | PLB | A4 | CIN 7 | 01FM21 | |
| 01CP30 PLB | X0120E | X0120 | OUTPUT 1 F LADDER | LOGIC | PLB | A5 | CO 9 | 01FM21 | 01FM22 |
| 01CP30 PLB | X0120F | X0120 | OUTPUT 2 F LADDER | LOGIC | PLB | A6 | CO 10 | 01FM21 | 01FM22 |
| 01CP30 PLB | X0120G | X0120 | OUTPUT 3 F LADDER | LOGIC | PLB | A7 | CO 11 | 01FM21 | 01FM22 |
| 01CP30 PLB | X0120H | X0120 | OUTPUT 3 F LADDER | LOGIC | PLB | A8 | CO 12 | 01FM21 | 01FM22 |
| 01CP30 PLB | HV0210CLOSE | HV0210 | VALVE DEVICE LIMIT | CLOSE | PLB | A2 | CIN 2 | 02FM15 | |
| 02CP30 PLB | HV0210OC | HV0210 | VALVE OPEN CLOSE | SWITCH | PLB | A3 | CO 9 | 02FM15 | 02FM16 |
| 02CP30 PLB | HV0210OPEN | HV0210 | VALVE DEVICE LIMIT | OPEN | PLB | A1 | CIN 1 | 02FM15 | |
| 2022NAPHTHA | FI0215 | F0215 | | | AIN | A | PNT | 11FM11 | |
| 2022NAPHTHA | FI0215V | F0215 | | | AOUT | A | OUT | 11FM11 | |
| 2022NAPHTHA | FI0216 | F0215 | | | AIN | B | PNT | 11FM11 | |
| 2022NAPHTHA | FI0216V | F0215 | | | AOUT | B | OUT | 11FM11 | |
| 2022NAPHTHA | FI0217 | F0215 | | | AIN | C | PNT | 11FM11 | |
| 2022NAPHTHA | FI0217V | F0215 | | | AOUT | C | OUT | 11FM11 | |
| 2022NAPHTHA | FI0218 | F0215 | | | AIN | D | PNT | 11FM11 | |
| 2022NAPHTHA | FI0218V | F0215 | | | AOUT | D | OUT | 11FM11 | |
| COMPND_0100 | FI0120 | F0120 | FLOAT MEASUREMENT | INPUT 1 | AIN | A | PNT | 01FM14 | |
| COMPND_0100 | FI0130 | F0120 | FLOAT MEASUREMENT | INPUT 2 | AIN | B | PNT | 01FM14 | |
| COMPND_0100 | FT0100 | F0100 | FLOAT | INDICATION | AIN | A | PNT | 01FM11 | |
| COMPND_0100 | FT0101 | F0101 | FLOAT | INDICATION | AIN | A | PNT | 01FM11 | |

FIG. 102
Tag List Data Entry Screen

Tag List Import from ASCII File

Tag List Export to ASCII File

Tag List Import / Export from Database Table

Tag List Object Model

Download Target Selection

Download Manager Document Object

Download Services Object Model

Historian Assignment Overview

Individual Compound Assignment

Historian Object Model

Enclosure Group View

Enclosure Loading View and Tag Assignment Dialog

Enclosure
Input/Output
Termination View

Enclosure Loading Model

Enclosure Definition Detail Model

Persistent Document Objects

IDA Main Application Architecture

Typical IDA Generic Editor Frame

IDA & OLE Compound Documents

APPARATUS AND METHOD FOR CONFIGURING AND EDITING A CONTROL SYSTEM WITH LIVE DATA

REFERENCE TO RELATED APPLICATIONS

This application is a continuation of U.S. application Ser. No. 11/434,005, filed May 15, 2006 now abandoned and entitled "METHOD AND APPARATUS FOR CONTROL CONFIGURATION USING LIVE DATA", which is a continuation of U.S. application Ser. No. 09/572,343, filed May 17, 2000, entitled "METHODS AND APPARATUS FOR CONTROL CONFIGURATION WITH VERSIONING, SECURITY, COMPOSITE BLOCKS, EDIT SELECTION, OBJECT SWAPPING, FORMULAIC VALUES AND OTHER ASPECTS" (now issued as U.S. Pat. No. 7,272,815), which claims the benefit of priority of U.S. Application Ser. No. 60/134,597, filed May 17, 1999, entitled "INTEGRATED DESIGN AUTOMATION CONTROL STRATEGY CONFIGURATOR ARCHITECTURE" and which is a continuation of U.S. application Ser. No. 09/448,223, filed Nov. 23, 1999, entitled "PROCESS CONTROL CONFIGURATION SYSTEM WITH CONNECTION VALIDATION AND CONFIGURATION" (now issued as U.S. Pat. No. 7,089,530) and is a continuation of U.S. application Ser. No. 09/448,374, filed Nov. 23, 1999, entitled "PROCESS CONTROL CONFIGURATION SYSTEM WITH PARAMETERIZED OBJECTS" (now issued as U.S. Pat. No. 7,096,465) and is a continuation of U.S. application Ser. No. 09/448,845, filed Nov. 23, 1999, entitled "METHODS AND APPARATUS FOR CONTROLLING OBJECT APPEARANCE IN A PROCESS CONTROL CONFIGURATION SYSTEM" (now issued as U.S. Pat. No. 6,754,885), all of which claim the benefit of priority of U.S. Application Ser. No. 60/134,597, filed May 17, 1999, entitled "INTEGRATED DESIGN AUTOMATION CONTROL STRATEGY CONFIGURATOR ARCHITECTURE"; the teachings of all of the aforementioned applications are incorporated herein by reference.

This application is a continuation of U.S. application Ser. No. 11/355,311, filed Feb. 14, 2006 and entitled "PROCESS CONTROL CONFIGURATION SYSTEM WITH CONNECTION VALIDATION AND CONFIGURATION," which is a continuation of U.S. application Ser. No. 09/448,223, filed Nov. 23, 1999, entitled "PROCESS CONTROL CONFIGURATION SYSTEM WITH CONNECTION VALIDATION AND CONFIGURATION" (now issued as U.S. Pat. No. 7,089,530), which claims the benefit of priority of U.S. Application Ser. No. 60/134,597, filed May 17, 1999, entitled "INTEGRATED DESIGN AUTOMATION CONTROL STRATEGY CONFIGURATOR ARCHITECTURE"; the teachings of all of the aforementioned applications are incorporated herein by reference.

BACKGROUND OF THE INVENTION

The invention pertains to control and, more particularly, to methods and apparatus for configuring control systems.

The terms "control" and "control systems" refer to the control of a device or system by monitoring one or more of its characteristics. This is used to insure that output, processing, quality and/or efficiency remain within desired parameters over the course of time. In many control systems, digital data processing or other automated apparatus monitor a device, process or system and automatically adjust its operational parameters. In other control systems, such apparatus monitor the device, process or system and display alarms or other indicia of its characteristics, leaving responsibility for adjustment to the operator.

Control is used in a number of fields. Process control, for example, is typically employed in the manufacturing sector for process, repetitive and discrete manufactures, though, it also has wide application in utility and other service industries. Environmental control finds application in residential, commercial, institutional and industrial settings, where temperature and other environmental factors must be properly maintained. Control is also used in articles of manufacture, from toasters to aircraft, to monitor and control device operation.

Modern day control systems typically include a combination of field devices, control devices, and controllers, the functions of which may overlap or be combined. Field devices include temperature, flow and other sensors that measure characteristics of the device, process or system being controlled. Control devices include valves, actuators, and the like, that control the device, process or system itself.

Controllers generate settings for the control devices based on measurements from the field devices. Controller operation is typically based on a "control algorithm" that maintains a controlled system at a desired level, or drives it to that level, by minimizing differences between the values measured by the sensors and, for example, a setpoint defined by the operator.

In a food processing plant, for example, a controller can be used to maintain a soup stock at a simmer or low boil. This is done by comparing measurements of vapor pressure in the processing vessel with a desired setpoint. If the vessel pressure is too low, the control algorithm may call for incrementally opening the heating gas valves, thereby, driving the pressure and boiling activity upwards. As the pressure approaches the desired setpoint, the algorithm requires incrementally leveling the valves to maintain the roil of the boil.

Controllers may be networked or otherwise connected to other computing apparatus that facilitate monitoring or administration. The so-called S88 industry standard, described in *Batch Control—Part 1: Models and Terminology* (The International Society for Measurement and Control 1995), for example, defines a hierarchy of processing and control equipment ("equipment entities") that can be used to model and control an automated manufacturing process. At the lowest level of the hierarchy are control modules that directly manipulate field devices (e.g., opening and closing valves) and, possibly, other control modules. At a higher level, equipment modules coordinate the functions control modules, as well as of other equipment modules, and may execute phases of the manufacturing process (such as setting controller constants and modes). "Units," at still a higher level of the hierarchy, coordinate the functions of equipment and control modules. Process cells orchestrate all processing activities required to produce a manufacturing batch, e.g., scheduling, preparing and monitoring equipment or resources, and so forth.

The principal function of controllers is executing control algorithms for the real-time monitoring and control of devices, processes or systems. They typically have neither the computing power nor user interfaces required to facilitate the design of a control algorithm. Instead, the art has developed configurators. These are typically general purpose computers (e.g., workstations) running software that permit an engineer or operator to graphically model a device, process or system and the desired strategy for controlling it. This includes enumerating field devices, control devices, controllers and other apparatus that will be used for control, specifying their inter-relationships and the information that will be transferred among them, as well as detailing the calculations and methodology they will apply for purposes of control. Once modeling is complete and tested, the control algorithm is downloaded to the controllers.

One well known process control system configurator is that provided with the I/A Series® (hereinafter, "IAS" or "I/A") systems, marketed by the assignee hereof. These provide a graphical interface (FoxCAE) permitting an engineer to model a process hierarchically and to define a control algorithm from that hierarchy. Multiple editors are provided for defining and modifying modules within the hierarchy.

Though prior art process control configuration systems, particularly, the IAS systems and others sold by the assignee hereof, have met wide acceptance in the industry, there remains room for improvement. Such is the case, for example, with respect to the configuration of complex control systems.

In this context, an object of the present invention is to provide improved methods and apparatus for control and, particularly, for configuring control systems. A related object of the invention is to provide methods and apparatus for configuring a process control systems.

A further object of the invention is to provide such methods and apparatus as facilitate configuring large or complex control systems Still yet a further object of the invention is to provide such methods and apparatus as can be used in configuring a range of control systems, whether hierarchical or not, whether pertaining to process control or otherwise.

SUMMARY OF THE INVENTION

Versioning

The foregoing are among the goals attained by the invention which provides improved methods and apparatus for configuring a process, environmental, industrial and other control system. A configuration apparatus, according to one aspect of the invention, generates and utilizes a model representing a configuration of a control system and/or the system being controlled by it. The apparatus maintains a record of changes to the model or the configuration represented by it and thereby, for example, provides bases for determining their current states, prior states and histories of changes. This information can be tracked, for example, from the moment a model or its components are created through the most current versions.

Further aspects of the invention provide such a configuration apparatus in which the model is composed of objects (or other data and/or programming constructs) that represent entities within any of the control system, the controlled system, a control level hierarchy, and/or the configuration apparatus itself. In aspects of the invention utilized for process control, objects can represent, by way of non-limiting example, field devices, control devices, control processors, blocks, loops, compounds, historians, object type categories, object connections, parameter connections, display placeholders, graphical display entities, and reports. They can also represent entities of a control level hierarchy, e.g., sites, areas, process cells, units, and the like.

A configuration apparatus, according to these and other aspects, can record changes by maintaining current and historical versions of the objects that make up the model. This permits, for example, tracing the genealogy of those objects forward and backward throughout the entire genealogy representing each object's life cycle.

In addition to maintaining multiple historical versions of objects, a configuration apparatus according to further aspects of the invention can maintain not only the modeling objects but, also, versions representing configuration data that has been downloaded to the control system for execution. That data can be, for example, binary or other machine-readable data of the type understandable by the target control system equipment.

Without limiting the invention, objects reflecting the model are referred to as "offline" versions. A plurality of such objects are referred as an "offline database." Versions of the objects reflecting data downloaded to, and running on, the control system are referred to as "online" versions. A plurality of these are referred to as an "online database."

Further aspects of the invention provide for the coordination/synchronization of the object versions and control of changes made to them. According to one such aspect, the identity of an object (or version) and/or the address, pointers or other references thereof or thereto remain constant during the lifetime of that object. As a consequence, for example, references to an object do not have to be updated each time an object is edited.

In related aspects, an object that has been "checked out" for editing or other modification, e.g., by a user, is locked from modification by other users. A copy of that object maintained for purposes of editing, e.g., in a user "workspace" database, can be locked from all access by other users. For these purposes, among others, the current and/or workspace versions of the object being edited can include a designation of the user who is making the modification. These locks can be released when editing is completed and the modified version is "checked in."

On check-in, a modified version of an object replaces the current version which, itself, is retained as a prior historical version. The modified object or the current version it replaces are, according to aspects of the invention, marked to indicate the user responsible for the modification, as well as the modification made and the reason therefor, e.g., based on information input by the user. The versions can cross-reference one another, forming a doubly-linked list that allows traversal of the version tree for the object.

In related aspects of the invention, the online version of an object is updated for correspondence with a new version of an offline object, thereby synchronizing the online and offline databases. The object is compiled (or otherwise validated) and downloaded during this process, for operation on the control system.

Conversely, where an online version of an object is modified, aspects of the invention provide for generating a modified offline version that corresponds to it, e.g., via an "upload" procedure. That modified version can replace the then-current offline version of the object in the same manner discussed above.

Further aspects of the invention provide a configuration system as described above that permit version "baselining," e.g., where all current objects in the off-line database are assigned a common version designation.

Still further aspects of the invention provide mechanisms for viewing or editing information pertaining to the changes recorded by a configuration apparatus of the type described above. This includes
  listing of objects being modified,
  recording changes made to objects,
  recording reasons for changes to objects,
  releasing locks on objects,
  checking-in objects that have been checked-out for modification,
  viewing a version history of an object,
  viewing a list of objects checked out by other users, comparing objects,
comparing versions of an object,
compacting a version history,
marking objects with a common revision identifications,
archiving a model or its history of changes, and
generating an audit trail of changes.

Yet still further aspects of the invention provide apparatus as described above that provide for system configuration on a computer that is disconnected from that on which the offline database resides. Changes made to that "disconnected" database can subsequently be merged into the offline (and online) databases.

Security Control

A configuration apparatus, according to further aspects of the invention, maintains a model comprising one or more objects that represent entities in the control system, a system controlled thereby, a control level hierarchy, and the apparatus for configuring the control system. Each of the objects has a plurality of characteristics such as, according to aspects of the invention, an object type characteristic and an area characteristic. Users can have corresponding permissions, e.g., to access objects of defined types and/or within specified areas. A security mechanism controls access by users, e.g., via applications programs such as editors, to the objects. The level of access, e.g., read-only vs. update, is a function of the multiple permissions held by the user and the multiple characteristics of the object subject to access.

By way of example, the security mechanism permits a process engineer having appropriate permissions to create and maintain objects modeling control loops for any building in a manufacturing plant configured by apparatus. It may, however, permit a nighttime operator to access only loops within his own building and to modify only those in the area to which he/she is assigned.

Object types, according to aspects of the invention, identify objects exhibiting related appearance and behavior. This may relate to the appearance/behavior of the entity modeled by the object or to the object itself vis-a-vis the configuration apparatus. By way of example of the former, objects that model two respective application workstations may be of a common object type (i.e., a type indicating that they are applications workstations), notwithstanding that the workstations themselves have different physical characteristics.

Area characteristics, according to related aspects of the invention, identify locations in which any of the control system and the system controlled thereby are disposed. Area types can relate to, for example, plants, buildings or areas therein. Thus, for example, objects that model process control equipment in the same area of a plant may have the same area characteristic.

Object type characteristics and permissions, as well as area characteristics and permissions can, according to aspects of the invention form respective hierarchies. In a system so embodied, for example, a user having permissions for a designated area inherits permissions for any area contained therein, as defined in the hierarchy.

Further aspects of the invention provide configuration apparatus as described above in which users are members of groups that, themselves, have assigned access permissions. A user can be a member of multiple groups and can have permissions afforded under any of them. Thus, for example, in a process control aspect of the invention, a given user can belong to both Process Engineer and Advanced Operator groups, thus, affording him/her access to any objects types and areas permitted for members of either group.

In related aspects of the invention, the groups form a hierarchy, with groups containing other groups, e.g., Operator group containing the Test Operator group. Each group holds the permissions of a group from which it descends, as well as any other permissions assigned, e.g., by the system administrator.

In still further aspects of the invention, a user can change his/her permissions, e.g., during the course of a session on the configurator. This is accomplished, for example, by activating specific permissions from among a listing of allowable permissible, e.g., presented in a dialog box. Thus, a user can to perform the majority of his/her daily operations with a default minimal security setting, then switch to a more restrictive security setting. Alternatively, or in addition, a user can temporarily log-in as another user, e.g., as may be desirable to allow a supervisor to intervene during a user's session, perform a restricted operation, then log-out and return security to its previous settings.

Composite Blocks

A configuration apparatus, according to further aspects of the invention, maintains a model made up of objects that represent entities in the control system or the system controlled by it. Among the objects are composite objects made up of other objects of types suitable for inclusion in the model independent of the composite objects. The composite objects are defined by definition objects that can be changed, e.g., using an editor or other applications program. These changes carry through to the composite object, regardless of whether the changes are made after the composite objects are created.

By way of example, a configurator according to the invention adapted for process control maintains a model including a composite object made up objects representing control blocks. The model includes additional objects, some of which also model control blocks, but which are not included in the composite object. Changes to an object that defines the composite object carry through to that object, even if the changes are made after the composite object is created and placed into the model.

Further aspects of the invention provide a configuration apparatus as described above in which the objects that make up the composite object (referred to here as "component" objects) have parameters reflecting characteristics of the respective entities those parameters represent. The characteristics include, for example, inputs, outputs, alarm limits, control functions and display characteristics. Each parameter can, in turn, have attributes such as parameter name, parameter grouping, display label, data type, behavior, help information, edit type, data value range, formula definition, display format, and so forth.

Selected parameters of a composite's component objects are exposed for connection to other objects in the model. An application, such as a control strategy editor, executing within the configurator permits connection between the composite and other objects via those selected parameters. Conversely, such an application prevents external connection with component object parameters that are not exposed and that, instead, service connections internal to the composite object.

Further aspects of the invention provide a process control apparatus having features like those described above comprising loop objects that are made up of control blocks objects. Parameters of the component objects can be selected for connection to objects such as input/output points (e.g., associated with sensors and actuators) external to the composite object.

Still further aspects of the invention provide a configuration apparatus as described above in which a composite object modifies a definition inherited from its associated definition object. This can be achieved via a modifier object that overrides one or more parameters supplied by control block or other objects that make up the composite object.

Yet other aspects of the invention relate to configuration apparatus as described above in which the application selectively displays the composite object in an encapsulated format or an expanded format. The former depict the object substantially with a single icon; the latter, with multiple icons that represent the respective composite's component objects.

Edit Selection

A configuration apparatus, according to further aspects of the invention, maintains objects that represent entities in the control system, the system controlled by it, a control level hierarchy and/or the configuration apparatus itself. At least a selected object includes an edit control type identifier. An editor or other functionality permits editing of at least the selected object. To this end, it presents the object for editing using an edit control that is based on the edit control type identifier. An edit control, according to aspects of the invention, includes a dialog box, list box, edit box, check box, or a combo box. It can also include a cell in a spreadsheet or property sheet.

By way of example, a configurator according to the invention adapted for process control maintains objects representing control blocks and other elements of the control system. A display presents a hierarchical listing of the objects and permits a user to designate one for editing. When a user designates an object of interest, e.g., via a mouse click or other selection mechanism, an aspect of it is presented for editing using an edit control based on the edit control type identifier provided with the object.

According to related aspects of the invention, the edit control type identifier can directly indicate the edit control to be used in presenting the selected object for editing. Thus, for example, the identifier can be a numeric code corresponding to one of the foregoing edit control types. The edit control type identifier, moreover, can be selected from among several identifiers permissible for the selected object or other object with which it is associated.

To continue the example above, an editable aspect of the selected object can be list of values amenable to editing with a list box or check box. The object can include an edit control type identifier indicating that one of those formats (e.g., the list box) and not the other is to be used when the object is selected for editing.

Still further aspects of the invention provide a configuration system as described above in which at least the selected object has parameters identifying characteristics of the entity represented by the object. The characteristics include, for example, inputs, outputs, alarm limits, control functions and display characteristics. Each parameter can, in turn, have attributes such as parameter name, parameter grouping, display label, data type, behavior, help information, edit type, data value range, formula definition, display format, and so forth.

The editor or other such functionality of a configurator according to still further aspects of the invention presents at least a selected attribute with an edit control identified by the edit control type identifier. That attribute can be, for example, the data value of the parameters.

Yet other aspects of the invention provide a configurator as described above an edit control is populated with dynamically determined data. For example, a list box providing a list of workstations for selection by a user can be populated with identifiers of workstations present at the time the list box is displayed. Alternatively, or in addition, aspects of the invention provide for the display of non-dynamic or predetermined values in an edit, e.g., yes/no, true/false, etc.

Object Swapping

A configuration apparatus, according to further aspects of the invention, has a graphical user interface that graphically depicts objects representing entities in the control system, the system controlled by it, a control level hierarchy, and/or the apparatus for configuring the control system. An editor, or other functionality, that is coupled with the graphical user interface displays icons or other representations of a first object and a second object. It responds to a selected user command by transferring characteristics of the first object to the second object. The command can be, according to one aspect of the invention, a drag-and-drop whereby an icon depicting the second object is graphically dragged and dropped onto an icon depicting the first object.

By way of example, a configurator according to the invention that is adapted for process control maintains objects representing control blocks and other elements of a control system. A graphical user interface, e.g., employed as part of a control strategy editor, displays an icon depicting an IAS analog input block included in a control loop. An icon representing a Fieldbus Foundation analog input block is graphically dropped onto the first icon by the user. In response, the editor (or a configurator resource used by it) transfers characteristics from the object modeling the IAS analog input block to the object modeling the Fieldbus Foundation block, swapping the latter for the former and, thereby, facilitating configuration of the system.

Further aspects of the invention provide a configuration system as described above in which the objects have parameters identifying characteristics of the entities represented by them. The characteristics include, for example, inputs, outputs, alarm limits, control functions and display characteristics. Each parameter can, in turn, have attributes such as parameter name, parameter grouping, display label, data type, behavior, help information, edit type, data value range, formula definition, display format, and so forth.

A configurator according to these aspects of the invention can transfer parameters, attributes and/or values from the source object (representing the IAS analog input block in the example) to the destination object (representing the Foundation Fieldbus block in the second example) in response to the drag-and-drop operation. Transferred values can be converted, e.g., to compensate for differences in scaling, units, and so forth, while they are being transferred.

Further aspects of the invention provide a configuration apparatus as described above that includes an editor facilitating specification of mappings and conversions used for the transfers. Such a "swap" editor can use dialog boxes or other edit controls, graphical displays, and so forth, to display permissible mappings/conversions stored in a "swap" database or other data structure.

Configuration-Time Value Formulas

A configuration apparatus, according to further aspects of the invention, has a plurality of objects modeling entities in the control system or a system it controls. One or more of the objects have values that are represented by formulas. Others have values that are constants. Functionality is provided to download portions of at least selected objects to the control system. Object values that are constants (numerical or otherwise) can be downloaded directly, e.g., after any appropriate scaling, compilation and/or conversion, with the corresponding objects. The functionality, however, evaluates (or invokes evaluation of) values that are formulas prior to their being downloaded. Evaluation entails, according to aspects of the invention, changing the formulas into numerical or other constants.

By way of example, a configurator according to the invention that is adapted for process control maintains objects representing control blocks and other elements of a control system. One of the objects can have real-valued parameters including, e.g., a high alarm value, HAL, and a low alarm value, LAL. An editor can be used to set the former, HAL, to the constant 100.0. Rather than using a constant for the latter, LAL, the editor permits its entry as a formula, e.g., my.HAL −100.0. Whereas the HAL value is downloaded directly to the control system (e.g., with appropriate scaling, compilation and/or conversion), the LAL formula is converted, prior to downloading, to 0.0 (i.e., the value of the same object's HAL parameter minus 100).

Further aspects of the invention provide a configuration apparatus as described above in which the formulas include mathematical operations, mathematical functions or references to characteristics of the same or other objects. The example above shows a formula that uses a mathematical operation and that refers to another characteristic of the same object. A formula can likewise refer to other objects, e.g., objects modeling blocks, compounds, loops input/output tags, and other elements of a process control system, by way of non-limiting example.

Yet still further aspects of the invention provide configuration apparatus as described above that provide an editor for entry and editing of formulas. Such editor can facilitate the inclusion of objects, object characteristics or mathematical functions in formulas, e.g., via display of lists of choices.

Further aspects of the invention provide a configuration system as described above in which the objects have parameters identifying characteristics of the entities represented by them. The characteristics include, for example, inputs, outputs, alarm limits, control functions and display characteristics. Each parameter can, in turn, have attributes such as the aforementioned constant or formulaic values, as well as parameter name, parameter grouping, display label, data type, behavior, help information, edit type, data value range, display format, and so forth.

Parameterized Objects

An apparatus for configuring control systems according to further aspects of the invention employs objects (or other data and/or programming constructs) that inherit parameters from their ancestors. Changes to an ancestor during configuration are effective as to its descendant objects. A "configurator" apparatus according to the invention can be used to model and define control algorithms for process control, environmental control, industrial and other control systems.

To illustrate by way of a non-limiting example, an apparatus according to the invention for use in configuring process control systems can employ an object to model a "conventional" analog input (AIN) field device of the type used in a particular product. That object can include output, high-high alarm, high-low alarm and other parameters of the type used for modeling such devices. The apparatus can be used to define at configuration time a further object, one that models an analog input device for use in high-temperature environments. That object can descend from the general AIN object and inherit its parameters, e.g., the high-high alarm and high-low alarm parameters. Configuration-time changes to the parameters of the general AIN object can automatically carry through to the high-temperature AIN object, thus, facilitating configuration of the process control system.

Objects used in apparatus according to these aspects of the invention can represent elements within a device, process or system being controlled or entities within the configuration apparatus itself. In process control, objects can represent, by way of non-limiting example, field devices, control devices, control processors, blocks, loops, compounds, historians, object type categories, object connections, parameter connections, display placeholders, graphical display entities, and reports. They can also represent entities of a control level hierarchy, e.g., sites, areas, process cells, units, and the like.

Parameters define characteristics of each object and, therefore, of the element or entity the object represents. Depending on the type of object, these include inputs, outputs, alarm limits, control functions and display characteristics, among others. Each parameter can have attributes that define the parameter's value and other attributes. These include, for example, parameter name, parameter grouping, display label, data type, behavior, help information, edit type, data value range, formula definition, and display format.

Objects used by an apparatus according to the invention can be defined or modified without recompilation. This is, in part, because the parameters on which they are based can be assigned and modified during configuration and, in this regard, are analogous to data. To this end, apparatus according to the related aspects of the invention can include an editor that facilitates definition, during configuration, of an association between an parameter and an object. The apparatus can further include editors or other functionality that permit an object to be defined as a descendant of another object at the time of configuration.

An object so defined derives parameters from its ancestor which, in turn, derives parameters from its own ancestors, and so forth. Unless otherwise overridden, a change to the parameters of an ancestor object is effective as to its descendants, regardless of whether that change is made before or after the descendant is defined or instantiated. Thus, for example, the characteristics of an entire ancestral "family" of objects can be changed, simply, by modifying the distant-most ancestor object.

To illustrate by way of a non-limiting example, an apparatus according to the invention for use in configuring process control systems can employ an object to model a "conventional" analog input (AIN) field device of the type used in a particular product. That object can include output, high-high alarm, high-low alarm and other parameters of the type used for modeling such devices. The apparatus can be used to define at configuration time a further object, one that models an analog input device for use in high-temperature environments. That object can descend from the general AIN object and inherit its parameters, e.g., the high-high alarm and high-low alarm parameters. Configuration-time changes to the parameters of the general AIN object can automatically carry through to the high-temperature AIN object, thus, facilitating configuration of the process control system.

Further aspects of the invention provide apparatus as described above in which an object can be associated with parameters other than those inherited from ancestors. Thus, for example, a high-temperature AIN object that inherits parameters from a general AIN object can be defined to include additional alarm parameters. Though definition of the additional alarm parameters does not affect the parent object (i.e., the general AIN object), it does carry through to children, grandchildren, etc., of the high-temperature AIN object.

Related aspects of the invention provide control system configuration apparatus as described above in which an object is associated with a parameter override or parameter modification. The former redefines attributes for parameters inherited from an ancestor object, while the latter can add entirely new parameters. Parameter overrides and modifications carry through to descendants of an object to which they are applied.

Still further aspects of the invention provide apparatus as described above in which the objects have parameters groups.

These identify groupings of parameters and relate to how they are presented to the engineer or operator during configuration, e.g., for editing. As with parameters, the groupings are inherited and can be overridden.

By way of example, an object that models a general proportional-integral derivative (PID) control block can be associated with two parameter groups, A and B, where Group A contains parameters X and Y, while Group B contains parameters M and N. If edited during configuration, that object can appear with two sheets, one showing the parameters (X and Y) of Group A and one showing the parameters (M and N) of Group B. A new PID object can be defined that descends from the first object. The definition can add a new group, Group C, that contains parameters W and X. If edited during configuration, the new object appears with three sheets, one showing the parameters (X and Y) of Group A, one showing the parameters (M and N) of Group B, and one showing the parameters (W and X) of Group C.

Further aspects of the invention provide a control system as described above in which classes defining the aforementioned objects are downloaded from a manufacturer's site to an applications workstation, for example, as part of a contracted-for or e-commerce transaction, e.g., between the customer and the manufacturer. Objects instantiated from those classes can be edited or used as a basis for modeling and control system configuration.

Object Appearance

Improved apparatus for configuring process, environmental, industrial and other control systems according to further aspects of the invention employ "appearance" objects (or other data and/or programming constructs) defining the appearance of configurable system components in graphical editors or other views in which the components may be depicted. "Placeholder" objects (or other constructs) persist the location, size, color, or other aspects of appearance defined by an appearance object in displays, reports, depictions, presentations and other view (collectively, hereinafter, "views") in which the corresponding configurable component is actually depicted.

By way of example, a process control configuration apparatus according to this aspect of the invention uses "configurable" objects to define blocks, loops and other components of a process control system. Appearance objects provide (or reference) icons or representations indicating how the configurable objects are to be depicted, e.g., in a configuration editor. Placeholder objects are created for each configurable object that is placed in a configuration using that editor. The placeholder objects identify the sizes, locations, colors, etc., of the icons used in the editor to represent the configurable objects.

Further aspects of the invention provide a configuration apparatus as described above in which the appearance objects identify labels or other textual information, e.g., configurable object names or types, for display with icons or other appearance indictors in the appearance objects. According to related aspects of the invention, those labels, as well as the icons themselves, can be specified using macros. Thus, for example, an appearance object can include macro strings, such as "$NAME", "$TYPE", "$ICON", that are replaced subsequent to configuration, e.g., with a configurable object name, type and icon, respectively.

The invention provides, in other aspects, apparatus as described above in which each configurable object has one or more parameters that identify the appearance of that object in views in which it may appear. The parameters may refer to appearance objects (or other constructs) as described above or they may contain appearance information (e.g., icons and textual identifiers) themselves.

The configurable objects of such an apparatus can be associated with one another in a hierarchical relationship, such that at least one such object is a descendant of another. Descendants, according to this aspect of the invention, inherit parameters from their ancestors. Accordingly, icons or other appearance information identified in a "parent" configuration object is passed on to its children. Inherited information may be overridden, according to aspects of the invention.

Still further aspects of the invention provide apparatus as described above comprising persistent documents that contain placeholder objects. Each persistent document may represent a specific configuration, e.g., created by a specific editor and displayed in accord with a selected view. Thus, for example, the configuration of a process control system may be represented in several documents, each edited by control algorithm diagram editor, covering different portions of the system.

In addition to placeholder objects, the persistent document may contain connector graphics that depict relationships between configurable objects. In an apparatus used for configuring process control systems, such a graphic may indicate, for example, that one configurable object, e.g., representing an analog input block, is a source for another configurable object, e.g., representing a PID controller. Such connector graphics can represent peer-to-peer relationships (such as source/sink relationships), in addition to hierarchical relationships (such as parent/child relationships).

Further aspects of the invention provide apparatus as described above for configuring process control systems. In such apparatus, configurable objects can, for example, represent entities within any of (i) a controlled process, (ii) the process control system, (iii) the apparatus for configuring the process control system, (iv) a level in a control level hierarchy, such as the aforementioned S88 standard. Such entities include, by way of non-limiting example, field devices, control processors, blocks, loops, compounds, historians, object type category, display placeholders, graphical display entities, and reports.

Connection Validation and Configuration

Improved apparatus for configuring process, environmental, industrial and other control systems according to further aspects of the invention employ "connection" objects (or other data and/or programming constructs) that indicate the permissibility of relationships between other types of objects. The apparatus validate potential relationships between those other objects by comparing their types with the permissible combinations identified in connection objects.

Those other objects can, for example, represent entities within any of (i) a controlled system, (ii) a control system, (iii) an apparatus for configuring the control system, (iv) a control level hierarchy. Such entities include, by way of non-limiting example, field devices, control processors, blocks, loops, compounds, historians, object type category, display placeholders, graphical display entities, and reports.

An apparatus as described above can be used, for example, to facilitate configuring a process control system. Using a graphical user interface, a user can "drag-and-drop" an object that models one system component (e.g., a printer) onto an object that models another component (e.g., an applications workstation), indicating that the user wishes to establish a relationship between those two objects. Through the connection objects, the apparatus validates that relationship and determines its type—in this case, a parent/child (or other hierarchical) relationship.

By way of further example, the apparatus can use connection objects to validate relationships that are peer-to-peer in nature, i.e., source/sink relationships. To illustrate, the user of can select objects that represent field devices and indicate (e.g., via a drag-and-drop operation, a menu option or other command) that she wishes to establish a relationship with an object that represents a control processor. The apparatus can validate that relationship, and determine its type (i.e., source/sink), by comparing the proposed combination against permissible pairings in the connection objects.

Object types can be hierarchical, according to further aspects of the invention. For example, a user-defined analog input (AIN) object type can be defined as hierarchically descending from a standard AIN type. Likewise, a specific class of personal computer can be defined as descending from branches of a hierarchy indicating that it is subcategory of applications workstation and, more particularly, a subcategory of Windows™ NT workstation An apparatus according to the invention can utilize this object type hierarchy in validating relationships between objects. Thus, for example, a relationship proposed by the user can be validated if the implicated objects or their hierarchical ancestors are identified as permissible pairings in a connection object.

Further aspects of the invention provide apparatus as described above in which the connection objects specify roles that objects serve in actual or potential relationships. Those roles can include, for example, a source or sink in a source/sink relationship, or a parent or child in a parent/child relationship.

In still further aspects, an apparatus as described above can utilize the connection objects to identify the maximum capacity of an object that serves as a "parent" to support objects that serve as "children" in a parent/child relationship. The connection objects can likewise identify the weight (or other quantitative attribute) each child object contributes in its role in such a relationship. An apparatus as described above can similarly utilize the connection objects to identify the minimum and maximum numbers of relationships that can be established with sources or sinks in source/sink relationships.

By way of example, a connection object may indicate that a control processor object type can serve as a parent to a specified number of field devices. As the user establishes relationships between a control processor object and multiple field device objects, the apparatus totals weights associated with the latter. If the combined weight exceeds the parent control processor's specified capacity, the apparatus prevents establishment of the relationships.

Yet still further aspects of the invention provide apparatus as described above in which the first connection object identifies not only permissible relationships between object types, but also actual relationships between specific objects.

According to further aspects of the invention, aspects of the invention pertain to configuration apparatus paralleling those described above, in which connection objects identify permissible combinations of parameter types (as opposed to, or in addition to, object types) that can form valid parent/child and source/sink relationships.

Such apparatus can automatically establish parameter-to-parameter connections of selected objects by comparing the types of those parameters with valid pairings identified in a connection object. To continue the above example, once a relationship is validated between AIN and PID objects and once the nature of that relationship (source/sink) is determined, an apparatus according to this aspect of the invention can form a connection or relationship between the PNT (point) output of the AIN object and the MEAS (measurement) input of the PID object.

Such apparatus can also validate parameter-level relationships identified by an operator, e.g., in a drag-and-drop operation. Thus, for example, using a graphical user interface, a user can "drag-and-drop" a parameter of one object (e.g., the parallel output of an object representing an applications workstation) onto the parameter of another object (e.g., the parallel input of an object representing a printer), indicating that the user wishes to establish a relationship between those two objects. Through the connection objects, the apparatus validates that relationship and determines its type—in this case, a source/sink relationship.

Still further aspects of the invention provide apparatus as described above in which establishment of certain connections (e.g., "master" connections) between parameters automatically causes others ("slave" connections) to be established. By way of example, once a connection is established between the PNT parameter of an AIN object and the MEAS input parameter of a PID object, "slave" connections are made between related parameter pairs (e.g., low and high scale parameters) of these objects. Slave connections are automatically updated or destroyed when the corresponding master connection is updated or destroyed.

Still further aspects of the invention provide combinations of the systems and apparatus described above.

Yet still further aspects of the invention provide methods for paralleling the operations described above.

These and other aspects of methods and apparatus according to the invention are evident in the drawings and in the description below.

Methods and apparatus according to the invention have numerous advantages over the prior art. Among these is the ability to quickly, flexibly and accurately design and modify control configurations.

BRIEF DESCRIPTION OF THE DRAWINGS

A more complete understanding of the invention may be attained by reference to the drawings, in which:

FIG. 54 depicts an historical archive with playback macro in a system according to the invention;

FIG. 55 depicts performing a macro playback in a system according to the invention;

FIG. 56 depicts a sample audit trail report in a system according to the invention;

FIG. 102 depicts a tag list data entry screen in a system according to the invention;

FIG. 120 depicts a typical IDA generic editor frame in a system according to the invention;

FIG. 121 depicts IDA & OLE compound documents in a system according to the invention.

DETAILED DESCRIPTION OF THE ILLUSTRATED EMBODIMENT

Figure 1:
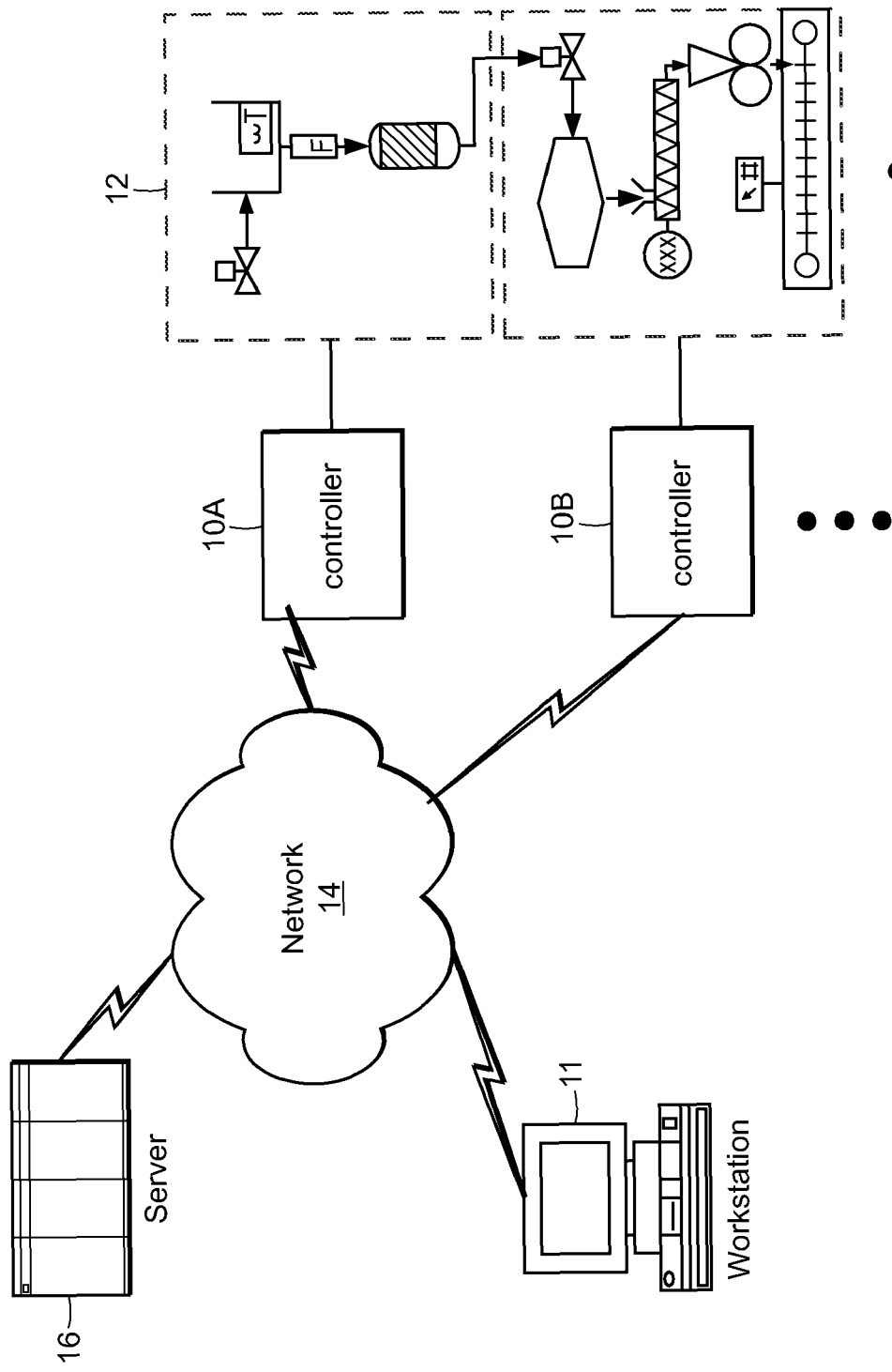
FIG. 1 depicts a a digital data processing environment of the type in which the invention is practiced.

FIG. 1 depicts a digital data processing system of the type with which apparatus and methods according to the invention may be practiced. The illustrated system is particularly adapted for use in connection with process control, as discussed further below. However, those skilled in the art will appreciate that apparatus and methods according to the invention can be used in connection with other control systems. In this regard, processes 12A, 12B can represent any industrial, manufacturing, service, environmental or other process, device or system amenable to monitoring or control (hereinafter, collectively, "control").

The system of FIG. 1 includes a workstation 11 that is coupled to one or more controllers 10A, 10B on which reside process control systems for monitoring and/or controlling one or more processes 12A, 12B. These may represent independent processes or different aspects of the same or related processes. Moreover, the processes 12A, 12B may reside within a single plant, site or area, cell or unit or, conversely, they may dispersed among many plants, sites, areas, cell or units.

Workstation 11 represents an engineering workstation, personal computer, mainframe computer or other digital data processing device suitable for operation in accord with the methods described herein for purposes of modeling a control system and configuring controllers 10A, 10B or other control or controlled apparatus in accord with the teachings herein. In a preferred embodiment of the invention, workstation 11 is an engineering workstation or personal computer executing the Windows NT operating system. Though illustrated as being carried out on workstation 11, those skilled in the art will appreciate that the modeling and configuration functions described herein can be executed on suitably configured controllers 10A, 10B (e.g., those having sufficient processing power and interfaces to provide the graphical and other configuration functions described herein).

Server 16 represents an optional additional source of classes defining objects for modeling a control system and for configuring controllers 10A, 10B (or other control or controlled apparatus) in accord with the teachings herein. This can include, for example, a retail store, warehouse or other distribution point of CDROMs, diskettes or other magnetic medium on which such classes are stored. In a preferred embodiment, however, it represents a digital data processor that functions as a server, e.g., maintained by a manufacturer or other distributor, from which such classes can downloaded to workstation 11, e.g., as part of an e-commerce transaction, for configuration prior to downloading to controllers 10A, 10B.

Network 14 provides a communications medium permitting the downloading of control algorithms and other configuration information to controllers 10A, 10B, e.g., from workstation 11. It can also of provide a medium for uploading information from controllers 10A, 10B to those other digital data processors 11, 16. Still further, it can provide a medium for communications, real-time or otherwise, between the controllers 10A, 10B and other devices, e.g., workstation 11 and server 16. Though illustrated to represent a LAN, WAN, or global network (Internet), those skilled in the art will appreciate that element 14 may represent any medium or mechanism through which control algorithms and other information may be transported, electronically, physically or otherwise, to and from controllers 10A, 10B.

Figure 2:
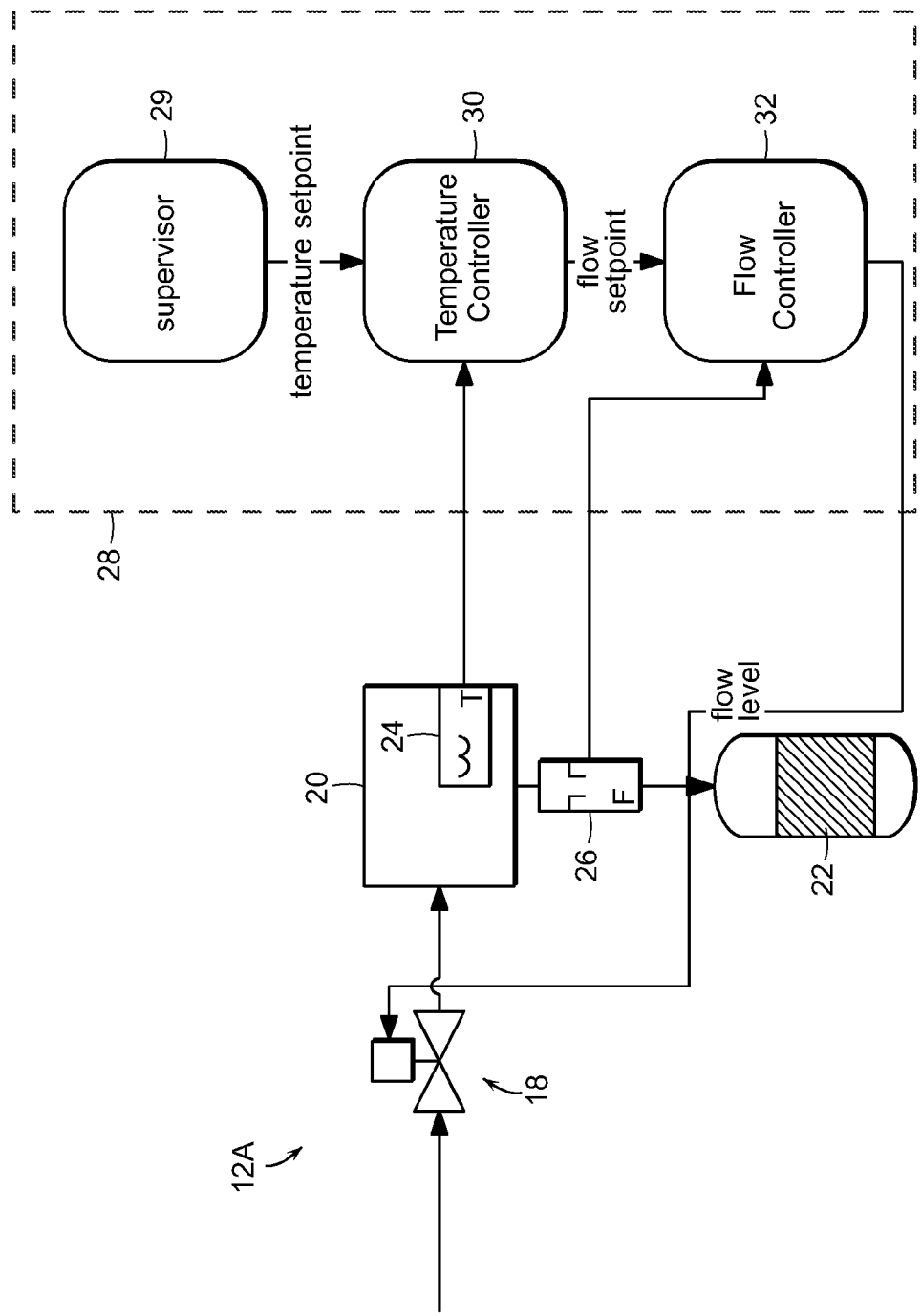
FIG. 2 depicts a process control system of the type with which the invention is practiced.

An exemplary control process 12A is illustrated in greater detail in FIG. 2. It shows a process including valve 18 that governs the rate of fluid flow to aeration tank 20 which, in turn, transfers the liquid to storage tank 22. Field devices, i.e., sensors 24 and 26, monitor the state of process 12A and, thereby, facilitate its control by process control system 28 operating on controller 10A. Thus, sensor 24 is disposed in or adjacent to tank 20 for measuring the temperature of fluid therein, while sensor 26 measures the flow of fluid from aeration tank 20 to storage tank 22.

FIG. 2 further illustrates a control algorithm 28 of the type that can be configured by methods and apparatus according to the invention. The algorithm 28 is exercised by controller 10A to control process 12A. The algorithm 28 includes blocks or other entities 29, 30, 32, that model field devices, control devices and other elements within process 12A and that monitor and/or control the states and interactions between those entities.

Entities 29, 30, 32 comprise software components which may include, by non-limiting example, source, intermediate or executable code, databases, of the type conventionally used in the art for operating controllers, field devices, control devices and other process control equipment. Referenced in this regard in the discussion below are software components, and process control systems in general, marketed as the I/A Series® systems (hereinafter, "IAS" or "I/A") available from the assignee hereof. Those skilled in the art will appreciate that methods and apparatus according to the invention can be used to model processes and configure control algorithms for use with other control systems, as well.

Figure 3:
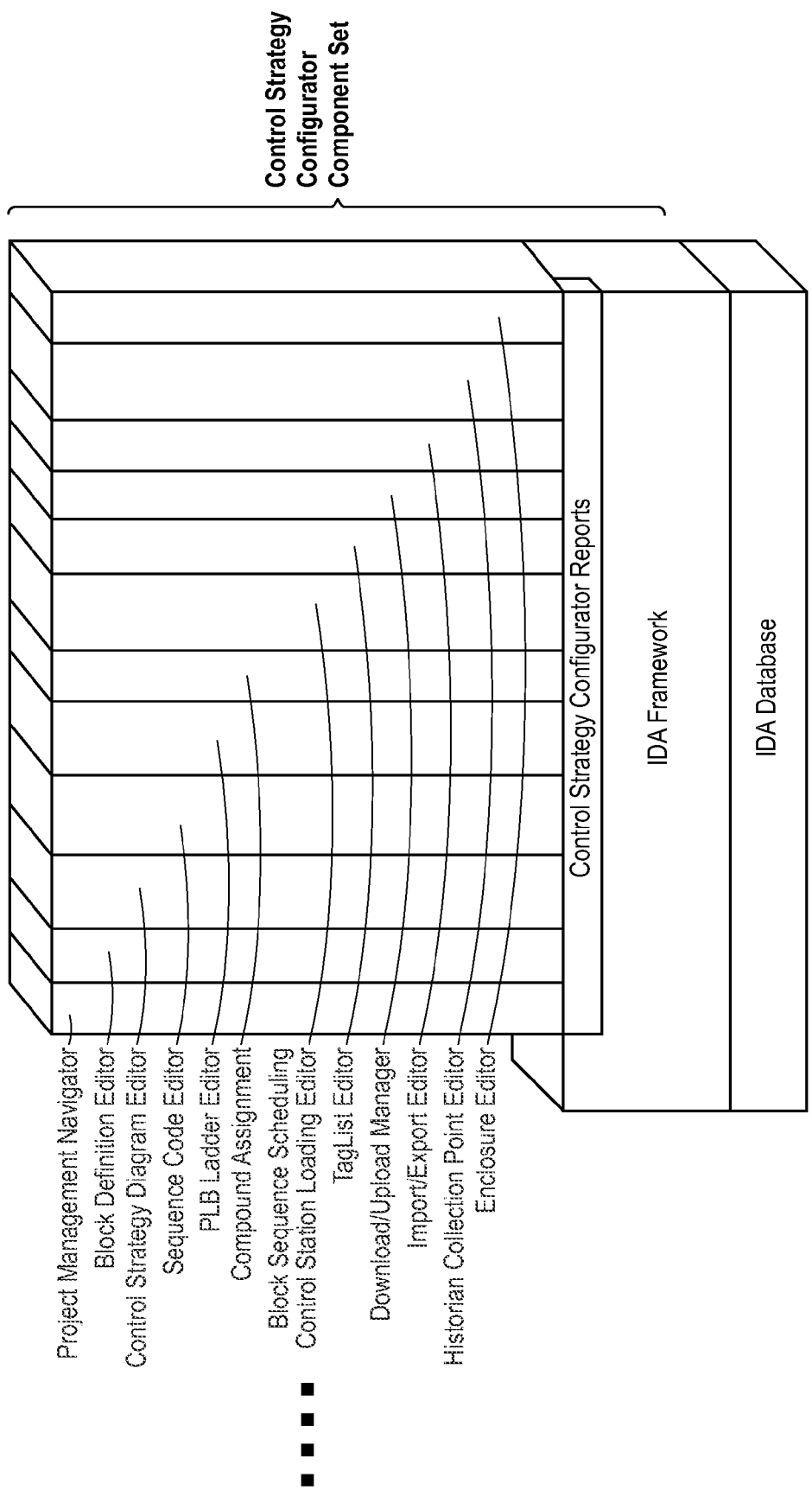
FIG. 3 depicts control algorithm configurator components in a system according to the invention.

Described below is a system, alternately referred to as the IDA Control Algorithm Configurator, the Configurator, IDA, and the like, according to one embodiment of the invention for use modeling and configuring control processes. Referring to FIG. 3, the Configurator includes a Framework, a Database, a project manager and a set of editors. The Framework provides common resources, such as menus, toolbars, dialogs, and security services, used by the editors to manipulate, display and report configuration data stored in the IDA database. In one preferred practice of the invention, the IDA Control Algorithm Configurator and Framework are packaged as a single application. This software package can be installed on either a stand-alone PC, workstation (e.g., element 11 of FIG. 1) or other digital data processor, e.g., running Windows NT or any other suitable operating system.

Figure 4:
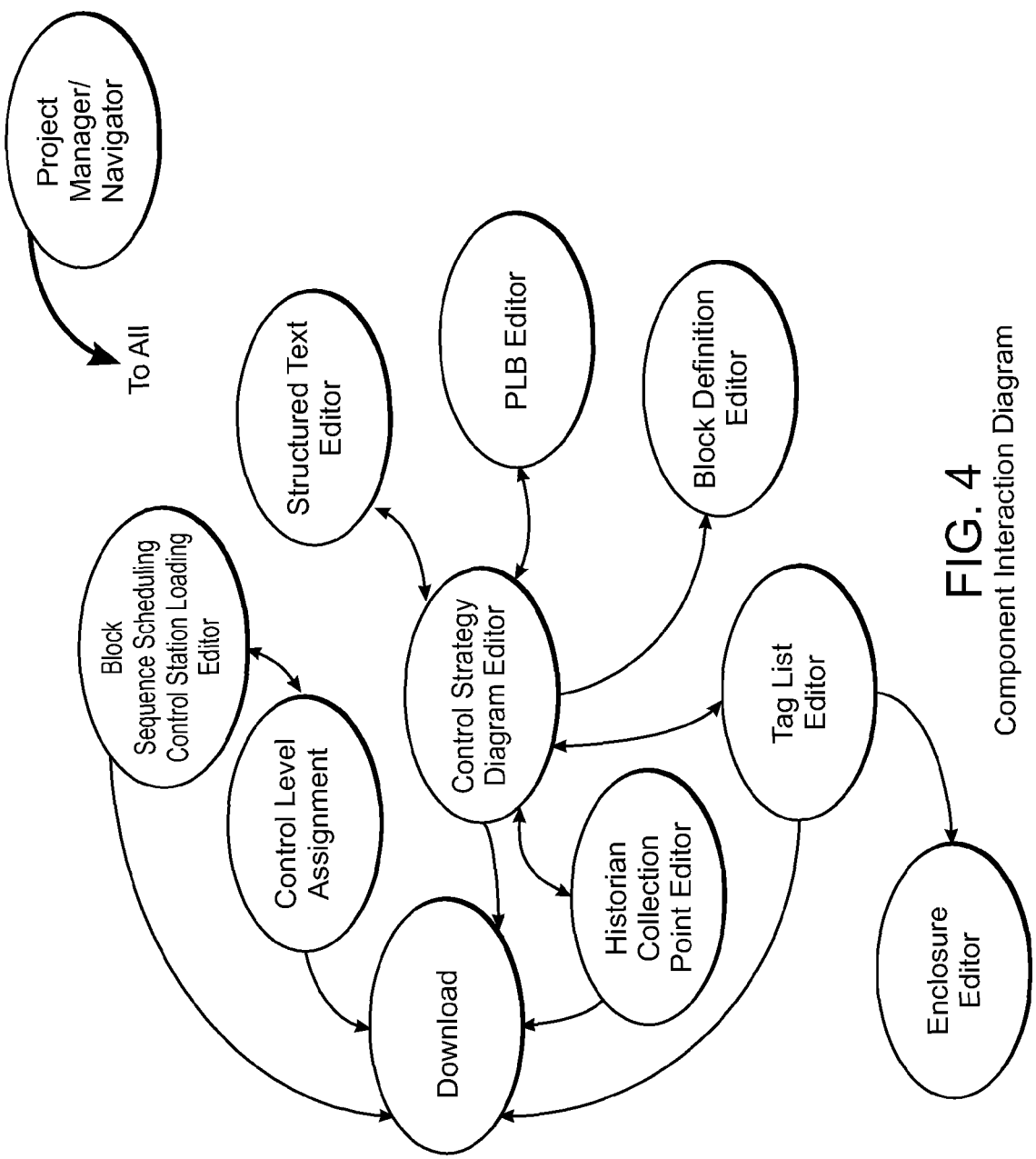
FIG. 4 depicts component interaction in a system according to the invention.

The editors are used by the implementation creator to create and maintain standard control scheme definition objects distributed with the implementation and by users to create their own plant control schemes. The Project Manager allows the user to browse through the project configuration hierarchies and data. Interactions among the editors and the project manager/navigator are shown in FIG. 4.

The database forms part of an object oriented database management system (OODBMS), which may be any type commercially available in the marketplace. The database can be deployed in a client/server configuration with a single centralized database per plant servicing multiple clients, or otherwise. It resides on the workstation 11, e.g., or on a digital data processor coupled therewith.

Part 1—Framework Classes

1 IDA Framework Object Model

Figure 5:
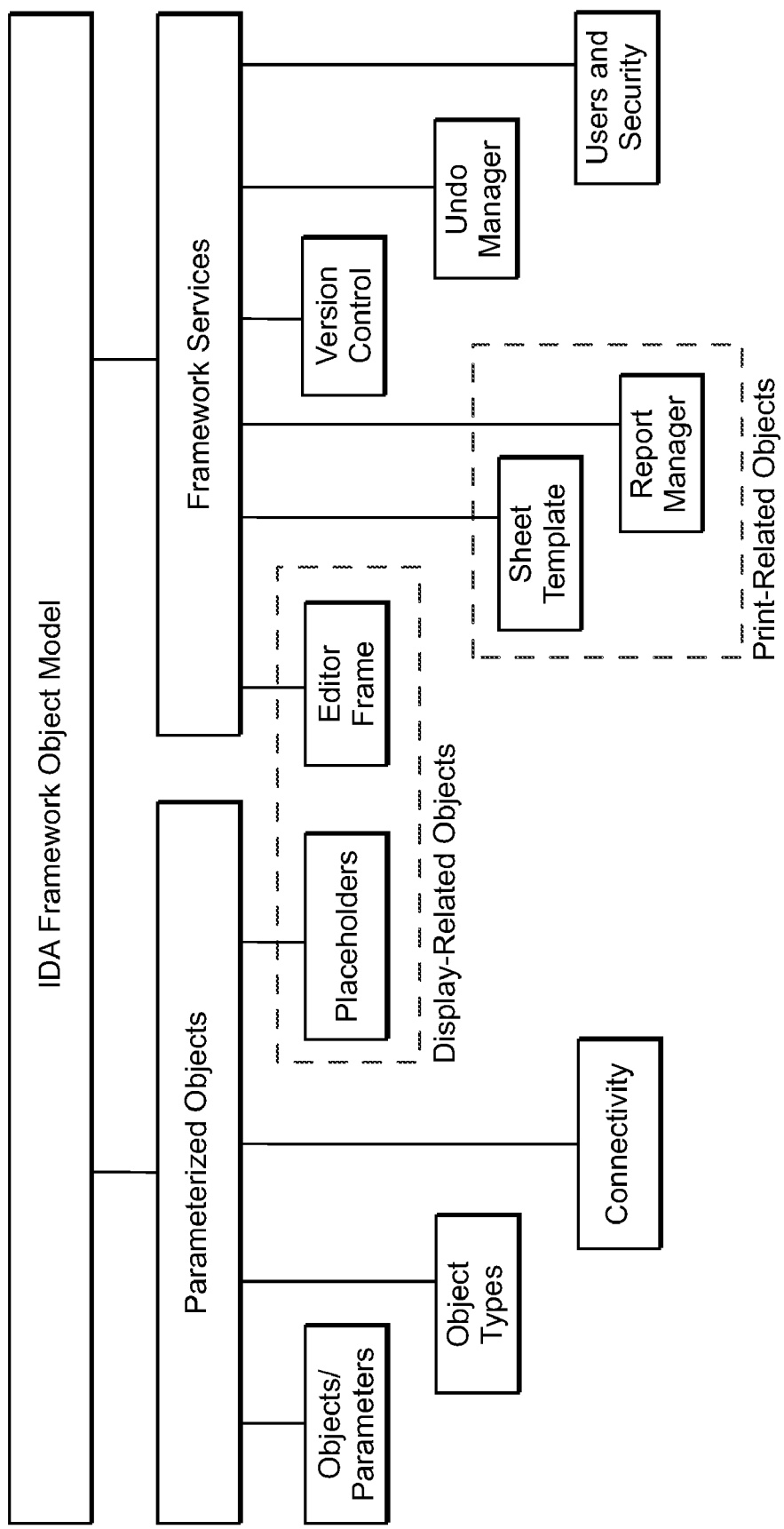
FIG. 5 depicts an IDA framework object model in a system according to the invention.

FIG. 5 presents the primary component parts of the overall IDA Framework object model. The model may be broken into two major areas:
1. Parameterized Objects.
2. Framework Services, which are provided in order to allow controlled access to those objects, and how they might be used to display, print and otherwise manipulate Parameterized Objects.

Figure 6:
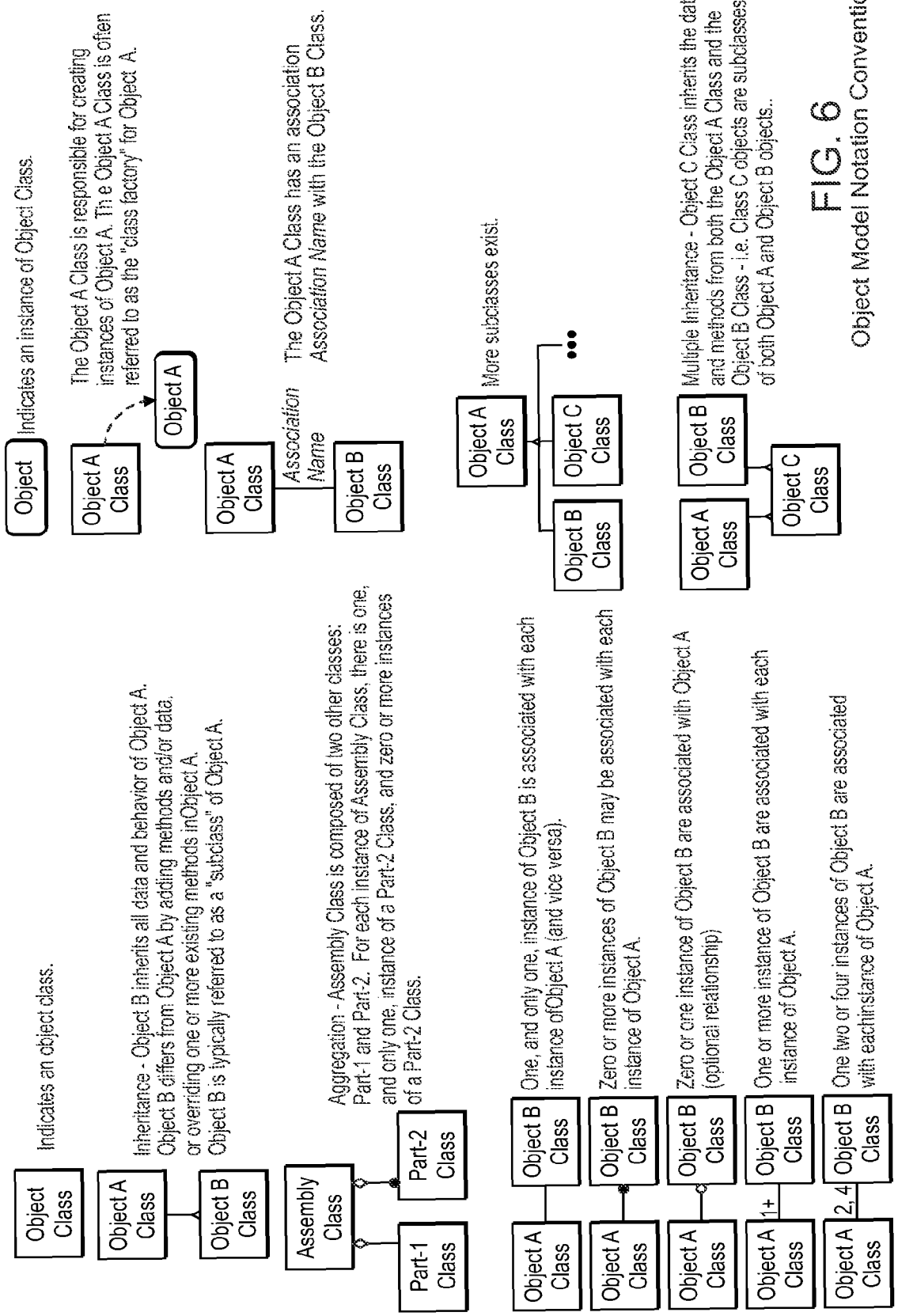
FIG. 6 depicts an object model notation used in this application.

In the discussion that follows object classes and their various associations are represented in the manner shown in FIG. 6.

1.1 Objects and Parameters

Almost all objects in IDA are parameterized—i.e., their type is determined by the parameter set they support, and the data that these objects represent is contained within their associated parameters. Parameterized objects have the capability to inherit their parameter set from another Parameterized Object which acts as the definition for the new object. A Parameterized Object's definition is, itself, a Parameterized Object.

Using Parameters to define an object's type, and the data associated with it, provides the following capabilities:

Parameters represent data—they aren't compiled-in behavior.

Parameterized Objects support data inheritance—a Parameterized Object inherits its structure and default values from its defining object.

Any object can override the default value of various attributes of an associated Parameter. Referred to as parameter instantiation by exception, only the Parameter attributes that differ from their defaults are instantiated, and attached to the object.

Parameters associated with a Parameterized Object can also be changed by the application of a modifier object, effectively overriding the default value(s) of any matching Parameters.

A change to a Parameter in a Parameterized Object acting as a definition is reflected in all the Parameterized Objects that are derived from the defining Parameterized Object.

Parameterized Objects can extend their definition by adding additional Parameters.

Parameters are organized into groups, each group containing logically-related Parameters. Groups can be predefined and/or defined by the user.

Given the complex nature of Parameterized Objects and their parameter sets, a simple interface for the developer is provided in which it appears that a Parameterized Object consists of a self-contained, cohesive set of parameters when in reality, data inheritance, parameter overrides, and modifications are all acting together to determine final parameter values.

1.1.1 Object Model

Figure 7:
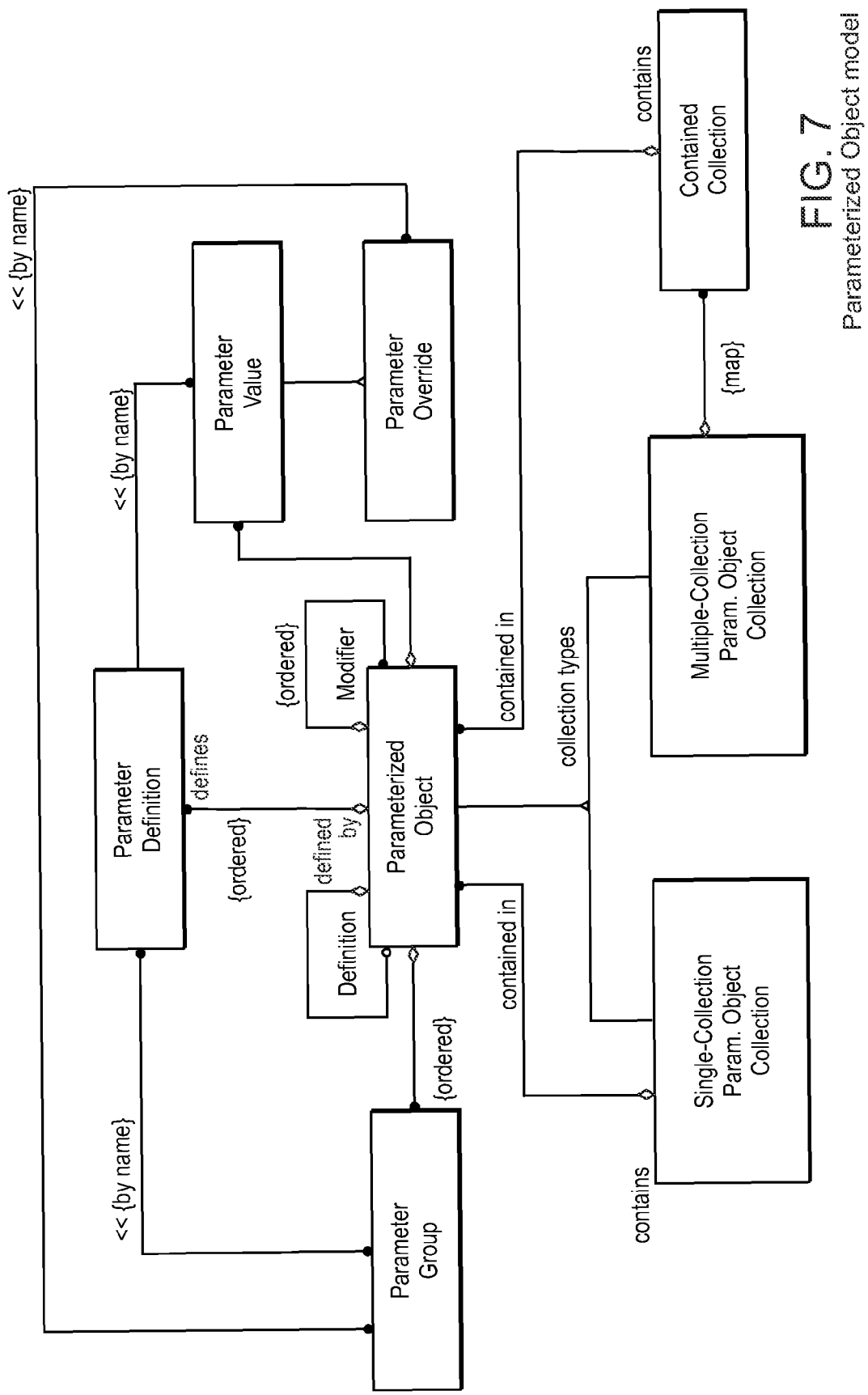
FIG. 7 depicts a parameterized object model in a system according to the invention.

The overall object model for Parameterized Objects, and Parameterized Object Collections is depicted in FIG. 7.

1.1.1.1 Parameterized Object

A Parameterized Object is a persistent object. The parameters associated with a Parameterized Object are both locally defined (as depicted in the object model) and inherited. The locally defined parameters are those defined by the Parameter Definition objects. The inherited parameters are those that are inherited through an association to another Parameterized Object typically serving as a definition.

- A Parameterized Object has an ordered one-to-many association with the Parameter Definition object. This represents the set of locally defined parameters which "belong" to, and ultimately define, this object.
- A Parameterized Object maintains a list of parameter overrides, in the form of Parameter Value and/or Parameter Override objects. Parameter Value objects are used to override the actual parameter value, and other important attributes such as high and low limits. Parameter Override objects are used to override all other editable parameter attributes. Only inherited parameters are overridden—locally defined parameters simply have the appropriate attribute value changed within the associated Parameter Definition.
- A Parameterized Object has an association to another Parameterized Object from which it inherits parameters. It is a zero-or-one association, and is referred to as its Definition, or parent, Parameterized Object. If a Parameterized Object does not have a definition, then it is considered to be a root Parameterized Object. A root Parameterized Object defines all of its parameters, not relying on another object to inherit them from. If a Parameterized Object has a Definition Parameterized Object association, then the Parameterized Object is a derived Parameterized Object. The derived Parameterized Object gets its parameters by inheriting them from the defining object and by adding its own through local Parameter Definition associations.
- A Parameterized Object maintains a list of other Parameterized Objects that inherit its parameters. A Parameterized Object whose parameters are inherited by other parameterized objects is referred to as a Definition, or parent, Parameterized Object. There is no limit as to the number of objects for which a Parameterized Object can act as a definition.
- A Parameterized Object maintains an ordered list of Parameter Groups associated with it. This association gives the Parameterized Object an ordered set of labels to put on the tabs of the Parameterized Objects' property page tabs while being edited, or on tabs at the top of the Parameterized Object editor. Parameter Groups, in turn, maintain an association with zero or more Parameter Definitions.
- The Parameter Definition order maintained by the Parameterized Object applies across all Parameter Groups that the parameters belong to. In other words, if parameter A comes before parameter B in the association between Parameterized Object and Parameter Definition, then A will preferably appear before B whenever the two parameters are displayed in the same group.
- A Parameterized Object may be contained within a parameterized object collection object, which may be either a single- or multiple-collection instance of Parameterized Object collection. In turn, parameterized object collections may contain zero or more parameterized objects.

An instance of Parameterized Object may be associated with zero or more other Parameterized Objects that are referred to as Modifier Parameterized Objects. The Parameter Values in the Modifier Parameterized Objects are used to override the parameters of the Parameterized Object. An instance of a Parameterized Object can have zero or more of these modifiers to modify their parameters. If an object has more than one modifier, the modifications are made in the order that the modifier objects were applied, with the resulting overrides representing the accumulative effect of having applied all the modifications.

The Framework provides the method(s) necessary in order to determine the behavior of a modifier object. By default, the Parameter Values in the Modifier which aren't associated with any Parameter Definitions (local or inherited) of the object being modified are ignored. However, there may be circumstances under which a developer needs to have all Parameter Definitions applied to the object being modified, potentially adding new parameters to the object.

1.1.1.2 Parameterized Object Collection Classes

A Parameterized Object Collection is just that—a collection of one or more Parameterized Objects. Applications programs can add or delete elements from the collection, and iterate through it. Parameterized Object Collections have the ability to support multiple collections. For example, a loop could collect both blocks and connections, whereas a compound could have a separate collection of blocks for each control zone.

Consequently, the Parameterized Object Collection classes have been separated into two classes, each of which will be able to support many different collection types, which include Lists (insert after/before), Arrays (indexed access, and "null" locations), and possibly Maps (or Dictionaries). These collection classes are:

1. Single-Collection. Instances of this class contain a single collection, presented as a single ordered list of objects.
2. Multiple-Collection. Instances of this class contain multiple, named collections. These named collections are references to instances of collections (i.e., instances of the Contained Collections) which are managed by the Multiple-Collection instance. Each collection within a Multiple-Collection object can be a different type (for example, a list and an array).

1.1.1.3 Parameter Definition

The Parameter Definition object defines the values for the attributes in a parameter. Even though it is only directly associated with one Parameterized Object, it may indirectly belong to many other Parameterized Objects via the parameter inheritance mechanism described in the discussion on Parameterized Objects.

The parameter object consists of a set of attributes. The attribute set is compiled-in behavior, and the value of each attribute is changed as needed to satisfy the requirements of the associated Parameterized Object. A Parameter Definition does not exist alone, but only in the context of a Parameterized Object.

In the illustrated embodiment, the minimum attribute set for a Parameter Definition is as follows:

| | |
|---|---|
| Name | The unique identifier for accessing the parameter within a Parameterized Object. There cannot be more than one |

-continued

| | |
|---|---|
| | parameter in a Parameterized Object with the same name. This is the name used when downloading the parameter to a target machine. |
| Group | A list of Parameter Groups which this parameter belongs to. |
| Label | An internationalizable string used to label the Parameter in the user interface. |
| Data Type | Specifies the data type of the Parameter. Integer, float, boolean, and string are examples of a data type. Depending on implementation, the length of the data can be either an attribute of the data itself or of the Parameter Definition. Can also be implemented via sub-classes of Parameter Definition. |
| Behavior | Specifies a set of behaviors the Parameter exhibits. Examples include whether the parameter could be edited or associated with another Parameter. This can be implemented as a bitmask. |
| Help | Specifies internationalizable help associated with the particular Parameter Definition. The help consists of both a verbose and terse version. The verbose version is used by the help system and the terse version is used for such things as short messages and tool tips. |
| Edit Control Type | Specifies a specific control type used to edit the value attribute associated with the Parameter Definition. This edit control type is used by any application editing this parameter, whether it is displayed in a property sheet, or in a spreadsheet format. |
| Range | Specifies a range of valid values for the Value attribute. |
| Value | Specifies the value of the Parameter. This value is type specific which is specified by the type attribute. |
| Formula | Provides a placeholder to contain the user-provided formula for Parameter Definitions which have their Value attribute determined by a formula. |
| Format | Specifies a C-printf type specification for displaying the value attribute. |

The Parameter Definition object has a many-to-many association to the Parameter Group object. A Parameter Definition can belong to many groups, allowing the parameter to be displayed in multiple tabs on a Parameterized Object property sheet. The order of parameters within any Parameter Group is determined by the ordering maintained by the Parameterized Object.

The Parameter Definition object has a many-to-one association to the Parameterized Object. Although it may be inherited by several Parameterized Objects, a Parameter Definition belongs directly to (locally defined by) one and only one Parameterized Object. A Parameterized Object contains an ordered set of zero or more Parameter Definitions.

1.1.1.4 Parameter Value

An instance of the Parameter Value object is created whenever specific attributes of a Parameter Definition instance are overridden—namely, value, high range and low range. Any other attribute of a Parameter Definition which is overridden is specified by a Parameter Override object. It is important to note that a Parameter Value exists by exception only—in other words, it exists only if the associated Parameter Definition is overridden by a Parameterized Object located "down" the ancestral tree from the Parameterized Object where the Parameter Definition was originally defined. Overrides of a locally defined Parameter Definition simply replace the appropriate value within the Parameter Definition itself.

A Parameter Value is associated with one, and only one, Parameter Definition, by name. Attributes of the same Parameter Definition, however, may be overridden by multiple Parameter Values when viewed in the context of the Parameterized Object hierarchy chain.

The final value of any parameter attribute is determined by traversing the Parameterized Object hierarchy back to the object's root, then sequentially applying overrides (and/or modifiers) appropriately going forward down the object's hierarchy chain.

Each Parameterized Object maintains a list of zero or more Parameter Value objects. This list represents the set of locally defined value overrides associated with this Parameterized Object.

1.1.1.5 Parameter Override

The Parameter Override object is used by a Parameterized Object to override attributes of inherited parameters other than value, high range, and low range. Attributes which are typically overridden using this object include which parameter groups a parameter belongs to, format, and help strings.

A Parameter Override object is derived from the Parameter Value class. As such, it inherits all the behavior and attributes of the Parameter Value class in terms of existing by exception only, and how the final value of attributes modified within a Parameter Definition are determined.

A Parameter Override has a "special" relationship to Parameter Groups, in that one of the attributes of a Parameter Definition is a string containing all of the names of the groups which that parameter belongs to. In this relationship, the same Parameter Override may specify many Parameter Groups. In turn, the same Parameter Group may be referenced by several Parameter Overrides, resulting in a many-to-many relationship. As with other relationships dealing with Parameter Values and Overrides, this one is resolved by parameter name.

1.1.1.6 Parameter Group

The parameter set that defines the structure of a Parameterized Object is segregated into named Parameter Groups. These groups are directly related to the tabs contained within the property sheet for the Parameterized Object when it is edited, as well as the tabs visible on the Parameterized Object editor. Each parameter defined in an object belongs to one or more Parameter Groups.

Figure 8:
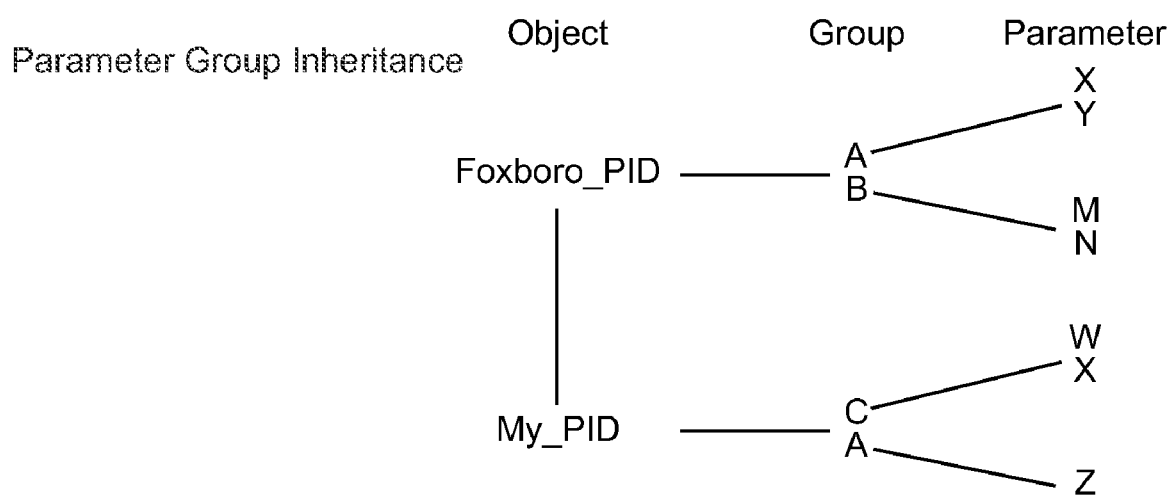
FIG. 8 depicts parameter group inheritance in a system according to the invention.

Parameterized Objects inherit their Parameter Groups in the same way they inherit Parameter Definitions. As depicted in FIG. 8, a Parameterized Object may add additional groups to the inherited list. The order of Parameter Groups, and the parameters within those groups, is also inherited, and is determined by the ordered list of parameters maintained by the Parameterized Object hierarchy chain.

In FIG. 8, an object Foxboro_PID is associated with two groups, A and B. Group A contains two parameters, X and Y, while Group B contains parameters M and N. A new object is created, using Foxboro_PID as it's definition object. A new group, C, has been defined for My_PID, which contains parameters W and X. A new parameter, Z, has been added to the inherited group, A.

When the object My_PID is edited, a property sheet with three tabs appears. The tabs are labeled A, B and C. If the user edits group A, parameters X, Y and Z are shown, in that order. Note that if a change is made to the value for parameter X, and switches to group C, the new value for X will be displayed.

The user can add new parameters (and define their order) to an inherited group, but not change the order of any of the inherited parameters contained in the group. All inherited parameters appear first on the property page, followed by the parameters which were added locally. Similarly, the user can add local groups, but cannot change the order of inherited groups when displayed on the property sheet. Local groups appear after inherited groups.

1.1.2 A Simple Parameterized Object Example

Figure 9:
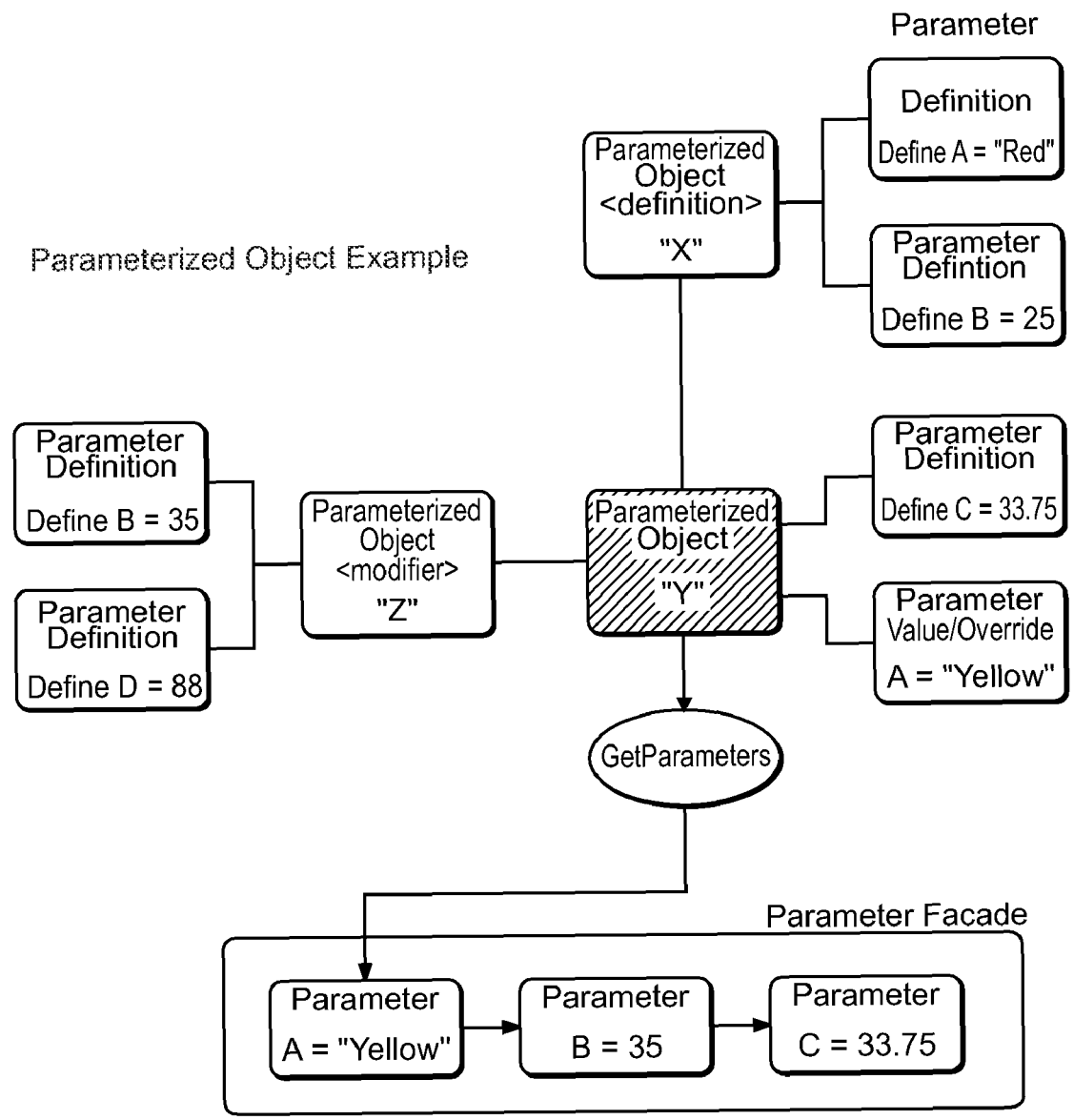
FIG. 9 depicts a parameterized object example in a system according to the invention.

The example in FIG. 9 shows how a parameter set of a simple Parameterized Object is constructed. Parameterized object "Y" has an association to its definition "X", and is modified by "Z". A call to a method to retrieve on parameterized object "Y" (depicted as "GetParameters" in the example) results in the list of parameters as shown.

Figure 10:
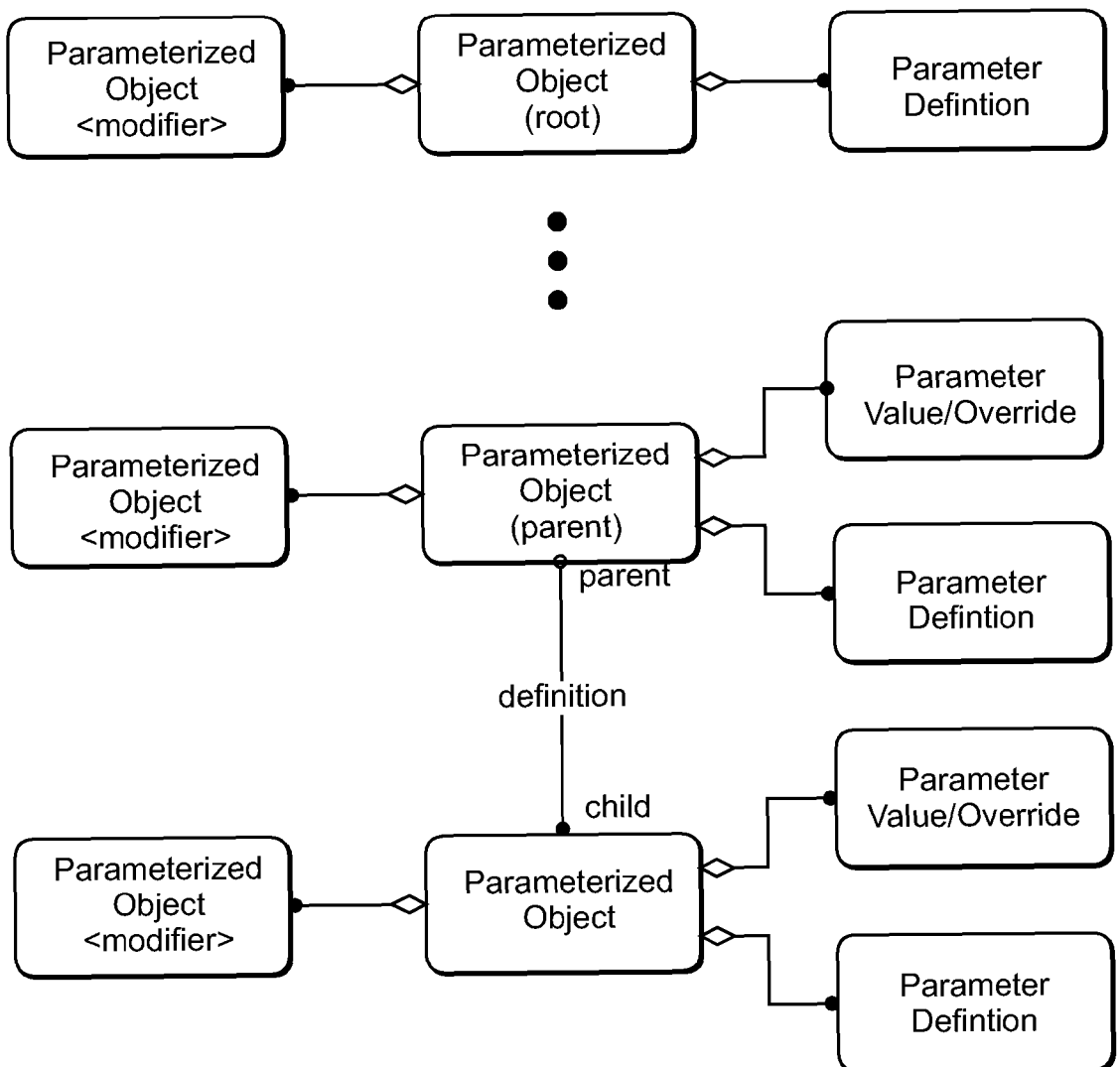
FIG. 10 depicts the creation of a parameter list in a system according to the invention.

The Parameterized Object has the capability to construct a list of parameter objects that are associated with it. The parameter list for a Parameterized Object is composed from two sources: the parameters that are inherited (including all overrides and modifiers, possibly n levels up the parameter inheritance tree), and the parameters which have been defined locally. FIG. 10 shows a instance model of the objects involved in constructing a parameter list for a simple Parameterized Object.

Listed below are the steps that a Parameterized Object takes when it is asked for a list of its parameters. Take note of step 2, which causes recursive behavior in that the inheritance tree is traversed all the way to the root Parameterized Object. The root Parameterized Object constructs a parameter list, finishes all 5 steps outlined below, and then returns that list to the next Parameterized Object down, and so, until the original calling Parameterized Object gets a list from step two. It then finishes steps 2, 3, 4, and 5 and the list is complete.

| Step | Action |
| --- | --- |
| 1 | The application asks for the parameter list of a Parameterized Object. |
| 2 | If there is a definition object, traverse the inheritance tree in order to add its parameters to the list first (this continues back to the root definition object). |
| 3 | If there are any Parameter Value and/or Override associations, then apply those to their respective inherited parameters in the parameter list. |
| 4 | If there are any Parameter Definition associations, then add those new parameters to parameter list. |
| 5 | If there are any Modifier Parameterized Object associations, then apply their Parameter Definition associations as if they were Parameter Override associations to their respective parameters in the parameter list. |

1.1.3 Framework User Interfaces for Parameterized Objects

Figure 11:
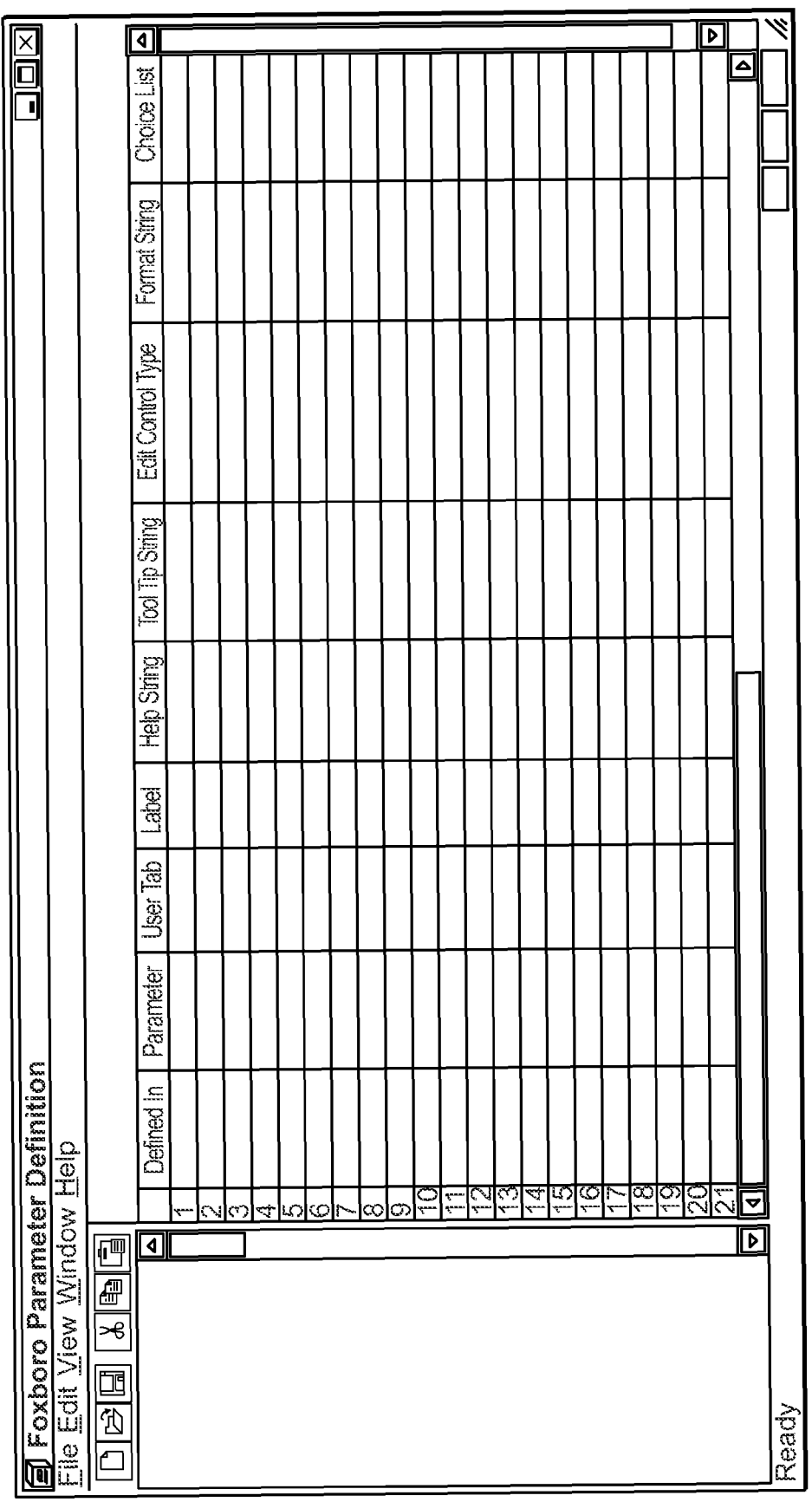
FIG. 11 depicts a parameter definition editor in a system according to the invention.

Two user interfaces are supplied by the Framework for working with Parameterized Objects on a daily basis. The first user interface supplied by the Framework to manipulate Parameterized Objects is a generic Parameter Definition Editor, which could appear as shown in FIG. 11. The Parameter Definition Editor is an interface which allows Parameter Definitions to be created for a Parameterized Object. This interface will most likely be utilized by someone with administrative and/or supervisory capability.

FIG. 11 provides a depiction of the Parameter Definition Editor. The Framework automatically provides the menu and toolbar services which the editor may need, a tabbed tree pane (shown on the left side of the figure), and a generic view pane which the application programmer can use for just about anything—e.g., a graphical "canvas", or a grid control able to display data in a spreadsheet-like format.

Figure 12:
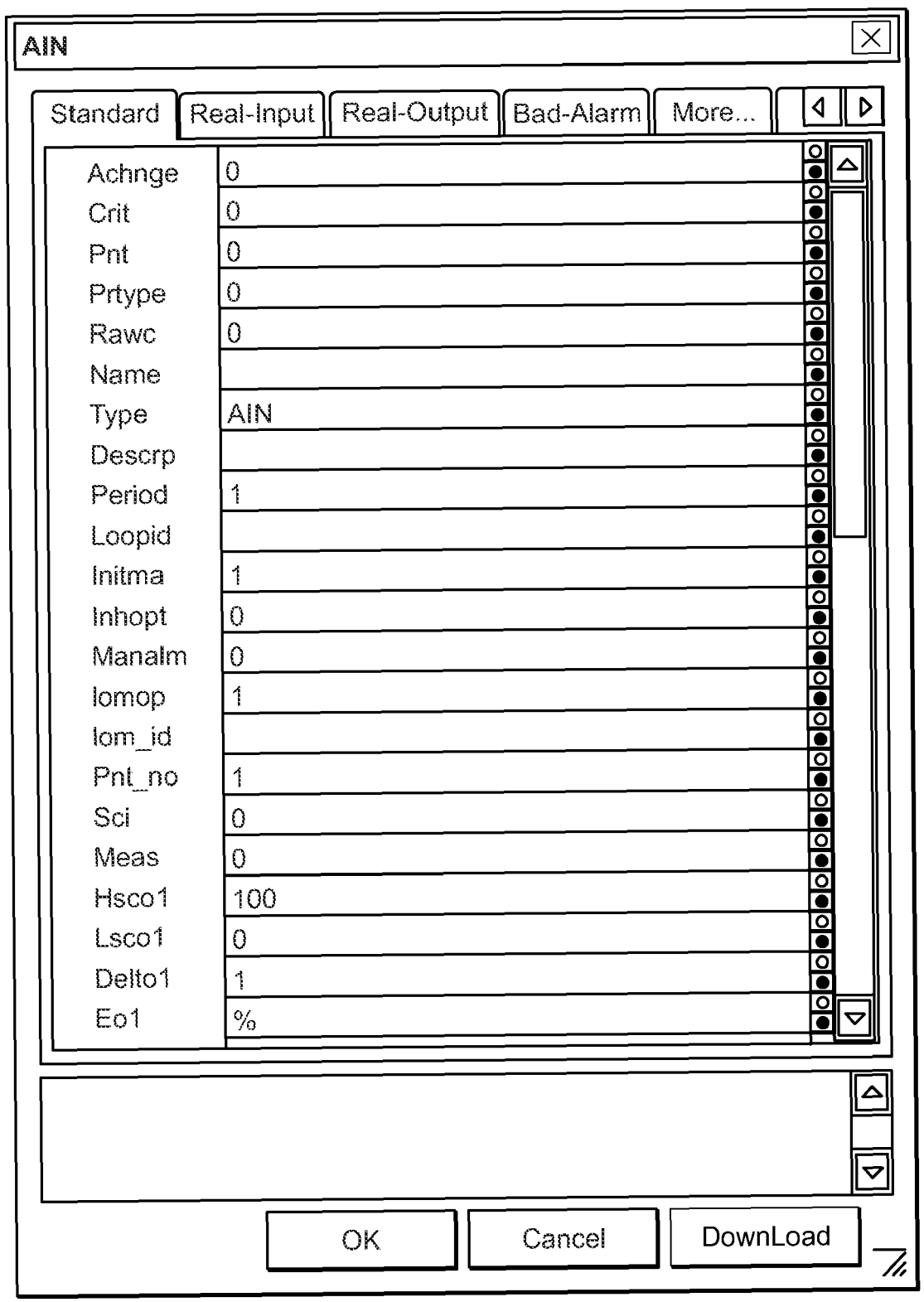
FIG. 12 is a parameter editor example in a system according to the invention.

The second user interface is a generic Parameter Property Sheet mechanism which is used whenever anyone needs to edit the Value attribute of a parameter on any object. The property sheet can appear as FIG. 12. When the user double-clicks on a Parameterized Object, or in some other way activates an editing session on a Parameterized Object, a property sheet is created and displayed by the Framework. The individual property pages within the sheet correspond to each Parameter Group found to be associated with the object being edited. Each page, in turn, displays only those parameters which have been associated to the corresponding Parameter Group.

The current values of each parameter in the group are displayed, providing the user with the ability to change the values of configurable parameters, possibly creating Parameter Override objects. The "look-and-feel" of each parameter value displayed on the property page is determined by the edit control type which was associated with the corresponding Parameter Definition.

Some parameter values (such as an entire sequence block) require something more sophisticated in order to edit it. In these cases, a button containing an ellipses ( . . . ) appear next to the field, and when pressed, display the appropriate editor. In the event that a Parameter value is derived from a user-specified formula, the formula is also displayed, and allowed to be changed, on the property page.

1.2 Object Types

All configurable objects have an associated classification, or type, which they inherently belong to. An object's type is used to classify what it is, and is used primarily to segregate objects into groupings of objects exhibiting similar appearance and behavior (e.g., an AW70 and AW51, although both application workstations, have different physical characteristics which necessitates distinguishing between them at configuration time. Thus, multiple instances of AW70's would each have a unique identifier in the configuration, but each would have a type of AW70).

As used here and hereinafter, the symbols Awxxx, where xxx is a number, identifies an applications workstation available from the assignee hereof, The Foxboro Company, or other digital data processing apparatus. The term FBM or symbol FBMxxx, where xxx is a number, identifies a field device available from The Foxboro Company, or other field device for use in process control. The term CP refers to a control processor or other digital data processing apparatus suited for that function.

The Framework provides methods to return an object's type to the application. This type information may be used for a number of reasons, including: preliminary lookup to see if two objects can establish a connection; satisfy a search which uses a type filter; display of type information on an object's placeholder.

The concept of type may be further abstracted into the concept of type category, which is a broader classification of type. Several object types may belong to the same category (e.g. an AW70 and AW51 both belong the category Application Workstation). All objects in the same category exhibit the same general behavior as that defined by that category. For example, an FBM would be an object type category, whereas an FBM02 and FBM04 are examples of specific object types.

Consequently, it is convenient to think of object types as being contained within a type hierarchy. Each branch in the hierarchy would correspond to an object type category, whereas the leaves, or endpoints, of each branch would correspond to specific object types. The remainder of this section will present the data model, with examples, of this type hierarchy for IDA.

1.2.1 Object Model

Figure 13:
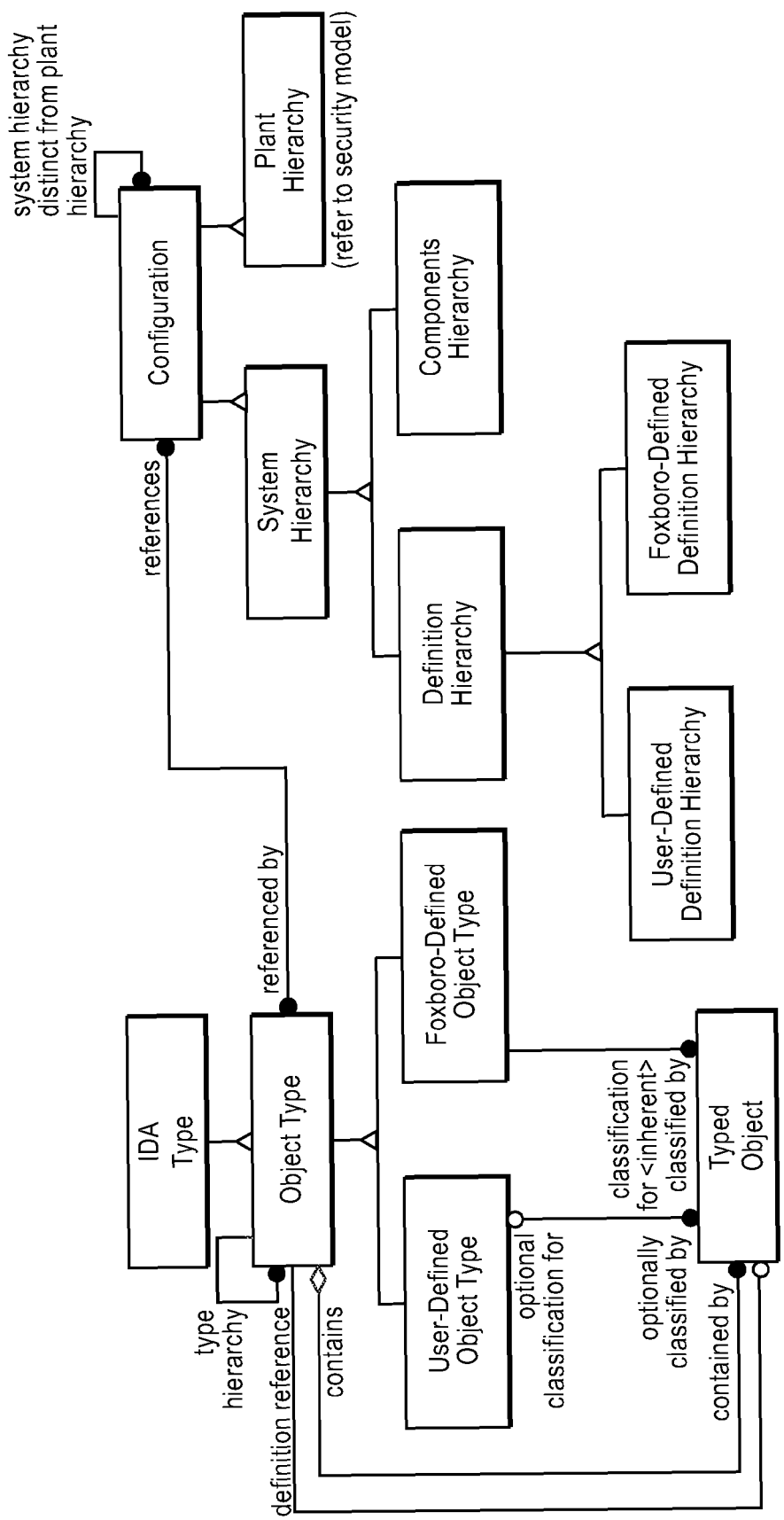
FIG. 13 depicts object types in a system according to the invention.

The object model used in the illustrated embodiment to support the concept of object types is shown in FIG. 13.

1.2.1.1 IDA Type

This abstract base class is used only as a placeholder for containing data and methods common to all "type-ish"

classes. The only one shown in the illustration is Object Type, but this can be expanded to include other types such as Parameter Type, etc.

1.2.1.2 Object Type

An object's type is used to classify what it is—i.e., all objects of the same type have the same appearance, and behave identically, differentiated only by minimal differences in associated data (e.g. name, ID, etc.) which is used to uniquely identify them.

The Object Type class is hierarchical—the branches of the hierarchy represent type categories, with the leaves, or endpoints, of the hierarchy being actual object types with which objects are associated. Instances of Object Types are Parameterized Objects, and may only be directly associated to a single type category (i.e., a specific object type cannot belong to more than one type category). Note, however, that even though an object type can only be directly associated with one type category, it may indirectly be associated with several type categories depending upon where it is in the type hierarchy. Every instance of Object Type has a pointer back to its containing type category, regardless of whether it's acting as a simple object type, or a type category itself.

All instances in the Object Type hierarchy are able to act as collections of Typed Objects. That is, each Object Type is able to maintain a list of all Typed Objects which are directly associated with the type itself. For example, all instances of an AIN block will contain a pointer back to the AIN instance of Object Type. In turn, the AIN instance of Object Type will maintain a list of all instances of AIN blocks in the configuration. This containment is meant to be only one level deep—in other words, there is no need for I/A Block, the containing instance of AIN, to also maintain a list of all AIN blocks (although nothing in the design would prevent it, if desired).

Additionally, each instance of the Object Type hierarchy which serves as a reference for a Typed Object requires a definition reference to the defining Parameterized Object which defines that Typed Object. This relationship provides quick access to the definition object when a symbolic representation of that definition is dragged and dropped into a view. For example, if the user clicks and drags an AOUT definition (either from the System Hierarchy, or from a library template) to a view, then drops it, this relationship provides access to the Parameterized Object which actually defines an AOUT block so that it can be created quickly.

Since an Object Type which can be referenced by a Typed Object requires a reference to the defining Parameterized Object, only those instances in the Object Type hierarchy be used to serve as the collection point for those same types of objects as they are created. If an Object Type doesn't have a defining reference, is not a container of Typed Objects.

The Object Type class is an abstract class—no instances of Object Type may exist in the database. Subclasses of Object Type are the implementation-standard Object Type class, and the User-Defined Object Type class. The Object Type class contains those methods common between the two subclasses, e.g. methods used to support the hierarchical relationship(s) in the type hierarchy, the containment relationship to Typed Object class, and the reference to its associated definition Type Object instance.

Summarizing Relationships:
  An instance of an Object Type is directly associated with one, and only one, other Object Type in the type hierarchy, and may represent either a type category, or an actual object type, depending upon where it resides in the hierarchy. For example, in the hierarchy Module-> FBM->FBM04, object types Module and FBM represent type categories, and FBM04 represents an object type.

The Object Type class is an abstract class, and instances of this class cannot exist. An instance of an Object Type is preferably either a User-Defined Object Type, or a implementation-standard Object Type.

The Object Type class is hierarchical, with branches representing type categories, and leaves being object types. The hierarchy is restrictive—that is, an implementation-standard Object Type is preferably contained within a implementation-standard hierarchy, whereas a User-Defined Object Type can appear virtually anywhere in the hierarchy (but ultimately also contained within a implementation-standard type category).

Instances of the Object Type class contain a reference to their containing type category.

Instances of the Object Type class which can serve as a reference for a Typed Object maintain a list of all the Typed Objects of that same type which exist in the configuration.

Those same instances of the Object Type class maintain a reference to the Parameterized Object which is capable of acting as the defining object for creating Typed Objects of that type.

Figure 14:
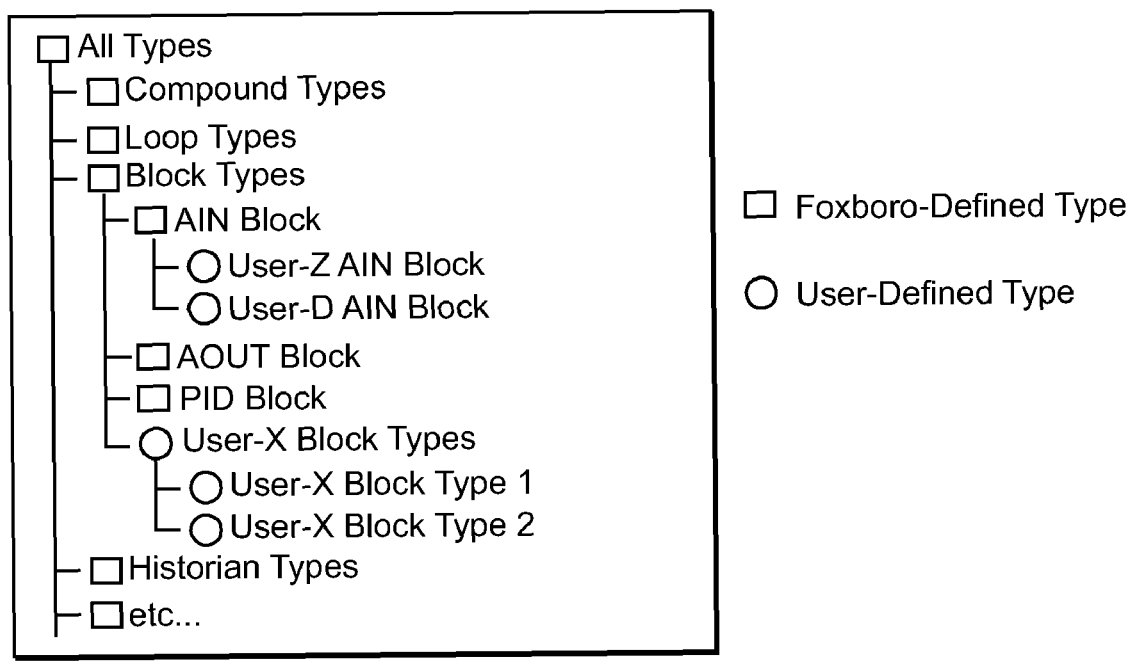
FIG. 14 depicts an object type hierarchy in a system according to the invention.

FIG. 14 depicts an example of how the object type hierarchy can appear in IDA. As mentioned previously, within the type hierarchy, branches form type categories, to which one or more object types belong. In the example shown in FIG. 14 are all examples of type categories. Within the category Block Types, AIN Block, AOUT Block, and PID Block are examples of implementation-standard object types, and User-X Block Types is an example of a user-defined object type.

1.2.1.3 Implementation-Standard Object Type

All objects which can be typed inherently belong to one Object Type (or type category)—that is the implementation-standard Object Type. Additionally, these objects may also optionally be associated with a User-Defined Object Type.

Each instance of implementation-standard Object Type defined in the database may be specified as the inherent type for one or more configuration objects. All Implementation-standard Object Types have a direct association with a type category, which is preferably also be Implementation-standard. In other words, a Implementation-standard Object Type may not be associated with a user-defined type category.

All Implementation-standard Object Types have three additional attributes—they are: configurable—all instances of this object type are able to be configured in an I/A configuration; assignable—all instances of this object type are able to be assigned to a process area; and downloadable—able to be realized (as an entity) on a target platform. Whether an object type is configurable, assignable and/or downloadable is determined at the time the instance of the Implementation-standard Object Type is created.

Summarizing Relationships:
  The Implementation-standard Object Type class is a subclass of Object Type.
  An instance of a Implementation-standard Object Type is inherently associated with one or more instances of Typed Object (e.g., there can be many instances of an FBM04 in the configuration).
  An instance of a Implementation-standard Object Type preferably belongs to a type category which is in the Implementation-standard Object Type hierarchy. In other words, going back along the type hierarchy chain from a Implementation-standard Object Type, one would only find Implementation-standard type categories.

When created, an instance of a Implementation-standard Object Type may be designated as needing to appear in the system hierarchy.

1.2.1.4 User-Defined Object Type

Users may create their own, customized object types, which may be assigned to typed objects. The primary purpose of a User-Defined Object Type is to allow the user to create their own object classification system in the event that the set Implementation-standard Object Types doesn't satisfy all their needs.

Summarizing Relationships:
- The User-Defined Object Type class is a subclass of Object Type.
- An instance of a User-Defined Object Type may be associated with one or more instances of Typed Object (e.g., there can be many instances of User X Block Type I in the configuration). This relationship is strictly optional, and User-Defined Object Types may exist without ever having been referenced by an object.
- An instance of a User-Defined Object Type may appear anywhere in the type hierarchy. In other words, a User-Defined Object Type may be directly associated with either a Implementation-standard, or user-defined, type category.
- When created, an instance of a User-Defined Object Type may be designated as needing to appear in the system hierarchy.

1.2.1.5 Typed Object

A Typed Object is a Parameterized Object which is able to be inserted into an I/A configuration, and is considered an integral part of the configuration, in such a way that the configuration would be considered incomplete without it. Examples of typed objects include CPs, FBMs, blocks, loops, and compounds. Objects such as graphical objects used to enhance documentation would not be considered Typed Objects.

Typed objects inherently have an associated Implementation-standard object type. The fact that an object is configurable is determined by whether or not its inherent object type is or not. Typed Objects may also have a User-Defined Object Type associated with them, although this relationship is optional.

One further restriction: at creation, a Typed Object is prevented from associating with an Object Type (and thereby prevented from being created), unless that Object Type also references an associated defining Parameterized Object which acts as the definition for the Typed Object being created. In an alternate embodiment, when a Typed Object is created and a reference made to its associated Object Type, if that Object Type doesn't have a reference to the defining Parameterized Object, it simply uses the one from the Typed Object itself.

Summarizing Relationships:
- The Typed Object is a subclass of Parameterized Object.
- An instance of a Typed Object has an inherent Implementation-standard Object Type associated with it, which the user cannot modify, or change. This object type determines whether or not the Parameterized Object is configurable, assignable to a process area, and/or downloadable to a target system.
- An instance of a Typed Object may have an optional User-Defined Object Type associated with it. This association is in addition to the Implementation-standard Object Type.

There may be occasions where it would be desirable to change the type of an object, without having to delete the original object, then create an object of the correct type. One example of where this capability could be useful would be being able to change a station type after a configuration has already been created, and all associations and connections established (this happens often). An alternate embodiment accordingly, permits the type of an object to be dynamically charged.

1.2.1.6 Configuration

The Configuration class exists to serve as an entry point into the two primary hierarchies which comprise the configuration itself—the System Hierarchy, and the Plant Hierarchy. These two hierarchies are, however, by no means mutually exclusive. The primary method(s) and data incorporated in this class exist to serve the establishment and maintenance of hierarchical relationships. Other configuration-wide data and/or methods may also reside with this class.

1.2.1.7 System Hierarchy

The System Hierarchy represents those objects which are contained within the configuration, and are organized by various categories, primarily object type. There are potentially several subclasses of System Hierarchy objects in the System Hierarchy itself. However, for present purposes, only two of these subclasses are discussed:
- Definition Hierarchy. This portion of the System Hierarchy deals with the display of definition objects, or those objects which act to define other Typed Objects (e.g., an AIN block definition). Within the Definition Hierarchy, definition objects may be organized in a number of libraries. These libraries are either implementation-standard or defined by the user.
- Components Hierarchy. This portion of the System Hierarchy deals with the display of actual instances of configured objects, and may not, themselves, act as definition objects.

All other subclasses within the System Hierarchy simply represent another view of existing configuration components. For example, a Network Hierarchy could display a view of the configuration from a System Definition point of view, showing a hierarchy of networks, nodes, stations, FBMs and other hardware. Since the only grouping of configuration objects in the current design is by object type, these subclasses have to use the relationships specified in the Connections discussion in order to know what to display (i.e., by network, by location, etc.).

The primary reason that subclasses exist within the System Hierarchy is due to the differences in behavior when dealing with objects in each subclass. For example, the act of dragging and dropping an object from the definition portion of the System Hierarchy results in the creation of a Typed Object of the proper type, whereas when an object from the components portion of the System Hierarchy is dragged and dropped, it results in that object being copied and placed in the view, or connected to another object, depending upon where it was dropped.

The visible portion of the System Hierarchy tree control actually consists of two types of elements: actual instances of System Hierarchy objects (of which there are very few), and derived (non-persistent) instances of tree control objects. Actual instances of the System Hierarchy may reference one or more instances in the Object Type Hierarchy. This relationship provides the mechanism by which the majority of the visible System Hierarchy is constructed dynamically as elements are "exploded" by the user in the tree control.

1.2.1.8 Plant Hierarchy

The Plant Hierarchy also represents those objects which are contained within the configuration, but are organized by location, rather than by type. This hierarchy represents another view of already-existing configuration components, and may be constructed using a subclass of System Hierarchy.

1.2.2 Managing Object Types

The user can create a new instance of an Object Type by selecting "New" on a pulldown menu within the definition portion of the System Hierarchy. Alternatively, a "New|Object Type" menu selection is available on any IDA application. However the user chooses to perform this task, the action can result in the display of a dialog box similar to that in FIG. 15. In this example, the user enters the new Object Type, and provides a description for the new type. Additionally, the user picks an already existing object type in the type hierarchy to act as its "template" type, or object type to be used to create from. The user can create a new object type from an existing one in two ways:

Copy. In this create method, the new object type is created by copying the existing object type, and is instantiated in the type hierarchy at the same level as the object type which was copied.

Derive. In this create method, the new object type is created by using an existing object type as its parent, thereby treating the old object type as a type category.

In order to finish creating the new object type, the user additionally specifies such things as:

Configurable. Specifies whether or not all objects associated with this object type are able to be configured in terms of security (i.e., a user's access to an object is determined by the user's group access to the object's type). If an object type is not configurable, objects created which are associated with that object type will not be affected by security mechanisms.

Downloadable. Specifies whether or not all objects associated with this object type are downloadable to a hardware target. Note that this option will be dimmed, and not available for selection if the object type being described is a User-Defined object type.

Assignable to System Hierarchy. Determines whether or not an object is visible within the System Hierarchy when the hierarchy is viewed from the tree control.

Assignable to Process Area. Determines whether or not an object associated with this object type can be assigned to a process area.

Figure 15:
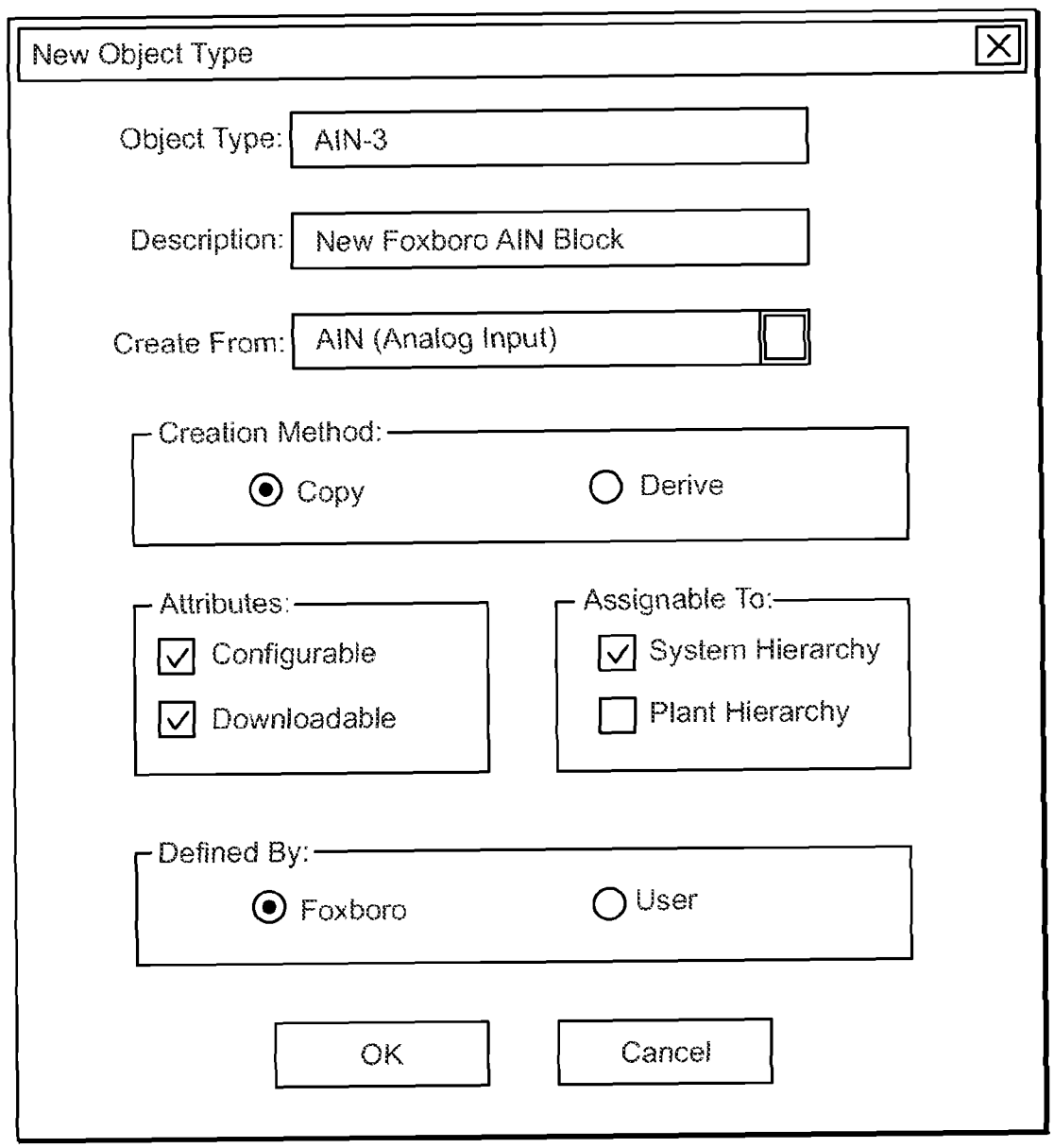
FIG. 15 depicts the creation of new object types in a system according to the invention.

To edit an existing instance of an Object Type, a dialog similar to the one shown in FIG. 15 is displayed, already populated with the information dealing with this object type (i.e., the configurable, assignable and/or downloadable flags checkboxes are selected appropriately). When an object type is edited, the only things that can be changed are the object's description, and whether or not the object is configurable, assignable and/or downloadable. Some of the attribute and assignable selections may be disabled when the object type is displayed, depending upon the settings of the object type's containing category.

To delete an instance of an Object Type in the hierarchy, the user must preferably explicitly decide to remove it. If the object being deleted is a type category, the user is informed, and asked if they wish to continue—if they confirm the delete, then everything in the type hierarchy from the object type downward is removed.

1.3 Parameterized Object Connections

An IDA configuration consists not only of objects, but objects which are related to each other in a number of ways. These relationships may be physical (e.g. a serial connection between a serial printer and a station) or logical (e.g. a host relationship between an AP and a CP, or a collection point relationship between a block and an historian). These relationships are all called connections.

Establishing a connection actually requires two different levels of "hand-shaking" between the two objects involved. Consequently, the subject of connectivity is divided into two sections:

1. The first level represents the connectivity which is established between two objects. Although easy to envision (e.g. the connection between a block and a compound), there is no actual database association which is actually created at the object level.
2. The second level represents the connectivity which is established between two parameters. The database association is established at this level, and is the mechanism by which two objects establish a relationship.

1.3.1 Type Awareness

Any Parameterized Object in IDA has an inherent Implementation-standard object type. This object type, in turn, has a direct relationship to a single type category, but may be indirectly related to several type categories.

Figure 16:
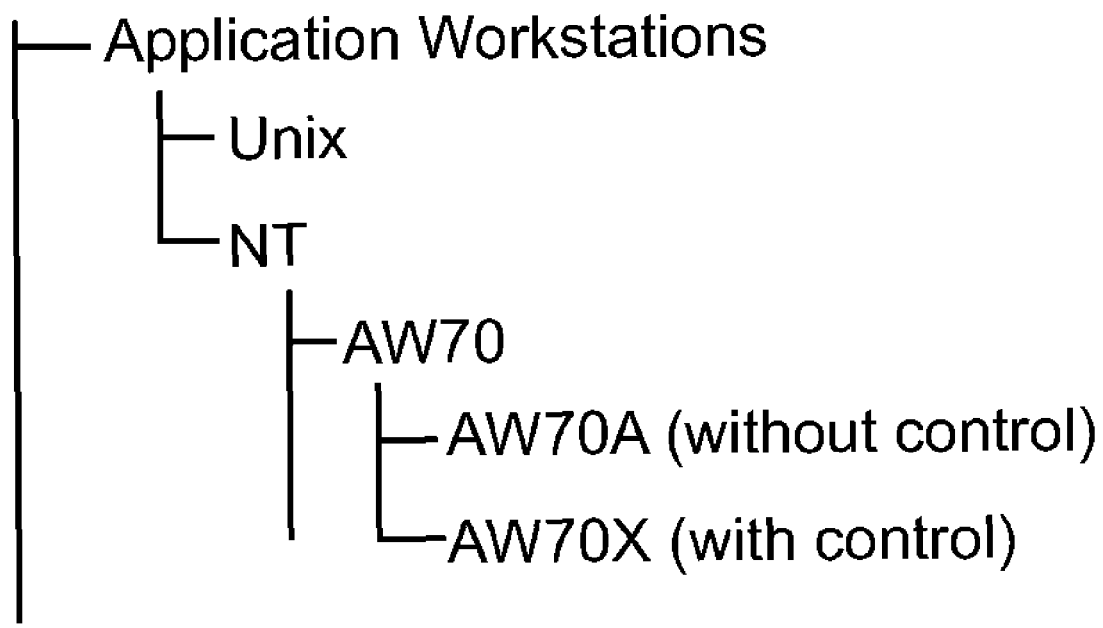
FIG. 16 is a type awareness example in a system according to the invention.

In FIG. 16, an instance of an AW70X (with control) knows that it's an AW70X, by virtue of the fact that AW70X is its inherent Implementation-standard object type. However, the instance is preferably also "aware" that it is also an AW70, NT Application Workstation, or control processor (here, identified as a "Z-Module," in reference to a control processor available from the assignee hereof, The Foxboro Company), going backward through the type hierarchy. This awareness may be used in a number of ways, particularly when a process is dealing with the concept of object types at different granularities. For instance, when dragging a specific serial printer across a representation of the AW70X mentioned above, the printer may not "know" that it can connect to an AW70X, but it may know that it could establish a connection to an NT Application Workstation. The Framework provides methods for allowing the application developer to "walk" the type hierarchy tree in order to obtain the direct, and all the indirect, type categories which a specific object type is related to.

1.3.2 Source/Sink vs. Parent/Child Relationships

A connection in IDA can describe a Source/Sink, or Parent/Child relationship between two objects. There are very subtle differences in the two types of relationships, but they are different enough to warrant separation of behavior. A Parent/Child relationship is typically used to model the relationship between two objects in a hierarchical, or containment relationship whereas a Source/Sink relationship is usually used in a peer-to-peer type of relationship. These differences are presented in the table below:

| Relation | Data | Data Description |
| --- | --- | --- |
| Parent | Capacity | Data represents the maximum combined "weight" of the children which can be associated to that object. |
| Child | Weight | Data represents the weight of a single instance of the child object. |
| Source | Min, Max | Specifies the minimum and maximum number of connections to other objects, or sinks, which can be supported by that object. Supports the concept of a "fan-out" capability. |

| Relation | Data | Data Description |
|---|---|---|
| Sink | Min, Max | Specifies the minimum and maximum number of connections from other objects, or sources, which can be supported by that object. Supports the concept of a "fan-in" capability. |

An example of a Parent/Child type relationship would be that of a CP to its connected FBMs. The CP acts as a parent in that it acts as a common control connection for all the FBMs which are physically connected to it. The CP is able to support a certain number of FBMs. Each FBM, in turn, acts as a child in that it relies on the CP to perform certain duties, and it contributes a specific weight toward the total capacity supported by the CP.

In both Parent/Child and Source/Sink connections, the concept of fan-in and fan-out is valid. A fan-out connection can be used to model a relationship in which the source (parent) object supports connections to one or more sinks (children) objects in the database. One example of such a connection type is a output (or "PNT") parameter on an AIN block and its associated output signal flows. The PNT parameter, acting as a source, would provide measurement values to one or more input parameters (conventionally referred as "MEAS" or "SPT") in other blocks, each input parameter acting as a sink.

1.3.3 Connection Object Model

Figure 17:
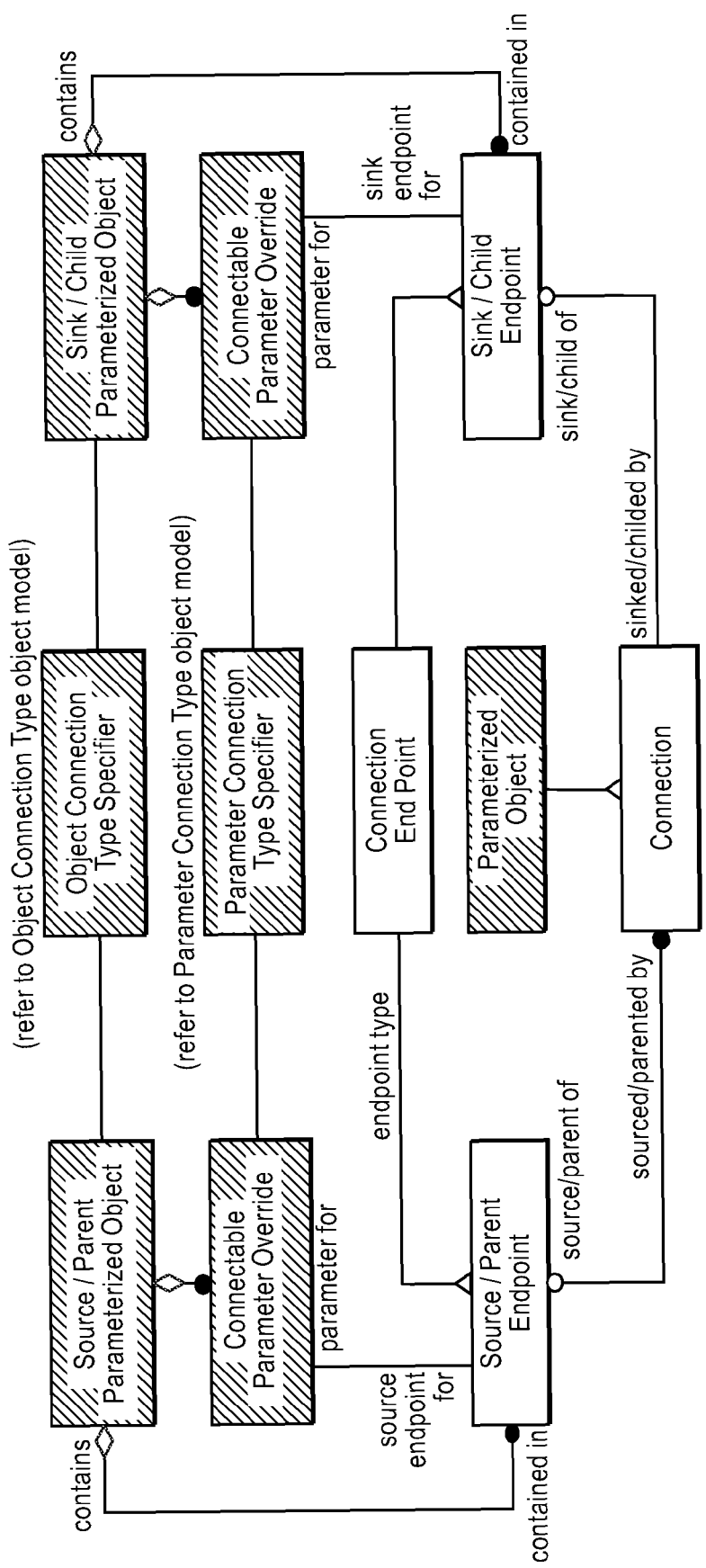
FIG. 17 depicts a connection object model in a system according to the invention.

FIG. 17 depicts the classes used in the illustrated embodiment to support connectivity at the object level. This shows the model used to support a source (parent) Parameterized Object, connecting to the sink (child) Parameterized Object. The model is not intended to suggest that two connectable parameters of the same object can't be connected together (i.e., the same Parameterized Object can be both source and sink at the same time). An example of when this might occur is a calculation output parameter (conventionally referred to as "BCALCO") parameter acting as calculation input parameter (conventionally referred to as "BCALCI") parameter in the same I/A block.

Figure 18:
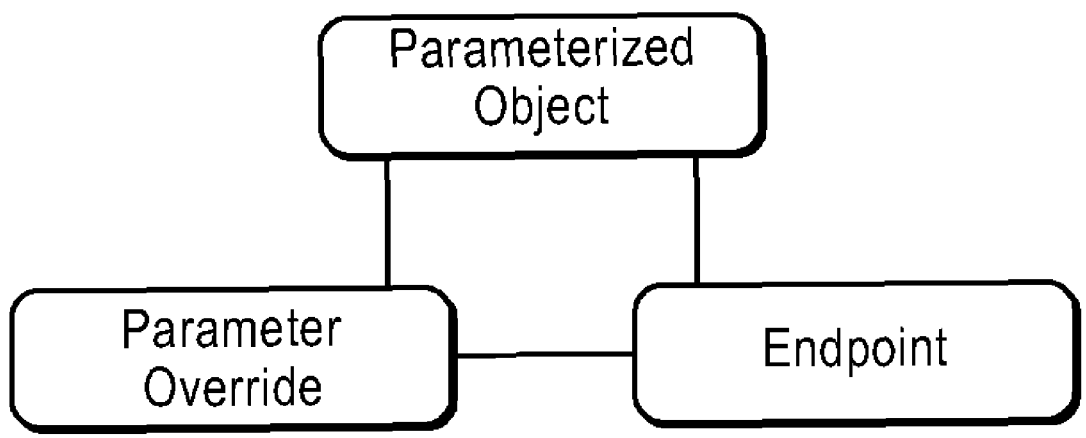
FIG. 18 depicts a parameterized object override endpoint triad in a system according to the invention.

One aspect of the object model needs to be explained in order to understand it fully. When a Parameterized Object is created, no Parameter Override or Endpoint objects exist. The Override and Endpoint objects only get created whenever a Connection is about to be established. When a Connection is about to be established, the appropriate Parameter Override object and Endpoint object are instantiated, and as depicted in FIG. 18, these two objects each maintain a reference to their associated parameterized object, as well as to each other, allowing iteration over an object's connections from either direction.

1.3.3.1 Connection

A Connection contains the data and methods that defines a relationship, or link, between two Parameterized Objects (or more specifically, between two connectable parameters). In an I/A relationship, a connection could can be used to model the logical relationship between two blocks, or the host relationship between two stations, etc.

In order to take into account the complex relationships that a Connection can have with other classes (esp. Placeholder classes), a Connection is a Parameterized Object. This allows Connections to be primarily data driven, rather than compiled behavior, allowing the establishment of connections with new objects to be done in an easier fashion. For example, some Connections probably are not displayed in a graphical environment (such as the relationship between an historian and its associated historizable points). Whether or not to display a Connection is, preferably, parameter-driven.

A Connection in IDA can be a Parent/Child relationship, or a Source/Sink. In order to exist, a Connection preferably has exactly one Source (or Parent) Endpoint, and one Sink (or Child) Endpoint. However, the two endpoints may exist without a Connection having yet been established between them. As mentioned previously, the endpoints of the Connection will not be instantiated until the Connection itself is about to be established. Conversely, endpoint objects remain persistent even after the associated Connection has been removed.

Graphically, connections between two objects will be connected at the edge of the rectangular area representing each object. The system will also support connections connected to a point at the center of the object as well. Connections are represented by segmented polylines made up of alternating horizontal and vertical segments. The system also supports single segment lines representing an association.

Summarizing relationships: a Connection is a Parameterized Object; a Connection, if it exists, preferably has both a Source (or Parent) and a Sink (or Child) Endpoint. Note, however, that certain operations (e.g. selection state) deal with the Association, and only one (or none) of its associated Endpoints; a Connection has a relationship to an Association Placeholder.

1.3.3.2 Connection Endpoint

A Connection Endpoint is an abstract class from which all connection endpoints are derived. No instances of this class may exist by themselves. The Connection Endpoint contains a reference to the Parameter Override which is either the source (parent) or sink (child) parameter representing one end of a connection.

Connection Endpoints provide a mechanism for associating the connection to the object. The endpoints relate the Connection to the Parameter Override to (or from) which the Connection is attached. Endpoints also relate the Connection to the position (side/direction, or center) where the Connection is attached to the object. Each Connection Endpoint is described by two coordinates, the side of the object it is on, and the relative position of the endpoint along the side of the rectangle representing the parameterized object. This allows the endpoint to retain its relative position along the side, even if the object is resized.

Connection Endpoints only come into existence whenever a connection between any two objects (or parameters) is about to be established. Once the Framework approves the creation of the connection, it instantiates the endpoint class instances, along the associated parameter overrides, inserting a reference to the parameterized object in each.

Connection Endpoints have a direct relationship to a Point Placeholder, allowing a depiction of the endpoint itself to be displayed on the screen.

Summarizing Relationships:
The Connection Endpoint class is an abstract class, and no instances of it may exist in IDA. This class is further specialized into Source/Sink Endpoints, and Sink/Child Endpoints.
Each instance of a Connection Endpoint has a reference to a Point Placeholder.

1.3.3.3 Source/Parent Endpoint

A Source (or Parent) Endpoint is the endpoint which is specific to the source (or parent) end of the Connection between two Parameterized Objects, and is a simple sub-class of the abstract Connection Endpoint class. The Parameterized Object maintains a list of its Source/Parent Endpoints. The Source/Parent Endpoint can be the source of several connections, supporting "fan-out" connectivity. The Source/Parent Endpoint may exist without a Connection to a Sink/Child Endpoint.

Summarizing Relationships:
- An instance of a Source/Parent Endpoint is associated with one, and only one, Parameterized Object. The Parameterized Object, in turn, maintains a list of all Source/Parent Endpoints associated with it.
- Each instance of a Source/Parent Endpoint may be associated with one or more Connections. This supports the concept of a "fan-out" relationship, which is valid for both Parent/Child as well as Source/Sink type relationships.
- Each instance of a Source/Parent Endpoint is directly related to the connectable Parameter Override it represents.

The Endpoint object can support the concept of a reference counter, which represents the number of connections currently associated with it.

1.3.3.4 Sink/Child Endpoint

A Sink (or Child) Endpoint is the endpoint which is specific to the sink (or child) end of the Connection between two Parameterized Objects, and is a simple sub-class of the abstract Connection Endpoint class. The Parameterized Object maintains a list of its Sink/Child Endpoints.

The Sink/Child Endpoint may only be the sink (child) of a single connection. The Sink/Child Endpoint may exist without a Connection to a Source/Parent Endpoint.

Summarizing Relationships:
- A instance of a Sink/Child Endpoint is associated with one, and only one, Parameterized Object. The Parameterized Object, in turn, maintains a list of all Sink/Child Endpoints associated with it.
- Each instance of a Sink/Child Endpoint may be associated with only one Connection.
- Each instance of a Sink/Child Endpoint is directly related to the connectable Parameter Override it represents.

1.3.4 Object Connection Type Object Model

Figure 19:
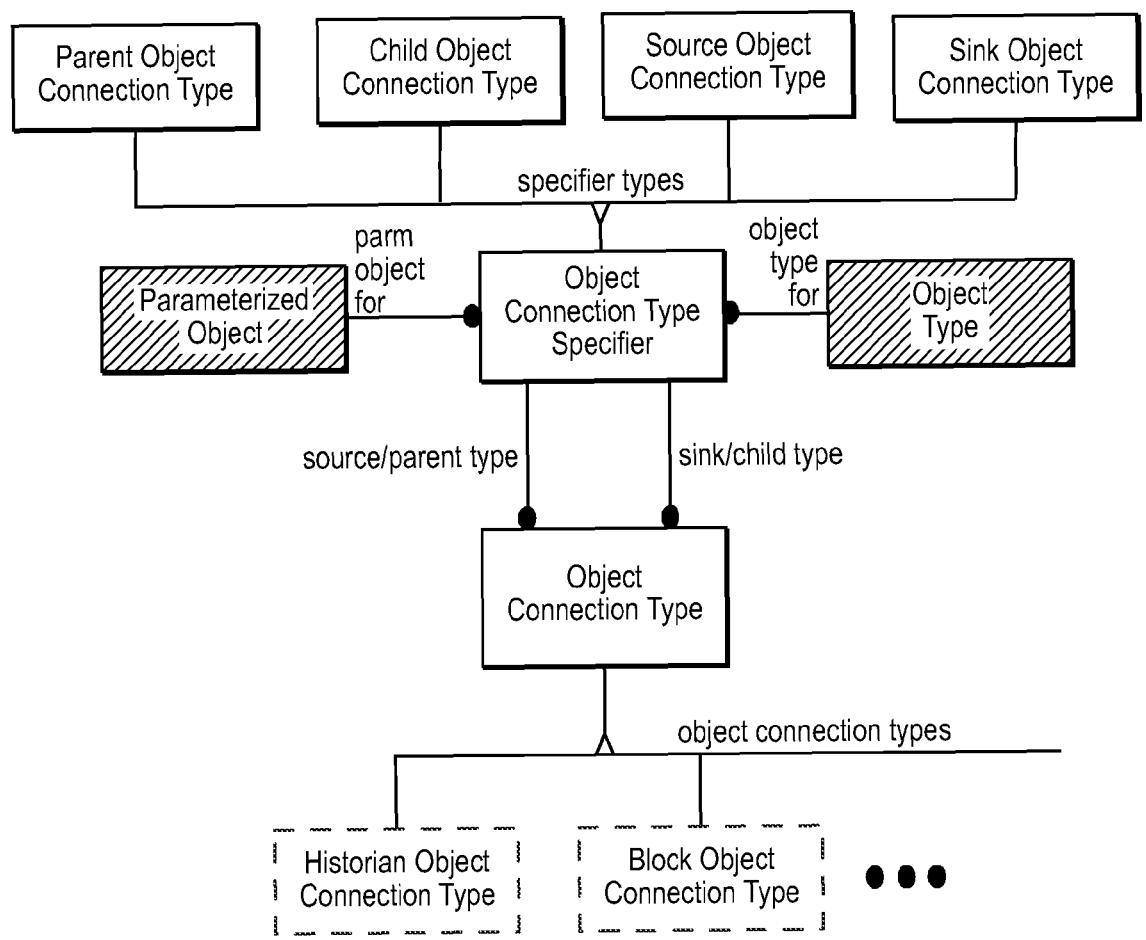
FIG. 19 depicts an object connection type object model in a system according to the invention.

FIG. 19 depicts additional classes used in the illustrated embodiment to support connectivity at the object level.

1.3.4.1 Object Connection Type Specifier

The primary function of the Object Connection Type Specifier is to provide a list of Object Types to Parameterized Objects, allowing objects to be "extended" such that they encapsulate the behavior of an object in terms of being a parent/child, or source/sink. The Object Connection Type Specifier is an abstract class from which four basic object connection type specifiers are derived: parent, child, source and sink.

Figure 20:
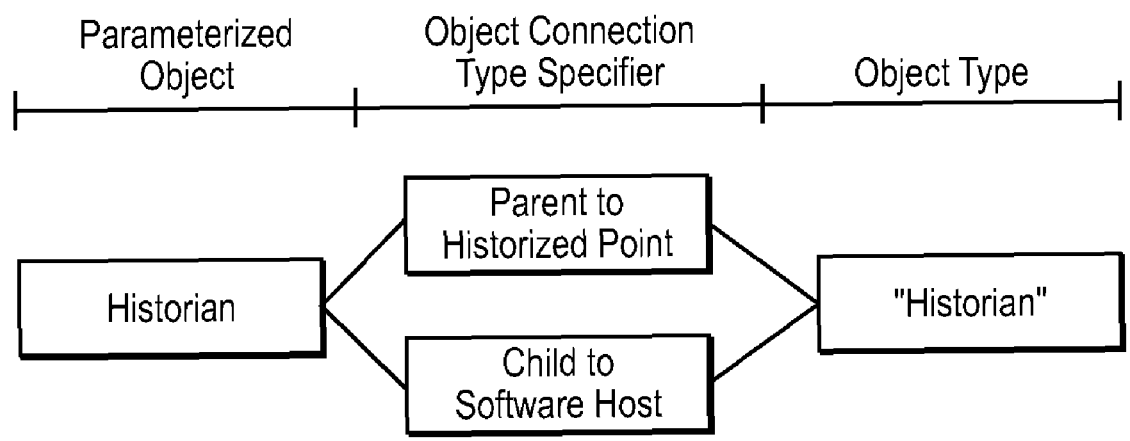
FIG. 20 is an example of simultaneous parent/child object connectivity in a system according to the invention.

Each Object Connection Type Specifier is directly related to a Parameterized Object, and is used to help determine the nature of connectivity that the Parameterized Object is allowed to participate in. The same Parameterized Object can act simultaneously as a parent (or source) and a child (or sink). This gives rise to the one-to-many relationship between Parameterized Object and Object Connection Type Specifier shown in the model In the example shown in FIG. 20, an Historian acts as a parent to all historized points associated with it, yet simultaneously acts as a child when discussed in terms of being associated with a software host. As used herein and throughout, a "historian" is a block or other functionality used to track parameter values during runtime operation of a process control system configured in accord with the teachings hereof. Each parameter so tracked is referred to as a "point," a "historized point," or the like. In the illustrated embodiment, the object type for a Historian is the same, no matter how many Object Connection Type Specifiers a Parameterized Object may be associated with.

Summarizing Relationships:
- The Object Connection Type Specifier class is used to relate instances of Parameterized Objects with Object Types
- Each instance of an Object Connection Type Specifier sub-class is directly related to the Object Type it represents. The same Object Type may be associated with one or more Object Connection Type Specifiers.
- Each instance of an Object Connection Type Specifier sub-class is directly related to the Parameterized Object it represents. It is possible for the same Parameterized Object to be associated with more than one Object Connection Type Specifier.
- Each instance of an Object Connection Type Specifier is referenced in one or more instances of the Object Connection Type class, with the added sense of whether or not the referenced specifier represents a source/parent, vs. sink/child in a potential connection.

1.3.4.2 Parent Object Connection Type Specifier

Parent Object Connection Type Specifiers extend the abstract Object Connection Type Specifier class to handle object types capable of fulfilling a parent role when connecting to another object. As such, they specify the capacity, or total weight, of all the child objects which they are capable of supporting, and provide other functionality used by a parent object.

Examples of a Parent Object Connection Type Specifier would include a CP which has the capacity to support 48 FBMs in an I/A fieldbus relationship, an AP which allows two serial printers to be connected via a serial connection, or an historian able to support 4000 collection points.

In a preferred embodiment, any object capable of playing a parent role keeps track of the total "weight" of the connections which have been established for each connection type it is able to support. This value can be associated with the parameter associated with the endpoint of a connection.

1.3.4.3 Child Object Connection Type Specifier

Child Object Connection Type Specifiers extend the abstract Object Connection Type Specifier class to handle object types capable of fulfilling a child role when connecting to another object. As such, they specify their weight which they will contribute to the total accumulative weight when connecting to a parent. Examples of Child Object Connection Type Specifiers include an FBM connecting to a CP, or a serial printer connected to an AP. Each connection causes the total accumulative weight for that connection type to be incremented by the child's weight. Prior to actually establishing a connection, the Framework checks to ensure that the weight supported by the parent object does not exceed its capacity for that connection type. If it does, the connection attempt will fail, and the application program will be informed that the pending connection is no longer feasible.

1.3.4.4 Parent/Child Object Connection Type Specifier Examples

The table below illustrates the data which needs to be considered at the object level for each valid parent/child connection—namely:

Capacity (This value specifies the total weight which the parent object type is able to support for the associated connection type); and Weight (This value specifies the amount of capacity consumed whenever a child object of this type is attached to the parent).

| Parent Object Type | Capacity | Connection Type | Child Object Type | Weight |
|---|---|---|---|---|
| Historian | 4000 | Historian | Historizable Point | 1 |
| CP40 | 48 | Fieldbus | FBM | 1 |
| AW70 | 2 | Serial | Serial Printer | 1 |
| IE32 | 4 | Nest | 1x8Cell | 1 |
| AP51 | unlimited | Software Host | CP40 | 1 |

1.3.4.5 Source Object Connection Type Specifier

Source Object Connection Type Specifiers extends the abstract Object Connection Type Specifier class to handle object types capable of fulfilling a source role when connecting to another object. There are no additional data or methods beyond those provided by the Object Connection Type Specifier class. This subclass provides consistency and flexibility during implementation.

1.3.4.6 Sink Object Connection Type Specifier

A Sink Object Connection Type Specifier extends the abstract Object Connection Type Specifier class to handle object types capable of fulfilling a sink role when connecting to another object. There are no additional data or methods beyond those provided by the Object Connection Type Specifier class. The subclass provides consistency and flexibility during implementation.

1.3.4.7 Source/Sink Object Connection Type Specifier Examples

The table below illustrates the data which needs to be considered at the object level for each valid source/sink connection.

| Source Object Type | Connection Type | Sink Object Type |
|---|---|---|
| AIN | Block Connection | PID |
| PID | Block Connection | AOUT |

1.3.4.8 Object Connection Type

Instances of the Object Connection Type class provide a means of establishing the outermost layer of connectivity between any two objects. This class is used to describe the "legal" combinations of object types or type categories (i.e., Source/Sink vs. Parent/Child) which are able to form a connection. These connections can be physical (e.g. an electrical signal flow between a serial port and a serial device) or logical (e.g. a host relationship between an AP and a CP, or a collection point association between a block and an historian).

There are two relationships that each instance of an Object Connection Type has with the Object Connection Type Specifier class—one is used to specify the source (parent) type, and the other is to specify the sink (child) type. In this way, the Object Connection Type class acts as a join table, relating two object types to determine whether there is a potential connection possible. This class is therefore used as an initial "filter" to determine whether two objects are able to establish a connection before the more complex negotiation between two parameters is allowed to continue.

When examining instances of the Object Connection Type class to see if two object types can form a valid connection, the Framework may encounter more than one instance which satisfies the criteria. If this occurs, the user will have to manually resolve the ambiguity, and select the connection type being sought.

While making a determination as to whether two object types can connect together or not, the Framework takes into account the fact that instances of Object Connection Types may not go all the way "down" to the object type level, but may specify type categories instead. In this manner, for example, a specific type of serial printer could be specified as being able to be connected to all NT application workstations, rather than specific types of NT stations. The Framework takes into account type "awareness", which was discussed in a previous section, in order to accomplish this.

Summarizing Relationships:

Each instance derived from an Object Connection Type contains references to two Object Types—one for a Source (Parent) Object Type, the other for a Sink (Child) Object Type. These object types are paired together to determine whether a request to connect two objects together is "legal", or valid, depending upon what types of objects they are.

The Object Connection Type class contains methods which, when given two object types, allows the application developer to determine which object type is acting as the source (parent) object, and which one is acting as the sink (child) object.

In order to efficiently implement type "awareness", a bit-masking operation can be used, in which each unique type category, as well as object type, gets assigned a unique bit-mask value. By "or'ing" all of the bitmasks together of all the type categories which an object belongs to, the matter of comparing an object's type bitnask with that of the types contained in each instance of the Object Connection Type class becomes a single operation, rather than a series of string compares.

1.3.5 Parameter Connection Type Object Model

Figure 21:
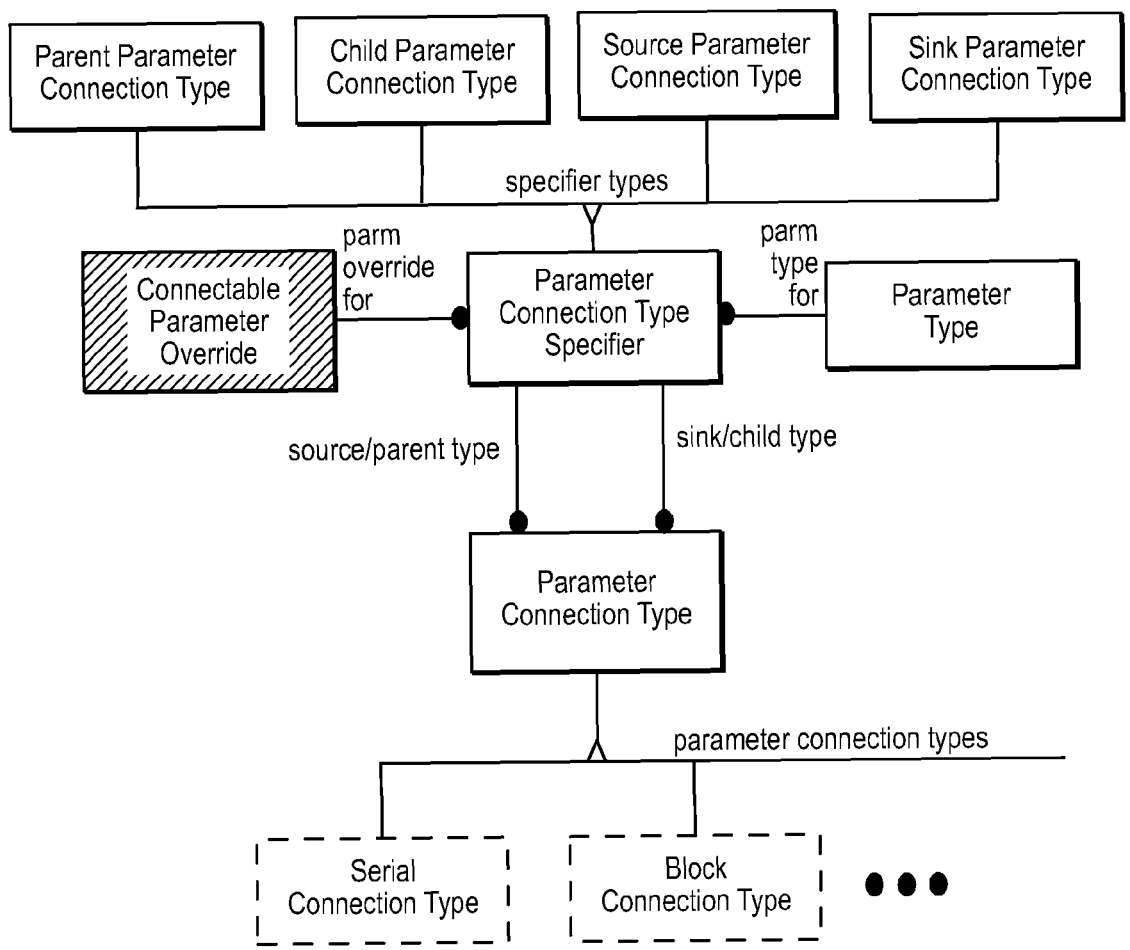
FIG. 21 depicts a parameter connection type object model in a system according to the invention.

FIG. 21 depicts the classes used in the illustrated embodiment to support connectivity at the parameter level. Note that the class structure presented in FIG. 21 closely parallels that of the object connection type object model presented in FIG. 19.

1.3.5.1 Parameter Type

The Parameter Type class is just that—a class used to describe all the various types of connectable parameters which can exist in I/A. Examples of Parameter Types includes serial ports, serial devices, analog input, analog output, historian hosts, and historizable points. Any "connectable" parameter in I/A preferably has an associated Parameter Type. Summarizing relationships:

A Parameter Type is a base class providing I/A with types of connectable parameters. No parameters will be allowed to be related to an endpoint in a Connection unless it is also represented by a Parameter Type found in an instance of this class.

Each Parameter Type may be associated with one or more Parameter Connection Type Specifiers, which provide additional information regarding connectability for that specific Parameter Type.

The Parameter Type class can be implemented as another type category in the Object Type hierarchy. In this manner, any code developed to deal with object types (esp. if implementing bitmask operations) may also be used to deal with parameter types.

1.3.5.2 Parameter Connection Type Specifier

The primary function of the Parameter Connection Type Specifier is to provide a list of Parameter Types to Parameter Definitions, and to fine-tune the "connectable-ness" of that Parameter Definition with the connection. The Parameter Connection Type Specifier class is an abstract class, from which four basic parameter connection type specifiers are derived: parent, child, source and sink.

Each Parameter Connection Type Specifier is directly related to one or more connectable Parameter Definitions, and is ultimately used to describe the nature of connection that the parameter is allowed to participate in. The parameter to act simultaneously as a parent/source, and a child/sink, thus the one to many relationship between Parameter Override and Parameter Connection Type Specifier.

Figure 22:
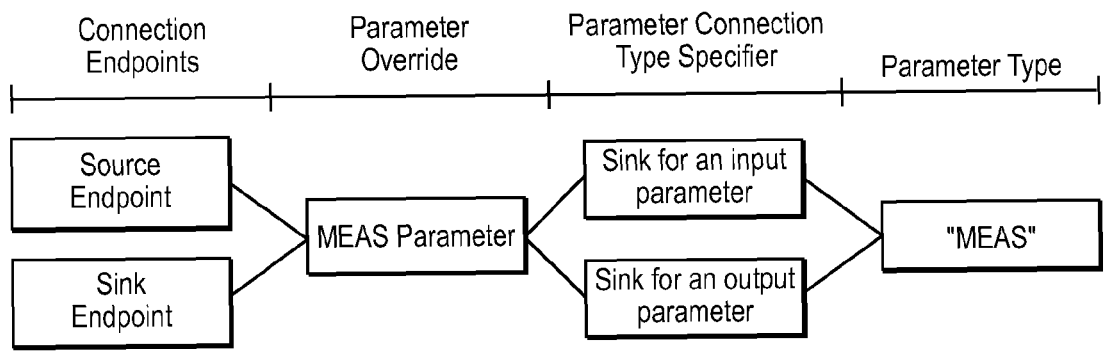
FIG. 22 is an example of simultaneous source/sink parameter connectivity in a system according to the invention.

In the example shown in FIG. 22, a MEAS parameter override acts as a source for other input parameters (e.g., a MEAS parameter in a REALM block), yet simultaneously acts as the sink when connected to a parameter such as a PNT parameter in an AIN block. Note that the parameter type "MEAS" is the same, no matter how many Parameter Connection Type Specifiers a parameter override may be associated with.

Summarizing Relationships:
- The Parameter Connection Type Specifier class is used to relate instance of Parameter Overrides with Parameter Types.
- Each instance of a Parameter Connection Type Specifier subclass is directly related to the Parameter Type it represents. The same Parameter Type may be associated with one or more Parameter Connection Type Specifiers.
- Each instance of a Parameter Connection Type Specifier subclass is directly related to the Parameter Override it represents. It is possible for the same Parameter Override to be associated with more than one Parameter Connection Type Specifier.
- Each instance of a Parameter Type Specifier is referenced in one or more instances of the Parameter Connection Type class, with the added sense of whether or note the referenced specifier represent a source/parent, vs. sink/child in a potential connection.

1.3.5.3 Parent Parameter Connection Type Specifier

Parent Parameter Connection Type Specifiers extends the abstract Parameter Connection Type Specifier class to handle parameters capable of fulfilling a parent role when connecting to another object. There are no additional data or methods beyond those provided by the Parameter Connection Type Specifier class. The subclass provides consistency and flexibility during implementation.

1.3.5.4 Child Parameter Connection Type Specifier

Child Parameter Connection Type Specifiers extends the abstract Parameter Connection Type Specifier class to handle parameters capable of fulfilling a child role when connecting to another object. There are no additional data or methods beyond those provided by the Parameter Connection Type Specifier class. The subclass provides consistency and flexibility during implementation.

1.3.5.5 Parent/Child Parameter Connection Type Specifier Examples

The table below presents some examples that have a parent/child relationship.

| Parent Parameter Type | Connection Type | Child Parameter Type |
| --- | --- | --- |
| Serial Port | Serial Connection | Serial Device |
| Historian | Logical Historian | Historizable Point |
| Parallel Port | Parallel Connection | Parallel Device |

1.3.5.6 Source Parameter Connection Type Specifier

Source Parameter Connection Type Specifiers extend the abstract Parameter Connection Type Specifier class to handle source-type endpoints of a connection. As such, they will specify the minimum and maximum number of sinks with which they are able to establish a Connection. Examples of a Source Parameter Connection Type Specifier would be an I/O point in I/A, represented by the PNT parameter in a AIN block. The PNT parameter acts as the source for signals flowing to one or more input parameters.

1.3.5.7 Sink Parameter Connection Type Specifier

Sink Parameter Connection Type Specifiers extend the abstract Parameter Connection Type Specifier class to handle sink-type endpoints of an association. As such, they will specify the minimum and maximum number of sources with which they are able to establish a connection. An example in I/A of a Sink Parameter Connection Type Specifier would be a MEAS or SPT parameter in a PID block, either of which is able to receive signal input from another block.

1.3.5.8 Source/Sink Parameter Type Specifier Examples

The table below presents some examples which that have a source/sink relationship.

| Source Parm Type | Min/Max | Connection | Sink Parm Type | Min/Max |
| --- | --- | --- | --- | --- |
| PNT | 1/unlimited | Block Connection | MEAS | 1/1 |
| PNT | 1/unlimited | Block Connection | SPT | 0/1 |
| BCALCO | 1/1 | Block Connection | BCALCI | 0/1 |

The "Min" data associated with a Sink represents an optional/required feature, with a zero (0) representing an optional connection, and a one (1) representing a required connection.

1.3.5.9 Parameter Connection Type

Instances of the Parameter Connection Type class represent the innermost layer of associativity between any two objects. This class is used to describe the "legal" combinations of parameter types which are able to form a connection. These connections can be physical (e.g. an electrical signal flow a serial port and a serial device) or logical (e.g. a collection point connection between a MEAS parameter and an historian).

There are two relationships that each instance of a Parameter Connection Type has with the Parameter Connection Type Specifier class—one is used to specify the source (parent) type, and the other is to specify the sink (child) type. In this way, the Parameter Connection Type class acts as a join table, relating two parameter types together to determine the connection endpoints. This class is therefore used as the final "filter" to determine whether two objects are able to establish a connection.

1.3.6 Establishing a Connection

The listing below represents the sequence of events which preferably occur before a Connection can be made between two parameters. This logic is used when an object is being "dragged" around the view, looking for a drop target. Additionally, this logic is valid whether the object being dragged is a potential Source/Parent in a relationship, or Sink/Child.

Level 1—Object to Object

| Step | Action Performed |
|---|---|
| 1 | Click and begin "dragging" object in view - cursor changes to a drag cursor. |
| 2 | Using the Object Connection Type Specifier of each object, check to see if there is any instances of the correct pairing in Object Connection Types. |
| 3 | If an instance in Object Connection Types is found, then change cursor to indicate that the drop target is potentially valid, otherwise perform no action. If valid, retain the sense of which object is now acting as Source(Parent), and which one is acting as the Sink(Child), as well as the type of Connection being sought. |

If no instance is found, then cursor remains unchanged, and the user will not be allowed to drop the object.

Level 2—Parameter to Parameter (Perform Only if Level 1 Above Passed)

| Step | Action Performed |
|---|---|
| 4 | Iterate through instances of the Parameter Connection Type class to find the proper Source(Parent) and Sink(Child) parameter types necessary to fulfill this connection. Note that there may potentially be several instances of the Parameter Connection Type class which satisfy the conditions imposed by the connection - keep track of all of them since we're not sure yet what parameters the objects have. |
| 5 | For the Source(Parent) object, find the proper Parameter Definition based on the Source(Parent) parameter type found in step (4) above. |
| 6 | Perform the same action for the Sink(Child) object parameter definition using the Sink(Child) parameter type which was paired with the Source(Parent) parameter type used in step (5) above. |
| 7 | Create the appropriate Parameter Override(s) with their associated Source(Parent) and Sink(Child) Endpoints (note that they may already exist from previous connection). |
| 8 | Create the instance of the Connection. If more than one connection is permissible, a preferred or default connection is automatically selected. |

The final responsibility for establishing a connection between two objects rests with the methods responsible for negotiating the "handshake" between the two parameters. These methods check for adequate capacity on the source (parent) object, and establish the actual connection instance itself. This code resides with the source object or the sink object.

Parameter-level connections can be automatically established as described in steps 4-8 above. In addition, they can be established via direct operator intervention. Through a drag-and-drop operation, menu selection or otherwise, the operator identifies two parameters between which a connection is to be established. After verifying that a relationship can exist between the objects themselves (e.g., as described in steps 1-3, above), the Parameter Connection Type Specifier is checked to insure that the combination is permissible. If so, the necessary Parameter Overrides are created.

In some embodiments, the creation of certain connections between parameters causes other to be automatically established. These are referred to as master and slave connections (or "connection propagation"). By way of example, once a connection is established between the PNT parameter of an AIN object and the MEAS input parameter of a PID object, related (or "slave") connections are made between related parameter pairs (e.g., low and high scale parameters) of these objects. These slave connections can be modified by the operator, as desired. Slave connections are automatically updated or destroyed when the corresponding master connection is updated or destroyed. Thus, for example, the destruction of a connection between the PNT parameter of an AIN object and the MEAS input parameter of a PID object automatically results in destruction of low-scale, high-scale and other parameter-level slave connections between these objects.

1.3.7 Connectivity Examples 1.3.7.1 Parent/Child Connectivity—Case #1

Figure 23:
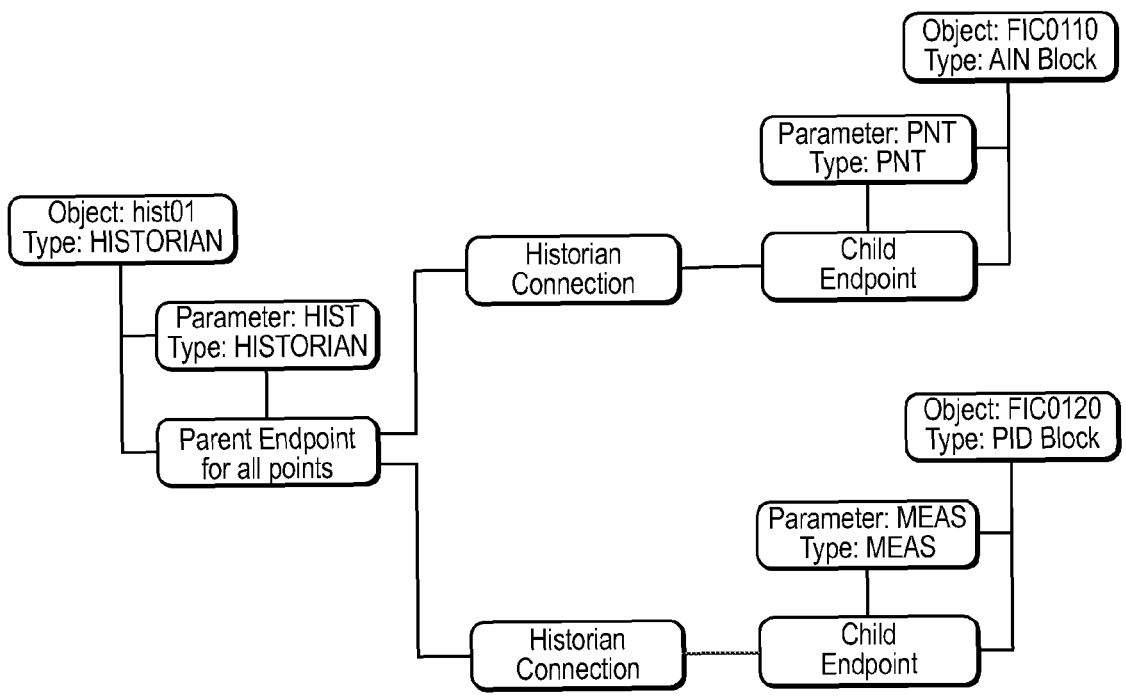
FIGS. 23-25 are parent/child connectivity examples in a system according to the invention.

FIG. 23 depicts the connections between an Historian to all the historizable points which have been assigned to it. The following table depicts the connectivity data needed to support these connections at the object level:

| Parent Object Type | Capacity | Connection Type | Child Object Type | Weight |
|---|---|---|---|---|
| HISTORIAN | 4000 | Historian Connection | AIN Block | 1 |
| HISTORIAN | 4000 | Historian Connection | PID Block | 1 | whereas this table depicts the connectivity data need to support these connections at the parameter level:

| Parent Parameter Type | Connection Type | Child Parameter Type |
|---|---|---|
| HISTORIAN | Historian Connection | PNT |
| HISTORIAN | Historian Connection | MEAS |

This example depicts how data can be structured to handle the parent/child situation where the child does not need to have a sense of which point it is (e.g., the MEAS parameter doesn't need to know it's the 2nd historized point in this example), simply that it's connected the HIST parameter of the historian. This example also provides the means to establish a "fan-out" relationship for a parent/child connection.

1.3.7.2 Parent/Child Connectivity—Case #2

Figure 24:
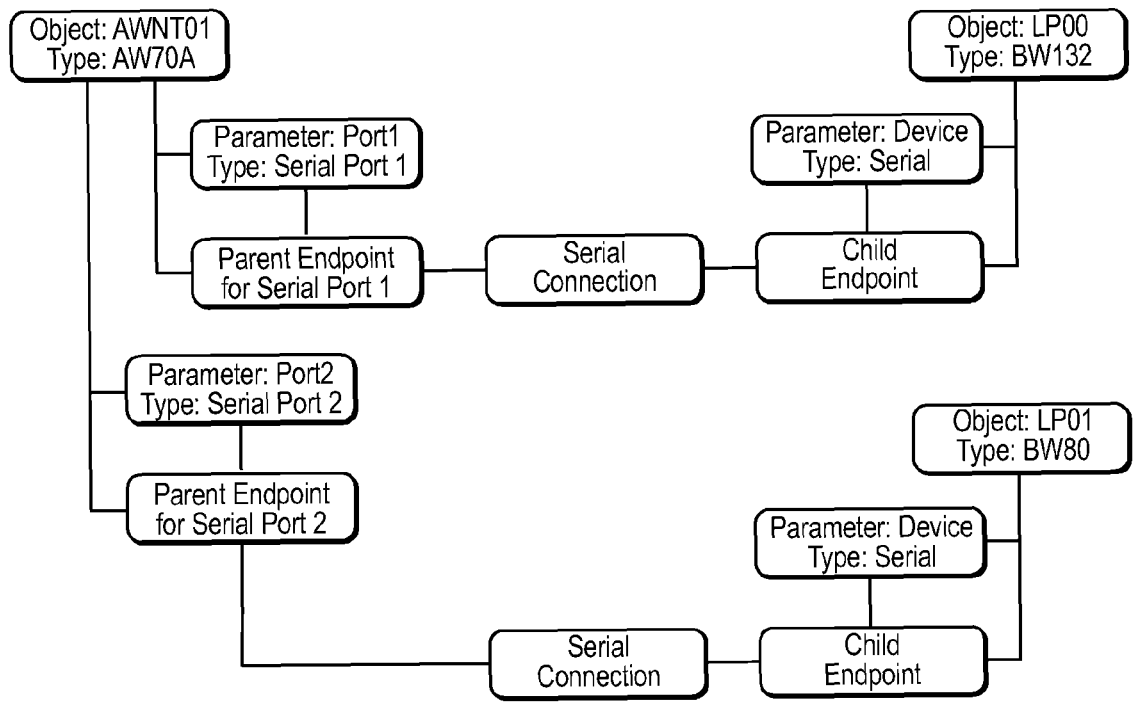

FIG. 24 is similar to the first, except that now the Parameter Definitions have been provided in such a way so as to "split" the parameter representing two serial ports into two separate parameters, each parameter representing a single serial port. The following table depicts the connectivity data needed to support these connections at the object level:

| Parent Object Type | Capacity | Connection Type | Child Object Type | Weight |
|---|---|---|---|---|
| AW70A (NT Station) | 2 | Serial Connection | BW132 (Serial Printer) | 1 |
| AW70A (NT Station) | 2 | Serial Connection | BW80 (Serial Printer) | 1 |

Whereas the following table depicts the connectivity data need to support these connections at the parameter level:

| Parent Parameter Type | Connection Type | Child Parameter Type |
|---|---|---|
| Serial Port 1 | Serial Connection | Serial |
| Serial Port 2 | Serial Connection | Serial |

This example depicts how data is structured to handle the parent/child situation where the child has to "know", or be aware of, the specific parent parameter instance they are connected to. In other words, in this scenario, it's important to know that Printer #1 is connected to Serial Port 1, and that Printer #2 is connected to Serial Port 2. If this level of detail is unimportant, then the parameter definitions for the AW70 could be modeled in such as way that there was only one Serial Port parameter, and one endpoint object, to which all serial devices would connect.

1.3.7.3 Parent/Child Connectivity(Nest)—Case #3

Figure 25:
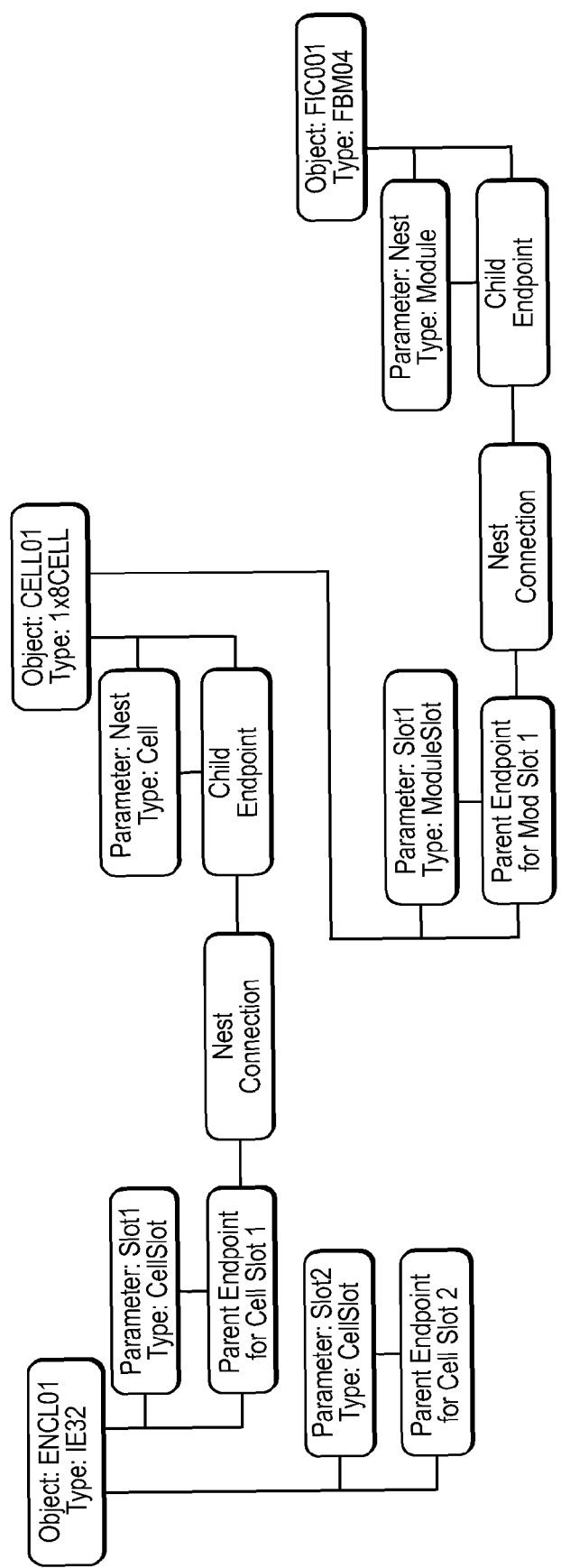

FIG. 25 depicts how a nest can be implemented within IDA. The following table depicts the connectivity data needed to support these connections at the object level:

| Parent Object Type | Capacity | Connection Type | Child Object Type | Weight |
|---|---|---|---|---|
| IE32 (Enclosure) | 4 | Nest Connection | 1x8CELL (Cell) | 1 |
| 1x8CELL (Cell) | 8 | Nest Connection | FBM04 (FBM) | 1 |

The following table depicts the connectivity data need to support these connections at the parameter level:

| Parent Parameter Type | Connection Type | Child Parameter Type |
|---|---|---|
| CellSlot | Nest Connection | Cell |
| ModuleSlot | Nest Connection | Module |

This example depicts how data can be structured to handle the parent/child connections used to support a multilevel nesting scenario. This implementation takes into account that each object connecting to its parent needs to know which "slot" it occupies, and in turn, each "slot" needs to know what object is currently occupying it (if any).

This design allows object differentiation between the slots. For example, it is easy to model (in the parameter definitions) the fact that the first two slots of a cell (represented by the first two parameter overrides) can only accommodate a power supply, and the remaining slots available for modules.

1.3.7.4 Source/Sink Connectivity

Figure 26:
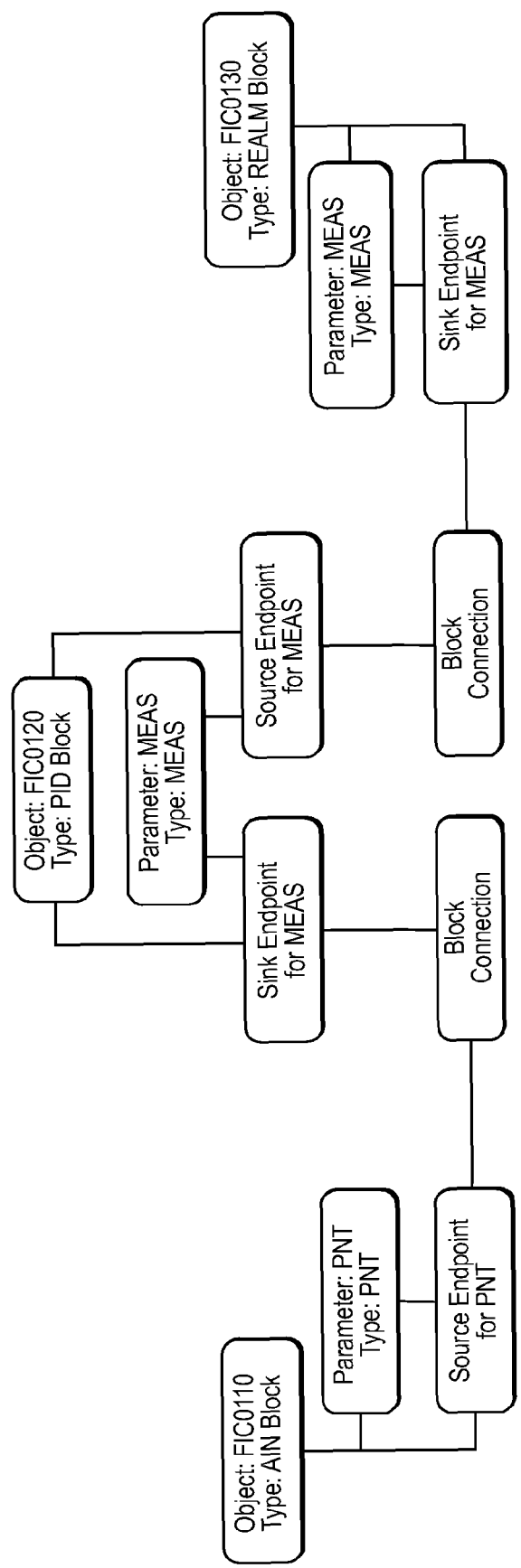
FIG. 26 is a source/sink connectivity example in a system according to the invention.

FIG. 26 depicts an implementation of how source/sink relationships can be implemented in IDA. The following table depicts the connectivity data needed to support these connections at the object level:

| Source Object Type | Connection Type | Sink Object Type |
|---|---|---|
| AIN Block | Block Connection | PID Block |
| PID Block | Block Connection | REALM Block |

The following table depicts the connectivity data need to support these connections at the parameter level:

| Source Parm Type | Min/Max | Connection | Sink Parm Type | Min/Max |
|---|---|---|---|---|
| PNT | 1/unlimited | Block Connection | MEAS | 0/1 |
| MEAS | 1/unlimited | Block Connection | MEAS | 0/1 |

This example depicts how data can be structured to handle a source/sink connection. More importantly, it shows how the same parameter (i.e., in this case, the MEAS parameter of the PID block) can function as both source and sink simultaneously.

1.4 Placeholders

The primary purpose of Placeholders is to preserve the location and appearance of an object on a Persistent Document, enabling an object to retain its appearance between viewings. Placeholders present an object model, depicting all the objects, their connections, and the endpoints of those connections in a single diagram. Consequently, the object model dealing with placeholders will broken into two sections:

Appearance Object Model. Objects of the same type appear in a certain way, depending upon which view it's being displayed in. This appearance is defined in an instance of the Appearance Definition class, which describe through the use of macros how a certain type of object appears. The Framework supports both a Implementation-standard, as well as a user-defined, appearance definition of an object type. Finally, a Placeholder Type class links an object type with a view type, with the appearance definition which is dictates how the object type appears on that view type.

1. Placeholder Object Model. This object model details how the placeholder class may actually be abstracted into three different classes: one each to support endpoints, connections, and objects.

1.4.1 Appearance Object Model

Figure 27:
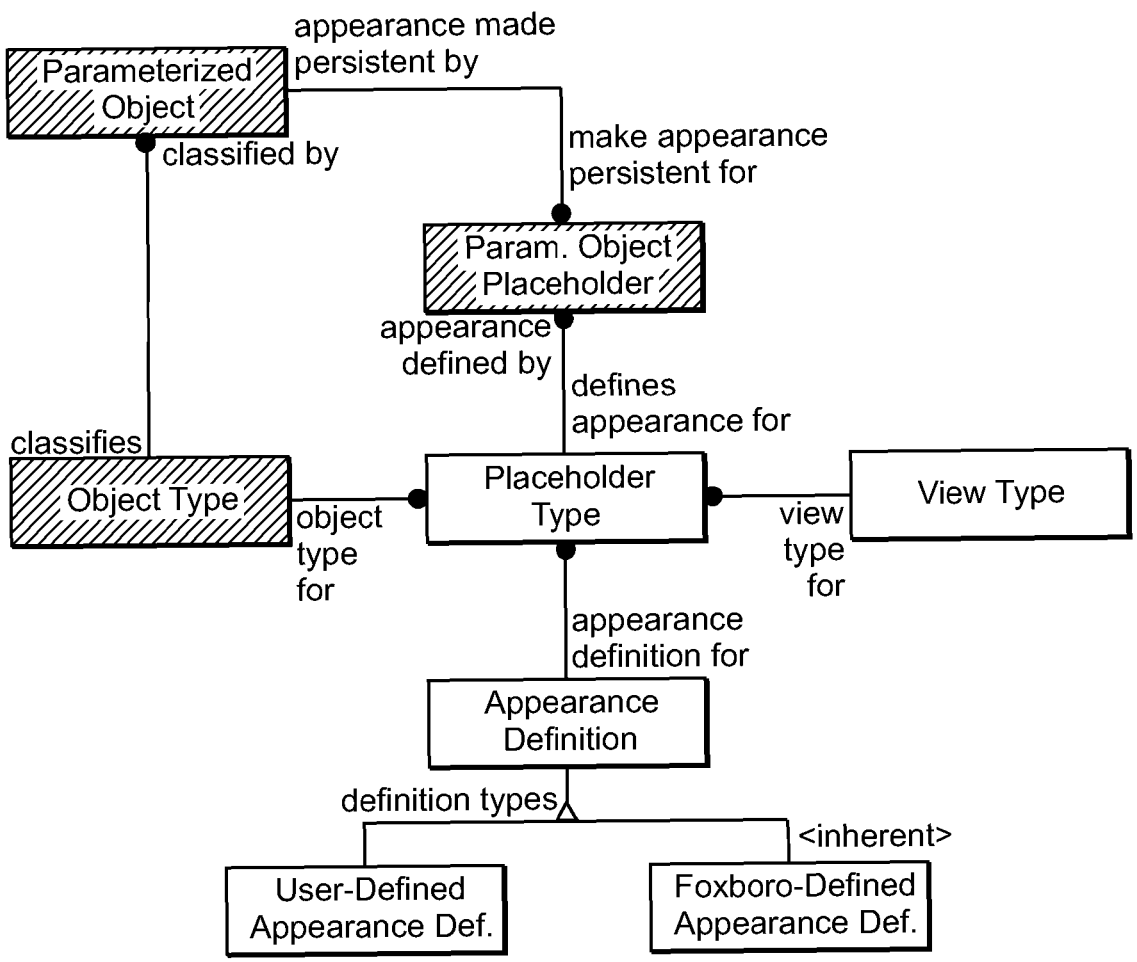
FIG. 27 depicts an appearance object model in a system according to the invention.

The object model depicted in FIG. 27 centers around how objects of a certain type appear when displayed on various types of views.

1.4.1.1 Placeholder Type

The Placeholder Type class is analogous to a join table between instances of the Object Type class and The View Type class, representing valid combinations of object types vs. view types. If a specific object type is not found in any instance of the Placeholder Type class, then no objects of that type will be able to be displayed on any view of that view type.

By referencing instances of the Appearance Definition class, the Placeholder Type class is also responsible for determining how an object of a specific Object Type appears on each view type it is able to be displayed on.

Summarizing Relationships:

The Placeholder Type class is a base class, instance of which define "legal", or valid, combinations of Object Types and View Type. Each instance of a Placeholder Type represents the appearance of a single valid object type on a specific view type.

The Placeholder Type class is analogous to a join table to separate the many-to-many relationship between object types and view types. In other words, the same Object Type can appear in many different View Types, and the same View Type can be used to display many different objects of the same Object Type.

An instance of the Placeholder Type class ties the object type/view type pair to an object appearance via its association with an instance of the Appearance Definition class, which is used to specify how an object type appears in that view type.

1.4.1.2 View Type

The View Type class represents the document (and supporting view, speaking in MFC terms) on which Parameterized Objects are displayed. Not all view types display all object types, and valid combinations are dictated by instances of the Placeholder Type class.

Summarizing Relationships:
    Each instance of the View Type class has a one-to-many relationship to instances of the Placeholder Type class. Each view type is capable of displaying one or more object types, with each valid View Type/Object Type pair represented by an instance of the Placeholder Type class. The appearance of that object on that view type is specified by the associated Appearance Definition object.

1.4.1.3 Appearance Definition

Figure 28:
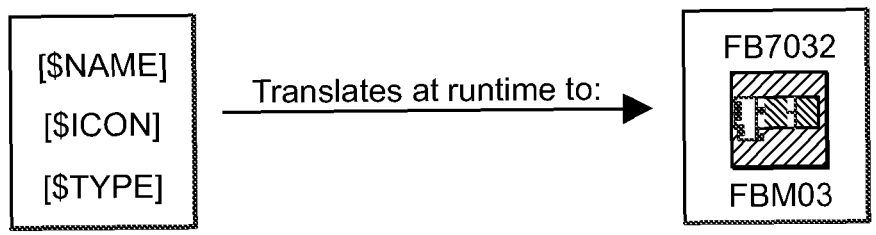
FIG. 28 is an appearance definition example in a system according to the invention.

The Appearance Definition class is just that—it defines the appearance of an object type on one or more types of views. The Appearance Definition object may be thought of as a small-scaled Sheet Template (refer to the section on "Sheet Templates"). The appearance of an object, if specified as a template, is macro-driven, allowing the user to edit and modify the way objects appear in certain View Types. For example, a possible Appearance Definition for a Parameterized Object might appear as that shown in FIG. 28, where the macros [$NAME], [$ICON] and [$TYPE] have specific values which have been obtained from the associated Parameterized Object at runtime.

All Parameterized Objects have a default Implementation-standard Appearance Definition for every View Type which they are allowed to appear on in IDA. The user can modify these Appearance Definitions, and save them as the new "default" Appearance Definition for that object type/view type pair.

1.4.1.4 Implementation-Standard Appearance Definition

Instances of Implementation-standard Appearance Definition objects represent the default appearance of an object when placed on an instance of a specific View Type. A Implementation-standard Appearance Definition object may be overridden by a User-Defined Appearance Definition object at runtime to produce customized displays and printouts to satisfy unique customer documentation requirements.

Every Object Type/View Type pair found in instances of the Placeholder Types class has an inherent Implementation-standard Appearance Definition associated with it.

1.4.1.5 User-Defined Appearance Definition

A User-Defined Appearance Definition object is a "copy" of a Implementation-standard Appearance Definition object which has been customized by the user to satisfy unique documentation requirements. The user can modify the default appearance definition by using an editing tool similar to the Sheet Template Editor to modify the appearance of an object type when displayed on a specific view type. The default appearance definition for an object will be overridden simply by virtue of the fact that a User-Defined Appearance Definition object exists for the object type/view type pair.

1.4.2 Placeholder Object Model

Figure 29A:
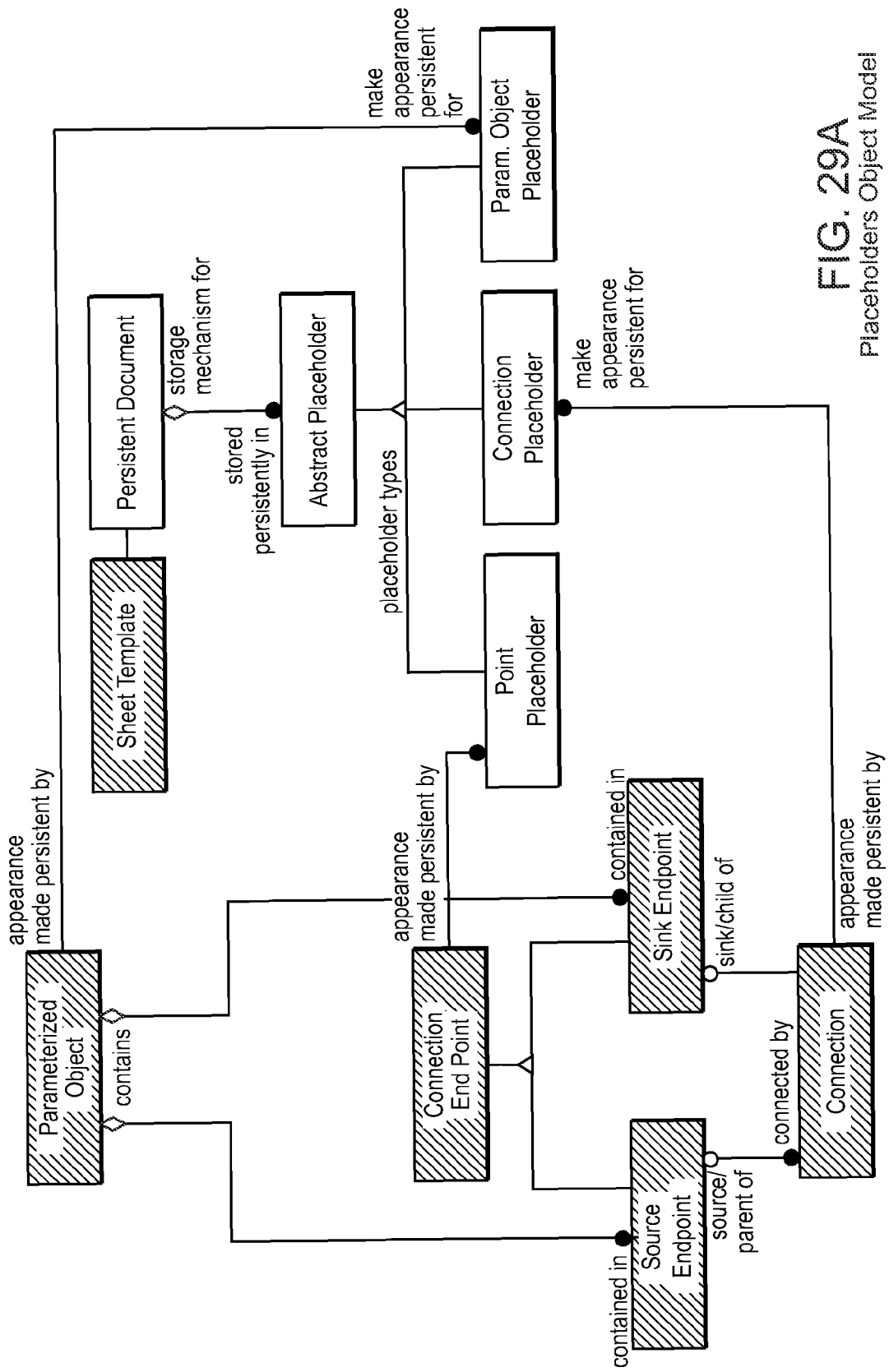
FIG. 29A depicts a placeholders object model in a system according to the invention.

A placeholder is created at runtime whenever a new instance of a Parameterized Object, Connection, or Endpoint is placed on a view. The placeholder retains geometric information (e.g. size and location) and a reference to the object's Appearance Definition which determines how the object appears in the view. The placeholder is the mechanism by which all this information is kept persistent within the document (FIG. 29).

1.4.2.1 Abstract Placeholder

The Abstract Placeholder class is an abstract class which is used to provide the mechanism by which the representation of objects on a Persistent Document object are made persistent. Every object which needs to be represented on an instance of a Persistent Document (e.g. an Endpoint, an Connection, or a Parameterized Object) uses a subclass of the Abstract Placeholder class and extend it to meet its specific requirements in terms of being able to reconstruct itself visually. Placeholders are used to represent an object regardless of the nature of the Persistent Document (e.g. graphical vs. tabular).

At a minimum, the data which an Abstract Placeholder contains includes the origin (x,y) of the object, and its extents. The ordered list maintained by the Persistent Document determines the order in which objects are drawn.

Summarizing Relationships:
    A Placeholder object (whether it be for Endpoint, Connection or Parameterized Object) is contained within a Persistent Document. The representation of an object, for any specific document, is dependent upon the Placeholder and the associated Appearance Definition object, for that object.
    One or more Placeholder objects may be associated with the same Persistent Document. The Persistent Document will maintain an ordered list of the Placeholders it contains.
    All instances of the placeholder class maintain a reference to the object they represent, in the event that they receive a notification that the object has been modified, or deleted. In this manner, they can take the appropriate action in order to refresh the display.

1.4.2.2 Parameterized Object Placeholder

A Parameterized Object Placeholder object extends the Abstract Placeholder class with data and/or methods to allow the associated Parameterized Object to be displayed on the Persistent Document object. In addition to the standard configurable objects (e.g. blocks, loops, etc.) all non-configurable Graphical Objects (discussed under the section entitled "Sheet Template Editor") are also derived from Parameterized Object so that they may benefit from the Object->Placeholder->Document relationship.

Examples of Parameterized Objects which subclass the Abstract Placeholder with object-specific data include:

| | |
|---|---|
| "Normal" Objects | Data can include size, shape, color, line weight, line style. Some objects may include a bitmap (or reference to one) to enhance the appearance of the object. Such objects can include blocks, representations of hardware components, and most Graphical Objects (e.g. rectangles, circles, etc.). |
| Object Collections | Data can include size, shape, color, line weight and line style. Implementation can set these properties for all objects within the collection. Such objects would include nests, loops and compounds. |
| Textual Objects | Data can include font (size and style), color, and background. Such objects include annotators on the Sheet Template, as well as those placed on the Persistent Document by the user. |

Summarizing Relationships:
   An instance of a Parameterized Object Placeholder object is used to represent one, and only one, Parameterized Object on an instance of the Persistent Document class.
   Parameterized Object Placeholder objects maintain a reference to their associated Parameterized Object in order to dynamically refresh any related data which may have changed outside the context of the current Persistent Document.
   Parameterized Object Placeholder objects (from the previous discussion on appearance objects) maintain a reference to their associated Placeholder Type object.

1.4.2.3 Connection Placeholder

A Connection Placeholder object extends the Abstract Placeholder class with data and/or methods to allow the Connection to be displayed on the Persistent Document object. Data with which the Abstract Placeholder is subclassed for a Connection Placeholder include line weight, line style, and color. Examples of Connection Placeholders are those used to represent the block connection between blocks and their respective parameters, or a fieldbus connecting a CP to an FBM.

Summarizing Relationships:
   A Connection Placeholder object is used to represent one, and only one, Connection object on an instance of the Persistent Document class.
   Connection Placeholder objects maintain a reference to their Connection object in order to dynamically refresh any related data which may have changed outside the context of the current Persistent Document.
   Since a Connection object is a Parameterized Object, it follows that instances of Connection Placeholders (from the previous discussion on appearance objects) maintain a reference to their associated Placeholder Type object.

1.4.2.4 Point Placeholder

A Point Placeholder object extends the Abstract Placeholder class with data and/or methods to allow the associated EndPoint object to be displayed on the Persistent Document object. Data with which the Abstract Placeholder is subclassed for a Point Placeholder object might include shape, line weight, line style, and color. Examples of instances of Point Placeholders are those that could be used to represent a parameter on a block, or a point on an FBM.

Summarizing Relationships:
   A Point Placeholder object is used to represent one, and only one, Endpoint object on an instance of the Persistent Document.
   Point Placeholders objects maintain a reference to their associated Endpoint object in order to dynamically refresh any related data which may have changed outside the context of the current Persistent Document.
   Unlike instances of the Parameterized Object and Connection Placeholder class, Point Placeholder objects do not contain a reference to a Placeholder Type object, but rather are responsible for determining their appearance using inherited methods and/or data.

1.4.2.5 Persistent Document

A Persistent Document object is used to contain the data associated with a specific document within IDA. It's important to note that a Persistent Document is directly related to an MFC Document, although differences do exist. A Persistent Document may only be associated to one and only one Sheet Template (see section entitled "Sheet Template Editor"). When the document is displayed, the Sheet Template is drawn first, as a type of background, then the Placeholder objects associated with the document is superimposed upon the drawing surface. The Sheet Template, which is used during printing and/or print preview, is user-selectable from the Page Setup dialog. In the absence of a user-specified Sheet Template, a default implementation-standard template is used.

1.4.2.6 Combined Placeholder/Appearance Object Model

Figure 29B:
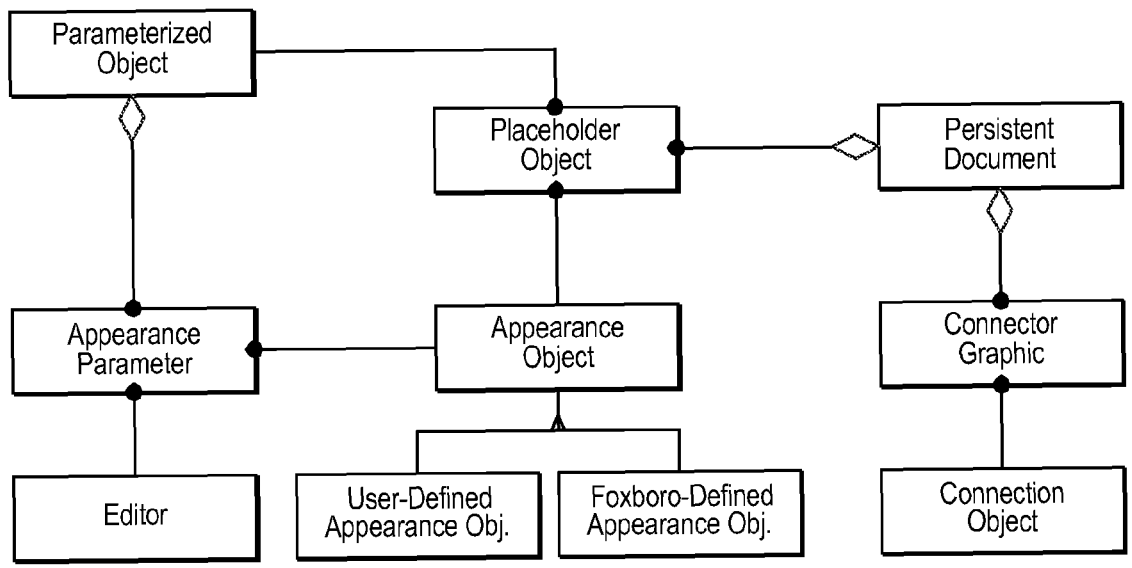
FIG. 29B depicts a combined appearance and placeholder object model in a system according to the invention.

FIG. 29B depicts a combined placeholder and appearance object model used in one practice of the invention. The classes illustrated in the drawing are defined as discussed above, with the following caveats.

Each configurable Parameterized Object utilizes parameters (here, identified as Appearance Parameters) that reference (or contain) instances of an Appearance Definition class specifying how that Parameterized Object appears in respective views—and, particularly, in the respective editors (e.g., the Block Definition Editor, Control Algorithm Diagram Editor, and so forth). This use of Appearance Parameters substitutes for (or supplements) the above-described use of the Placeholder Type class.

Appearance Parameters are treated in the manner of other Parameterized Object parameters and hence, for example, are inherited from parent objects, may be edited and/or may be overridden. Thus, a "default" Appearance Definition associated with a configurable object as a consequence of inheritance may be changed, e.g., through use of the Block Definition Editor. Moreover, Appearance Definitions required for depiction of a configurable object in additional editors may be added to a "child" Parameterized Object, e.g., in the manner that other parameters are added to an Parameterized Object definition.

Embodiments utilizing the model of FIG. 29B forego Connection Placeholders in favor of Connector Graphics that are integral to the graphical display of each Persistent Document. Each Connector Graphic in a Persistent Document references the corresponding parameterized Connection Objects. By checking those references, an editor that display the Persistent Document can verify the existence of each Connection Object before displaying the Connector Graphic.

1.5 The Generic Editor Framework Classes

The IDA application in general, and the IDA editors in particular are based on the Microsoft Foundation Classes' (MFC) Document/View model.

Figure 30:
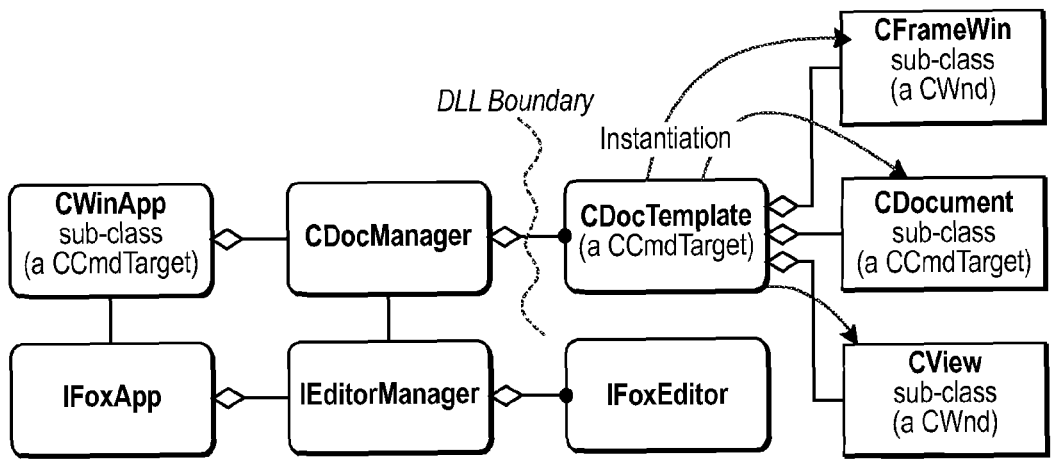
FIG. 30 depicts a MFC document/view architecture in a system according to the invention.

The MFC Document/View model relies on the interaction of several classes (as shown in FIG. 30). An Application object (using a contained CDocManager object) maintains a list of one or more Document Templates. Each of the Document Template objects represents a tuple consisting of a Frame class, a Document Class, and a View class. Together, this triplet of classes, when instantiated as objects, defines the appearance of the program, the data being edited, and the program's user interface, respectively.

The document objects define and maintain the data being edited. The frame objects define the menus and toolbars available when the documents are edited. The view objects draw the objects being edited on the screen (or during printing) and manage the details of the user interface interactions.

Each of the editors is packaged as a Win32 DLL (dynamic link library). The DLL includes the supporting code for the sub-classes of CFrameWnd, CDocument, and CView that make up the editor's code. When the DLL is loaded, a document template instance containing references to these classes is created and passed to the application. Once the document template is managed by the application, the editor is available for use. This isolation from the application object's code (which is compiled into the process's EXE) and the editors' code (compiled into various DLLs) is illustrated by the DLL Boundary shown in FIG. 30. The application, may, at a later time unload the document template once the editor the code implements is no longer in use. At that time, the DLL can then be released.

When a user action results in a new instance of an editor, the application retrieves the appropriate Document Template instance from its manager. It then asks the template to create new instances of the appropriate frame, document and view objects, placing the windows in the edit pane of a main editor window.

When the user selects a new document object (of a different type) in the tree control, the framework attaches an instance of the appropriate Frame class to the frame window (detaching the previous Frame class). This causes the menus and toolbars for the frame to change to those appropriate for the new editor. The editor's View class is then instantiated as the new View Pane of the frame.

The IDA Framework provides several base classes to facilitate the creation of IDA applications. Most are derived from the standard MFC Document/View architecture classes defining the application, the frame, the document and the view.

1.5.1 COM Architecture in IDA

The Component Object Model (COM) (a collective term used to describe aspects of a Windows NT Object Linking and Embedding (OLE) object) is utilized by IDA in three ways—internal automation, external automation, and application/editor interaction.

The framework used for automating parameterized objects and IDA is independent from the parameterized object and Framework Services framework classes, and can be implemented separately. However, there are some coding practices that make integration of parameterized objects with the automation framework easier. The framework used for interaction in IDA and its editors needs to be tightly coupled with the MFC classes.

It is apparent that all classes implementing COM functionality are preferably kept separate from the persistent object model for the same reasons MFC classes must be. COM needs to keep track of information related to the lifetimes of objects on a per application basis, and therefore is not compatible with IDA's multi-user database model. The exception to this rule is a pseudo-implementation of the OLE automation server, IDispatch, by parameterized objects that will be wrapped by an object providing the actual functionality expected for automation.

1.5.1.1 Internal Automation

This type of automation is typically referred to as "Scripting". By exposing parameterized objects through automation and defining event interfaces, a scripting engine (such as VBScript) can be hooked into to run event-based scripts. This is a powerful tool for easily building and maintaining IDA functionality, as well as giving users an extremely rich and flexible way to customize and extend IDA.

As mentioned above, parameterized objects provide a pseudo-implementation of IDispatch. An automation wrapper class is used to handle all calls to the methods of IDispatch on behalf of the parameterized object using an ObjectStore reference. The wrapper object is created through an automation manager that is also used for firing events for parameterized objects.

An event is handled using a script (VBScript) that is persisted in a parameterized object and passed with the object itself to the automation manager. An editor is provided to manage the scripts associated with an object. A script has the context of the object it belongs to, along with the global IDA application object discussed in the next section. From the global IDA application object, one has access to all the functionality exposed through automation for IDA and the editors. This includes access to parameterized objects in the system and plant hierarchies.

1.5.1.2 External Automation

All automation interfaces used for external automation are dual interfaces to provide the best level of efficiency and ease of use. A dual interface is a custom interface that derives from IDispatch.

IDA has an Application object that serves as the automation entry point. The object is registered with Windows as a local server allowing Visual Basic or C++ developers to create one and use it in their own application. From this entry point, developers have access to all the functionality exposed through automation for IDA and the editors. This includes access to parameterized objects in the system and plant hierarchies using an automation wrapper object. Examples of objects that would be properties of the Application object are the palette window, the project manager window, output window and the editor manager. The Application object may also have methods or child objects with methods that provide helper services and routines living in DLLs.

IDA GUI classes are exposed through automation by aggregating a dual interface into an MFC class and adding it as a property of the Application object. Developers can choose to implement their functionality in either the MFC class or the aggregated interface, and call one from the other. IDA also abstracts the editor manager with an automation object. Editors provide one or more automation interfaces to expose their functionality through automation. Although all the editors may have one or more common automation interfaces, each can have as many unique ones as necessary.

1.5.1.3 Application/Editor Interaction

In the illustrated embodiment, these interfaces do not support automation, and are implemented in non-MFC/non-parameterized object classes.

There are a number of COM interfaces that are implemented by the IDA application, and managers that are used to synchronize GUI-related and other operations. These are non-automation custom interfaces with associated proxy/stub classes provided by IDA used for marshalling data. The difference between these interfaces and the ones used for external automation is that these are used solely for the coordination of the editors with IDA and are not editor-specific. The automation interfaces are typically unique to the editor they belong to.

As with the automation interfaces, special consideration is given to parameterized objects. In the illustrated embodiment, pointers are passed to parameterized objects and OID's using the "long" data type and casting appropriately. This is permissible because the embodiment operates in a single process, that is linked to the DLLs exporting its classes, and is integrated with ObjectStore. In alternate embodiments, a COM interface/class can be implemented for each parameterized object defined. These classes can live in non-extension DLLs and can wrap their corresponding parameterized objects using OID handles. Additional application/editor interfaces can be implemented using the object interfaces instead of the "long" data type.

1.5.2 The IDA Application Class

There is a single IDA application class—there is a single IDA application. It supplies standard services to the application, and to the classes that make up the application. These services include:

Transaction Services

Undo Services

Window Management

Version Control

Security and Authentication Services

Figure 31:
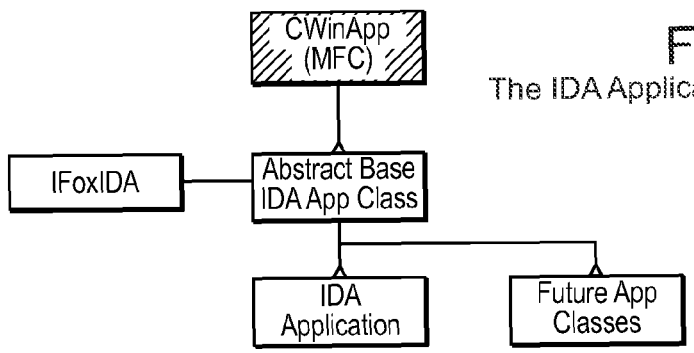
FIG. 31 depicts an IDA application class architecture in a system according to the invention.

It also provides the dynamically loadable (and unloadable) document template facility. As shown in FIG. 31, the application class is derived from MFC's CWinApp class. An intermediate abstract class (which implements most of the application's services) is shown.

1.5.3 The IDA Document Manager Class

This class manages the document templates for each editor. This class is used to manage the loading and unloading of editor DLLs. When an editor is unloaded, its document template is preferably be removed from the list of available templates. The document templates contain pointers to objects which reside in the editor DLL, and might be located differently if the editor is reloaded.

When an editor is installed on a target system, it registers itself before use. Registration stores and relates three pieces of information about the editor:

The path to the DLL

The editor's unique identifier (i.e., the GUID for that editor)

Identifies itself as an IDA editor

The third item, IDA editor information, is stored in the registry via the use of the COM Components Categories Manager (COM-CCM). The COM-CCM is a single instance COM component which allows applications like IDA to register a category (i.e. IDA editors) and servers that support objects in that category (e.g., Block Definition editor, etc.)

On initialization, CDocManager retrieves a list of available editors via the COM-CCM. Once that list is retrieved, an editor can be started by instantiating it via COM using the GUID stored in the appropriate component category.

Once the editor is loaded, it registers the document template with the main application, and can then be used like any other document template.

1.5.4 The IDA Document Classes

Figure 32:
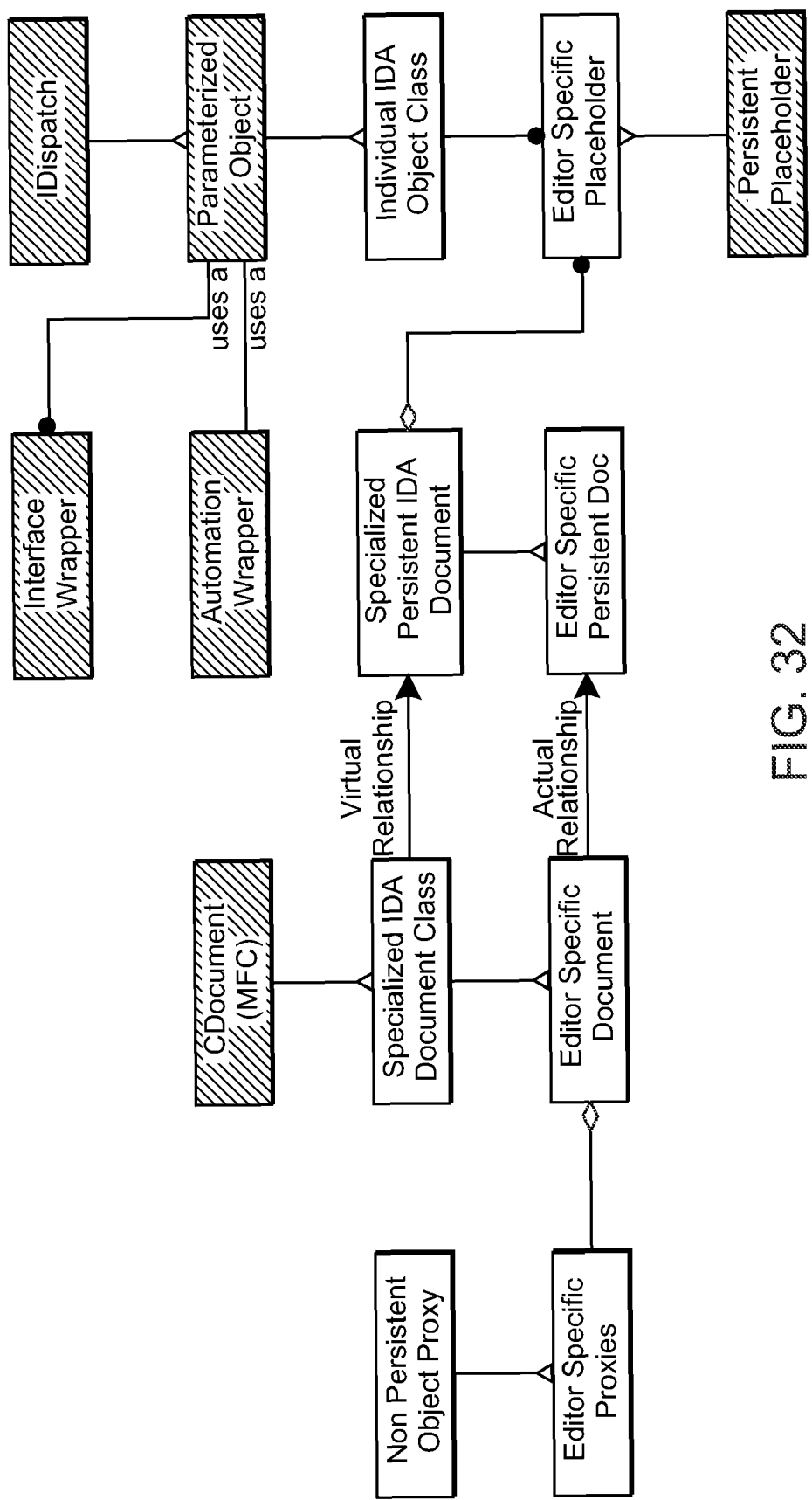
FIG. 32 depicts an IDA document architecture in a system according to the invention.

FIG. 32 shows a class diagram for IDA documents. In IDA, the document classes differ from the other Document/View components, in that they represent persistent data. The figure consists of many categories of object classes. These include:

The non-persistent (CDocument-derived) documents that represent the persistent document in an editor The persistent documents that collect objects into editing contexts The Parameterized Objects that are the configurable items in the database The persistent Placeholder objects that tie the configurable items to their document(s)

The non-persistent proxy objects that act as on-screen tokens for configurable item placeholders during editing The base IDA document classes include provisions for embedding OLE objects within an IDA document, and for providing linkings to IDA editors via OLE from other applications.

In FIG. 32, the classes which begin with "Editor Specific" are created and maintained by the application developer (along with the individual IDA object class). The remaining classes are provided by the Framework, or MFC.

1.5.5 The IDA Hierarchy Tree Class

Figure 33:
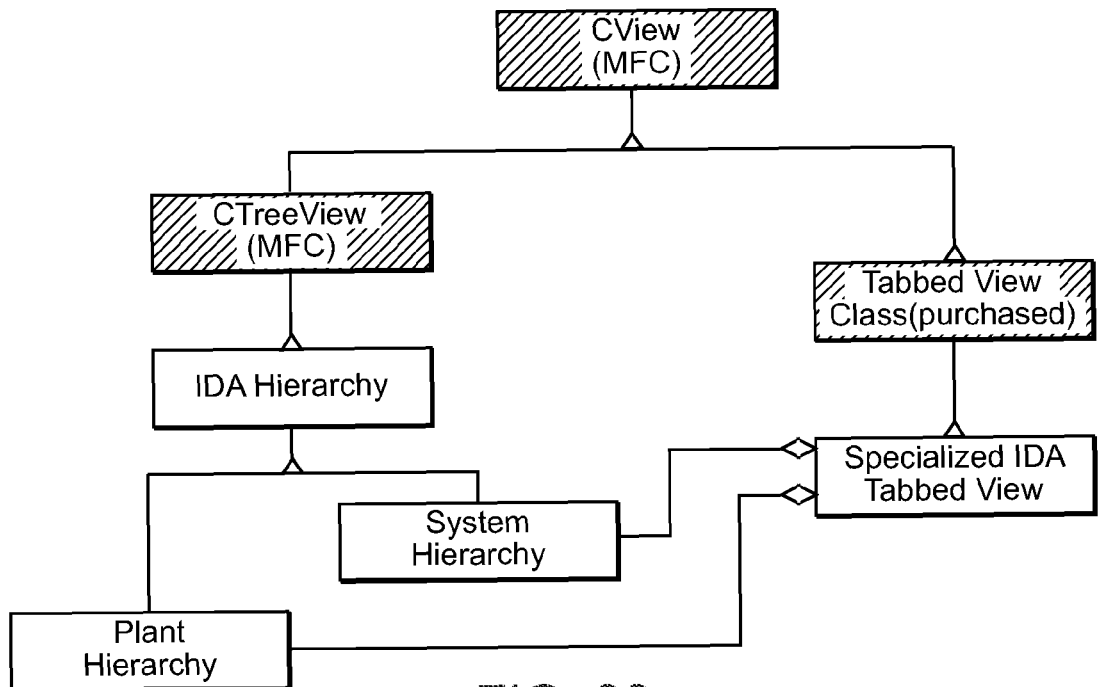
FIG. 33 depicts IDA hierarchy classes in a system according to the invention.

The IDA Hierarchy Tree provides two hierarchical views of the components of an IDA configuration. FIG. 33 shows an approximation of the class inter-relationships for the IDA Hierarchy Tree.

The IDA Hierarchy class provides most of the services available in the two hierarchy trees. These include general database connectivity, dynamic update from the database, and drag and drop, cut/paste services. The Plant and System Hierarchy sub-classes are simple specializations of this class. The Specialized Tabbed View class acts to hold the two views in a single tabbed container (i.e., the IDA Hierarchy Tree).

1.5.6 The IDA View Classes

Figure 34:
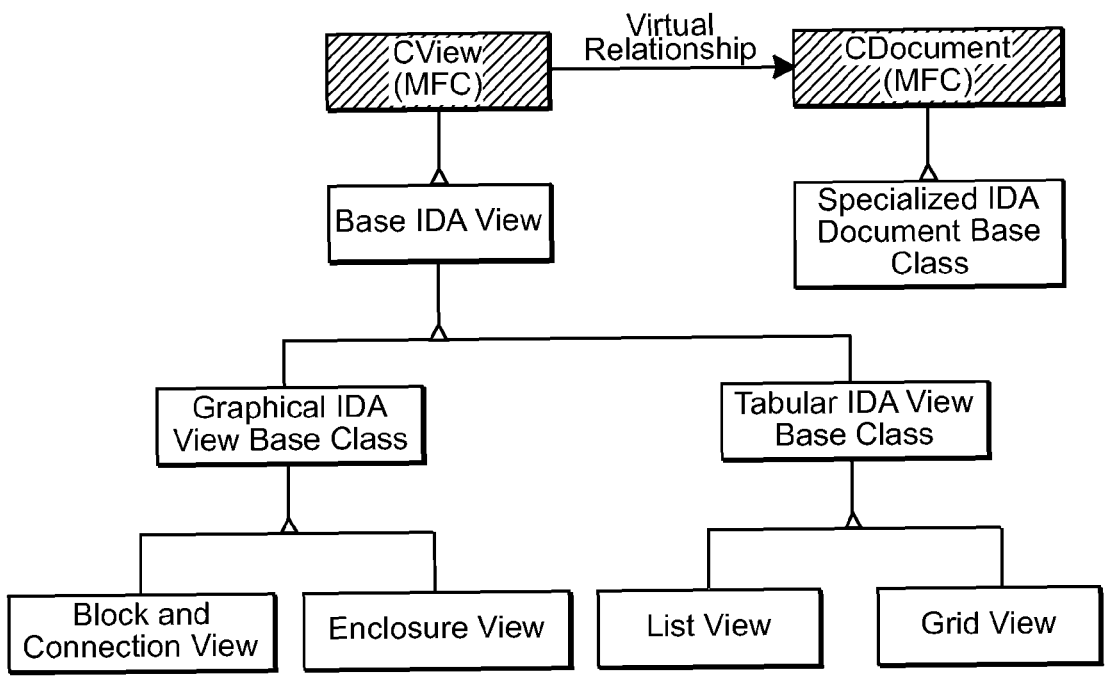
FIG. 34 depicts IDA view classes in a system according to the invention.

The IDA Framework provides base view classes (derived from MFC's view classes) providing application developers with much of the user interface behavior they need in their applications. FIG. 34 shows a model of the relationships of these classes.

The Specialized IDA Document Base Class shown in FIG. 34 corresponds to the same class as shown in the IDA Document classes. The "Virtual Relationship" between the CView and CDocument classes is common to all MFC document/view applications, and is actually implemented in most derived application-specific view and document classes.

The Base IDA View Class provides the basic user interface services. These include page and print services (most IDA applications are page-based—their final output is a page, or pages, in a book of system documentation), notification services, invalidation and the relationship to an IDA Hierarchy Tree control.

The Graphical IDA View Base Class provides the facilities needed for a simple graphical editor (object placement on a page, or "canvas"). Two sub-classes of this view, the Block and Connection View Class, and the Enclosure View Class, add connection and containment user interface attributes to the services already provided by the graphics class. Similarly, the Tabular IDA View Base Class adds the data and methods necessary to provide a grid, or spreadsheet-like, user interface. Two sub-classes of the tabular base class are the List View class, used for listing properties and attributes of items selected in the IDA Hierarchy Tree, and the Grid View class, used for other spreadsheet editors such as the Parameterized Object Definition editor.

Application developers are expected to sub-class their view class from one of the provided base classes.

1.5.7 The IDA Frame Classes

Figure 35:
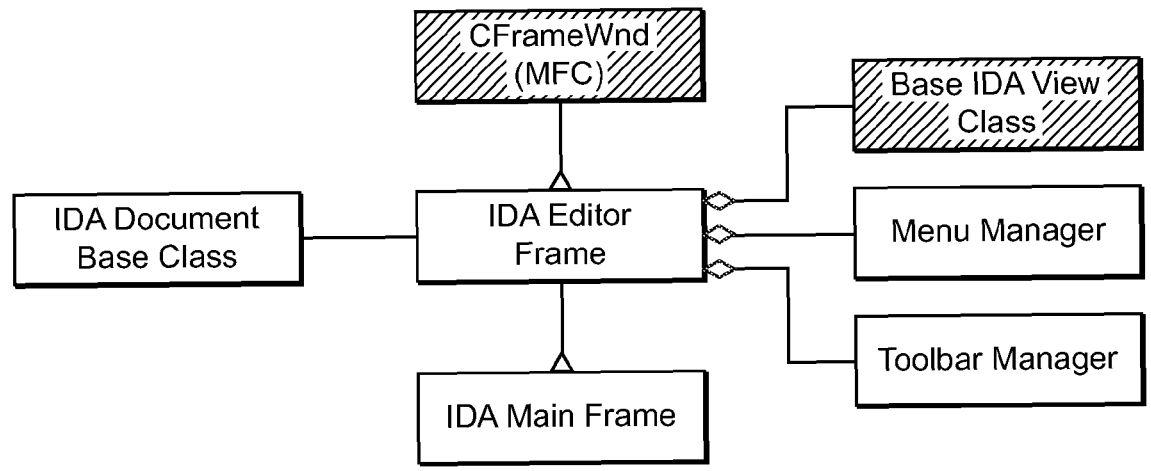
FIG. 35 depicts IDA frame classes in a system according to the invention.

FIG. 35 shows the structure and relationships of the base IDA Frame Class. The MFC frame classes provide the menus and toolbars, and some generalized behavior of MFC applications. Many classes presented in the previous section in FIG. 34 and FIG. 35 are shown here to depict the relationships between the various classes involved.

The IDA Editor Frame controls lines of communication between the IDA Document Base Class, and the IDA Main Frame.

The IDA system has specialized menu and toolbar management, allowing the dynamically loaded menus and toolbars to negotiate with the standard IDA facilities. Menus and toolbars associated with the main application are merged with the menus and toolbars associated with each editor as it becomes active.

1.6 Sheet Template Editor

Sheet Template objects are used to allow the user to define a template, or sheet layout, to be used during the printing and/or print preview process. A Sheet Template typically includes combinations of graphical symbols which have been defined (e.g. rectangles, circles, bitmaps, etc. . . . ) to satisfy a customer's unique requirements for documentation.

Sheet templates are used to augment the documentation process with information which may be used to point out, or highlight, portions of the configuration. Sheet templates support the inclusion of a variety of graphical objects to help in this task, such as geometric shapes, bitmaps, and annotators (text blocks).

Sheet templates are created and modified by the Sheet Template Editor. This graphical-based utility allows the user to modify existing graphical objects, add new ones, and change the size of the drawable surface area on which output is displayed.

1.6.1 Object Model

Figure 36:
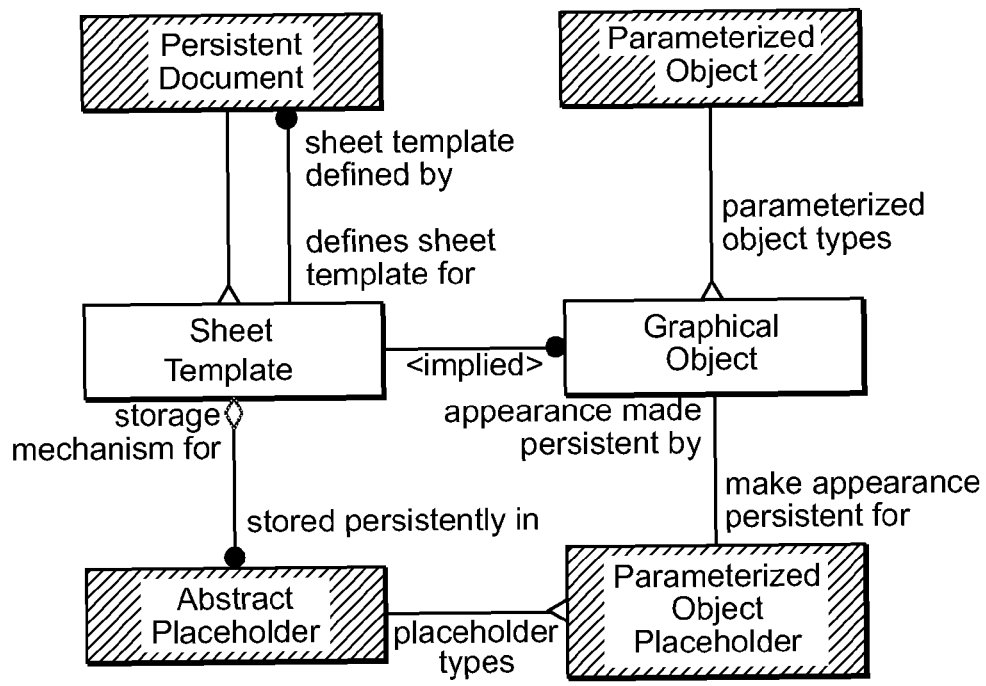
FIG. 36 depicts a sheet templates object model in a system according to the invention.

The object model used in the illustrated embodiment to support Sheet Template objects appears in FIG. 36.

1.6.1.1 Sheet Template

Sheet Templates objects are actually specialized Persistent Document objects created and maintained by the Sheet Template Editor. Each Sheet Template object contains a reference to one or more representations of Graphical Objects, via instances of the Abstract Placeholder class. Placeholders are used to provide the mechanism for persistent storage of the placement of various objects in the Sheet Template.

When a Sheet Template object is being accessed via the Sheet Template Editor, instances of Graphical Objects may be moved, modified, and deleted as desired. However, when a Sheet Template is used for display during printing or print preview purposes, it serves as an uneditable background meant to further enhance the appearance of the report it is associated with. When viewed in this manner, Graphical Objects on the Sheet Template may not be manipulated, moved, or changed in any way.

The Sheet Template object which is actually used during print and/or print preview is defined by the Page Setup dialog box. Should the user elect not to use Page Setup capabilities, a default Sheet Template object is available while the configurator is providing normal printing services.

Summarizing Relationships:
  A Sheet Template object is a specialized Persistent Document.
  One or more placeholder objects representing Graphical Objects may be contained within the Sheet Template.
  There is an implied relationship wherein a Sheet Template object can reference (albeit indirectly) one or more instances of Graphical Objects, but that an instance of a Graphical Object can only appear on one, and only one, Sheet Template object.
  An instance of a persistent document may only be associated with a single Sheet Template object. However, the same Sheet Template object may be associated with several persistent documents at the same time.

1.6.1.2 Graphical Objects

Figure 37:
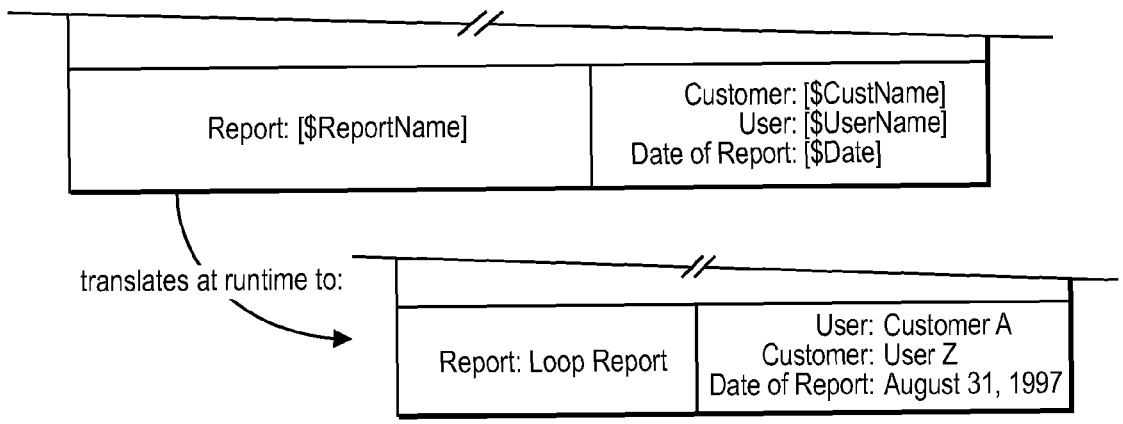
FIG. 37 depicts a sample use of macros in sheet template in a system according to the invention.

While creating or modifying a Sheet Template, numerous Graphical Objects can be drawn which are then used to form the background (or sheet layout) to be used during printing and/or print preview (FIG. 37). These Graphical Objects are independent of the objects normally considered to be "configurable", such as loops or compounds. In that context, types of Graphical Objects include:
  Rectangles
  Circles (Ellipses)
  Polylines
  Bitmaps
  Icons
  Annotators (used to display text)

Graphical Objects require the management of graphical characteristics such as line weight, line style, line color, fill color, etc. These properties may vary depending upon the object type being modified, and are displayed on that object's property pages appropriately when edited. Annotators, or text strings, support the use of macro substitution, allowing the user to enter specific, predefined macros embedded within text strings. When the text string is displayed on the Sheet Template, the macro is replaced with the appropriate value. Examples of things for which macros are defined include: report name; customer name; user name; and date and time in various formats.

Summarizing Relationships:
  An instance of a Graphical Object is a Parameterized Object, created and manipulated by the Sheet Template Editor.
  An instance of a Graphical Object may be associated with one Parameterized Object Placeholders. These Placeholders provide the mechanism by which a Graphical Object's location and appearance on a Sheet Template can be made persistent.
  There is an implied relationship directly with the associated Sheet Template object itself—and that is, that a Graphical Object can be associated with one, and only one, Sheet Template object.

1.6.2 Sheet Template Editor

Figure 38:
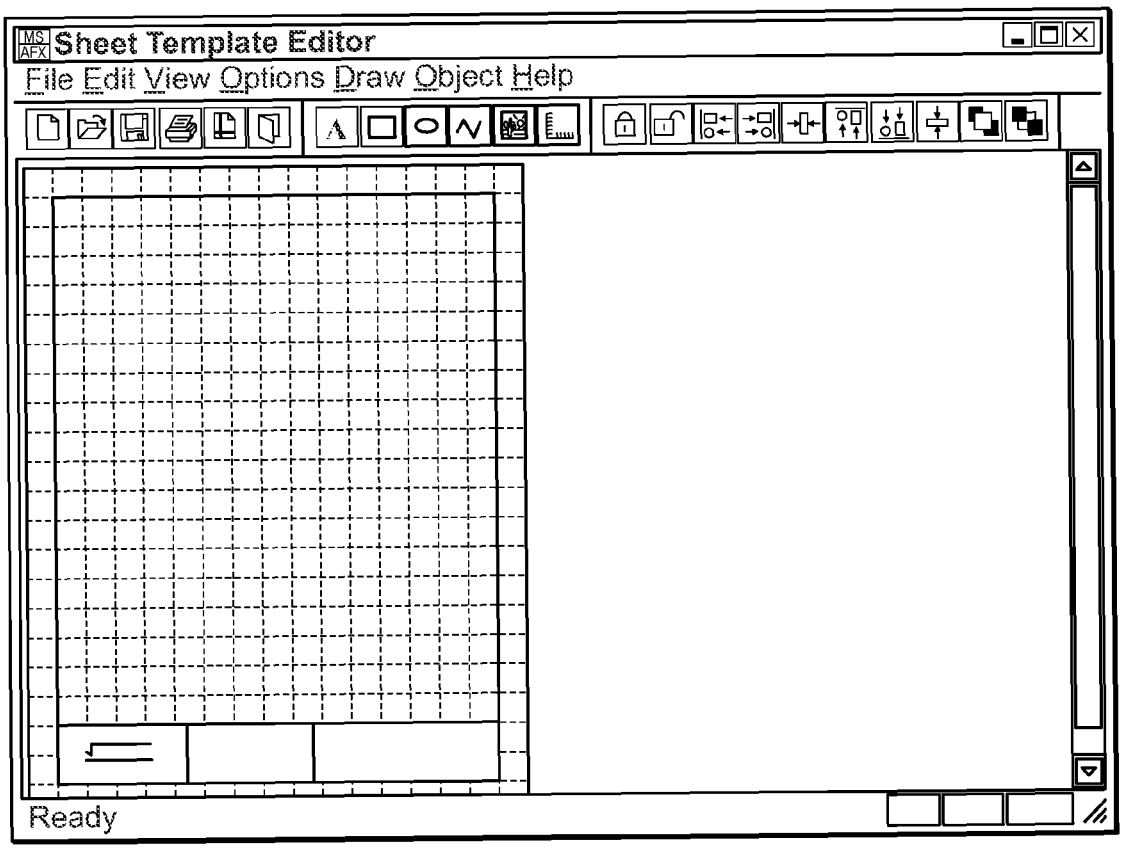
FIG. 38 depicts a sheet template editor in a system according to the invention.

Although IDA can include predefined, standard Sheet Template objects, the Sheet Template Editor (FIG. 38) may be used to create new Sheet Template objects, or customize existing ones. Conceptually, the Sheet Template Editor is similar to many drawing packages which exist on other platforms and systems today. The editor provides the primary mechanism for allowing users to modify graphical characteristics of the Graphical Objects displayed on a Sheet Template. A full range of graphically related commands allow the user to manipulate objects which have been placed on the Sheet Template, such as various alignment commands, send to front/back, etc.

One important feature of the Sheet Template Editor is to allow the definition of the size and orientation of the area representing the physical paper surface (e.g., 8½×11 portrait). Also defineable within the editor is the drawing area, which is essentially used to define the top, bottom, left and right margins of the drawing surface available to the user for placement of configurable objects. While in the editor, instances of Graphical Objects may be placed outside the normal margin depicted by the drawing area (e.g., a Title Block at the bottom of a sheet). Graphical Objects preferably still remain within the physical boundaries of the selected sheet. Any Graphical Object may be created, modified, moved, or deleted from the template, regardless of the size and position of the drawing area.

1.7 The IDA Report Manager

Figure 46:
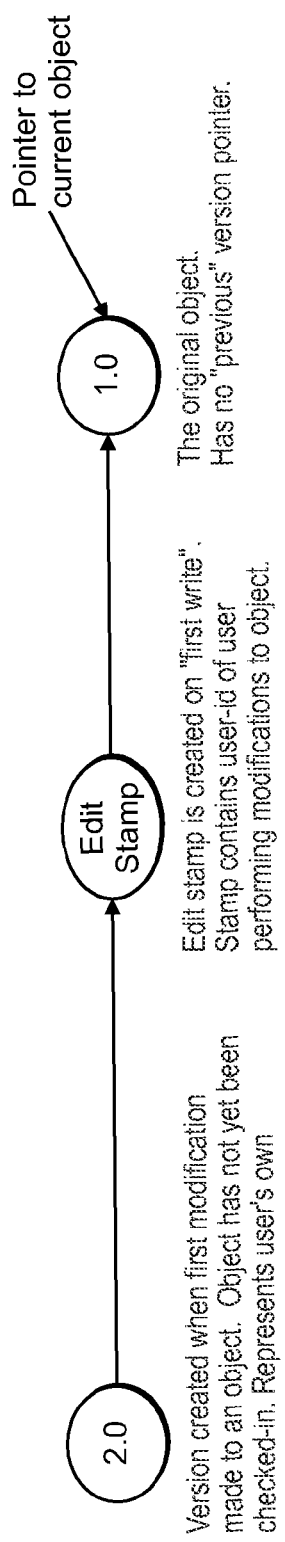
FIG. 46 depicts an object check out in a system according to the invention.

The IDA Report Manager allows users to create, edit, and print reports. A report is an association between a collection of IDA configurable objects (possibly filtered) and templates describing how to print them. Reports are composed of report templates that organize the data to be printed—describing what should be printed, how it should be printed, and in what order. This enables the user to produce a printed document that combines information from various sources organized in one of many different ways (FIG. 46). For the remainder of this section, IDA configurable objects will be referred to as simply "objects".

An object may be associated with one or more named views, each used to render a specific representation of it inside an IDA editor. Editors are components of the IDA application. Each editor provides a graphical user interface (GUI) to allow the user to edit one or more objects, each object being associated with one or more object types. A central view registry keeps a list of views for each object type, and for each view, the name of the editor that implements the GUI for it. In addition, for each object type, one of the views is marked as the default.

Each of the IDA editors is a Microsoft Windows server implemented in a DLL using the MFC document/view architecture. In an IDA editor, an MFC document is associated with an object and an MFC view is associated with either an IDA named view, or the placeholder object used to render that named view of the object.

An object can be printed either as part of a report or individually through an IDA editor. All printing is performed using the MFC printing mechanism up until either the report or the object actually prints itself. At this point, the MFC view calls into either the report or the placeholder/appearance object associated with the object being printed. A report is responsible for making the calls into the placeholders/appearance objects for the objects it is currently printing.

1.7.1 Object Model

Figure 39:
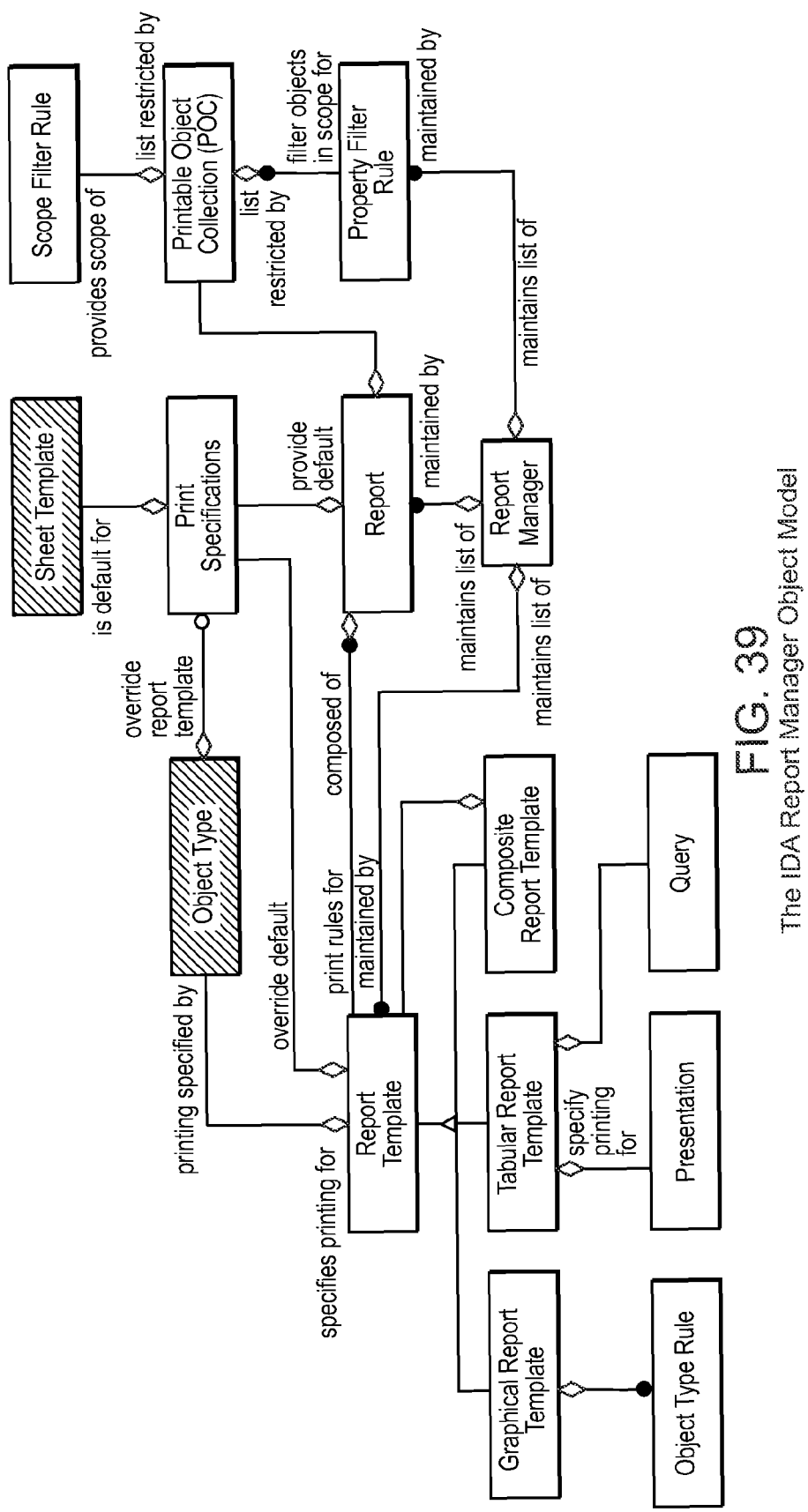
FIG. 39 depicts an IDA report manager object model in a system according to the invention.

FIG. 39 depicts the object model used in the illustrated embodiment to support the Report Manager, which maintains the following three lists: reports; report templates; and property filter rules.

In the illustrated embodiment, only one Report Manager can exist in an IDA system, and it is a top-level member of the System Hierarchy. To the user, its representation in the System Hierarchy is an untyped collection, only capable of being opened and closed. It contains three lists, each being a Parameterized Object. Nothing can be added to the Report Manager's "folder" on the System Hierarchy, and none of the three lists can be deleted. The IDA Report Manager relies on a parallel registry of printable views with the following conditions: one or more print views is registered for each Object Type; and of the Object Type's print views is registered as the default.

1.7.1.1 Printable Object Collection (POC)

A Printable Object Collection (POC) organizes a list of references to objects (typically, a subset of the Plant or System Hierarchies) intended to be printed together to form a "book" of printed output. The list of objects is transient, and are preferably first generated using the Scope and Property Filter Rule objects before being used by a Report.

The POC uses its Scope and Property Filter Rules to populate itself with objects fitting certain criteria. They also apply an ordering to objects. All functionality for populating the object list lies within the POC class.

Object filtering happens at two different levels. First, objects are added to a temporary list that passes through the Scope Filter Rule. Then objects in the temporary list pass through the Property Filter Rules, and are added to the final list that is used by the Report.

Figure 40:
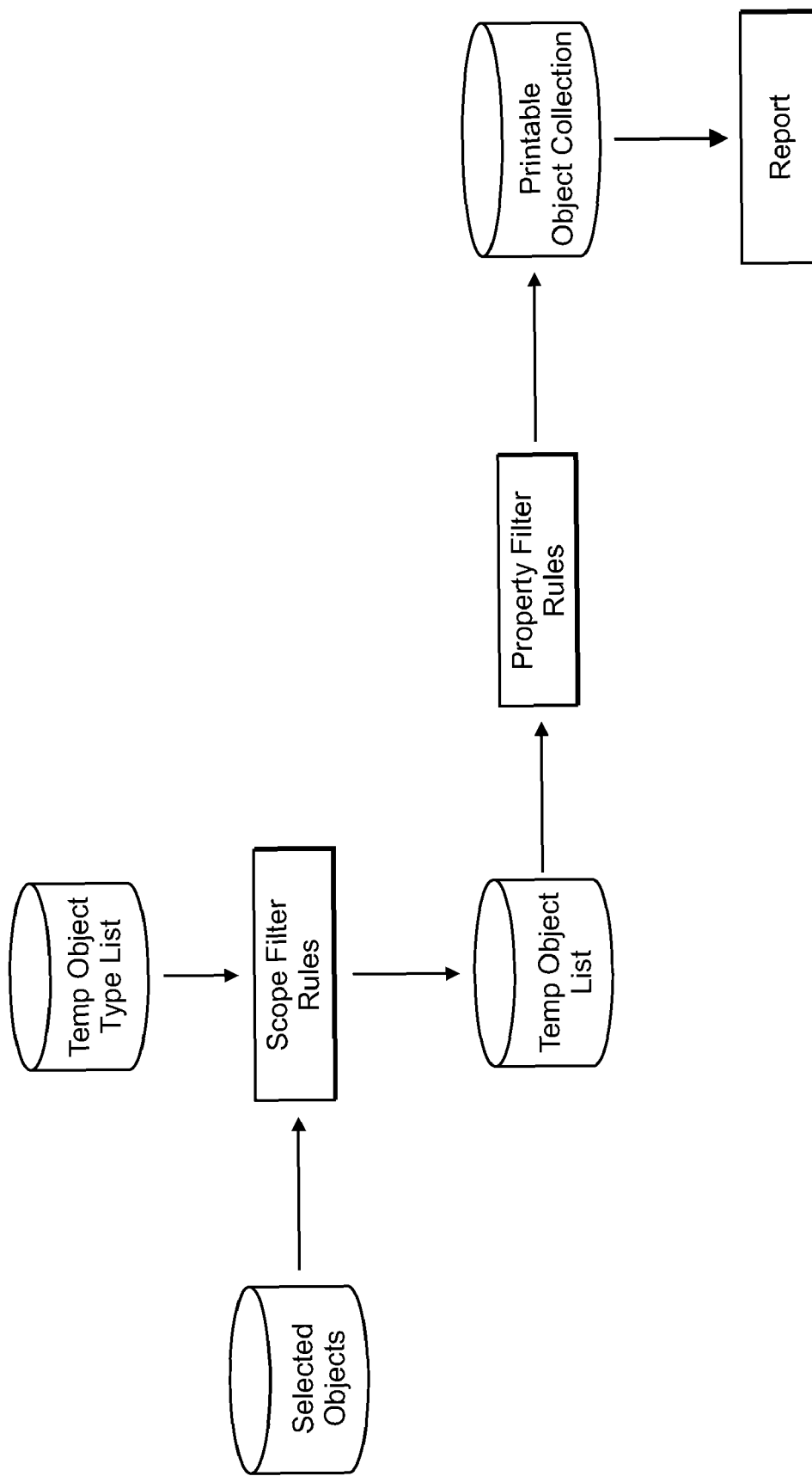
FIG. 40 depicts the application of filter rules to POC in a system according to the invention.

As shown in FIG. 40 the following steps are taken to filter objects based on scope:
1. A temporary Object Type list is generated, containing each Object Type associated with the Report to which the POC belongs. The Object Types consist of those that all Report Templates in the Report have in common that do not derive from any of the others in the list.
2. If the Scope Filter Rule's list is empty, the tree root object is added to it temporarily.
3. For each Object Type in the temporary list, the following steps are taken:
    a. Each object in the Scope Filter Rule's list matching this Object Type is added to the temporary list.
    b. Objects in the Scope Filter Rule's list that do not match this Object Type have their "children" searched recursively for those matching the type. Child objects matching this Object Type are then added to the temporary list.

The following steps are taken to filter objects based on property values:
1. Objects are added to the final object list if they evaluate correctly for each property filter expression in the Property Filter Rule.
2. If there is no Property Filter Rule, all objects in the temporary list are added to the final list.

The only object that is treated differently by the POC than other objects is the type that is a link to an Active Document object. These objects are added to the final object list during the POC's first pass through the Scope Filter Rule and are not affected by the Property Filter Rule.

1.7.1.2 Property Filter Rule

A Property Filter Rule acts to populate a Printable Object Collection (POC) by specifying one or more property filter expressions that preferably evaluate correctly for each object in the POC's temporary list before it can be added to the POC's final list. Objects in the POC's temporary list are those that have passed through the POC's Scope Filter Rule. For properties of the rule that do not exist in an object being filtered, the filter expression evaluates correctly. This can only happen with expressions with type='ALL'. A single Property Filter Rule may be associated with more than one POC.

The Property Filter Rule object's parameterized properties map a Property Name to a structure holding a Filter Value, Object Type, and an Expression defining the property value's relationship to the filter value.

Example: The Property Filter Rule with Property Name="Block Name", Expression="=", Filter Value="FID*", and Object Type="I/A Blocks" will limit "I/A Block" objects in the POC to those whose Block Names match the pattern "FID*".

1.7.1.3 Scope Filter Rule

A Scope Filter Rule acts to populate a Printable Object Collection (POC) by specifying an ordered list of objects that are searched (or whose children are searched) for those matching a specific type. Objects matching this type are added to the POC's temporary list and are further filtered by the POC's Property Filter Rule before being added to the POC's final list. The objects in these lists remain in the order they were added and are subsequently printed in this order by the Report associated with the POC. A Scope Filter Rule can also contain a type of object that is a link to an Active Document object. These objects are treated a little differently by the POC.

1.7.1.4 Report

A Report is an association between a Printable Object Collection (POC) and a list of Report Templates. It is a Parameterized Object maintained in a list by the Report Manager. Report names are preferably unique within the scope of the Report Manager.

In a Report, the POC contains a list of objects that are to be printed, and the Report Templates describe how they are to be printed. If no objects in the POC match an Object Type associated with a given Report Template, then no object will be printed. The Report preferably initializes the POC before getting the objects to print.

A Report maintains default Print Specifications (i.e., paper size, orientation, etc.) that are configurable by the user. If the job is either quick printed using the print toolbar button or printed as part of a batch print job, the stored Print Specifications are used. These default specifications may be overridden by the object type-specific Print Specifications associated with a Report Template within the Report.

1.7.1.5 Print Specification

A Print Specification physically describes how printable views of objects should be printed. It includes:

The physical description of the paper size and type (not to be confused with the logical paper size and type which is described by the sheet template attached to the printable view)

The orientation of the printing to the paper (landscape, portrait, or natural)

Whether the logical view should be tiled onto the physical paper, or sized to fit the paper Reports have a default Print Specification which may be overridden by the Print Specification associated with a Report Template. If an object is of a type having a Print Specification, these override all others during printing. All instances of Print Specifications except those belonging to an Object Type can be edited by the user.

Print Specifications are used with the following precedence (from high to low in order of importance):

1. Object Type Print Specification

2. Report Template Print Specification

3. Report Print Specification

Individual specifications within a Print Specification can be overridden.

Example: An Object Type may specify that it needs to be printed out with a Landscape paper orientation, and a certain width and height, but it may accept the default Sheet Template associated with the Report Template.

Every Print Specification has a Sheet Template that is used to provide a background for report pages.

Instead of the Report having a hard coded Print Specification that needs to be overridden by each Report Template, the Report Manager can have a default Print Specification associated with it that is applied to newly created Report objects. This allows users to go to a single location to configure the default Print Specification for each new Report that will be created.

1.7.1.6 Report Template

All instances of Report Templates in the system are maintained in a list by the Report Manager and preferably have unique names identifying them. There are three types of Report Templates all deriving from the Report Template base class: Graphical Report Templates, Tabular Report Templates, and Composite Report Templates.

Report Templates have one or more Object Types associated with them that determines what objects the Report Template can be applied to, forming legal relationships.

A Report Template may maintain a default Print Specification (i.e., paper size, orientation, etc. . . . ) that is configurable by the user. This Print Specification overrides those associated with the Report when printing objects. The objects themselves are associated with an Object Type which may have a Print Specification that in turn, overrides the one specified by the Report Template. The Object Type's Print Specification is not editable.

A number of Standard Report Templates are included. These include implementation-standard Graphical and Tabular Report Templates that are provided as read-only templates. With these templates, users are able to report data for any objects in a number of practical formats. Users also use these Standard Report Templates to build custom Composite Report Templates.

1.7.1.7 Graphical Report Template

A Graphical Report Template is a Report Template that represents a fixed association between its object types, and a set of object type-specific rules for printing (Object Type Rules). This type of Report Template prints objects as "What-You-See-Is-What-You-Get" (WYSIWYG) reports—the same way they are seen from within the graphical editor.

A Graphical Report Template also maintains print sequence information. This information includes the order print views should be printed in, and whether objects get printed consecutively with each of their views, or grouped by view. In some embodiments, users will be able to create an editable copy of a Graphical Report Template.

1.7.1.8 Object Type Rules

Object Type Rules specify how objects with a specific Object Type should be printed. It names the Object Type, and lists the named print views that should be printed.

Object Type Rules provide the following information: the default print view for the Object Type; specific named views to be printed for the Object Type; and all print views registered for the Object Type.

1.7.1.9 Tabular Report Template

A Tabular Report Template is a Report Template that represents a dynamic relationship between presentation information, and a query responsible for populating the presentation to be printed. Unlike a Graphical Report Template that is only concerned with static WYSIWYG representations of individual objects, Tabular Report Templates combine the information about many objects into one Crystal Reports report that can be sorted and grouped as desired.

1.7.1.10 Presentation Object

The Presentation object contains information about how to retrieve the data to be printed, and how to print it out as a Crystal Reports report. It also specifies how the data should be grouped.

The Crystal Reports report expects to find data in a fixed "n×n" array. It uses this data to populate itself in its persisted format.

Example:

| | Name | Sequence code | Block Count |
|---|---|---|---|
| Loop1 | Primary Loop | 1 | 3 |
| Loop2 | Secondary Loop | 2 | 5 |
| Loop3 | Tertiary Loop | 3 | 2 |

A Presentation object for a Tabular Report Template that prints loop object information may retrieve data for the "Block Count", "Name", and "Sequence Code" properties of each loop object. It would then put the data into a 3×Loops array with the properties in the order "Name", "Sequence Code" and "Block Count". The report can be persistently formatted to sort the object by "Name", or saved with no grouping information so that it can be grouped on the fly by the Presentation object.

If the user can customize how the data in the report is grouped, the Query object for the Tabular Report Template indicates the properties that the user can group by. The user could choose to sort loops by "Block Count" rather than by "Name". The Presentation object has a list of object type and/or property names that it uses to retrieve data from the objects contained in the report. The data is then organized into an "n×n" variant array passed to the Crystal Reports report.

1.7.1.11 Query Object

The Query object contains information to be used for selecting the data to be printed, and also specifies what aspects of the query are user configurable. Most of the user configurable aspects of the query pertain to Filter Rules, but some are formatting rules that apply to the Presentation Object.

A Query object contains the following information:
Required expressions to be added to a Property Filter Rule at runtime used to filter objects included in the report.
Limitations on what expressions users can specify in the Property Filter Rule used to avoid conflicts with required expressions.
The names of properties that the data in the report can be grouped by used by the Presentation object.

Example: A Query object for a Tabular Report Template the prints loop object information can impose a Property Filter Rule expression that only loops with more than 10 blocks are to be in the report. The expression would be added to the Property Filter Rule of the Report's Printable Object Collection (POC) at run time.

The Query object may impose limitations on what properties of the object can or cannot have user-specified Property Filter Rule expressions. Example: For the Query object in the previous example, the "Block Count" property on the loop may be designated as one for which a user cannot specify a Property Filter Rule expression. If a Property Filter Rule supplies one, a warning will be displayed, and the rule will be ignored at run time.

Similarly, the properties by which the report can be grouped will be limited to those that actually appear in the report and may have additional constraints. Example: A Query object that imposes a filter on objects requiring them to have a specific property value would not allow sorting or grouping on this property.

1.7.2 Using the Report Manager

This section clarifies how objects in the Report Manager are created and used through the IDA applications graphical user interface.

1.7.2.1 Property Filter Rules

1.7.2.1.1 Creating Property Filter Rules

Figure 41:
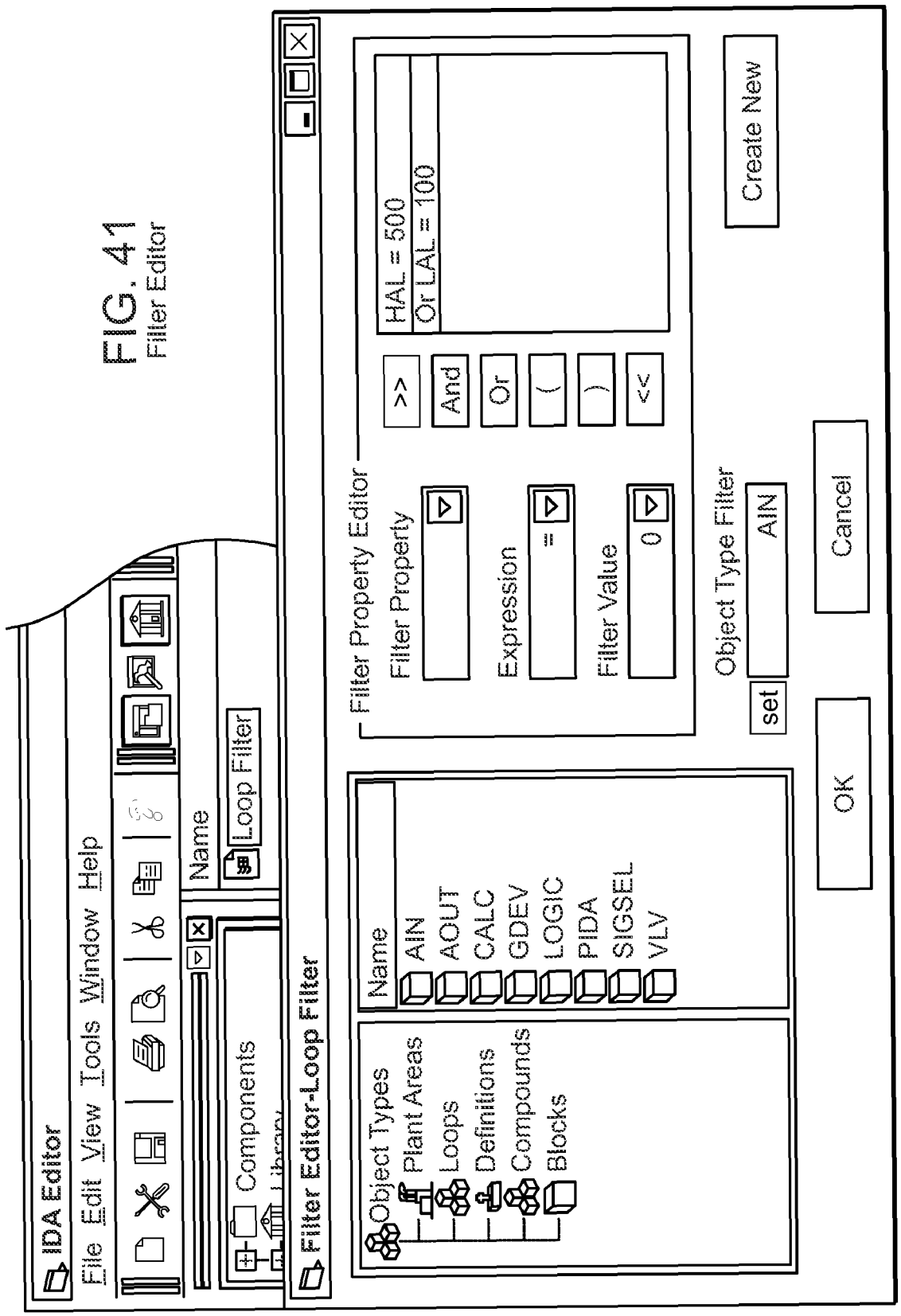
FIG. 41 depicts a filter editor in a system according to the invention.

When a new Property Filter Rule is created, it is added as a child to the "Filters" folder with a default name and the Filter Editor is displayed (FIG. 41).

New Property Filter Rules can be created in the following ways:
Selecting "File|New|Filter" from the application menu.
Selecting the "Filters" folder from within the Report Manager node within the System Hierarchy, and selecting "New" from the pop-up menu.
Clicking on the "Create New" button inside the Filter Editor to make a copy of an existing filter.

1.7.2.1.2 Editing Property Filter Rules

Property Filter Rules can only be edited from within the Filter Editor, as depicted in FIG. 41. The Filter Editor dialog box allows the user to build an expression to evaluate against the property values of a parameterized object type. The Expression builder will let the user build simple nested expressions. In some embodiments, users may have the option of writing a custom expression as a Visual Basic style script to run against the object. This allows more complex relationships among properties of the object as well as child or parent objects.

The Filter Editor can be displayed in the following ways in order to edit an existing Property Filter Rule:
Double clicking the Property Filter Rule to be edited.
Selecting the desired Property Filter Rule in the System Hierarchy, then selecting "File Edit" from the application menu.
Right-mouse clicking on the Property Filter Rule then selecting "Edit" from the pop-up menu.
Clicking on the "Edit Filter" button inside the "Filter" tab of the Report Editor.

1.7.2.1.3 Deleting Property Filter Rules

Property Filter Rules can be deleted in the following ways:
Selecting the Property Filter Rule to delete, then selecting "Edit|Delete" from the application menu.
Right-mouse clicking on the Property Filter Rule and selecting "Delete" from the pop-up menu.

1.7.2.2 Composite Report Templates

1.7.2.2.1 Creating Composite Report Templates

Only legal Composite Report Templates are created. If the user tries to create an invalid one, a warning is displayed and the operation is aborted. Newly created Composite Report Templates are added as children to the "Report Templates" folder in the System Hierarchy with a default name.

New Composite Report Templates can be created in the following ways:
Selecting "File|New|Report Template" from the application menu to create an empty Composite Report Template.
Right-mouse clicking on the "Report Templates" folder in the System Hierarchy, and selecting "New" from the pop-up menu to create an empty Composite Report Template.
Selecting one or more existing Report Templates, then selecting "File|New|Report Template" from the application menu.

1.7.2.2.2 Editing Composite Report Templates

In some embodiments, users can only edit Composite Report Templates. In others, users are able to modify a copy of any existing Report Template. What the user is able to modify will be limited to what is allowed by the Report Template object itself. Composite Report Templates can be edited in the following ways: using the Composite Report Template Editor (FIG. 42); and drag and drop operations in the System Hierarchy.

Figure 42:
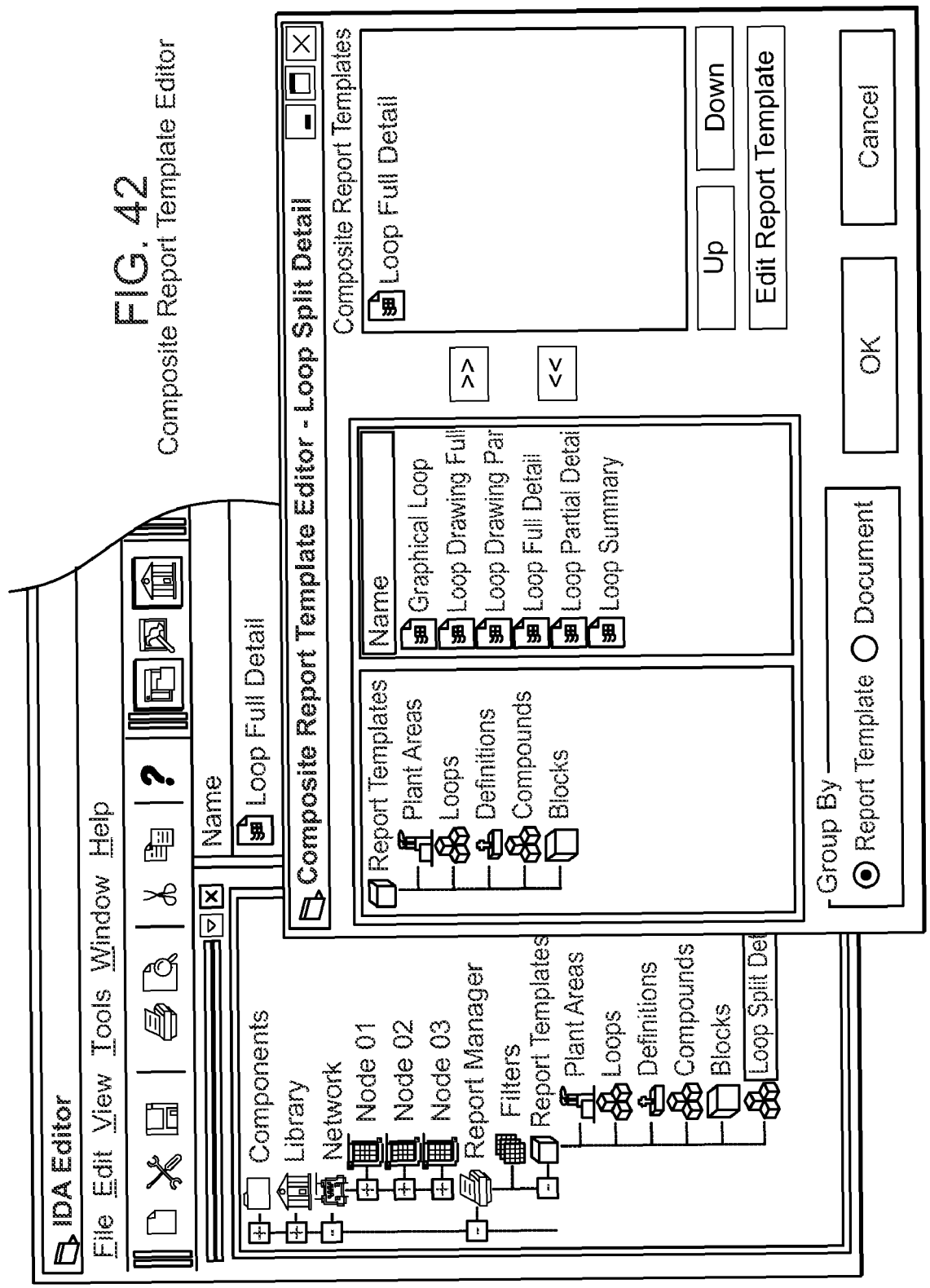
FIG. 42 depicts a composite report template editor in a system according to the invention.

The Composite Report Template Editor, depicted in FIG. 42, allows the user to add and remove Report Templates to and from the Composite Report Template. They can also change the Composite Report Template's template order and bring up the dialog box used to edit another template.

The Composite Report Template Editor can be invoked by:
Double-clicking the Composite Report Template
Selecting the Composite Report Template, and selecting "File|Edit" from the application menu Right-mouse clicking on the Composite Report Template, then selecting "Edit" from the pop-up menu Selecting the Composite Report Template to be edited inside the listbox control of the Composite Report Template editor, and clicking on the "Edit Report Template" button.

1.7.2.3 Reports

1.7.2.3.1 Creating Reports

New Reports are added as children to the "Reports" folder in the System Hierarchy with a default name. New Report objects can be created in the following ways:

Selecting "File|New|Report" from the application menu to create an empty Report

Right-mouse clicking on the "Reports" folder and selecting "New" from the pop-up menu to create an empty Report Selecting one or more Report Templates, then selecting "File|New|Report" from the application menu Selecting one or more objects and dropping them onto a Report Template

1.7.2.3.2 Editing Reports

Reports can be edited in the following ways:

Using the Report Editor

Drag and drop operations in the System Hierarchy

Figure 43:
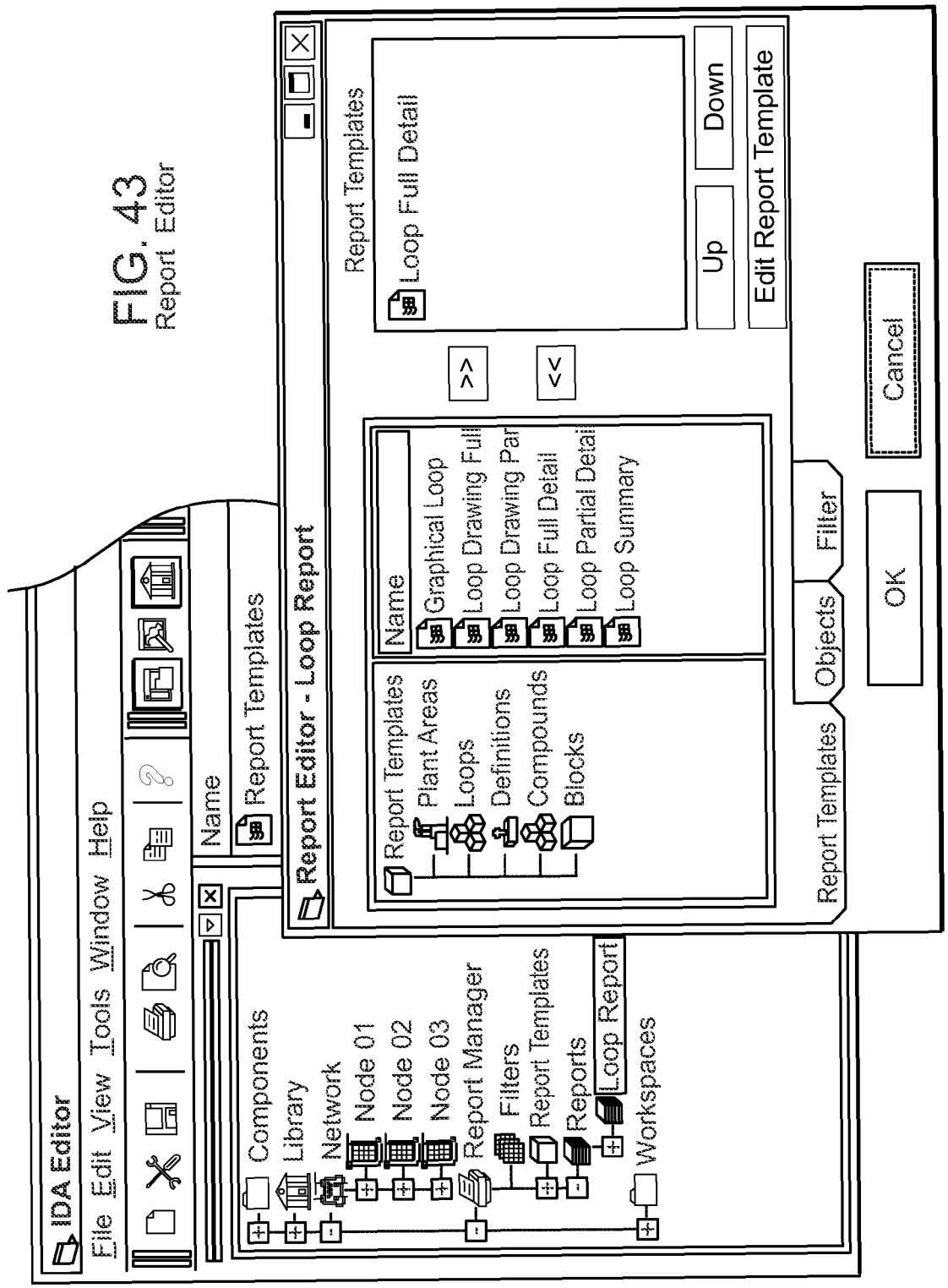
FIG. 43 depicts a report editor in a system according to the invention.

The Report Editor, depicted in FIG. 43, allows the user to add and remove Report Templates and objects to and from the Report. They can also pick the Filter to use for the Report and bring up the dialog box used to edit the filter.

The Report Editor can be invoked in the following ways:

Double-clicking on the desired Report in the System Hierarchy

Selecting the Report, then selecting "File|Edit" from the application menu

Right-mouse clicking on the Report, then selecting "Edit" from the pop-up menu

1.7.2.3.3 Printing Reports

When a report is printed using the menu, the user can change the print setup and output printer as well as specify what parts of the Report to print. Print settings for a Report can be edited by selecting the Report, then selecting "File|Print Setup" from the application menu.

A Report can be print previewed by selecting the Report, then selecting "File|Print Preview" from the application menu.

A Report can be printed in the follow ways:

Selecting the Report, then selecting "File|Print" from the application menu

Selecting the Report, then clicking the "Print" button on the application toolbar Users may also create and immediately execute temporary Reports by direct manipulation of the objects within the Plant and System hierarchies. Note that the default functionality when objects are dropped on a Report Template with the left mouse button is to create a new Report in the Report Manager.

1.7.2.4 Organizational Folders

1.7.2.4.1 Creating Folders

Figure 44:
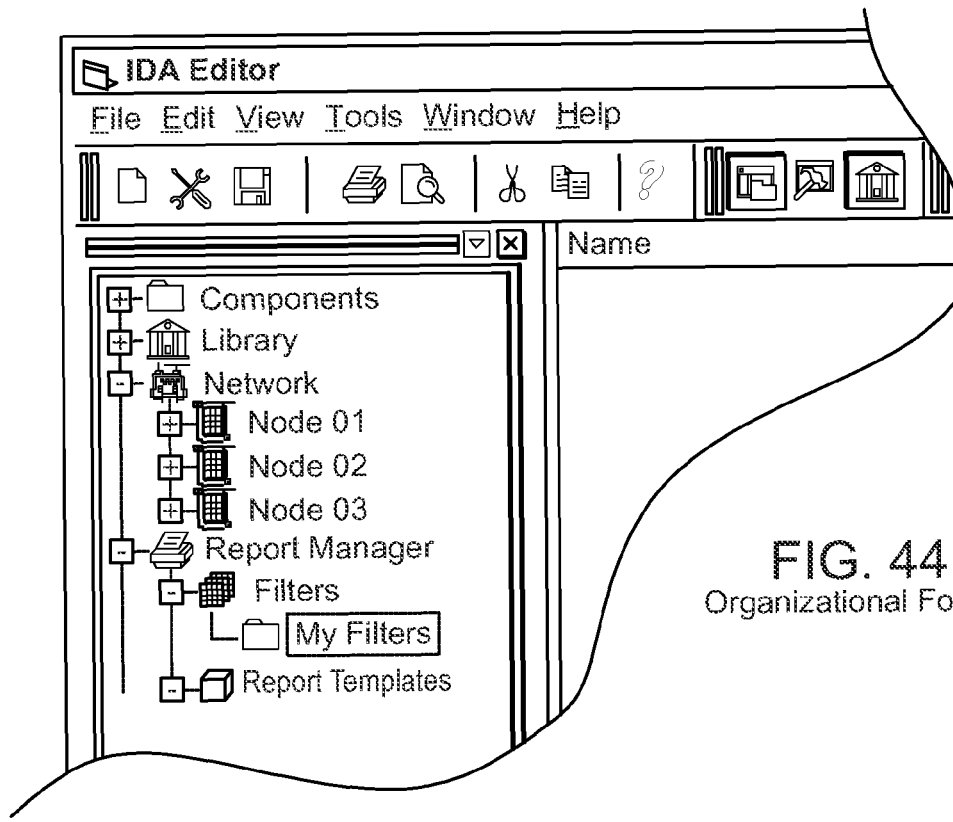
FIG. 44 depicts organizational folders in a system according to the invention.

When users have to keep track of a number of Reports, Report Templates, and Filters that they have created, it is convenient for them to be able to organize them into folders, accessible from the System Hierarchy (FIG. 44). New folders can be created as children of the "Report Templates", "Reports" and "Filters" folders. Users can then move any Report, Filter, and user created Report Template objects around inside their respective parent and user folders but cannot move them to any other parent or user folder. Standard Report Templates cannot be moved.

New organizational folders can be created in the following ways:

Selecting "Report Templates", "Report", or "Filters" folder in the System Hierarchy, then selecting "File|New|Folder" from the application menu Right-mouse clicking on "Report Templates", "Reports", or "Filters" folder, and selecting "New Folder" from the pop-up menu

1.7.2.4.2 Deleting Folders

Only empty folders can be deleted. Standard Report Template folders cannot be deleted.

1.8 Version Control

Version control in IDA provides the ability for the system to record changes made to the control database. It allows the user to be able to tell what the state of the system is now, what the state of the system was at a specific time in the past, and the history of changes made to a specific object over time. With IDA version control, the change history of an object is tracked from the moment it was created through its current version.

The IDA system does this by capturing versions of the objects which make up an IDA configuration, and providing methods to trace the genealogy of those objects forwards and backwards throughout the entire genealogy representing each object's life cycle.

1.8.1 Basic Concepts

Before presenting the object model which has been designed for IDA's version control system, a few basic concepts need to be presented in order to provide a common base of terminology.

Figure 45:
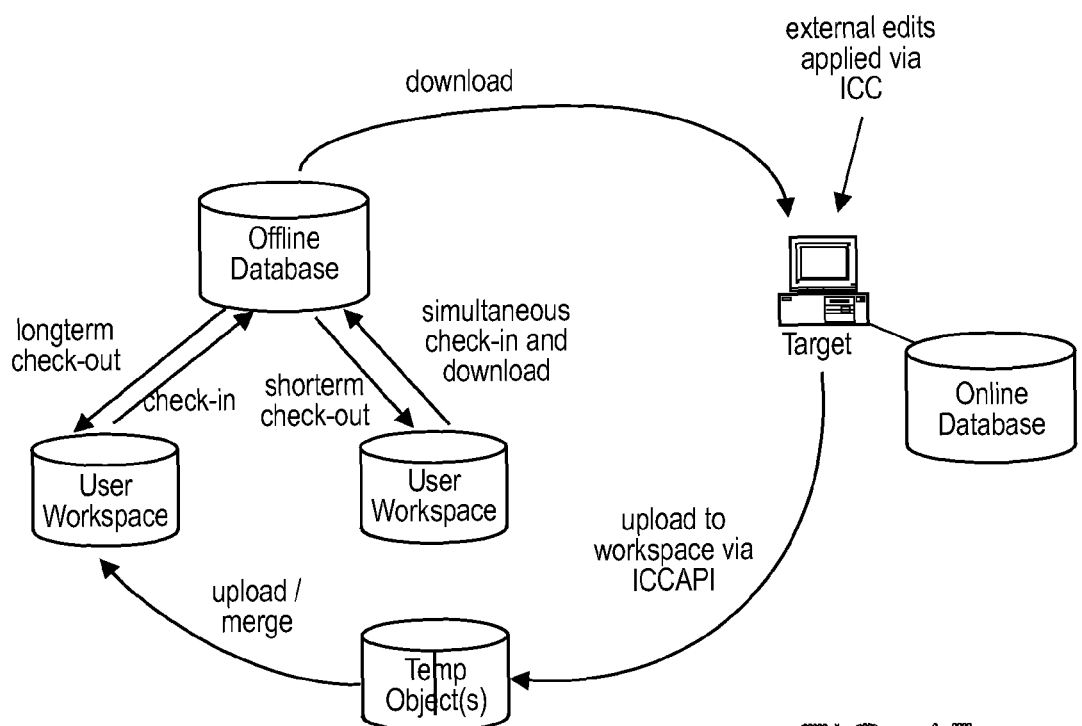
FIG. 45 depicts version control basic concepts in a system according to the invention.

IDA version control may be conceptualized as two separate databases (an Offline and an Online database) as depicted in FIG. 45 with the user being able to make edits in either database. Synchronization processes are run in order to keep the two databases in synch with each other.

1.8.1.1 Offline Database

Referring to FIG. 54, the offline database contains the configuration data that forms the basis for the configuration contained in the online, or running, database. A common scenario for a user would be to lock one or more objects in the offline database (check-out), edit them in a personal workspace over the course of several hours or days, then place the changes back into the offline database (check-in). Objects that have been modified in the offline database are then manually downloaded to the target hardware.

Another scenario for editing objects may occur when the user edits a small amount of data, such as a single block parameter. In edits such as these, the object will be implicitly checked-out, without the user being aware, and edits performed on the object(s). When the user is finished editing the object(s), a simultaneous check-in/download process is initiated by the user. Edits such as these are meant to cover a short period of time (e.g., minutes) rather than an edit session spanning several hours or days.

In either scenario, the download process is responsible for compiling the modifications to ensure that the edits are valid, and for actually downloading the new data to the appropriate control processors. If either the compile or the download to the control processor(s) fails, then the entire download process is rolled back.

1.8.1.2 Online Database

The online database contains the configuration data that has been downloaded from the offline database, and represents that data which is currently running on the control processors. The database, in this case, is not in the same form as that in the IDA database (i.e., it is not an OODBMS), but rather is in a form, e.g., typically proprietary, understandable by the target. As mentioned previously, data is downloaded from the offline database in a separate process, and compiled to ensure that it is valid for the target processor.

In one embodiment, the user modifies the online database via an external process (not shown). When edits to the online database are done in this manner, they become out of synch with the corresponding objects in the offline database. In order to synch the databases back up again, a manual upload process is performed. In this procedure, data is copied to a temporary work area, then compared to the objects which are currently in the offline database. Users will manually decide which objects need to be uploaded using a version compare utility provided by the Framework.

1.8.1.3 User Workspace

Users access the IDA system via an editing session. Changes made to IDA database objects accumulate in the user's private edit space, referred to as a user workspace. The user workspace may be thought of as a "mini-database", containing a subset of the objects contained in the database being modified.

To make a modification to one or more objects, the user locks the object(s), reserving a copy of the current version of the object(s), and placing this copy into the user's personal workspace. This copy cannot be seen by other users of the system. Once locked, an object is only available for read access by other IDA users. Attempts by other users to modify the object will result in a dialog box being displayed indicated that the object is checked-out, and by whom.

The process of locking the object and placing a copy of it into a personal workspace is often referred to as checking an object out for edit, or simply check-out.

There are essentially two ways that a user can lock an object.

- An object which is not yet checked out can have a lock applied implicitly whenever the user starts to edit it. As long as the object is not already locked by another user, this lock will be performed automatically.
- An object can be explicitly checked out, automatically causing a lock to be applied.

When the user finishes editing the object(s), they are preferably placed back into the appropriate database in order for other users to be able to see the modifications. This act of placing edited objects back into the database is referred to as a commit, or check-in, process. During the check-in process, the user may elect to keep the object locked, or to release the lock completely, thereby allowing other users to modify it once the act of check-in is completed.

An object which has been checked-out may also be explicitly unchecked-out. This action will release the lock on the object, and discard any changes made to it since the last check in. Once unchecked-out, an object will be automatically removed from the user's workspace, and once again become editable by other IDA users and processes.

1.8.2 Versioning

As mentioned previously, the various versions of an object could be thought of as multiple self-contained databases (e.g. offline, online) which contain full copies of the configuration, and occasionally need to be synchronized in order to ensure that edits performed against one database become known in the other.

In reality, the different databases actually simply represent a different state, or version, of an object, each version being represented by a distinct instance of the same object. Integral to this is the concept of the identity of an object. An object's identity (or its address in the database) preferably remains constant throughout the lifetime of the object. If an object's identity was allowed to change as edits were performed against it, it would quickly become difficult to maintain referential integrity, since everywhere that object was referenced would need to be changed. In some embodiments, object ID's (OID's) are as a means of uniquely identifying an object in the database, rather than the pointer or reference which is inherent with the OODBMS

1.8.2.1 Check-Out

FIG. 46 depicts an object which was created in the offline database, and has not undergone any modifications (e.g., only version 1.0 is "officially" recognized). A user has checked-out the object (either implicitly or explicitly), causing an IDA-specific Checked-Out attribute to be set on version 1.0 of the object. Once an object is checked-out, the user may make one or more modifications to it, causing the information to be stored in the database as version 2.0 of the object, and an edit stamp is created which captures the user-id (among other things) of the user who is performing the changes. At this point, the object may be considered to be in the user's personal workspace.

It is important to note here that version 1.0 is still the current object, and that version 2.0 is only visible to the user who has checked the object out for modification. This is done primarily via user ID comparison between the user ID of the user attempting to access the object, and the user ID contained within the edit stamp.

Until version 2.0 is checked-in, the user may explicitly release the lock on the object being modified via the Revision Editor. When this occurs, all accumulated changes made to that point are discarded, the edit stamp is destroyed, and the Checked-Out attribute of the original object is reset.

1.8.2.2 Check-In

Figure 47:
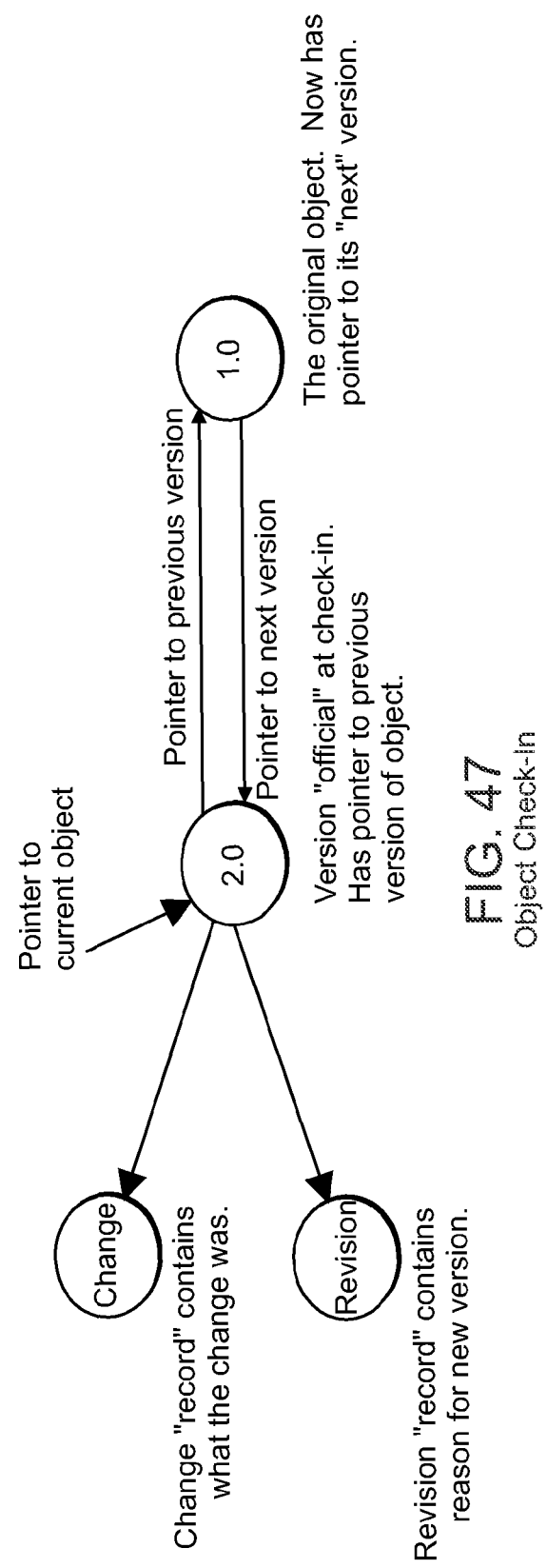
FIG. 47 depicts an check in a system according to the invention.

At check-in (as depicted in FIG. 47), version 2.0 of the object now "officially" exists, and both versions 1.0 and 2.0 get pointers to each other updated, effectively creating a doubly-linked list to allow traversal of the version tree for this object. Note that a pointer to the current object now returns version 2.0, and not version 1.0. At check-in time, the user may optionally keep the Checked-Out attribute on the object set. Other users now see the modified version, but are prevented from making edits. If the attribute is reset, the edit stamp previously associated with the object is destroyed.

During a "manual" check-in process, the user is prompted for two additional items of information:

1. For each object being checked-in, the user supplies what change has occurred to the object to satisfy the reason for the new version. Only one change "record" will be associated with each object being checked-in.
2. The user is asked for a reason the check-in is occurring—i.e., the reason for the revision. The same revision "record" will be associated with all objects being checked-in.

This information will be generated automatically during a minor edit, such as when the user modifies a parameter value.

The Framework provides the application developer the methods necessary to "walk" the version tree for any versioned object, and to extract the change and/or revision associated with any particular version of the object.

1.8.2.3 The Revision Editor

The Revision Editor permits the user to: see a list of all objects currently checked-out; record modifications, or changes, made to individual objects; record a reason for having modified one or more objects (a revision); explicitly release locks on one or more objects currently checked-out; and initiate a check-in of one or more objects.

Figure 48:
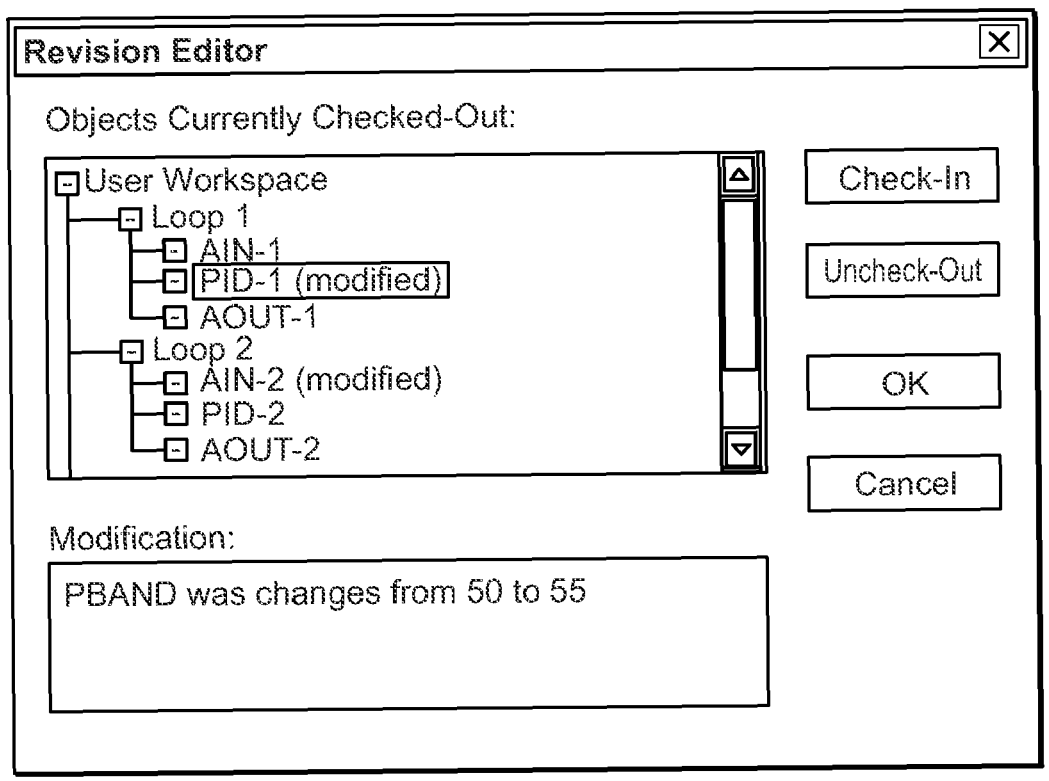
FIG. 48 depicts a revision editor in a system according to the invention.

A sample user interface for the Revision Editor appears in FIG. 48.

When the user is ready to check objects back into the database, or unlock objects that have previously checked-out, the Revision Editor is invoked. This editor displays a list of objects which the user currently has checked out. As objects are modified, the actual modification made to the object can be recorded by selecting the desired object, and entering the change in the edit window labeled "Modification." At check-in time, if the object(s) hasn't had a change description filed for it, the user will be prompted to supply that information on a per-object basis.

All the edits which have been performed against an object prior to check-in can be discarded by selecting the desired object(s), and choosing the "Uncheck-Out" button. This effectively deletes the edit copies of the object(s), and their associated edit stamps. The Checked-Out attribute of the original object is also be reset to indicate that the object is no longer in a checked-out state.

Figure 49:
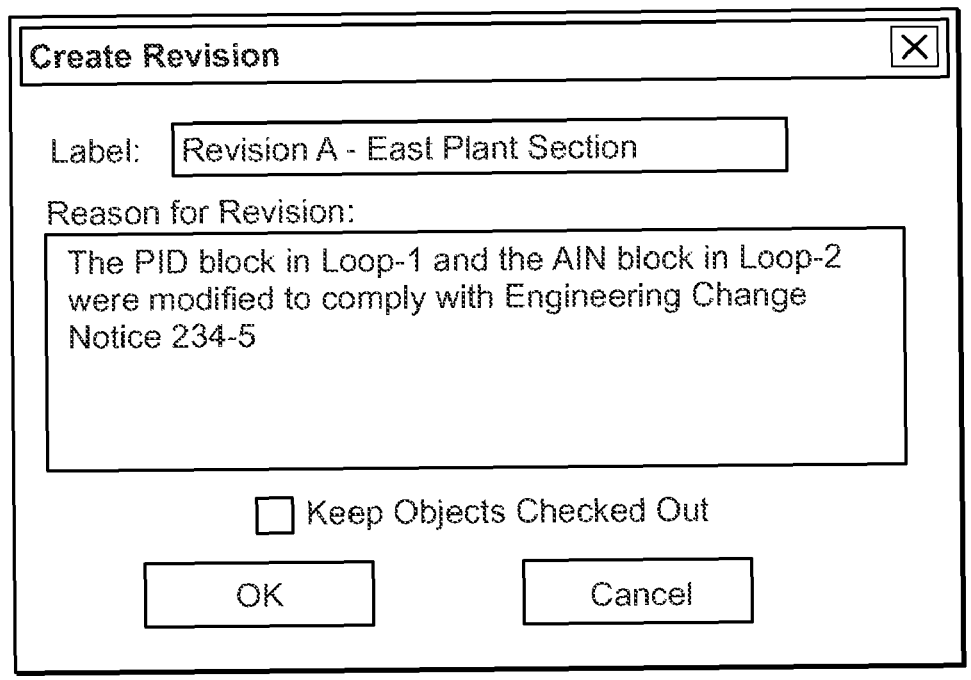
FIG. 49 depicts a create revision dialog box in a system according to the invention.

To check an object in, the "Check-In" button on the Revision Editor is selected, resulting in the display of the dialog box depicted in FIG. 49. This dialog box prompts the user to supply a label and a "Reason for Revision:" in the edit box. When the user selects "OK", the new version of the object officially becomes the current object, and the previously current object moves downward in the version tree as described in FIG. 47. Selecting "Cancel" on this dialog box will result in the cancellation of the revision process.

The user has the option of checking the "Keep Objects Checked-Out" checkbox. If this is checked on when the user selects the "OK" button, the Checked-Out attribute of the new version of the object stays set. If the user does not select this checkbox, all locks to the objects are released after check-in, and the edit copy and time stamp associated with the object are deleted.

1.8.2.4 A Versioning Example

Taking versioning one step further, there can be several versions of the same object existing all at the same time (although not all in the IDA database). These versions include: the current offline image of the object; the current online image of the object; an online edit session image of the object; and multiple previous versions of the object (one of which may be the current online image of the object).

Figure 50:
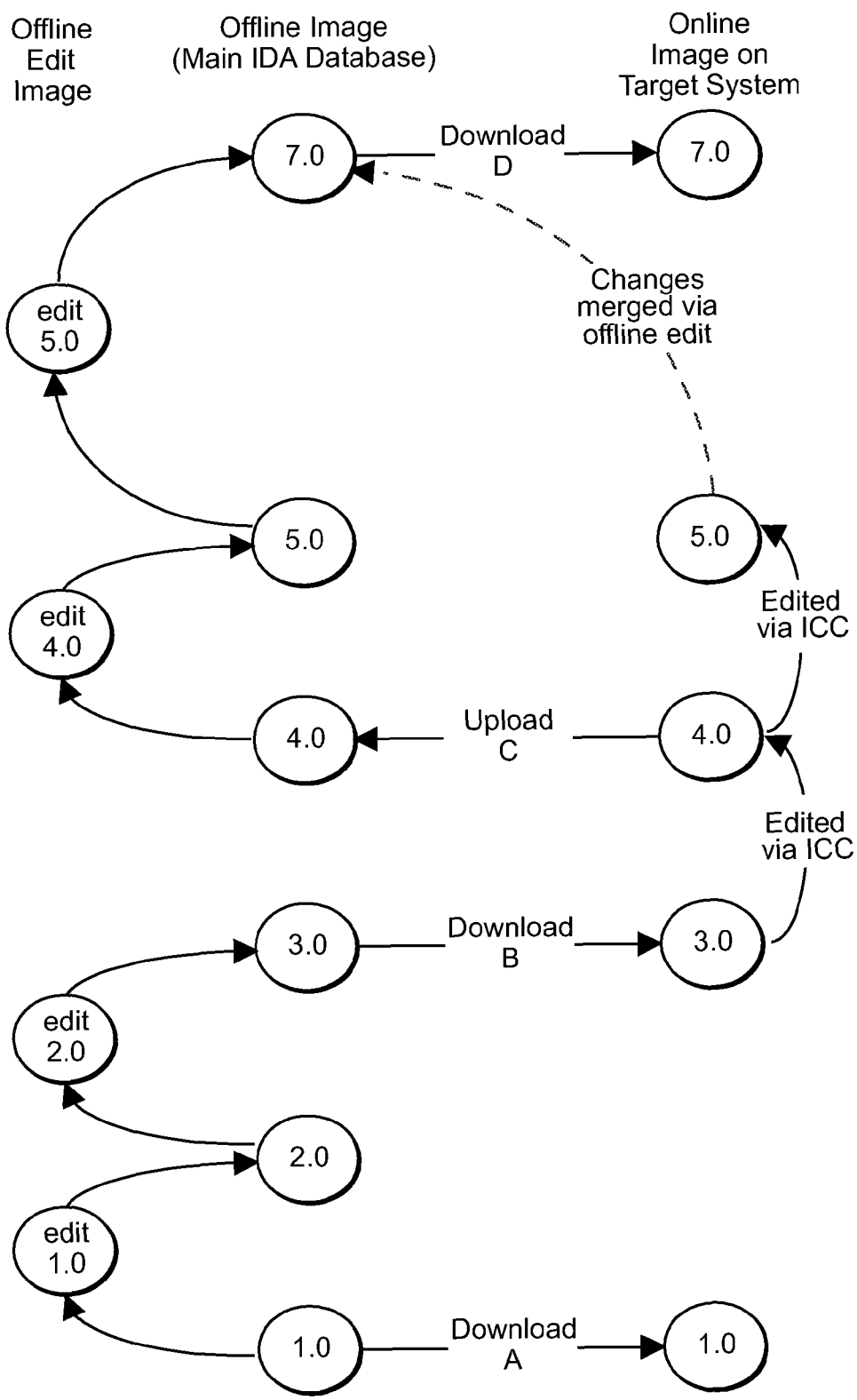
FIG. 50 depicts parameterized object versions in a system according to the invention.

These versions are represented in FIG. 50.

FIG. 50 (which reads chronologically from bottom to top) illustrates an object undergoing various edits, each edit establishing a new version of the original object. The object is created (version 1.0), and is then downloaded (Download A) to the target, synchronizing the online image with the offline. The user then makes a change to the object in an offline edit session, then performs a check-in, which creates version 2.0. At this point, the online and the offline images are out of sync. Another offline edit produces version 3.0, which is then downloaded to the target (Download B), and the images fall in sync again.

To illustrate another type of change, the online version is edited via an external process, which produces version 4.0 of the object. Even though the user is able to change the object(s) in the running, or online, database via the external process, there is no sense of versioning on the target system. Hence, the external process is not aware that the object is going from version 3.0 to version 4.0—only that the objects are different. A new version number is shown in FIG. 50 only to visually emphasize that the object has been modified.

In order to synchronize the online and offline images, an upload (Upload C) is performed. The upload process actually places the object(s) in a temporary work file, and then changes which were done in the external process are manually inserted into a checked-out version of the same object which is in the user's workspace. The newly-modified object is now checked-in to the offline database, and the two images are now back in synch with each other.

To finish out the various scenarios in which edits can be made, changes can be made simultaneously to both the online and offline versions of an object. This is represented in FIG. 50 by an offline edit producing version 5.0, and an online edit producing version 6.0 of the object. Since edits have occurred in both versions, synchronization is impossible, and some type of merge operation will need to be done.

The merge operation is a manual process, which is represented by an offline edit which results in the creation of version 7.0 of the object. Once completed, the object is then downloaded again to the target (Download D), and the online and offline versions of the object are once again synchronized.

1.8.2.5 Version Propagation

There are a few cases where a change to an object will propagate to many other objects. They include block definitions, composite block definitions, and loop template definitions. When one of these definition objects is changed, the change preferably propagates to all the objects that use the objects definition to define themselves. A version and a revision will be made automatically for each of these objects.

A case can be made in limiting these types of changes to the offline database. It is doubtful that a change made to a definition should be automatically "rippled" into a running, online database with potentially disastrous effects.

1.8.2.6 Configuring while Disconnected

A feature of the IDA system is the ability to run the system locally on a computer, disconnected from the main IDA database. This feature is intended to allow users to continue configuration activities on computer systems temporarily disconnected from the main IDA database. Users can disconnect from IDA and continue configuring simply by making a copy of the entire IDA database onto their local drive, then disconnecting from the network. When the user begins a new IDA session, the temporary copy of the database will be opened.

Disconnected users can make changes concurrently with normally connected users, and may make changes which conflict with other users. As a result, when a disconnected user reconnects to IDA, a merge operation of some type is effected. That merge operation results in new versions of the edited objects, and that the versions will all be associated with a single revision.

When the user reconnects to the main IDA database, the consistency of the object ID's (OID's) is no longer guaranteed, since new objects may have been created while disconnected, and others deleted. A macro language, with a record macro feature, helps solve this problem. The entire disconnected session is recorded as a single macro, and at reconnection time, that macro is played against the main IDA database. Conflicts regarding the consistency of OID's can be minimized by using Globally Unique Identifiers (GUID's). A GUID is a 128-bit integer which is virtually guaranteed to be unique, and is based on the current date and time, an incremented counter, and a unique IEEE machine identifier.

The macro language is "smart" enough to assert that an object in the main IDA database is unchanged since the start of the disconnected session (e.g., by date), and handle the case where an object has changed. Similarly, the disconnected session playback stops when such a discrepancy is discovered, allowing the user to properly merge the change, and then continue on with the playback.

1.8.3 Version Control Object Model

Figure 51:
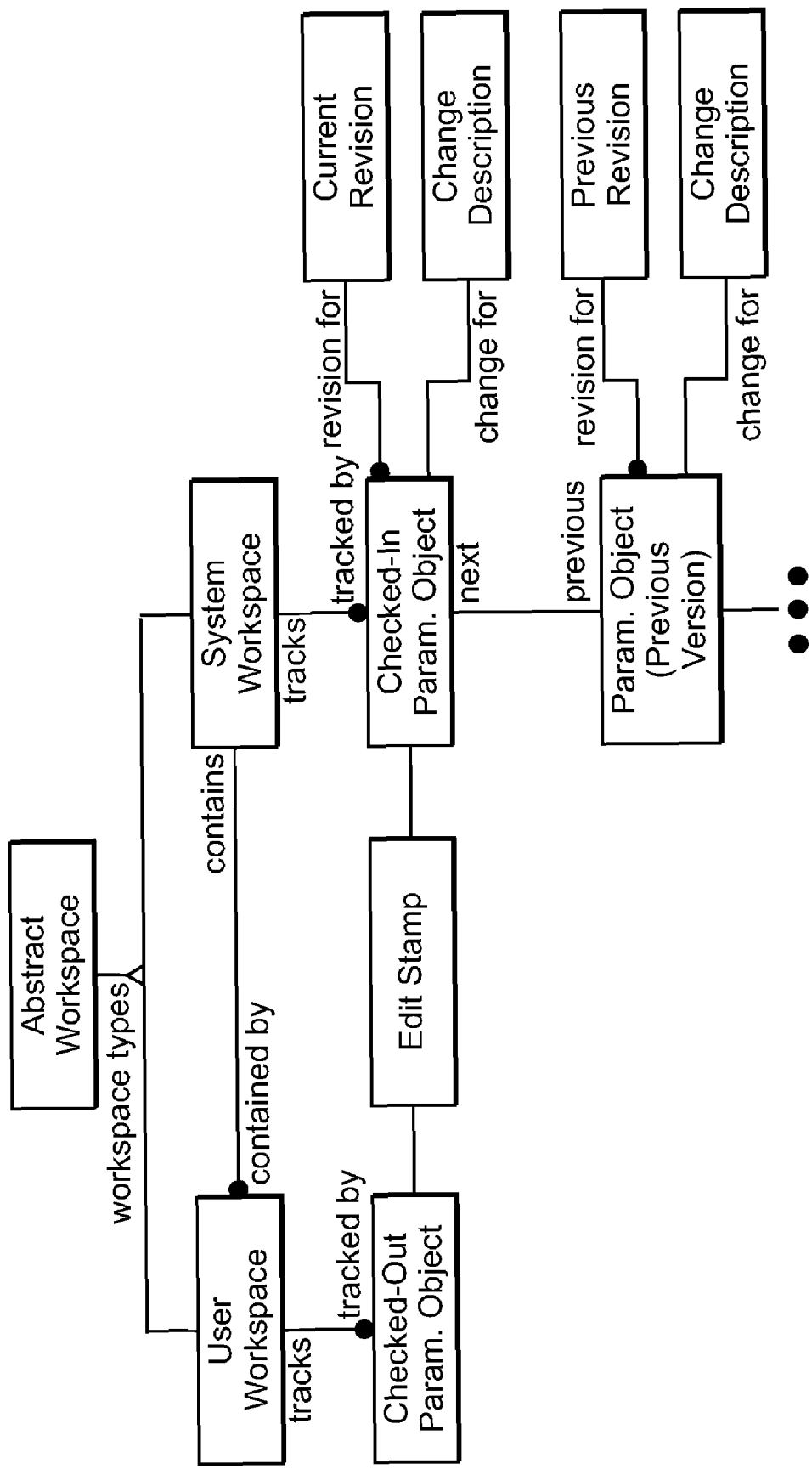
FIG. 51 depicts a version control object model in a system according to the invention.

To make a change to a Parameterized Object, the user checks it out into their own personal workspace. This may either be done explicitly by the user, or implicitly. When the first modification to the object is written back to the database, an edit copy of the Parameterized Object (and its associated parameters) is created. A temporary Edit Stamp containing the user ID of the user who checked-out the object is created, and associations made between the current version of the object, the Edit Stamp, and the edit copy of the object (FIG. 51).

During a user's IDA session, if the user ID does not match that of the user ID contained in the Edit Stamp, only the current version of the object will be visible. As the user modifies an object in his personal workspace, a description of the modification may be recorded, and associated with the object. Note that this provides the "how" of a modification, whereas the revision comment records the "why" of a modification. When the object(s) currently being edited are checked-in, the user is asked to provide a reason for the revision. This revision "record" is permanently associated with the version of each object that is created as a result of the check-in process.

1.8.3.1 Abstract Workspace

The Abstract Workspace class is used only to provide common data and/or methods to two specialized subclasses—the User Workspace, and the System Workspace. Being an abstract class, no instances of this class may exist. The purpose of an instance of the Workspace class is to maintain a list of Parameterized Objects which are contained within it.

1.8.3.2 User Workspace

The User Workspace object, one for each user in the IDA system, contains a list of all the objects which a user has checked out in their personal workspace. The User Workspace object provides a mechanism by which other processes can obtain a list of objects which have been checked-out by other users, since these checked-out objects would otherwise not be visible to anyone but the user who has the object(s) checked-out.

User Workspace objects are visible from the System Hierarchy tree view.

Relationships are:
  A User Workspace object is derived from the Abstract Workspace class.
  An instance of a User Workspace maintains a list of all the Parameterized Object that a user has checked-out from the main IDA database. This User Workspace object is created automatically when a user is established by Security Administration, and initialized to an empty state.
  As objects get checked-in, they get removed from the User Workspace object (unless the user keeps it checked-out), and added to the System Workspace object.

When being examined in the System Hierarchy, it is desirable to allow the User Workspace object "explode" to indicate all of the objects which are contained within it, representing all the objects that the associated user has checked-out.

1.8.3.3 System Workspace

There is only one instance of the System Workspace class in the entire IDA system. The System Workspace object contains two lists: one of all the User Workspaces in the system, and one containing a reference to all objects in IDA which have been checked-in, but not yet downloaded to a target platform. The second list is the one which will be referenced by the Download process developed by the Application group.

The System Workspace is visible from the System Hierarchy tree view. When "exploded", the System Workspace will display a list of all the User Workspaces contained within it.

Relationships are:
  The System Workspace object is derived from the Abstract Workspace class.
  There is a single instance of the System Workspace class in IDA.
  The System Workspace object maintains a list of all the User Workspaces which are in the IDA system. This list gets added to whenever a new user ID is added to the system via Security Administration.
  The System Workspace object maintains a list of all objects which have been checked back into the IDA database after being edited, but have not yet been downloaded. As objects get downloaded, the reference contained by the System Workspace object is removed.

1.8.3.4 Checked-Out Parameterized Object

An instance of a Checked-Out Parameterized Object is that version of the object which has been checked out into a user's workspace for editing purposes. This version of the object does not exist until the first time an update transaction against the object is committed to the database.

When an object is checked-out, an Edit Stamp object is created, containing the user-ID and a time stamp of the time of check-out. Until the object is checked-in, only the user with the same ID as the user-ID contained in the Edit Stamp will be permitted to see the edited version of the object. Other users will be able to see the current, or checked-in, version of the object.

When the edits for an object have been completed, they may be checked-in. At that time, the user has the option of releasing all locks on the object, or keeping the object checked-out. If all locks are released, the object is removed from the user's workspace, and is no longer in a checked-out state. If the user retains the checked-out status, other users can see the latest changes to the object, but with read-only access as before. Relationships are:
  A Checked-Out Parameterized Object is associated with an Edit Stamp, which indicates the date, time and user ID of the user who has locked the object.
  When an object is checked-out, a reference to it is placed within the User Workspace object, so that a complete list of all objects which are currently checked-out by the user are available simply by iterating over the contained references.
  Since a checked-out version of an object doesn't actually exist until the first change is written back to the database, all of the associations between then User Workspace, Edit Stamp, and Checked-Out Parameterized objects can't be created until then.

1.8.3.5 Edit Stamp

The Edit Stamp is basically the user identification, and a time stamp which indicates the time that a check-out occurred to a Parameterized Object. Once the user has committed an object being edited back to the database, this information is recorded in a Revision object.

Relationships are:

An Edit Stamp is associated with one, and only one, Parameterized Object which has been locked for edit.

1.8.3.6 Checked-In Parameterized Object

An instance of a Checked-In Parameterized Object is that version which corresponds to the last committed public version of the object. This version is the view that is open to the public whenever a Parameterized Object is extracted from the database.

A downloadable object which has been checked-in, but not yet downloaded to its target platform is in a state which needs to be made known to the application developer. An object is deemed as being "downloadable" at the time it is created via its association to instances of the Object Type class. A reference to these types of objects is added to the System Workspace object is added at check-in time. Downloadable objects associated with the System Workspace object are removed from the System Workspace once they have been successfully downloaded to their target platform.

When an object is checked-in, the reason for the revision is captured by the Revision Editor, and a Revision object is created and associated with the checked-in object. An object which is checked-in also has an instance of the Change Description object associated with it.

Relationships are:

A checked-in version of a Parameterized Object has a Revision association which reflects the user id, timestamp, and reason for the revision (who, when and why).

A checked-in version of a Parameterized Object has a one-to-one association with a Change Description object, which records what modification(s) were made to the object in order to create the associated revision.

A checked-in version of a Parameterized Object maintains a reference to its Previous Version, in support of the requirement to be able to "chain" down the version tree of any Parameterized Object. This would allow an application to get to a version of any object which existed at a certain point in time.

1.8.3.7 Parameterized Object (Previous Version)

The Previous Version of a Parameterized Object is that version which corresponds to the last previously committed public version of the object. Each Parameterized Object is aware of it immediate ancestor, and its immediate descendant, in the "genealogy" hierarchy. Relationships are:

A Previous Version has a Revision association which reflects the user id, timestamp, and reason for the revision (who, when and why).

A Previous Version maintains a reference to its Previous Version, in support of the requirement to be able to "chain" down the version tree of any Parameterized Object. This allows an application to get to a version of any object which existed at a certain point in time.

A Previous Version maintains a reference to its Next Version, in support of the requirement to be able to "chain" down the version tree of any Parameterized Object. This allows an application to get to a version of any object which existed at a certain point in time.

As with the checked-in version of the object, a Previous Version also maintains references to the associated Revision and Change Description object(s).

1.8.3.8 Revision

A Revision object contains data about who created the revision, a timestamp when the revision occurred, and the reason for the revision. A Revision object also contains a text field explaining the nature of the revision. Relationships are that one Revision object exists for each version of each Parameterized Object in the database. Multiple Parameterized Objects can reference the same Revision object.

1.8.3.9 Change Description

A Change Description object contains a description of the modification(s) made to an object in support of the associated Revision level. Relationships are that one Change Description object exists for each version of each Parameterized Object in the database. Change Descriptions are unique, and may not be applied to more than one Parameterized Object.

1.8.4 Version Administration

1.8.4.1 Version History

When an object is selected, the user can view its version history. The Framework provides a utility to display that history, in a user interface similar to FIG. 52.

Figure 52:
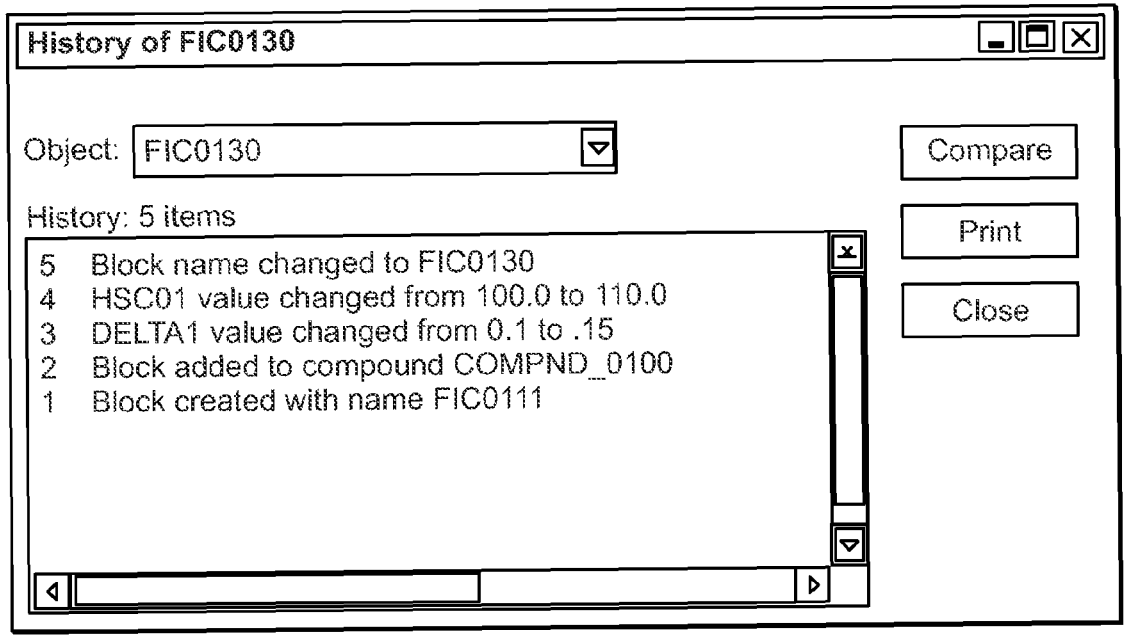
FIG. 52 depicts a version history in a system according to the invention.

If two or more objects are selected, the user needs to select the desired object from the combobox provided in the dialog box shown in FIG. 52. Once selected, the version history associated with the object will appear in the scrolling listbox. Each line in the listbox represents a different version of the object, with the modification (or revision label), e.g., ordered from new to old. By highlighting two items listed (they may be non-contiguous), the user may select the "Compare" button and obtain a comparison between the two selected versions (see next section). Lastly, the user may obtain a report of the versioning displayed in the listbox by selecting the "Print" option, and obtain an output similar to that shown in FIG. 56.

1.8.4.2 Version/Object Comparison

Figure 53:
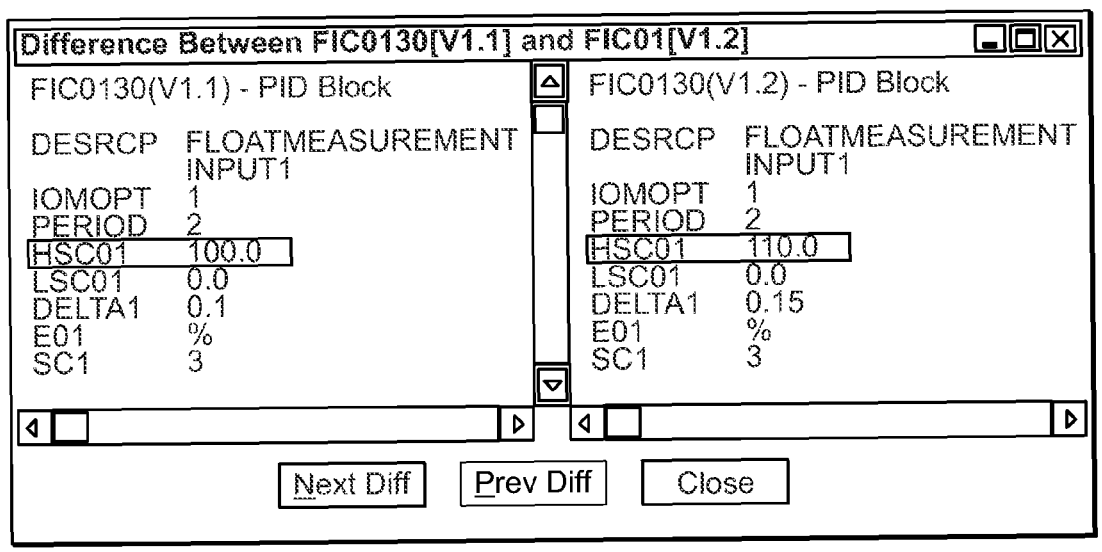
FIG. 53 depicts an object compare utility in a system according to the invention.

A utility is provided by the Framework which allows the user to compare two versions of the same object, or two versions of different objects, and obtain a report detailing those differences. A sample user interface to perform this function is presented in FIG. 53.

In this example, the differences between two versions of the same object is shown. Each version's parameters are listed, along with the value for each parameter. By selecting the "Next Diff" button, the user is automatically advanced to the next difference between the two versions (either in parameter name or value). Differences between the two objects can be outlined (as shown), or appear in a different color. Although not shown in this example, to make this comparison easier, the parameters will probably need to be sorted alphabetically. Once the first difference is viewed, the user will be able to select the "Prev Diff" button in order to move to the previous difference between the two versions of the object.

This same interface is used to detail the differences between two different objects. The menu command(s) used to provide this functionality are based simply on the fact that two (or more) objects are selected in the configuration. If more than two objects are selected, a listbox could prompt the user to pick the two objects on which to run a comparison.

1.8.4.3 Compacting Version History

Left unchecked, the version control system can consume a large amount of disk space. A version control utility is provided in order to reduce the amount of old version information contained within the system, an operation which may be referred to as compaction. Generally speaking, compaction consists of two distinctly different operations:

1. Collapse. This operation removes version information between two dates. Intermediate versions are deleted, and revisions during the collapsed period are concatenated. Typically, a system is collapsed as a major change (which may require several intermediate check-out and check-in cycles) is commissioned. A collapse at that time acts to delete the details of the changes done during the development phase, while retaining the overall revision and change information.
2. Trim. This operation removes version information before a certain date. This operation will remove both version and revision information, acting to slice off all history before a specific time.

1.8.4.4 Version Baselining

There may be a need for all objects in an IDA configuration to become baselined, or tagged with a revision label which is common for all objects. It might be convenient to baseline a configuration, for example, just prior to an historical archive, or just before a big configuration change is about to be implemented.

The Framework provides the user with a mechanism for baselining an IDA configuration. The resulting revision and change information is captured, and each versionable object in the database is versioned with a common revision. The information associated with baselining (i.e. a common revision label) can be used as a basis for rollback.

The concept of baselining can be extended to only selected objects, rather than the entire database. For example, a user may want to baseline all the objects associated with a certain plant section. In this scenario, the user selects the desired plant section in the Plant Hierarchy, and select "Baseline" from a right-mouse click, pulldown menu. After capturing the change and revision information, all the objects associated with the selected plant section would be automatically versioned with the baseline information.

1.8.4.5 Historical Archival

The version control features described above are database operations—the entire history of all the changes done to each IDA configuration object is contained within the database. Archiving change history is done using vendor-provided backup utilities (e.g., for ODI's ObjectStore, the utility osbackup). These backups are meant to be special historical backups rather than the ones associated with normal day-to-day system operations.

As noted in the next section, and depicted in FIG. 54, depending upon how rollback is implemented, a playback macro is archived at the same time that the configuration is archived, and a new macro initialized to an empty state in preparation for ongoing changes to the now-archived database. In this manner, the playback macro of a database represents the total changes which occurred to a configuration from one historical archive to the next.

1.8.4.6 Archive Retrieval and Rollback

A rollback provides database auditors with a means of viewing the database at a particular date and time. There are at least three ways in which some degree of rollback can be accomplished, all of which create the rolled-back version of the database separately from the current offline database for obvious reasons.

1. Archive Retrieval. This is by far the simplest way to institute a rollback mechanism, but it has drawbacks. In this scenario, the user specifies the archive to retrieve, and the database is restored to the state which it was in at the time the archive was created. A disadvantage to this method of rollback is that the user may actually be interested in the state of the configuration at a point in time between two archives, with no way of getting there.

2. Macro Playback, or Roll Forward. This method utilizes a concept which was first discussed in the section dealing with modifying a configuration while disconnected from the main IDA database (e.g. on a laptop computer), and is probably preferable in terms of being able to implement than the other two methods. This method requires an additional component to the historical archive mechanism itself—that of a record macro which is initialized following each time an historical archive is created. This macro records the changes made to the database in detail rich enough to be able to reproduce those changes. The record macro is archived on the same media that the database is stored on at the time the archive is created.

Referring to FIG. 55, when the need for a rollback is identified, the archive nearest in date to the desired rollback date, but not later than the rollback date, is restored to a database. The record macro associated with that archive is then "played" back, creating changes to the temporary database just as though a user were performing the edits, forward to the date that the user specified for rollback. When the macro playback has finished, the database is in the state that it was at the date specified.

This technique permits enough detail to be recorded to reproduce all changes to all objects, regardless of whether they were versioned or not. This automatically allows changes such as associations between objects to be re-established, since they are created in the same order, and by the same method, that they were in the original database. There is minimal danger in the method resulting in "dangling" relationships, or "orphaned" objects.

3. Rollback. This method is the most difficult to implement, and can potentially corrupt the data. In this scenario, the user provides a date to be used to determine how far to roll the database back. Alternatively, the user might supply a revision label which was provided during a baseline operation, in order to establish the point in time that the rollback is to address. The rollback utility is offline, and relies on the historical backups which were described in the preceding section. When a rollback is desired, the appropriate archive is restored to a separate system, isolated from the running IDA database. The rollback utility is then run against the restored archive. The rollback utility walks through the entire IDA database, using the version information to roll the objects back to the requested date and time. At that point, an image of the database exists as it did on the requested date.

1.8.4.7 Audit Trail

A utility is provided which allows the user to produce an audit trail detailing the changes and/or revisions which have occurred on selected objects over a period time. The functionality of producing an audit trail lists the individual changes which have been recorded from one version of the object to the next. The process would begin with the oldest version of each selected object, and traverses the version tree of the object, output the change records associated with each succeeding version. The resulting report could appear as FIG. 56. The information of interest includes the version number, the date that each version was made, who made the version, the nature of the modification (change), and the reason for the modification (revision). A modification of this report (or interface) suffices for any audit trail requirements which have been imposed on IDA. If this is the case, then the audit trail for any object(s) can be produced on demand, rather than kept up-to-date everytime a modification to an object is made.

1.9 Undo Manager

The Framework provides a basic Undo/Redo capability in the form of an Undo Manager for IDA application developers.

The purpose of the Undo Manager is to allow users to undo changes they've made to objects if they decide they don't want those changes. The Undo Manager enables multi-level undo and redo operations for actions which have been defined for each object by the application developer. Each developer is responsible for creating the undo units (i.e. actions) which mean something to the object. Undo units may be nested hierarchically (i.e., undo units can contain other undo units), resulting in a parent undo unit. This allows complex operations such as a change on a multiple selection to be treated as a single undoable action.

The Undo Manager provides a centralized undo/redo service, managing both simple and parent undo units on the undo and redo stacks. Undo units are typically created in response to actions taken by the end user, or a programmatic function which is simulating a user-generated action. When an object's state changes, it creates an undo unit encapsulating all the information it needs to undo that change. The object then calls methods within the undo manager to place the corresponding undo units on the stack. The Undo Manager then has all the data it needs to support the undo/redo user interface.

1.9.1 Object Model

1.9.1.1 Undo Manager

The Undo Manager manages two stacks, the undo and redo stacks, each of which is a repository for undo units generated by application software. When an object's state changes, it creates an undo unit encapsulating all the information necessary to undo that change, and passes it to the Undo Manager. The Undo Manager, depending upon what state it's in, will place the undo unit on the undo or the redo stack, as appropriate.

When the user select Undo, the Undo Manager takes the top unit off the undo stack, invokes it, then discards it. Similarly, when the user selects Redo, the Undo Manager take the top unit off the redo stack, invokes it, then discards it.

The Undo Manager has three states: the base state, the undo state, and the redo state. It begins in the base state. To perform an action from the undo stack, it puts itself in the undo state, invokes the action, then returns to the base state. To perform an action from the redo stack, it puts itself in the redo state, invokes the action, then returns to the base state. If the Undo Manager receives a new undo unit while in the base state, it places the unit on the top of the undo stack, and empties the redo stack. If it receives one while in the undo state, it puts incoming units on the redo stack. Finally, if it receives a new unit while in the redo state, it places them on top of the undo stack without flushing the redo stack.

Figure 57:
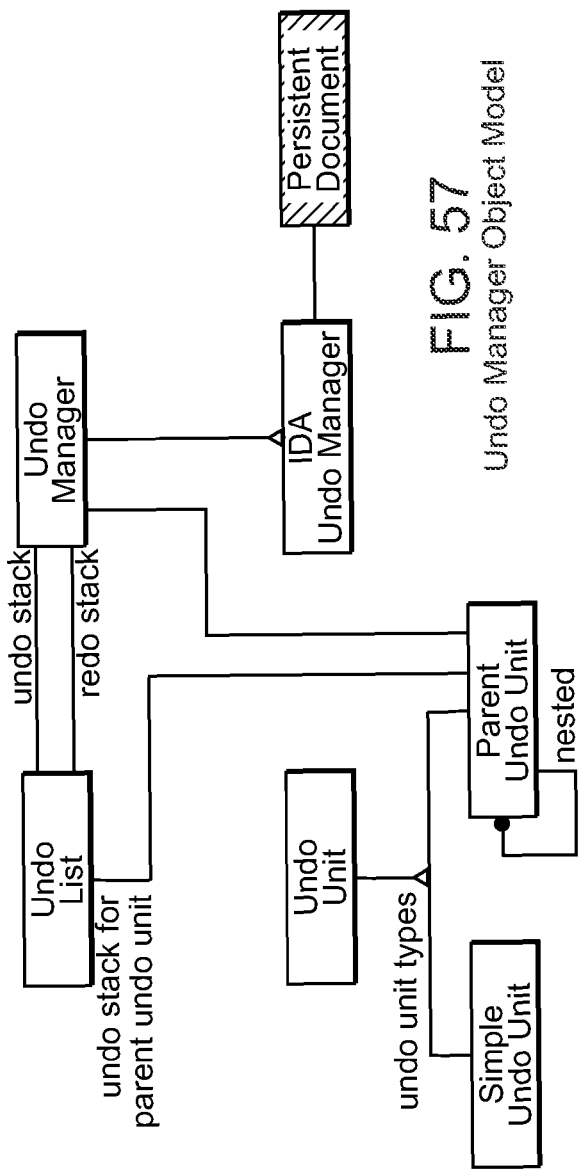
FIG. 57 depicts an undo manager object model in a system according to the invention.

The object model depicted in FIG. 57 shows a subclass of the Undo Manager (the IDA Undo Manager). This subclass extends the Undo Manager to be aware of the current modification state of the MFC document which the instance of the Undo Manager is associated with. Depending upon the state of the Undo Manager, the modified state of the document may need to be changed programmatically. For example, if the user performs Undo and empties the undo stack, essentially no changes have been performed to the configuration. The document associated with the application, however, is not aware of that, and will continue to indicate a modified state unless reset.

1.9.1.2 Undo Unit

An Undo Unit encapsulates the information necessary to undo (or redo) a single action. Its principal methods are Do( ) and GetDescription( ). The Do( ) method implements the actual undo (or redo) operation. Calling Do( ) on an undo unit in the undo stack creates a corresponding (inverse) object on the redo stack, and vice versa. The GetDescription( ) method returns a description of the unit, used to edit menu text (e.g., Undo Color Change, etc. . . . ). There are two subclasses of Undo Units: simple and parent.

1.9.1.3 Simple Undo Unit

A Simple Undo Unit contains the information to undo a single operation, such as creating or moving an object. Simple Undo Units preferably do not change the state of any object if they return failure. This includes the state of the redo stack (or undo stack if performing a redo). They are also used to put a corresponding unit on the redo (or undo) stack if they succeed.

1.9.1.4 Parent Undo Unit

A Parent Undo Unit can also contain other Undo Units. This becomes useful when the user performs a complex action, yet perceives it as a single action. For example, the user might select several objects on the screen all at one time, and move them as a group to some other location. To support an undo of this type of behavior, the Undo Manager preferably has a single undo unit which encapsulates all the actions of all these objects.

The Parent Undo Unit has two methods, Open( ) and Close( ) which provide the encapsulation. Simple Undo Units are added to parents by an Add( ) method. Parent units are added through Open( ), which leaves the unit open. In this way, Parent Undo Units keep simple ordered lists of child units. Each Parent Undo Unit is responsible for managing the child units it receives through the Open( ) or Add( ).

Parent Undo Units preferably do not change the state of any object if they return failure. Additionally, if one or more children succeeded prior to another child's failure, the parent unit preferably commits its corresponding unit on the redo stack, and return the failure to its parent. If no children succeeded, then the parent unit only has to commit its redo unit only if a state change has been made which needs to be rolled back.

1.10 Users and Security

The Framework provides security functions to allow users and other personnel to restrict access to objects which need to be protected from unauthorized modification or access. User-level security is optional, and is disabled by default. Implementation-standard security restricts modification of implementation-standard standard objects (such as standard I/A Block definitions) to authorized personnel, and is preferably always enabled.

When user-level security is enabled, the security functions provide authentication by presenting a log-in dialog requesting a user name and password when a user starts any IDA application. Similar to the Windows NT security model, access control is provided by assigning users to groups which have various access permissions (read, write, create, etc.). Groups are based on roles, such as Process Engineer or Advanced Operator, and users can assume multiple roles by being assigned to multiple groups. Implementation-standard default groups and permissions are provided, but users can create their own groups, and can modify the permissions of the default groups. Permissions are assigned by object type (such as Loops) and by Plant Area (such as East Plant Section). This provides selective access by geographic area.

A switch user/group function is also provided which allows users to assume a subset of their permissions or allows another user to temporarily log-in. Users use this function to assume a more restrictive set of permissions to ensure that they do not make an inadvertent change if they were only interested in viewing configuration data. The ability to temporarily log-in would be used to allow a supervisor to assist another user in making changes which may require special access permission to an existing configuration work space, and then return control to the original user.

The Framework supplies user interface dialogs to allow developers to register objects and permissions to assign permissions to the default groups. The Framework also supplies an API to allow the various configurator applications to check for access permission before responding to access requests for objects they control. A consistent "access-denied" mechanism will be provided to advise the application of a security access violation.

1.10.1 Object Model

Figure 58:
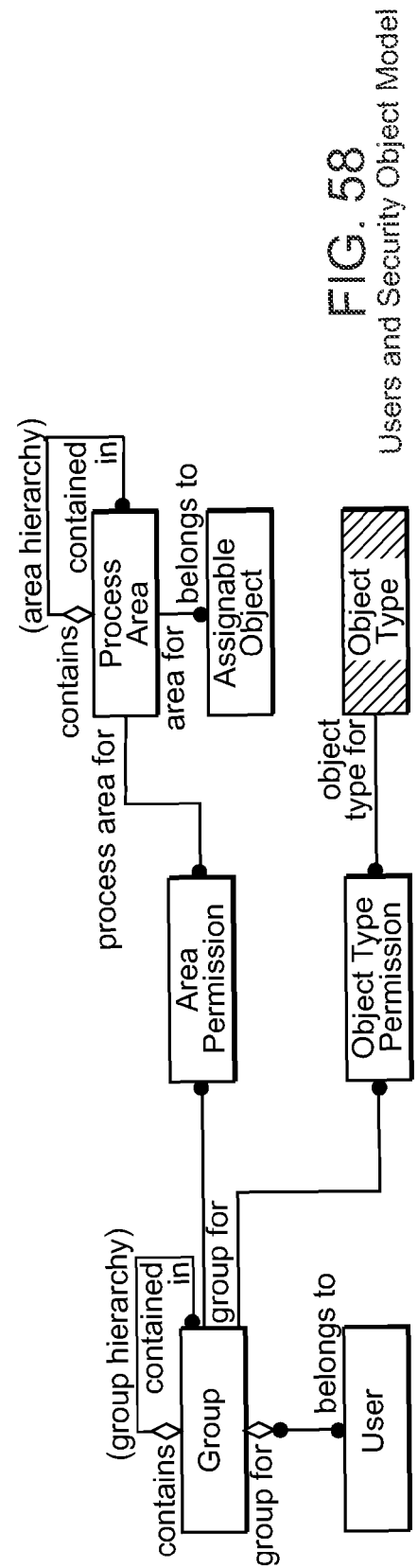
FIG. 58 depicts an users and security object model in a system according to the invention.

IDA uses a security system to control access to configuration objects by users. Given a particular user and a particular object, the security system determines what permissions the user has (e.g. read, write) with respect to the object. The security object model is depicted in FIG. 58.

1.10.1.1 Group

In the Security model, the Group object is used to categorize Users, with many instances of Users belonging to the same Group object (e.g., Operator, Engineer, etc.). These broad categories are each associated with a specific set of permissions. These permissions pertain to various areas throughout the plant, as well as to object types within the plant.

Instances of Groups may form a hierarchy, and contain other Groups (e.g., Test Operator within the Operator Group). However, an instance of a Group can only be contained by one, and only one, other Group. For example, the Test Operator group could be in the Operator group, but not also in the Engineer group. Each Group has permissions of its containing Group, and may add additional permissions. See "Users and Groups Example" in FIG. 59.

Members of a Group can have permissions objects via the object's association to instances of the Process Area and Object Type classes. To have a permission to access an object within a Process Area, the group preferably has that permission to both the Process Area, and the Object Type. If the object is not assignable to a Process Area, then the group only needs type permission against the object in order to access it.

In summary, relationships are:
  A Group object maintains a list of all User objects associated with it.
  A Group object maintains a list of all other Group objects which are contained within it.
  A Group object can be in only be directly related with one other Group object (i.e., Groups can occur in only one place in the Group hierarchy)
  A Group object has all the permissions of its containing Group, and may have additional permissions.
  User objects within a Group object access objects assigned to specific Process Areas if that Group has permission to do so. Since permissions form a hierarchy, it's possible for a Group to have multiple object permissions within the same Process Area, as well as permission to access objects in multiple areas. This relationship is managed by the class Area Permissions.
  Similarly, User objects within a Group object can access many different types of objects. Since permissions form a hierarchy, it's possible for a Group object to have multiple permissions within the same Object Type, as well as permission to access different Object Types. This relationship is managed by the class Object Type Permissions.

Listed below are sample Groups provided with one embodiment of the invention:

| Group Title | Group Description |
| --- | --- |
| Advanced Operator | Tuning specialized or critical loops. |
| Default User | General user capabilities to read, but not change configuraton data. |
| Developer | Develop and maintain IDA framework and applications which run inside the framework. Note that this particular group object may not be visible to a "normal" user. |
| Operator | Tuning general loops. |
| Process Engineer | Build and maintain process loop configurations. |
| Process Engineer Administrator | Develop and approve customer default block parameters, loop templates, proprietary control schemes, batch administration, etc. |
| Software Engineer | Develop and install customer applications and third party software, such as custom reports and database applications. |
| System Administrator | Configure system, security, backups, fault tolerance, etc. |

1.10.1.2 User

In IDA, a User object is someone who initiates an Edit session using a unique identifier. This identifier is captured from within the Framework in order to determine security permissions. A User preferably belongs to at least one Group. A User may belong to more than one Group, limited only by the number of Groups defined in the system. When a User logs onto IDA initially, they acquire the sum of the permissions of all of their associated Groups. Since a User can belong to different Groups, they should be able to change which Group or Groups they belong to dynamically (refer to FIG. 62). The groups which a User belongs to at any point in time is referred to as the Active Group Set. The Active Group Set will be used for determining permissions. The permissions which a User has at a specific point in time are determined by the sum of the permissions of all the Groups within the Active Group Set. A User can change groups at any time, but only to groups within the set which have been defined for him in the Group hierarchy. Summarizing relationships:
  A User object belongs to one or more Group objects in the security hierarchy. Groups objects, in turn, maintain a list of all associated User objects.
  A User object is able to dynamically change its Active Group Set, thereby changing the permissions by which the User object can access objects within IDA.

Figure 59:
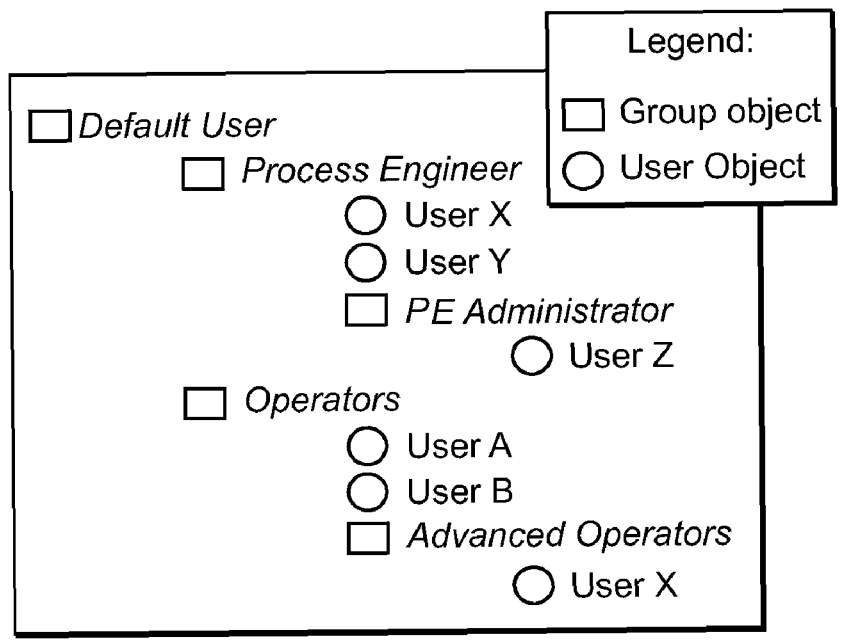
FIG. 59 is an users and groups example in a system according to the invention.

Users and Groups form a hierarchy as illustrated in FIG. 59. A Group can only be in one other Group, so that for example, Test Operators could not appear more than once in the hierarchy.

In the example shown in FIG. 59, the group "PE Administrator" has all of the permissions of "Process Engineer", and may have additional permissions. Note that user "User X" belongs to both the "Process Engineer" and "Advanced Operators" groups.

1.10.1.3 Process Area

Instances of the Process Area class form a hierarchy, and reference such things as individual buildings, or areas within a building in which logically-related processes are performed. Process Area objects can contain other Process Area objects, and they can be associated with one or more configurable objects which are capable of being assigned to that Process Area. Examples of such configurable objects are Loops and Compounds. Each instance of a Process Area object has permissions of its containing Process Area, and may add additional permissions.

Objects may be indirectly associated with a Process Area. For example, a Block may be associated with a specific Process Area as the result of being part of a Loop or Compound associated with that area. The ramifications of this on the design needs to be explored further.

Summarizing Relationships:
> User objects within a Group access objects assigned to specific Process Area object if that Group object has permission to do so. Since permissions form a hierarchy, it's possible for a Group object to have multiple permissions within the same instance of the Process Area class, as well as permission to access objects in multiple areas. This relationship is managed by the class Area Permissions.
>
> An instance of a Process Area can contain other Process Areas. Permissions are "inherited" from the containing Process Area.
>
> Configurable objects can only belong to a single instance of a Process Area (i.e., an object can't belong to two or more Process Area objects at the same time).

1.10.1.4 Area Permission

The Area Permission class is used to restrict a user's access to an object by considering where the object resides in the plant hierarchy. Area Permission objects allow system administrators to set user access permission to the objects assigned to Process Areas by groups that the user belongs to. Area Permission objects contain a reference to the permission in the permission hierarchy for the indicated Group/Process Area object pair. Summarizing relationships:
> An Area Permission object represents the permission in the permission hierarchy that the associated Group has on objects which have been assigned to the associated Process Area.
>
> Permissions get more restrictive, not less, as you go down the area hierarchy.

1.10.1.5 Assignable Object

An Assignable Object is an instance of an object associated with an Object Type (refer to object model depicted in FIG. 13) capable of being assigned to a Process Area. One or more instances of Assignable Object may be assigned to the same Process Area object. Objects associated with an instance of the Object Type class are deemed "assignable" when they are created. Access to an Assignable Object is dictated first by the user's group access to the object's type, then by the user's group access to the Process Area object which the object has been assigned to. Summarizing relationships:
> An Assignable Object can be assigned to one, and only one, Process Area object. The object maintains a reference to the Process Area to which it has been assigned.

Figure 60:
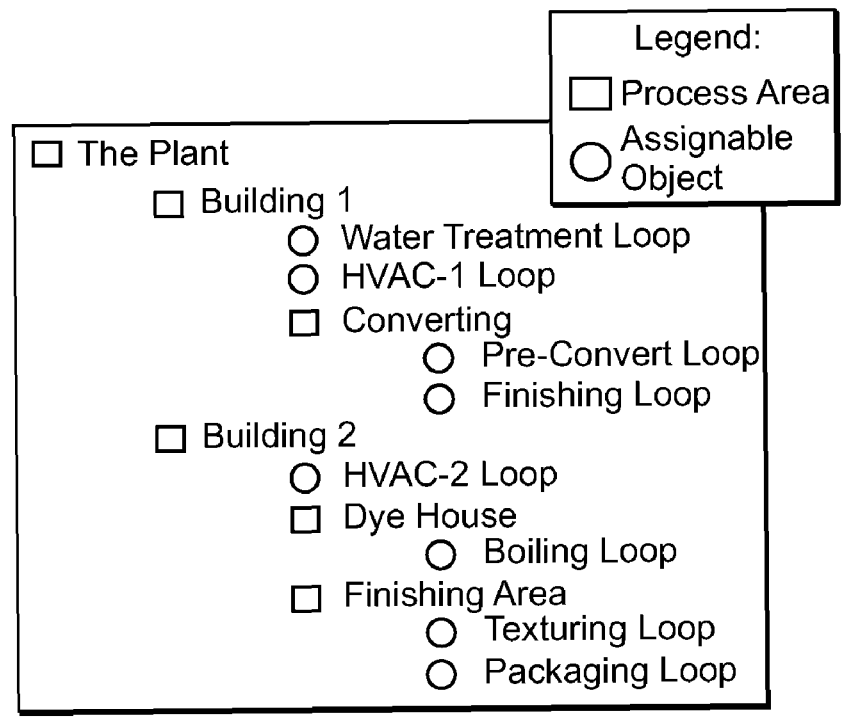
FIG. 60 is a process area and assignable objects example in a system according to the invention.

FIG. 60 depicts the hierarchical relationships between instances of Process Areas, and Assignable Objects.

1.10.1.6 Object Type Permission

Instances of the Object Type Permission class control access to objects by considering what type they are. Object Type Permission objects allow system administrators to set user access permissions to the object types by groups that the user belongs to. Object Type Permission objects contain a reference to the permission in the permission hierarchy for the indicated Group/Object Type pair. Summarizing relationships:
> An instance of the Object Type Permission class represents the permission that the associated Group object has on objects of the associated Object Type.
>
> User objects within a Group may access many different types of objects. Since permissions form a hierarchy, it's possible for a Group object to have multiple permissions within the same Object Type, as well as permission to access different Object Types. This relationship is managed by the class Object Type Permissions.

1.10.2 Security Administration 1.10.2.1 Permissions Hierarchy

Figure 61:
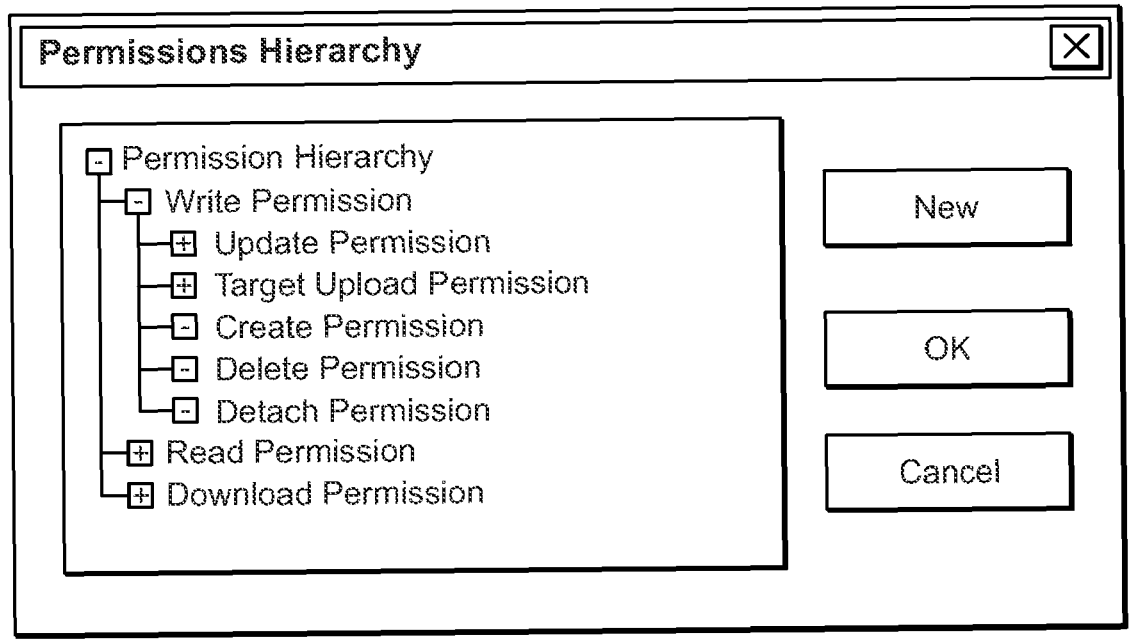
FIG. 61 depicts a IDA permissions hierarchy in a system according to the invention.

Permissions (both Process Area and Object Type Permissions) for IDA form a hierarchy defined by static data within IDA, and not allowed to be changed by the user (FIG. 61). General read and write permissions will need to be more fine grained than simply read vs. write. Permissions stated in the Process Area Permissions and Object Type Permissions objects are stated in terms of one of the higher entries in the hierarchy, but can be as fine grained as needs dictate.

1.10.2.2 Download Permission

Download permission governs who is allowed to download configuration data to the targeted I/A system. The download is the process by which edited configuration information gets transferred to the target. A download permission is a special case of IDA security—although effectively it is only an IDA database read, the fact that it affects a running target makes it special. As with other permissions, download permissions may be set on an object type basis, and/or on process areas.

1.10.2.3 Switch Group/User Facility

A mechanism by which a user can switch groups is provided in IDA. The mechanism allows a user to perform the majority of his daily operations with a default minimal security setting, then switch to a more restrictive security setting by changing the Active Group Set they are currently associated with.

Another mechanism allows the user to switch user ID's. This is accomplished by the same mechanism described above. The mechanism would also allow a supervisor to temporarily "log-in" to a user's session, perform a restricted operation, then "log-out" and return security (and user ID) to its previous settings. A simple dialog box like the one presented in FIG. 62 is provided to perform this switching.

Figure 62:
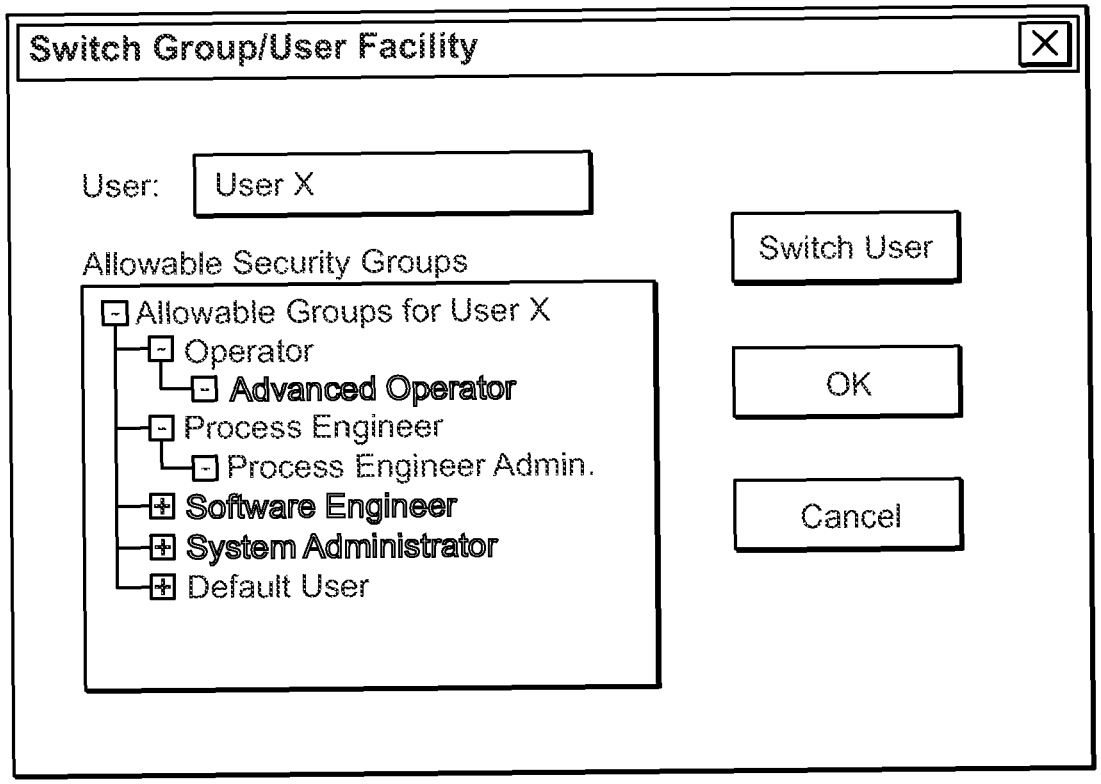
FIG. 62 depicts a switch group/user capability in a system according to the invention.

In the example shown in FIG. 62, User X is currently logged in, and has activated the Switch Group/User Facility. The application will allow User X to select (or deselect) Groups which he is currently allowed to be associated with, thereby establishing his Active Group Set.

Notice in the sample dialog that some groups are dimmed, or "greyed-out". These groups represent those groups which are not currently in the user's Active Group Set. Clicking on the text of a Group will toggle it back and forth between the normal "on" state, and the dimmed "off" state. This is only an indication of the functionality which is used in the illustrated embodiment, not a restriction on other implementations.

Additionally, by selecting the "Switch User" pushbutton, a screen equivalent to the log-in screen appears, prompting for a new user's ID and password. This user ID would be "stacked", in that IDA remembers the previous user ID as a new one logs in, so that when the new user finishes an edit session and exits, they will effectively be reverting back to the original user's identity and permissions. A user stack of only one-deep will suffice for this purpose.

1.10.2.4 Managing Groups and Users

This section presents sample property pages which used to maintain groups and users. All dialogs presented in this section are meant to be used in the performance of ongoing Security Administration.

Figure 63:
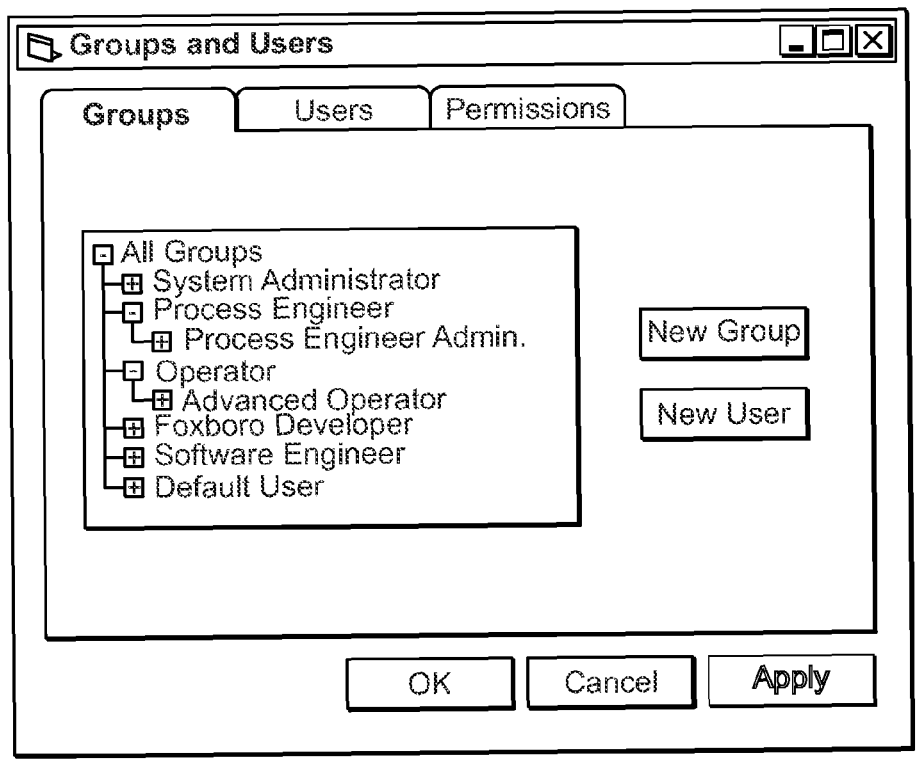
FIG. 63 depicts managing groups in a system according to the invention.

The first property page presented in FIG. 63 represents a way in which the security administrator manage Groups. The existing Group structure is placed into a type of tree hierarchy control, which is imploded/exploded as necessary to gain an entry point into the Group hierarchy. To add a new Group, the administrator finds the proper spot in the control where the new Group could be inserted, and press "New Group".

At that time, a dialog box (not shown) pops up, prompting the administrator for information to create a new Group. Upon exiting that dialog, the new Group is displayed at the proper point in the hierarchy. A Group automatically inherits all Object Type and Area Permissions associated with its root Group.

To add new users to IDA, the security administrator presses the "New User" button, and a dialog box (also not shown) pops up, prompting the administrator for any information IDA requires to establish a User. This information contains the User's name, password, and possibly some other information which is needed for administrative purposes by IDA. Upon exiting the dialog, the new User will have been established as a valid User within the IDA administrative system, but not yet assigned to a specific Group (or Groups). To assign a new User to a Group, or modify the Groups to which an existing User belongs, the administrator would select the "Users" tab on the property sheet.

Figure 64:
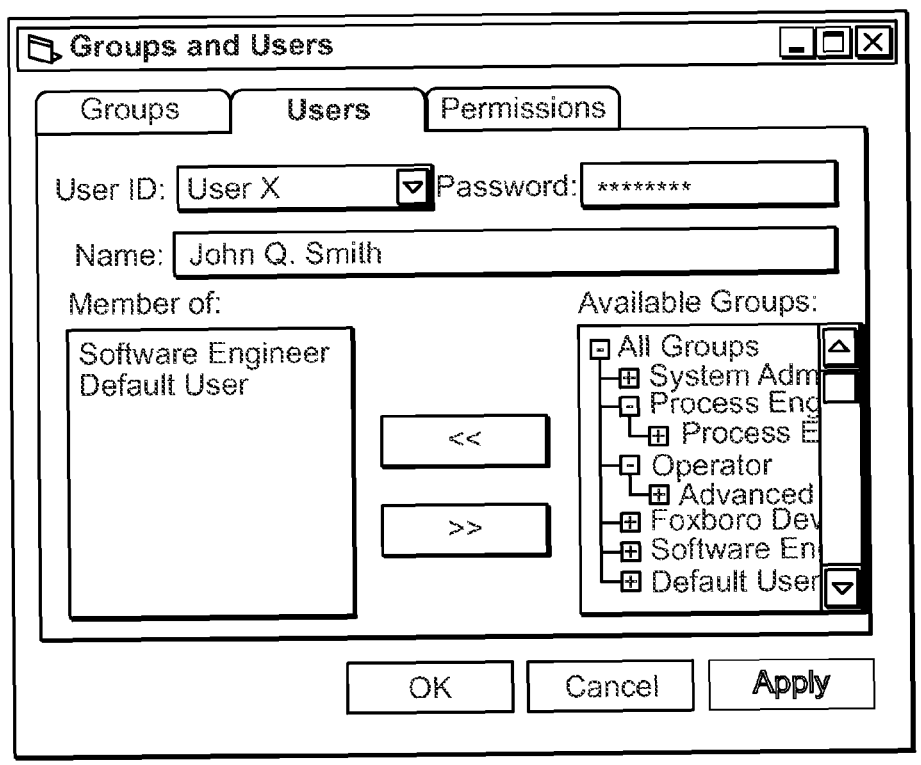
FIG. 64 depicts assigning users to groups in a system according to the invention.

In this example (shown in FIG. 64), the administrator is able to select the User from the combobox depicted by "User ID". Once the User was selected, the administrator would be able to modify their password and/or description in the edit fields provided, and pick the Group(s) that the User would need to be associated with.

Figure 65:
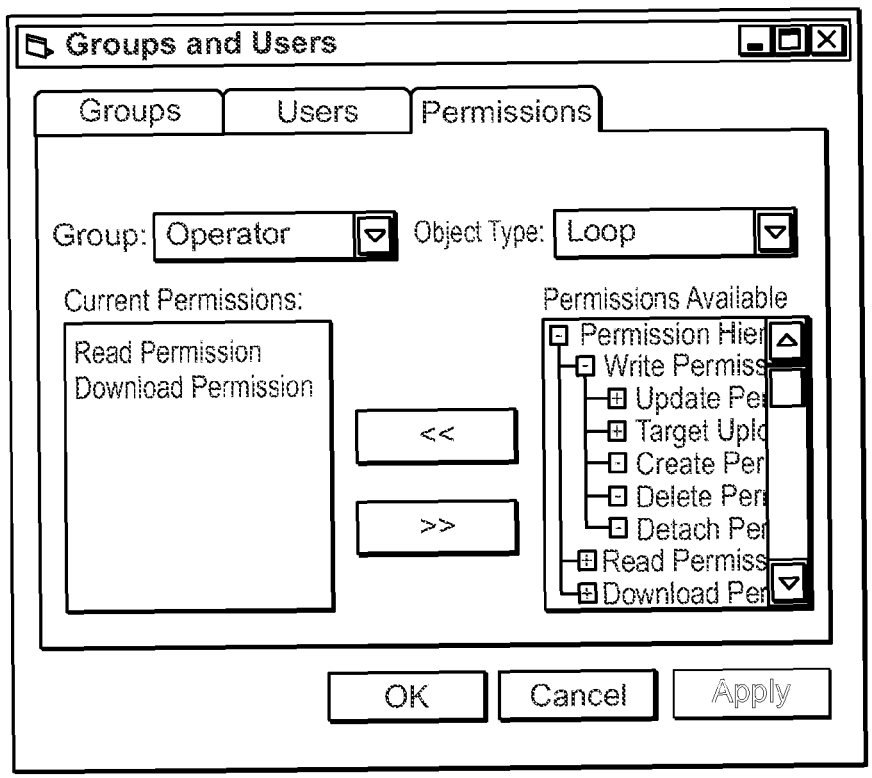
FIG. 65 depicts groups, object types and permissions in a system according to the invention.

And finally, the following property page shown in FIG. 65 represents a method by which Group access, or permission, could be given to specific Object Types. In this example, the administrator picks the Group and Object Type to be "linked" together via a permission, then picks from a list of available permissions all those which apply for this Group. The mechanism allows for permissions to be added, as well as deleted. Permissions can be established at any level in the Permission Hierarchy, since the Permission Hierarchy is allowed to be as fine-grained as necessary for the customer's unique requirements.

1.10.2.5 Managing Process Areas

This section presents sample property pages used to maintain process areas. All dialogs presented in this section are meant to be used in the performance of ongoing Security Administration.

Figure 66:
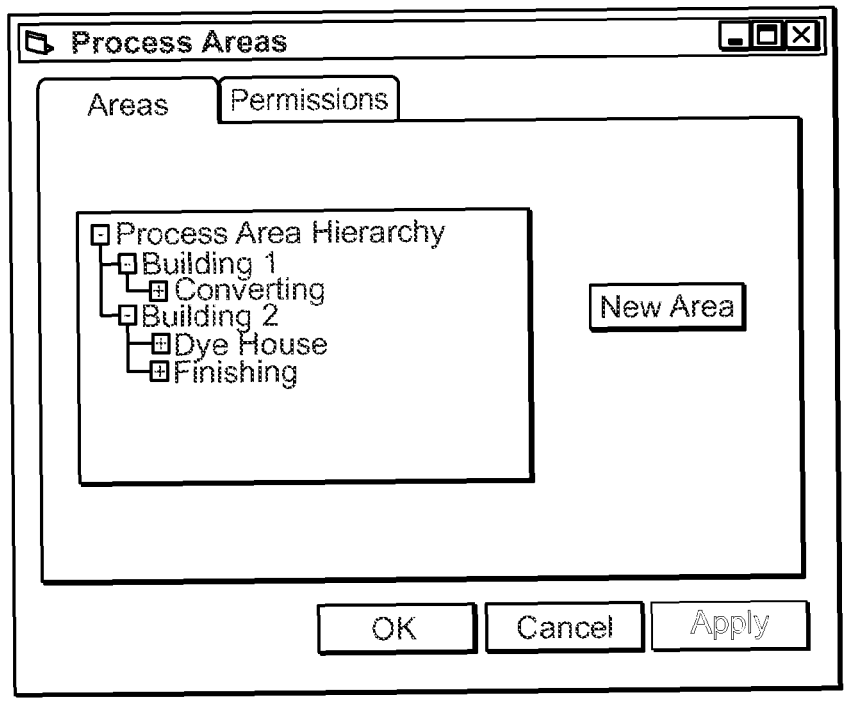
FIG. 66 depicts managing process areas in a system according to the invention.

The property page shown in FIG. 66 represents a way in which the security administrator manages Process Areas. The existing Process Area hierarchy are placed into a type of tree hierarchy control, which is imploded/exploded as necessary to determine an entry point into the Process Area Hierarchy. To add a new Process Area, the administrator would find the proper spot in the control where the new area is to be inserted, and press "New Area". At that time, a dialog box (not shown) pops up, prompting the administrator for information to create a new Process Area. Upon exiting that dialog, the new Process Area is displayed at the proper point in the hierarchy. When a Process Area is first created, it will automatically inherit all Assignable Objects, and Area Permissions associated with its root Area.

Figure 67:
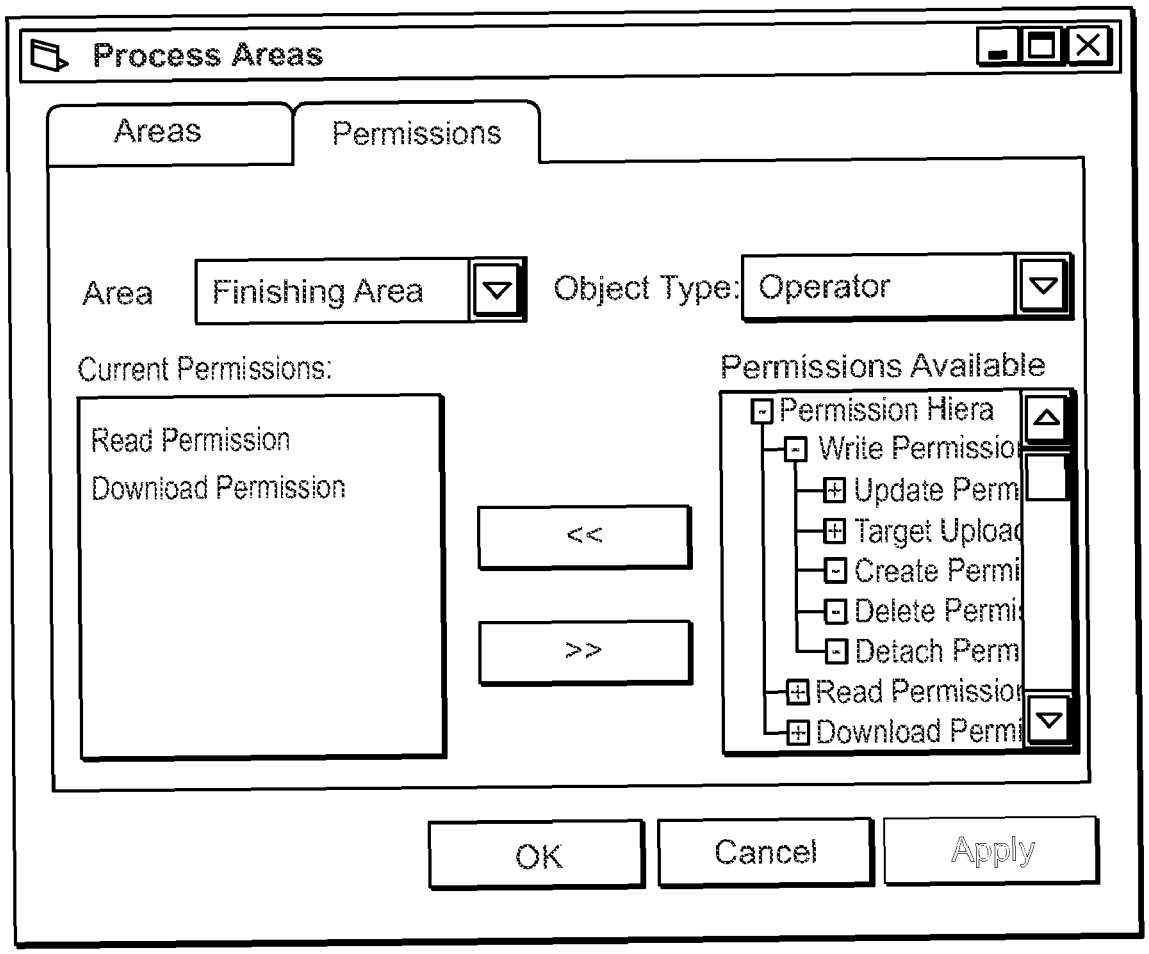
FIG. 67 depicts groups and process area permissions in a system according to the invention.

And finally, the following property page in FIG. 67 represents a method by which Group access, or permission, could be given to specific Process Areas. In this example, the administrator picks the Process Area and Group to be "linked" together via a set of permissions, then picks from a list of available permissions all those which apply for this Process Area/Group combination. Permissions can be established at any level in the Permission Hierarchy, since the Permission Hierarchy is allowed to be as fine-grained as necessary for the customer's unique requirements.

1.10.2.6 User Authentication Service

Closely associated with the IDA security subsystem, but separate, is a User Authentication Service. This service is responsible for providing the security service with the identity of an authorized user of the IDA system. The authentication service is responsible for providing the application's security mechanism with the name of an authorized user. Whenever the security system needs to evaluate a user's permissions to an object, it will ask the authentication service for the name of the user. The first time this happens, the authentication service queries the operating system for the name of the user, and responds with the name of that user. The name is then cached for use in later calls.

Another implementation results in the user being presented with a "login" dialog box asking for a username/password combination the first time the authentication service is asked for the name of the user. Again, the user's name, once captured and verified, is cached for later use. This implementation is desirable in certain I/A installations in which all users commonly log-in as "root" or "administrator", making an operating system query for the name of the user meaningless.

Part 2—Control Algorithm Configurator Architecture

2 Functions

This section describes major functions of the configurator architecture, including sample user interface representations. Note that these user interface sample are intended to illustrate functionality described in the text and are not intended to show all design details, such as menus and toolbars. In the object model diagrams included in this section, shading indicates classes supplied by the IDA Framework and a dashed line border indicates classes described in another subsection of this document.

2.1 Project Manager/Navigator Interface

2.1.1 Overview

The Project Manager is the navigator's view into the project database. It allows the user to browse through the project configuration hierarchies and data. The GUI interface is similar to the Microsoft Explorer's look and feel. The Framework described in Part 1 provides a common Project Manager navigational capability. This section describes the functionality specific for Control Algorithm Configuration.

2.1.1.1 System Tree View

Figure 68:
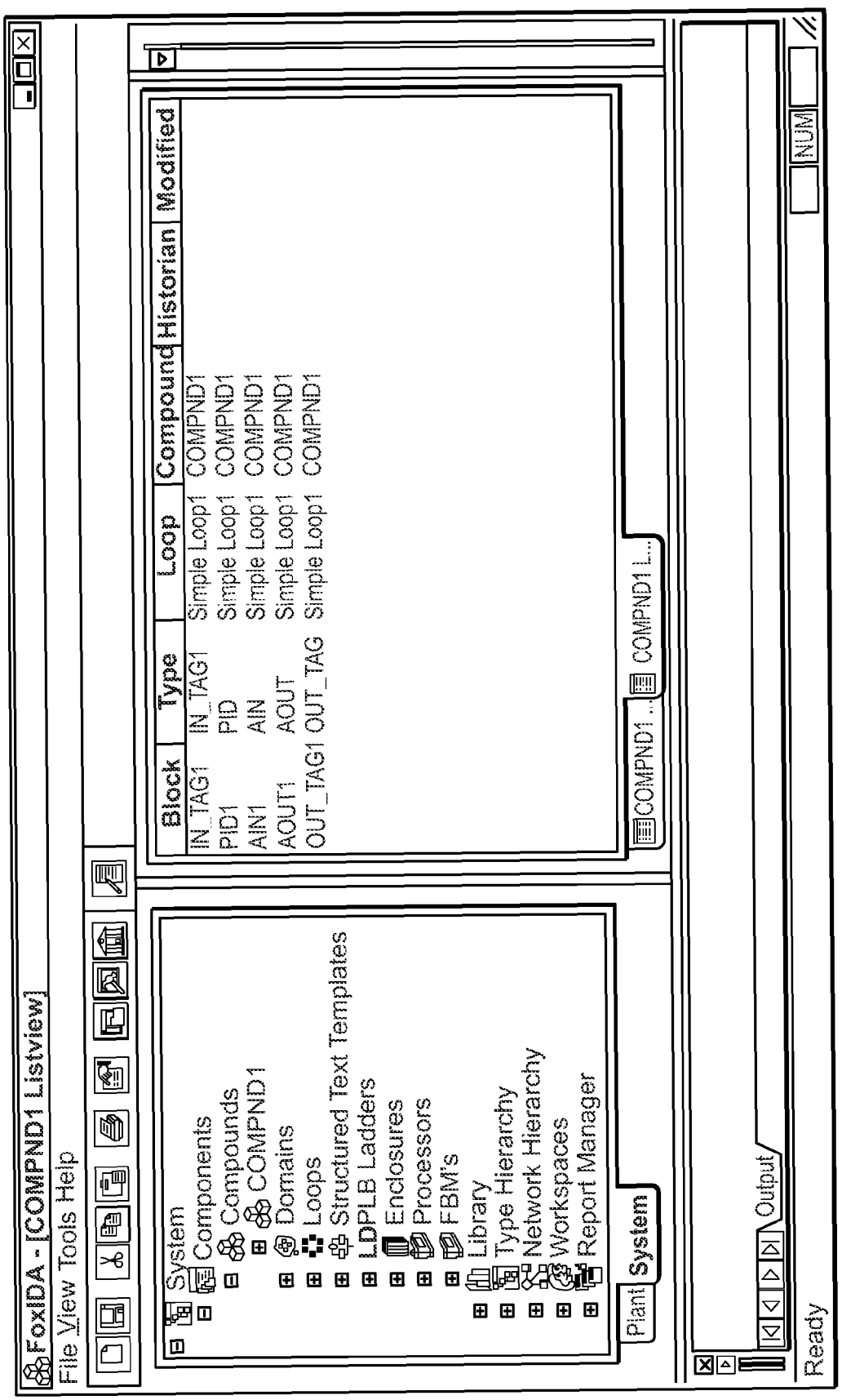
FIG. 68 depicts a system tree view in a system according to the invention.

FIG. 68 shows the Navigation Manager's System Tree View. The Components item holds the main items involved in control configuration: Control Levels (shown as compounds in the figure), Control Algorithm Diagrams (shown as Loops in the figure), and processors.

2.1.1.2 Control Algorithm Diagrams

The Control Algorithm Diagram Editor supports adding and connecting blocks to specify control algorithms. Blocks are only created through Control Algorithm Diagrams. The blocks in a Control Algorithm Diagram must preferably be assigned to a Control Level. A default Control Level may be set for a Control Algorithm Diagram, setting all blocks in the diagram to that level. However, blocks may be reassigned to any Control Level.

2.1.1.3 Control Processors

Control processors execute the control applications created by the users. The blocks specifying the control application are contained within the control processor in Control Levels. The Control Levels are assigned to Control Processors.

2.1.1.4 Control Levels

The Control Levels act as a logically named container for control applications. Within control processors, the control algorithm blocks are contained in Control Levels. The control levels provide a hierarchy structure following the IAS S88 standard. This standard defines seven levels of plant hierarchy with each level serving as a logical container for the next lower level.

Enterprise
  An organization that coordinates the operation of 1 or more sites
  May contain 1 or more Sites
Site
  A physical, logical, or geographical component of the enterprise
  May contain 1 or more Areas
Area
  A component of a site identified by physical, geographical or logical segmentation
  May contain 1 or more Process Cells
Process Cell
  Defines the span of logical control of one set of process equipment within an area
  Preferably contain 1 or more Units
Unit
  A collection of associated control modules and/or equipment modules in which 1 or more major processing activities can be conducted
  May contain 1 or more Equipment Modules
Equipment Module
  A functional group of equipment that can carry out a finite number of specific minor processing activities
  May contain 1 or more Control Modules
Control Module
  The lowest level of equipment that can carry out basic control The control naming hierarchy implemented by IAS does not address the top two levels of the ISA S88 hierarchy. The control hierarchy begins with the "Area". In addition to the ISA S88 hierarchy, the implementation defines three additional levels: blocks, parameters, and attributes. Every level of the naming hierarchy may contain blocks. There is no restriction that only the "Control Module" level contains blocks.

2.1.1.5 Control Level Syntax and Assignment Rules

The following rules characterize the naming hierarchy:
  Total name length of 128 bytes, including delimiters
  A total of 32 bytes for each level name
  The name can be any mix of numeric (0-9) or alphabetic (A-Z) characters and the underscore (Internationalization issues are not currently decided)
  Names may not contain spaces
  Each naming level, except possibly the last, is a compound.
    Each level may contain:
      Other levels
      Blocks
      Parameters
  A delimiter using the greater than symbol ('>') between levels
  There is no delimiter before the first level name
  A delimiter of colon (':') between a level and a block
  A delimiter of period ('.') between a block and a parameter
  A delimiter of period ('.') between a parameter and an attribute
  At a given level, the names of any contained levels must preferably be unique
  At a given level, the names of any contained blocks must preferably be unique
  At a given level, names for blocks, levels, and parameters do not have to be unique between themselves.
  The full naming hierarchy does not have to be used.
    At least one level must preferably be specified. This provides compatibility with I/A naming convention—compound:block
    Any number of levels up to the maximum may be used
  Given these rules the following two names specify blocks:
  Area1>ProcCell2>Unit1>Equipment1>CtlMod2: Ft104.STATUS
  Area1>ProcCell2>Unit1:CTLBLOCK.STATUS
    The first name defines a block named FT104 with a parameter of STATUS.
    The second name defines a block named CTLBLOCK with a parameter of STATUS.
    The FT104 block is contained within the Control Module level.
    The CTLBLOCK is contained within the Unit level.
  Since names for blocks, levels, and parameters do not have to be unique, the following is legal:

```
Area1>ProcCell2>Unit1>Equipment1>CtlMod2:FT104.STATUS
Area1>ProcCell2>Unit1.STATUS
Area1>ProcCell2:Unit1.STATUS
```

The ProcCell2 level contains a level called Unit1
The ProcCell2 level contains a block called Unit1
The Unit1 level contains a parameter called STATUS
Each of these objects can be uniquely resolved.
Names do not have to span the full naming hierarchy:
Area1:FT104.MEAS
This provides with backward compatibility with I/A names
Compound:Block.Parameter
A second set of rules specify the relationships to control stations:
  Blocks are never directly assigned to control stations
  Blocks are assigned to compounds expressed as a level name
  The compounds, or levels, contain not only blocks but also other compounds
  The compound, or levels, also contain parameters
  Each level contains a parameter that allows the grouping of contained blocks, and blocks within contained levels, for shared name scope in structured text programs, the unit grouping flag.
  Once the unit grouping flag is enabled, the unit grouping flag in contained levels is ignored.
  Compounds, or levels, are assigned to control stations
  Any level, regardless of it's position in the hierarchy, may be assigned to a control station
  All contained levels are also assigned to the control station when a level is assigned to a control station
  Contained levels may be reassigned to a different control station. Lower levels contained by the reassigned level are also reassigned Contained levels may not be reassigned to a different control station if the unit grouping flag for a parent level is set. All lower levels contained by the reassigned level are also not allowed to be reassigned All referenced levels are preferably assigned to a control station All blocks assigned to a level preferably execute within a single control station.

Although contained levels may execute in a different control station, all of the blocks at a given level preferably execute within the same control station. (All blocks in a compound execute in the same control station.)

More than one level may be assigned to a CP

More than one level which are at the same point in the hierarchy may be assigned to a control station (i.e. Area1 and Area2 may both be assigned to the same control station)

The block processing order is a function of the control station and is specified in control station documents.

The levels in a control hierarchy are not only divisible between control stations in a child relationship; they can also be divided among parent control stations:

| | |
|---|---|
| Area2>ProcCell1 | assigned to CP001 |
| Area2>ProcCell2 | assigned to CP003 |
| OR | |
| Area2>ProcCell1>Unit1 | assigned to CP001 |
| Area2>ProcCell1>Unit2 | assigned to CP003 |

All of the blocks contained by a level (a compound) preferably execute in the same control station.

| | |
|---|---|
| Area2>ProcCell1>Unit1:FT104 | If block FT104 executing in CP001 then block FT105 preferably also executes in CP001 |
| Area2>ProcCell1>Unit1:FT105 | |
| Area2>ProcCell1>Unit1>Equipment1:FT105 | block FT 106 could execute in a separate CP |

All compounds and all blocks could be assigned to a single control station

| | |
|---|---|
| Area1 | Assigned to CP003 |
| Area2 | Assigned to CP003 |

Any level could be assigned to a control station
Area2>ProcCell>Unit1>Equipment1>CTLMod1 assigned to CP003
All used levels are preferably assigned to a control station

| | |
|---|---|
| Area2>ProcCell1 | assigned to CP003 |
| Area2>ProcCell2 | assigned to CP001 |

If these are the only two assignments made, then
Area2 is not assigned to any control station, this is illegal 2.2 Block Definition Editor 2.2.1 Overview The Block Definition Editor allows control blocks and their parameters to be defined for use on IAS. Through the editor, users create entirely new block definitions or derive new blocks from existing definitions. Only blocks derived from implementation standard control blocks download to control stations. User-defined blocks also appear in the list of defined blocks when viewed with this or the Control Algorithm Diagram Editor, but are not installed into a control station. This list contains only single Block definitions; no Composite Block Definitions appear.

Figure 69:
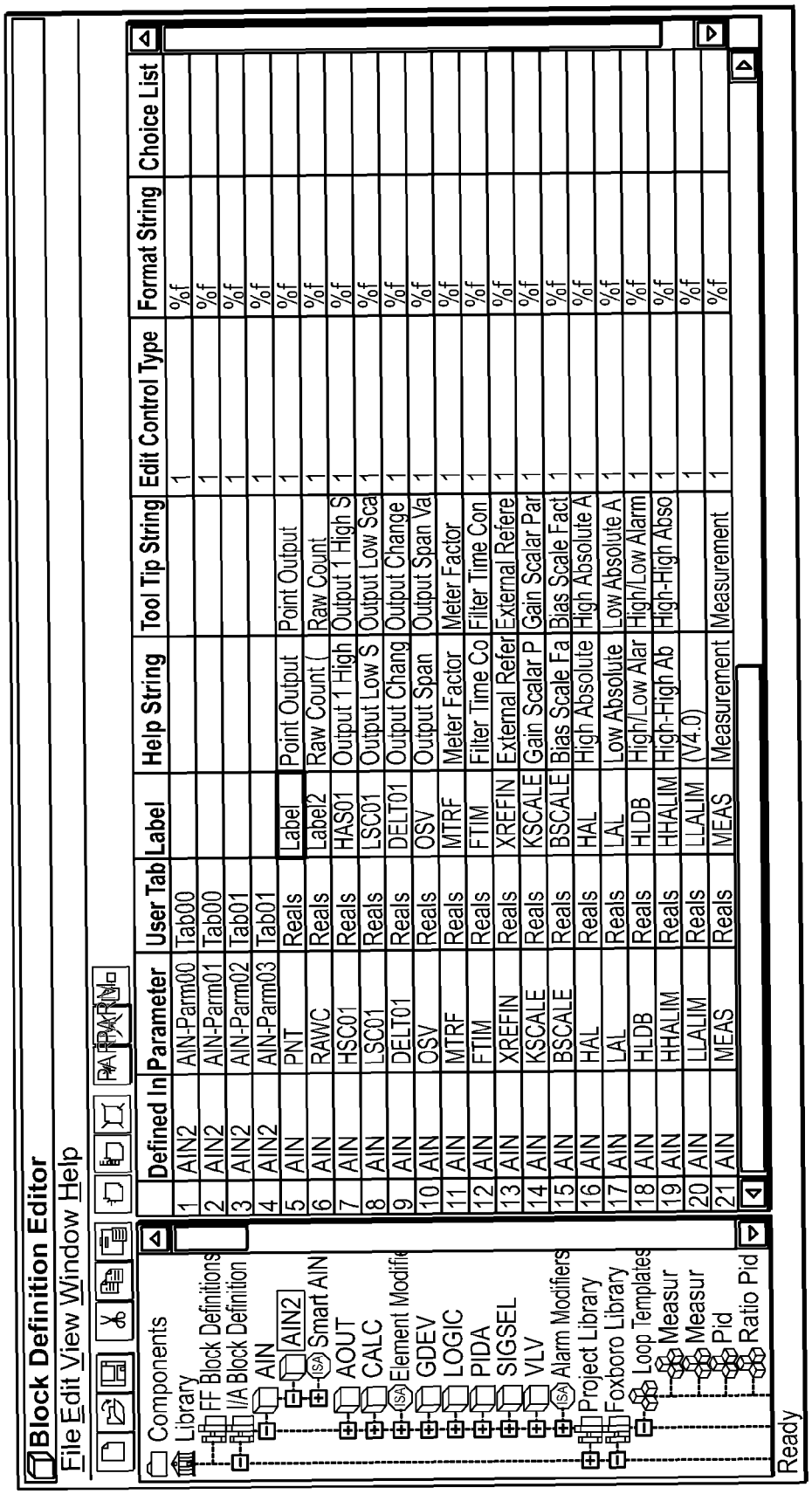
FIG. 69 depicts a block definition editor in a system according to the invention.

FIG. 69 shows the main display for the Block Definition Editor. The user is presented with the Project Manager tree branch representing the hierarchy of block definitions. All block definitions derived from the base types show as lower branches in the tree. A grid view shows the parameters for each block. Each row is a block parameter with the columns representing the parameter attributes. The attribute values for each parameter can be modified by the user. However, some inherited parameters cannot be overridden in the derived block definition: parameter name, value type, etc. Values that are overridden are displayed differently from those defined in the local block definition or in the parent block definition. Both the tree and grid views are based on Framework supplied editor classes.

Definitions for derived blocks can add parameters or modify the attributes of inherited parameters, but inherited parameters cannot be removed. Blocks are derived from exactly one other block definition.

The user cannot modify the implementation-standard blocks. This block set is part of IDA. Personnel with the appropriate security permissions can add, modify and remove any parameters when creating the standard set of IAS blocks. Users can add parameters to definitions derived from these standard block definitions or create new "base" block definitions (not derived from an IAS block type). The first four rows in FIG. 69 show examples of user-added parameters in the Block Definition for block AIN2. These parameters are available for documentation and calculation purposes only, but are not downloaded into running control stations.

There are two classes of parameters, those that are integrated directly with the control system (control parameters) and those that are not (non-control parameters). Control parameters are those downloaded to Control Processors and participate in the running of the control system, such as parameters associated with the standard control block types AIN, PID, AOUT, etc. Non-control parameters can be used for calculations, documentation, etc. and are not downloaded to the CP. Normal users can only add non-control parameters, only authorized personnel (e.g., engineers) can add control parameters.

Each parameter in a block definition contains a fixed set of predefined attributes. Values can be given to all of these attributes in the block definition where the parameter is defined. A subset of these parameter attribute values can be changed in derived blocks, which results in the creation of a parameter override object being created.

The value of a parameter can be defined in two ways—by setting the "value" attribute to a constant value or by setting the "formula" attribute to a formula. In the "value" attribute of a parameter, users can supply constant default values for parameters in block definitions. If a formula is supplied, the result of the formula calculation is used as the parameter value. These formulas are executed when the value of the parameter is requested. Formulas can consist of references to other parameters in the current block, mathematical operations, etc.

Modifier Block Definitions are defined in a manner identical to that of Block Definitions. In Modifier Block Definitions, references to other parameters in formulas are not restricted to existing parameters. See Part 1 for a detailed description of modifier blocks. Parameter groups can be defined to contain any or all parameters defined in the local definition or parent definitions. Parameter groups correspond to the tabs on the Block Property sheet display. The parameter group definition contains information on ordering for parameters contained in the group. All parameters are contained in at least one parameter group, but can be assigned to multiple groups. The user can select the group(s) to which each parameter belongs. Versioning of blocks is supported via standard versioning features supplied by the Framework classes. Each time a block definition is changed, the block version is incremented. This data is used for reporting and tracking of block definition history. A security mechanism is used to verify that the user has privileges to edit the selected block. No customer will have privileges to edit implementation-standard block definitions. These defined blocks can be derived from, but not changed. Reports can be generated on block definitions, changes in the current edit session, and audit trails. The report for changes between versions is helpful internally to facilitate version upgrades to customer systems.

2.2.2 Functions

Figure 70:
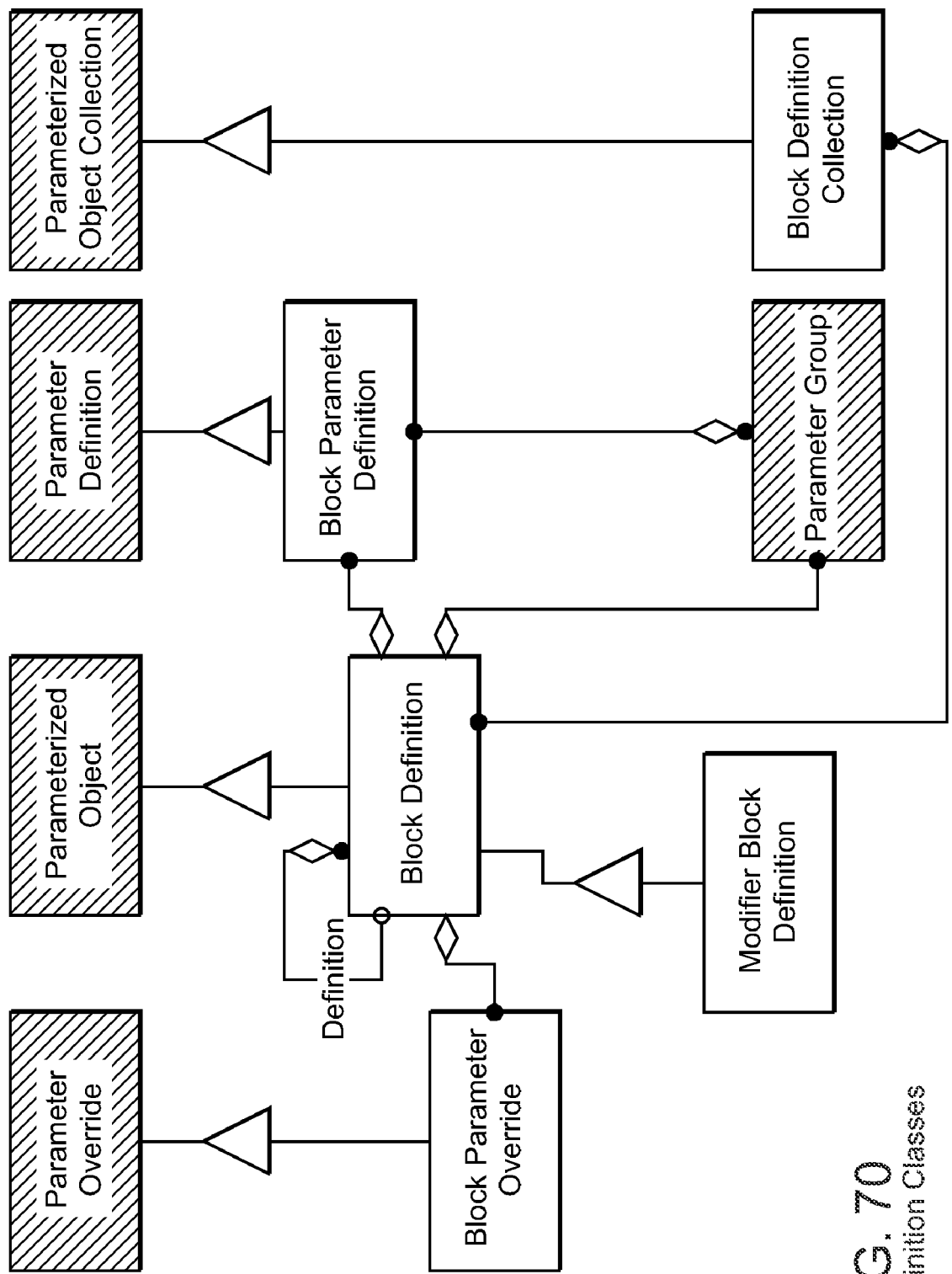
FIG. 70 depicts a block definition classes in a system according to the invention.

The following functions are implemented by the Block Definition Editor:

Create new, derived or copied block definitions
Create new, derived or copied modifier block definitions
Add, remove, or modify parameters
Override parameters inherited from parent block definition, revert to parent value
Group parameters into categories displayed on property sheet during configuration
Provide a mechanism for ordering parameters on property sheet page
View parameters as they would appear on property sheet
Define parameters to be control or non-control types
Define configuration-time formulas for parameter values, recalculate values. These formulas will support math statements, references to other parameters in blocks, etc.
Save/load definition(s) to/from diskette or file
Import definitions from pdef files or FoxCAE tables
Upgrade to new version of standard IAS block definitions
Maintain block version information
Report block/parameter definitions, changes, definitions in use, block derivations
Provide audit trails for definition changes
Provide security which allows only certain people access to block definitions
Provide security against changing implementation standard control block definitions and standard parameter group assignments.
Provide standard editing capabilities: cut, copy, paste, etc.
Provide search capabilities for parameters or content, allowing the user to find parameters of a specified name or containing a specified value The following functions are provided in support of the Block Definition Editor:

Maintain standard set of control blocks
Version upgrade mechanism for redistribution of control blocks 2.2.3 Object Model 2.2.3.1 Block Definition Referring to FIG. 70 Block definitions follow the basic paradigm defined for Parameterized Objects. Block definitions contain lists of parameter definitions and overrides and maintain a pointer to their parent definition. Block definitions can be "base" definitions—those with no parent definitions, or "derived" definitions—those that inherit parameter definitions and overrides from a parent block definition.

The implementation includes a set of base definitions that correspond to control algorithms in Control Processors, called control blocks. Users can derive definitions from this set or create their own base definitions that do not correspond to Control algorithms, called non-control blocks. Only block definitions derived from control blocks will be downloaded into a CP when instantiated in a running system.

Class Relationships:

Block definitions are parameterized objects.
Block definitions can create instances of blocks of their type or block definitions derived from their type. The blocks or block definitions created are also instances of parameterized object-derived classes.
Block definitions contain parameter definitions. The parameter set defines the type and characteristics of the block definition, not the class of the block definition object. All block definitions are of the class "Block Definition", while the type of the block definition varies according to the parameter set. (AIN, PID, etc.)
Block definitions may contain parameter overrides. These overrides modify the inherited parameter definitions.
Block definitions can refer to 0 or 1 parent block definitions. The parent block definition defines a set of parameters that are inherited and can be overridden.
Block definitions maintain an ordered list of Parameter Group Definitions to use in creating a Property Sheet view for modifying block parameter values. Each group corresponds to a Separate Property Page within the Property Sheet. See Part 1 for further discussion of Parameter Groups.
All block definitions are collected in Block Definition Collections for use in reporting, viewing and listing block definitions. These collections reside in the Project Manager "System" hierarchy.

2.2.3.2 Block Parameter Definition

Block parameter definitions consist of a standard, framework defined set of attributes. The attributes of name and type compose the basic definition for a parameter. Other attributes such as default value, limits, description, etc. all contribute to the definition and can be overridden in derived block definitions.

Block parameter definitions contain attributes which indicate whether it is a control or non-control parameter. Control parameters are those recognized by the control algorithms in Control Processors. Only implementation standard blocks can contain control parameters. Non-control parameters can be used for calculation or documentation purposes and do not get downloaded into a CP when they are part of a compound in a running system.

Some block types contain special parameters which cannot be viewed, edited or overridden by the user. Blocks like PLB and Sequence have parameters which are not standard parameter types such as string, float, int, etc. but contain compiled ladder or sequence code.

Class Relationships:
- Block parameter definitions are parameter definitions. They provide all of the attributes of a parameter, such as name, type, description, limits, etc.
- Block definitions contain parameter definitions. The parameter set defines the type and characteristics of the block definition.
- Parameter Groups collect block parameter definition for displaying or reporting of parameters by Group identifier.

2.2.3.3 Block Parameter Override

Block parameter overrides can modify a value or attribute of an inherited parameter definition. When a new block definition is derived from another block definition, any attribute modifications which are made to inherited parameters are stored in the current block definition as an override. Overrides are cumulative. Overrides which appear in a parent apply to derived block definitions as well.

Class Relationships:
- Block parameter overrides are parameter overrides. They provide the ability to override a most of the parameter attributes of inherited parameter definitions. (Not included are parameter name, type, etc.)
- Block definitions contain parameter overrides. These overrides modify the inherited parameter definitions.

2.2.3.4 Block Definition Container

A Block Definition Container provides a grouping mechanism for all block definitions. Separate containers exist for block definitions, modifier blocks, and user work areas for block definitions. At system installation time, the single block definition container for system block definitions is created. Users can create other containers for working copies of block definitions.

A Block Definition Container provides a mechanism for iterating over all of the definitions it contains. This feature is inherited from the standard Parameterized Object Container. Additional iteration methods are supplied by this class to report on block definitions alphabetically or hierarchically. Block Definition Containers take many forms: nodes of the Project Manager "System" hierarchy which are used to hold Block Definitions, palettes of Block Definitions for use in the Control Algorithm Diagram Editor, and others. Class Relationships:
- A Block Definition Container contains block definitions.
- A Block Definition Container is a generic Parameterized Object container restricting the Parameterized Object contents to Block Definitions.

2.2.3.5 Modifier Block Definition

A Modifier Block Definition is a block definition. It can contain parameters exactly like a standard block definition. Derived modifier blocks can override parameter attributes from parent modifier blocks. A modifier block instance can be contained in a loop or composite block just like any other block, but does not behave in the same manner. All parameters in a modifier block instance override parameters matching by name in the block to which it is attached. Modifier block definitions, however remain identical to block definitions. A Modifier Block can contain formulas which reference parameters not necessarily defined in the Modifier Block. Like Block Definitions, the calculations are executed whenever the value of the calculated parameter is requested.

2.2.3.6 Parameter Group Definition

A Parameter Group Definition maintains parameter grouping information to allow reporting or displaying parameters by selective groupings. Standard parameter groupings (such as Input/output, High/Low Alarms, Tuning) are provided for implementation standard block definitions. Users can add their own groupings but are not allowed to change the standard groupings. Class Relationships:
- A Parameter Group Definition is a Parameter Group, from which it inherits the ability to maintain an ordered list of parameters.
- A Parameter Group Definition maintains associations with parameter definitions to define its group.

2.3 Control Algorithm Diagram Editor

2.3.1 Overview

The Control Algorithm Editor is the single editor for all Control Algorithm related work. With this editor, the user can graphically create and edit Loop Templates, Simple Loops, Composite Block Definitions, Blocks and Connections. The user can also view and edit some properties of Composite Blocks and Template-Derived Loops. Composite Blocks and Template-Derived Loops are shown graphically based on their definition or template.

Figure 71:
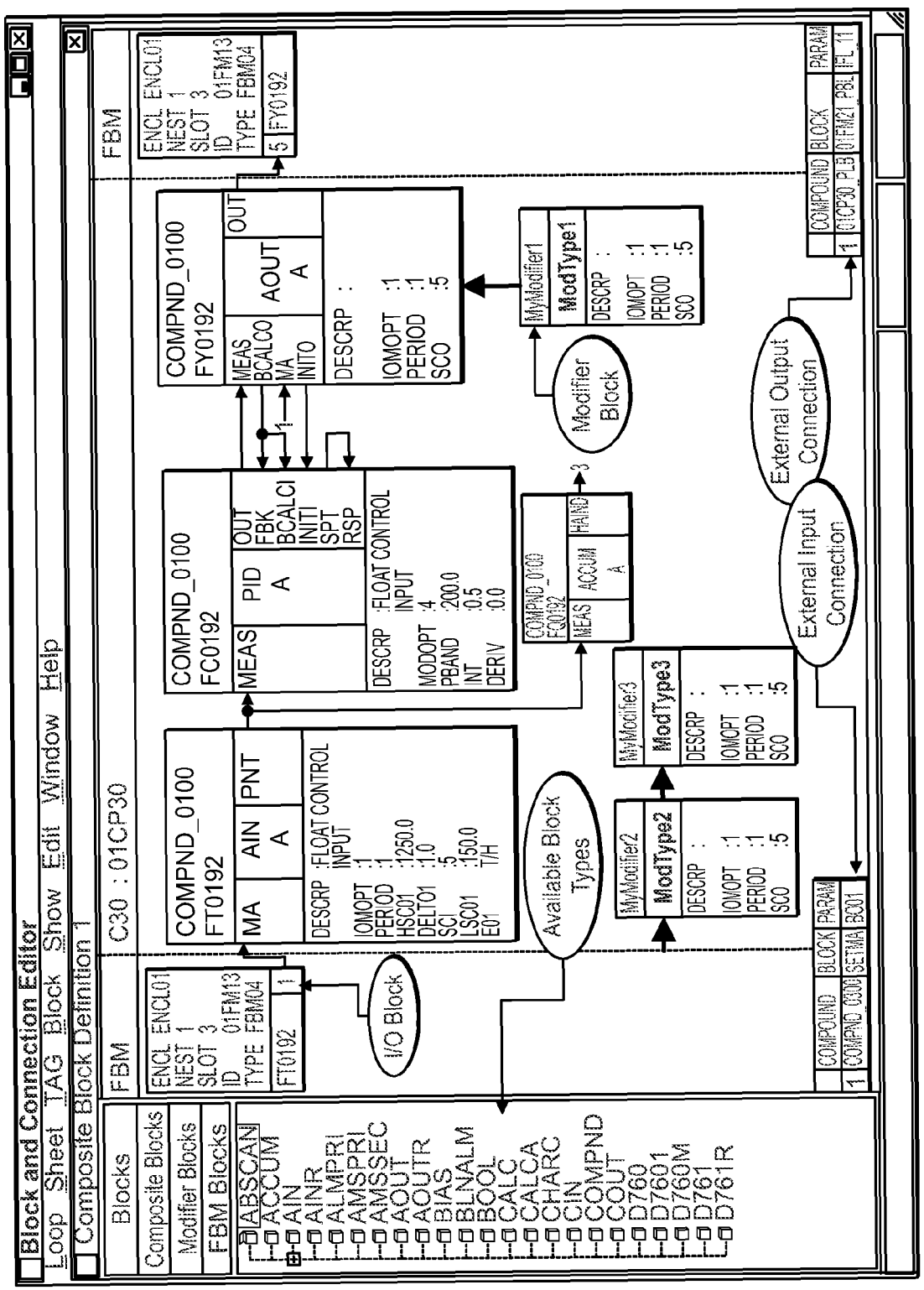
FIG. 71 depicts a simple loop in a system according to the invention.

FIG. 71 shows a single Simple Loop in the Control Algorithm Editor. All control algorithm diagrams graphical views look similar to this display, allowing new Blocks to be added by dragging and dropping from a palette of available Blocks and positioning and connecting Blocks through mouse actions. The block or blocks which compose a loop or Composite Block are displayed in the center of the display. Modifier blocks which are applied to individual are shown in the center with arrows indicating which blocks they are modifying (ModType1). Modifier Blocks which apply to the entire Loop or Composite Block are shown attached to the drawing boundary (ModType2 and ModType2).

Loop Templates define the blocks, block parameters, internal connections, and connections to external hardware points (Tags) for a loop. Any defined block or Composite Block type can be inserted into a Loop Template. When modifications are made to the Loop Template, the user is prompted to download all of the derived loops. Changes made to the Loop Template are automatically inherited by the derived Loops, since the Template is referenced whenever the derived Loops are accessed for display or download.

The user defines any parameter values or connections for the loop and connects the externally exposed block source and sink parameters to I/O Blocks. When instantiated, the placeholder I/O Block attributes (Name, type, enclosure, etc.) are assigned values. Tags are then assigned to connections made within the I/O Block. The I/O Block Placeholders serve to group Tag List Row Placeholders associated with the same I/O device (FBM). When building loops, the user can add and remove I/O Block and Tag List Row Placeholders from the drawing.

Template-Derived Loops are loops which are instantiated from Loop Templates. Individual block parameters and connections to I/O hardware devices can be customized in each separate instantiation. When instantiated, the user assigns the loop to a compound, assigns "real" block names, connects the I/O points to actual tags, and modifies values of parameters in the loop. This is either done manually or via the Loop generation function of the Tag List Editor. Any changes made to information specified in the Loop Template (Blocks included in the Loop, internal Block connections, etc.) result in the user being prompted to convert the Loop to a Simple Loop, which will result in breaking the link to the Loop Template. Parameters for Blocks in a Template-Derived Loop can only be modified if they have been exposed as Loop parameters, as described below.

Simple Loops are loops which have no template. They are edited nearly identically to Loop Templates but can be created in the context of a compound and assigned to "real" blocks and I/O Blocks.

Figure 72:
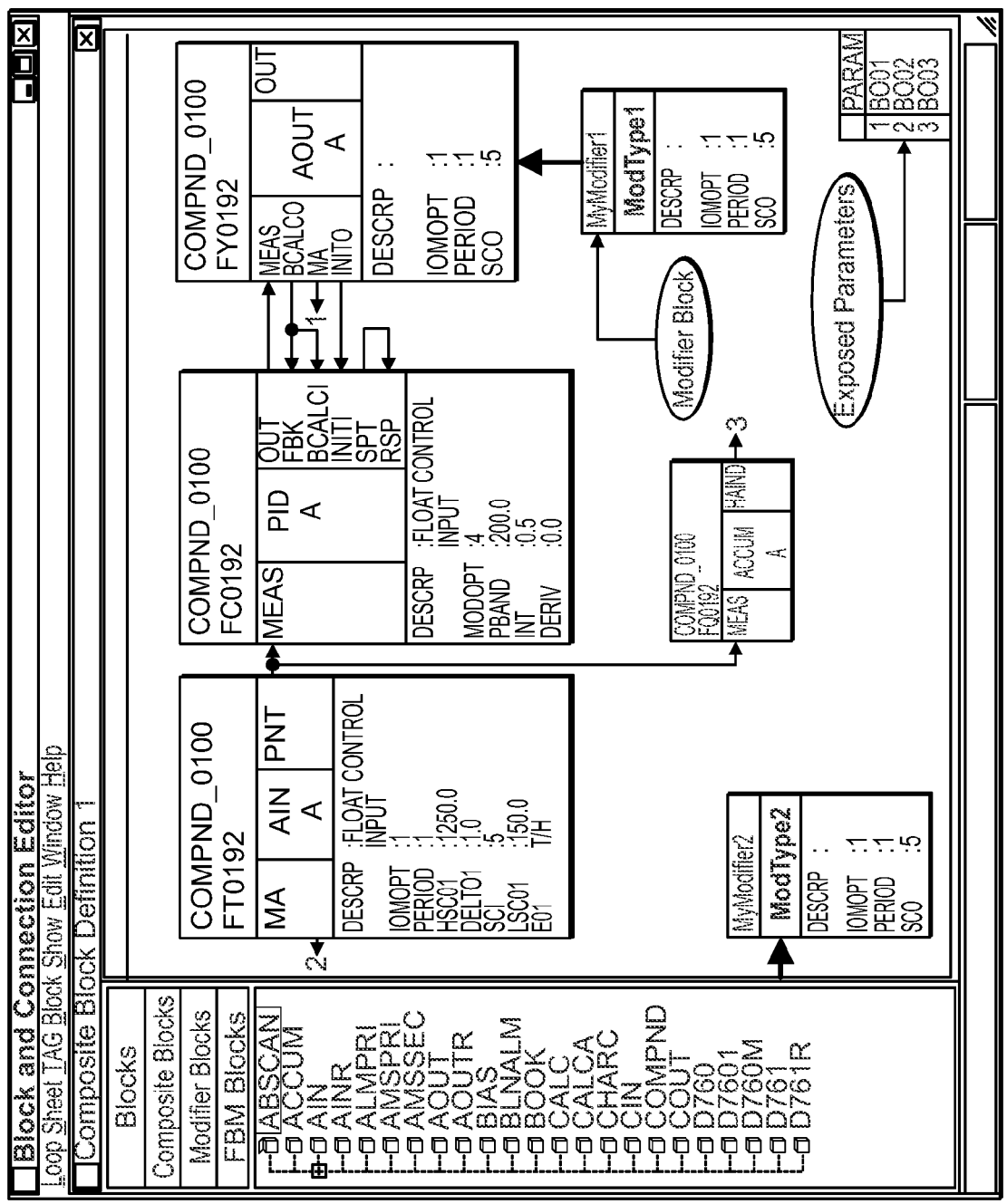
FIG. 72 depicts a composite block definition in a system according to the invention.

Composite Block Definitions define the blocks, block parameters, internal connections, and externally exposed connection points for a Composite Block, as shown in FIG. 72. When a Composite Block is instantiated, it maintains an association with its defining Composite Block Definition. Individual block parameter values can then be modified, or "overridden", in the Composite Block instance. There is no concept of a single-instance Composite Block, a Composite Block Definition is preferably used for every instance of a Composite Block. Like Simple Loops and Loop Templates, the user assigns block parameter value overrides and connections within the Composite Block.

No external connections are created directly for Blocks contained within Composite Block Definitions. Instead, the user defines which internal Block parameters are exposed to users of the Composite Block. Internally, the user is creating a connection between a parameter created for the Composite Block Definition and the internal Block parameter that is to be exposed. These Composite Block Definition parameters inherit their attributes from the parameters they are exposing.

Composite Blocks are instances of Composite Block Definitions. They can be used like standard blocks in anything which can contain blocks. (Loops, Composite Blocks, etc.) Users cannot modify the defined values or connections within the Composite Blocks unless the parameters have been exposed by the Composite Block Definition. Users modify and connect to or from the exposed parameters of the Composite Block, similar to other Blocks. The exposed parameters can be edited on a loop sheet via the parameter property sheet like the parameters of any standard Block.

Figure 73:
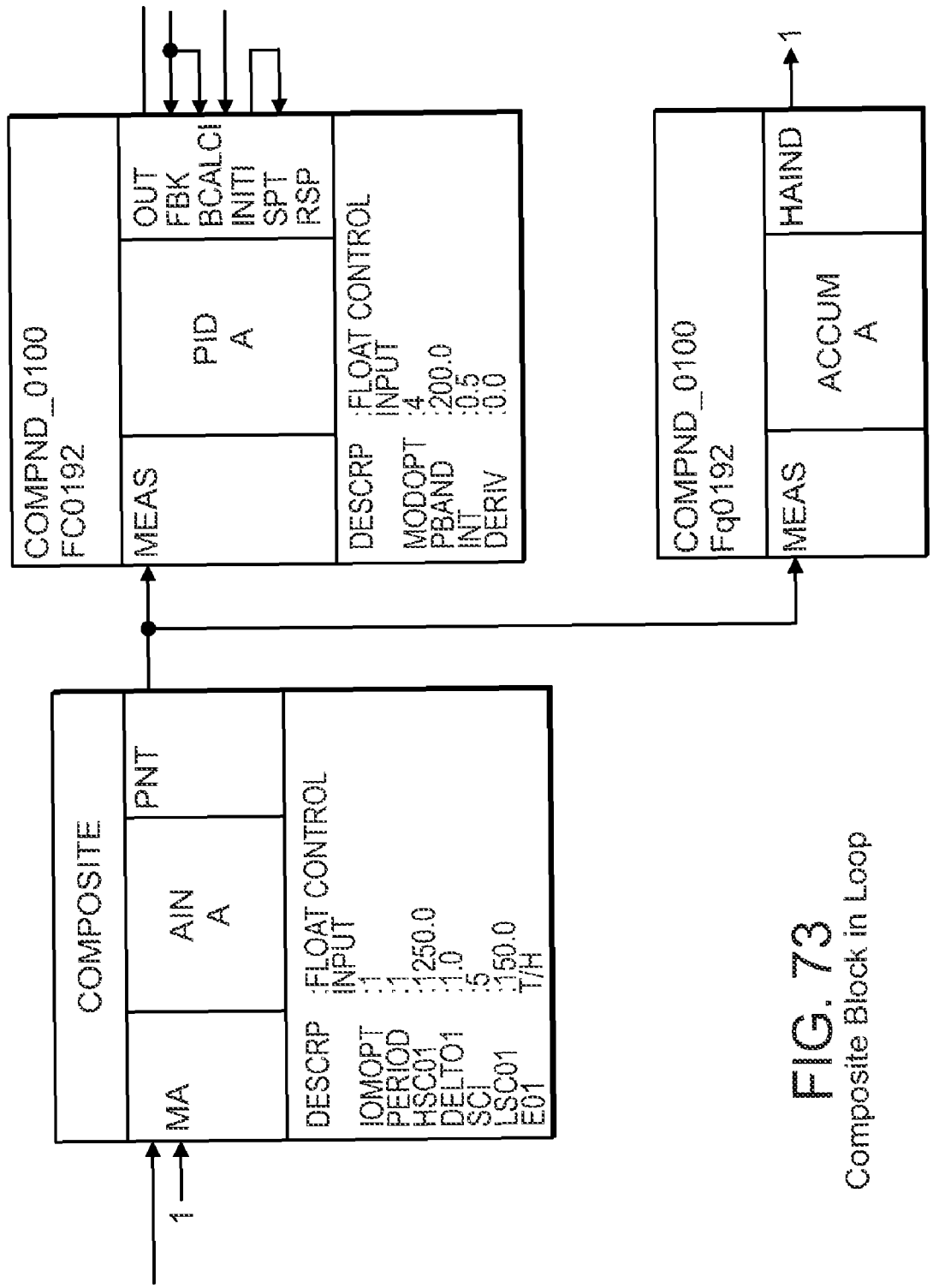
FIG. 73 depicts a composite block in loop in a system according to the invention.
Figure 74:
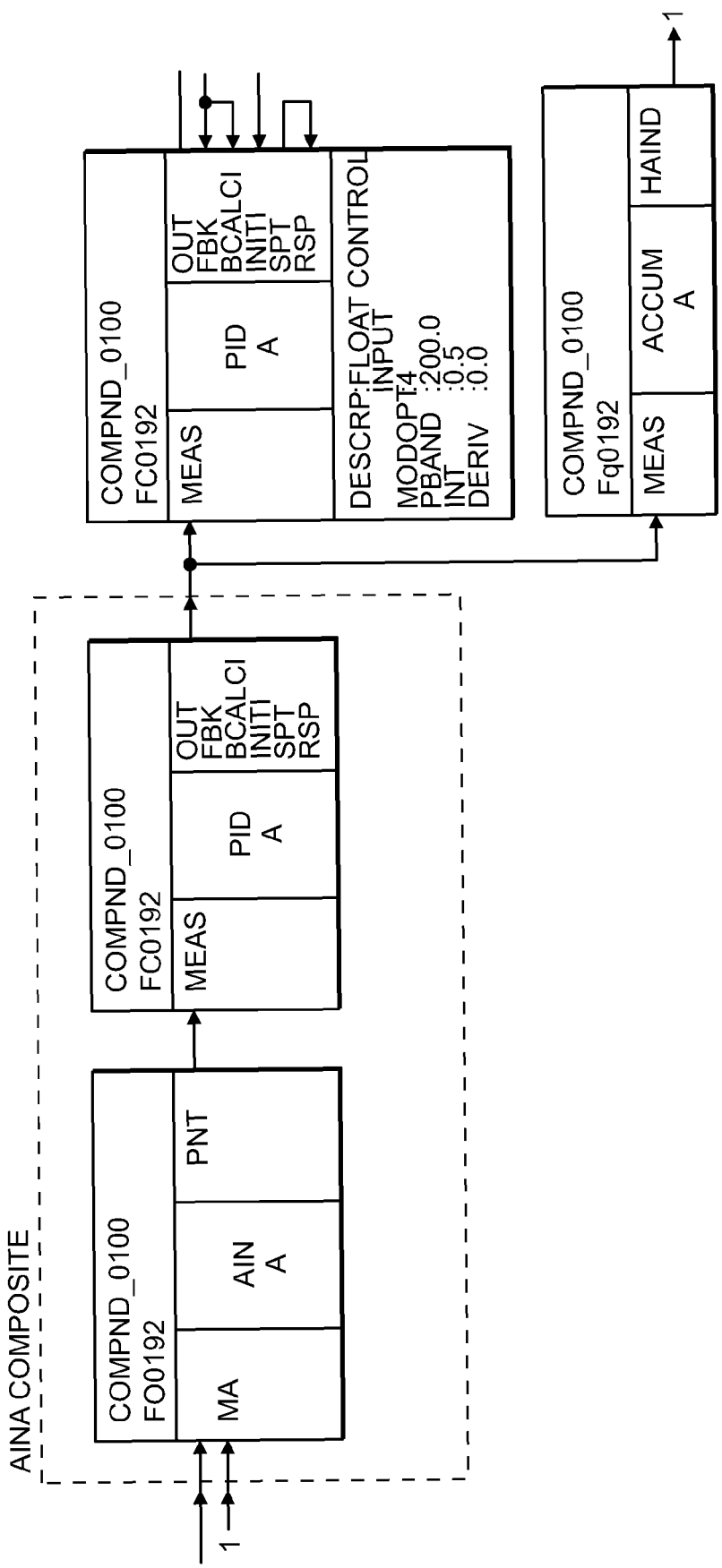
FIG. 74 depicts an expanded composite block in loop in a system according to the invention.

FIG. 73 shows an instance of a Composite Block in a loop diagram. Some exposed parameters for internal blocks are shown like parameters for any standard block. FIG. 74 shows the same loop diagram with the Composite Block expanded in-place to show its internal structure. While Composite Block internals can be viewed this way on a Loop drawing, they cannot be edited. Any attempt to add, delete, or manipulate the Blocks within the Composite Block outline results in the user being prompted to invoke the Composite Block Definition editor view.

All of the Control Algorithm Diagram objects can be stored in the user's workspace or the appropriate branch of the System tree. Simple Loops, Template-Derived Loops and Composite Blocks can be created in the context of a Compound.

Composite Blocks and Composite Block definitions define groups of blocks, connections between them and specific values for the contained block parameters. Simple Loops, Loop Templates and Template-Derived Loops extend this to connect the blocks to external I/O points, represented by an I/O Block.

Figure 75:
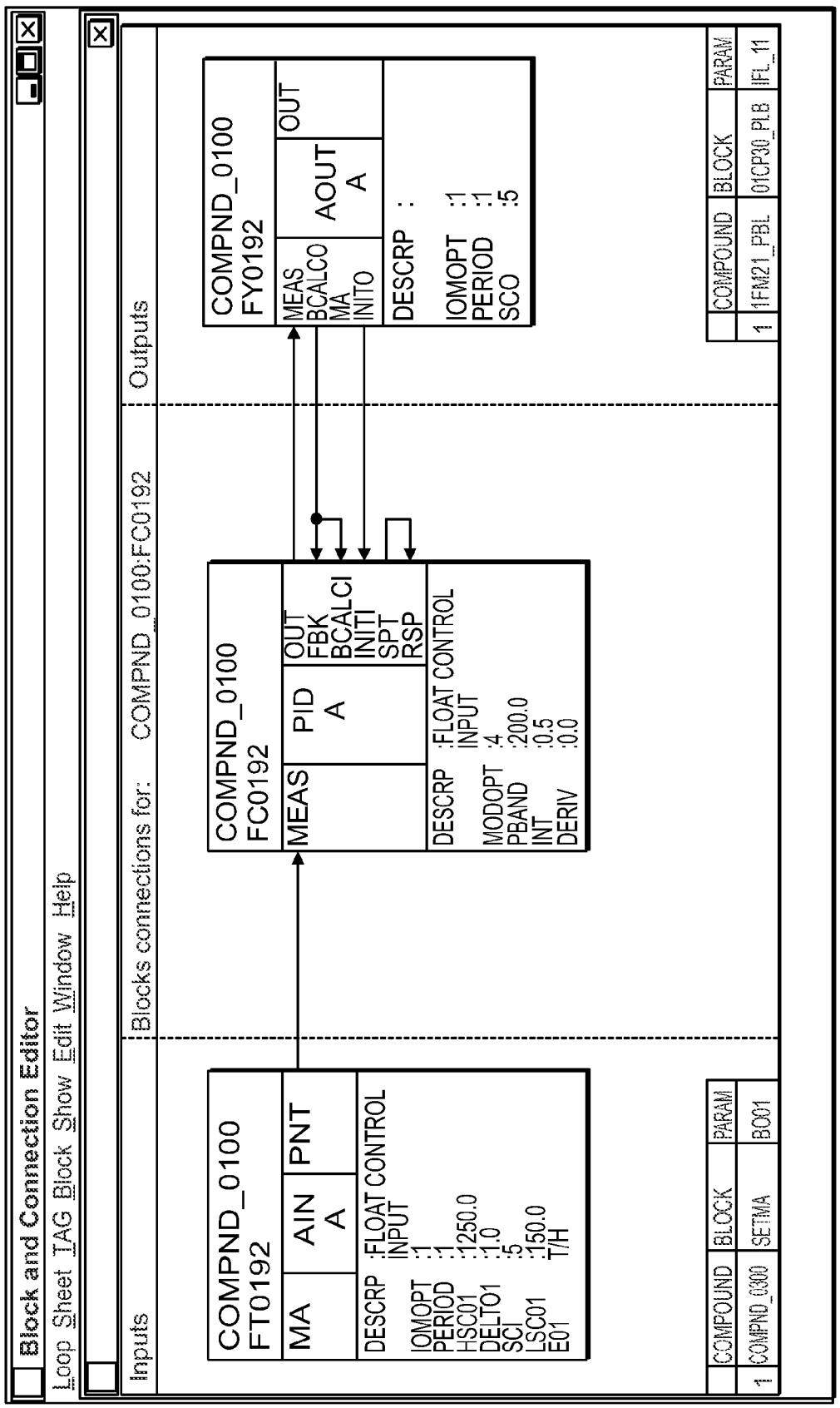
FIG. 75 depicts a block with connections in a system according to the invention.

Blocks and Connections for standalone blocks in compounds can be made with this editor. The user can edit parameter values and make connections to other standalone blocks graphically as shown in FIG. 75. Blocks containing parameters which supply inputs to the current block appear in the left margin and blocks containing parameters receiving outputs appear in the right margin. Only blocks not associated with Loops or Composite Blocks can be edited in this manner.

Each block on a control algorithm diagram is represented internally by a Placeholder. This Placeholder holds information about the geometry, placement, and size of the visual block representation. The placement of the object is user-modifiable. The basic appearance, geometry and size information for an object is maintained in the user-definable Appearance object. The object's Placeholder maintains a reference to its Appearance object. From this representation of a block, the user can access parameter and connection information or navigate to other loops, composite blocks or blocks by accessing the block's context menu.

The user can perform different functions on different parts of the Block Placeholder by right-clicking to bring up the context menu. Context menus contain unique functions depending on the object on which they are invoked. For example, the user has the option to edit connections, parameters, block information, etc. The default double-click function for the Compound/block name section is to prompt for new Compound and Block Names. The default function for the source/sink parameters sections is to bring up a connection dialog. In the Relevant block parameters section, the default action is to select parameters displayed from a list of block parameters. The default action for the center of a block is to bring up the block's Property Sheet.

Figure 76:
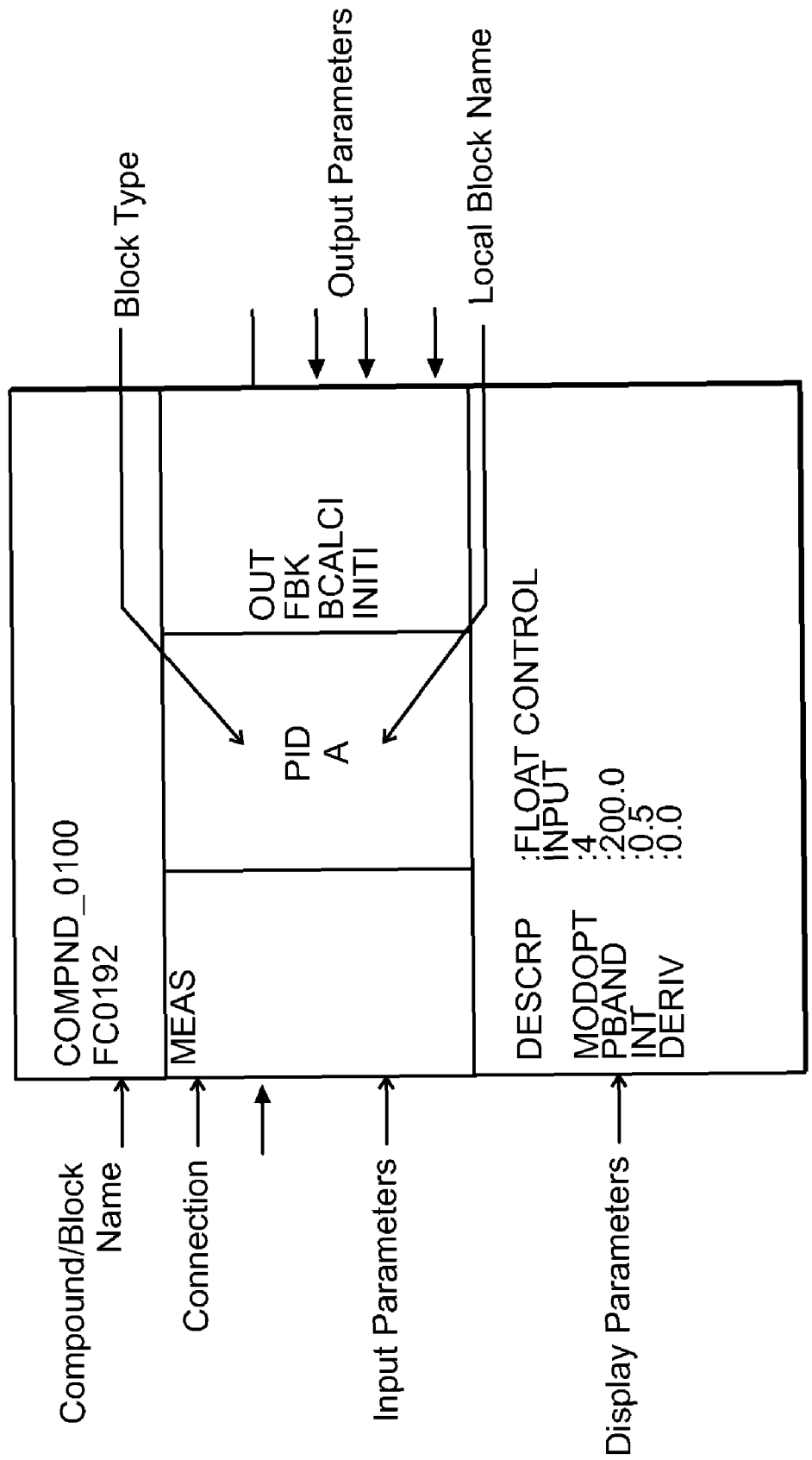
FIG. 76 depicts the anatomy of a block placeholder in a system according to the invention.

Each Block Placeholder on the display has the same basic graphical structure. FIG. 76 shows a typical block on a graphical display. The type of the block is displayed in the center in a larger font than any other in the block for easy viewing. The optional compound name and block name appear at the top in a medium font. On Loop Templates, Composite Block Definitions or any block not downloaded, the compound and block name fields are empty. Connected parameters appear in the source/sink regions of the block. A small font is used for showing parameters. Sink parameters are shown on the left, source parameters on the right. Parameter values that the creator of the diagram have considered to be relevant to the drawing appear at the bottom. When parameters are added or removed from the lists of source, sink, or display Parameters, the block is automatically resized.

Parameters are selected for display from a list presented in a dialog. Internally, these parameter selections are stored with the Placeholder, probably as part of the Appearance Definition. See Part 1 for a more complete discussion of Placeholders and related objects.

Composite Blocks have additional functionality which allows them to be expanded in place on a control algorithm diagram. Composite Blocks can expand to show the internal block representation in a trimmed-down view of the actual Composite Block diagram. The expanded view is shown outlined, to still denote the original Block, as shown in FIG. 74.

The Control Algorithm Diagram Editor has the ability to generate a default graphical representation of a Template-Derived Loop or Composite Block. When loops are automatically generated via the Tag List Editor, for example, the Loop is created, but the graphical representation is not. When the Loop is first printed or displayed, a default representation is created.

All objects on the diagram are "active." Each area of an object has a context which is used for displaying popup menus. For example, the default action for the block type area is to show the property sheet for the block. The default action for the relevant block parameters area is to bring up a list of parameters available to be displayed there. Clicking and dragging from within one of the sink or source areas to another blocks source or sink generates a new connection. If the parameters to be connected are exposed on the Block Placeholders, the connection can be made directly. If the parameters to be connected are not shown on the Placeholders, the user can invoke a connection dialog.

Figure 77:
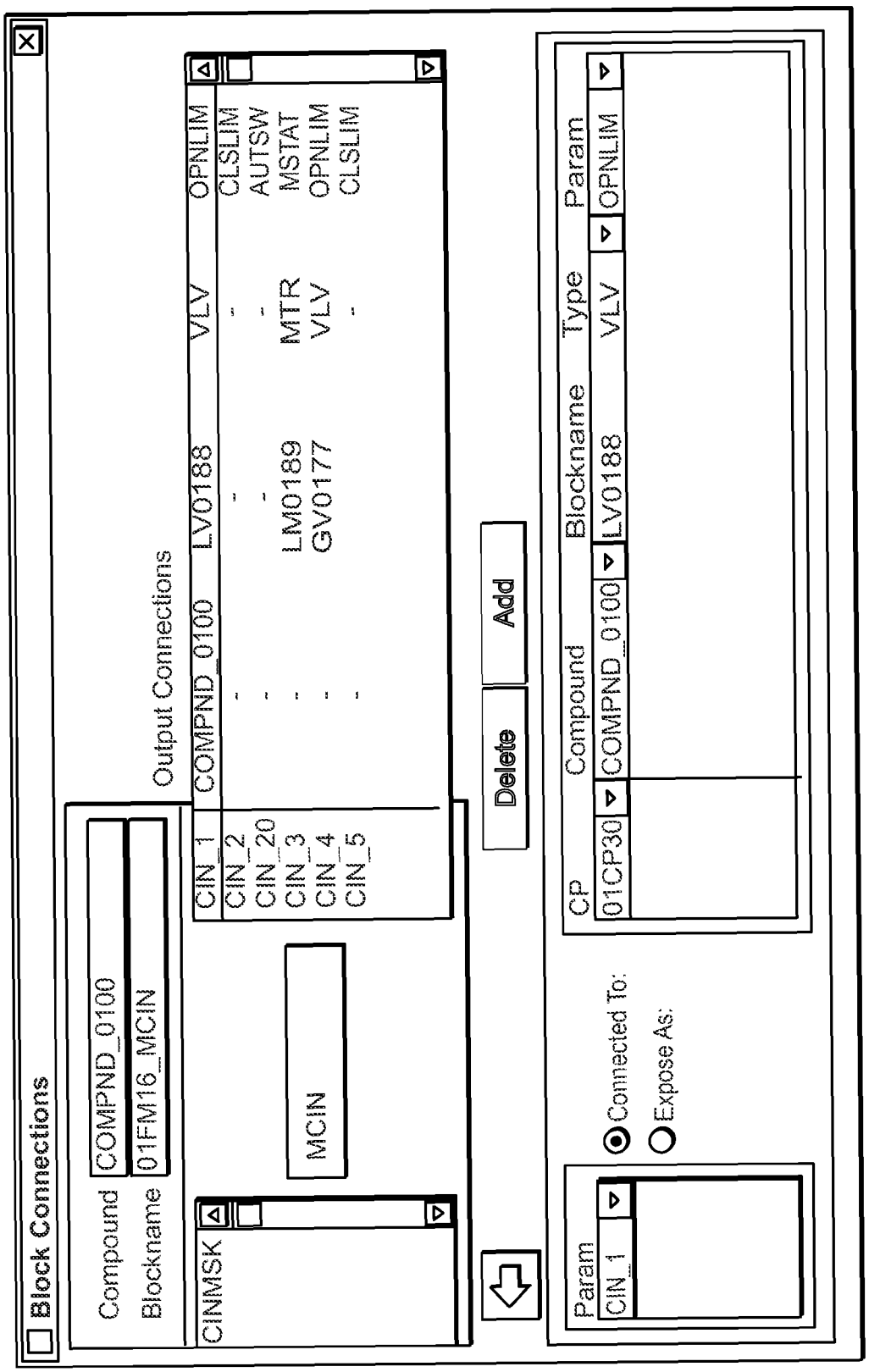
FIG. 77 depicts a block connection dialog in a system according to the invention.
Figure 78:
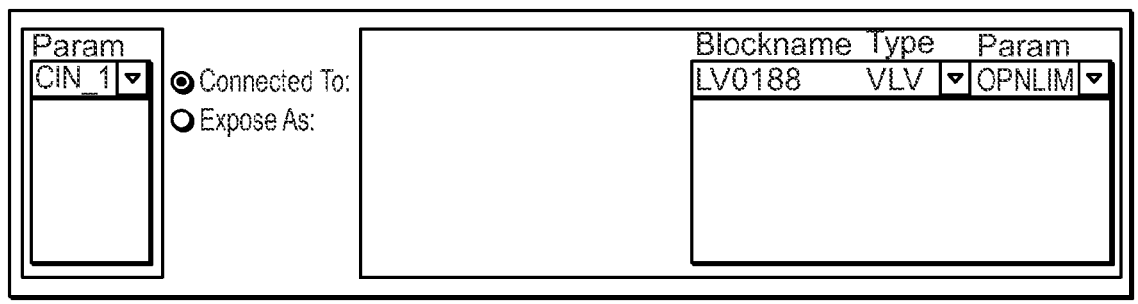
FIG. 78 depicts template/definition internal connections in a system according to the invention.
Figure 79:
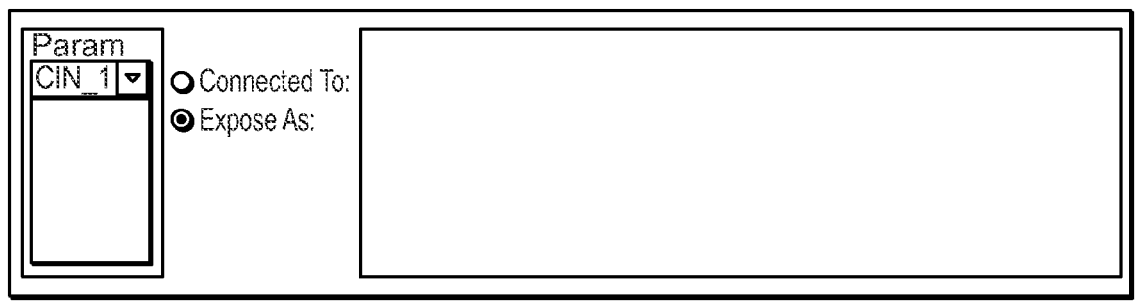
FIG. 79 depicts template/definition exposed connections in a system according to the invention.
Figure 80:
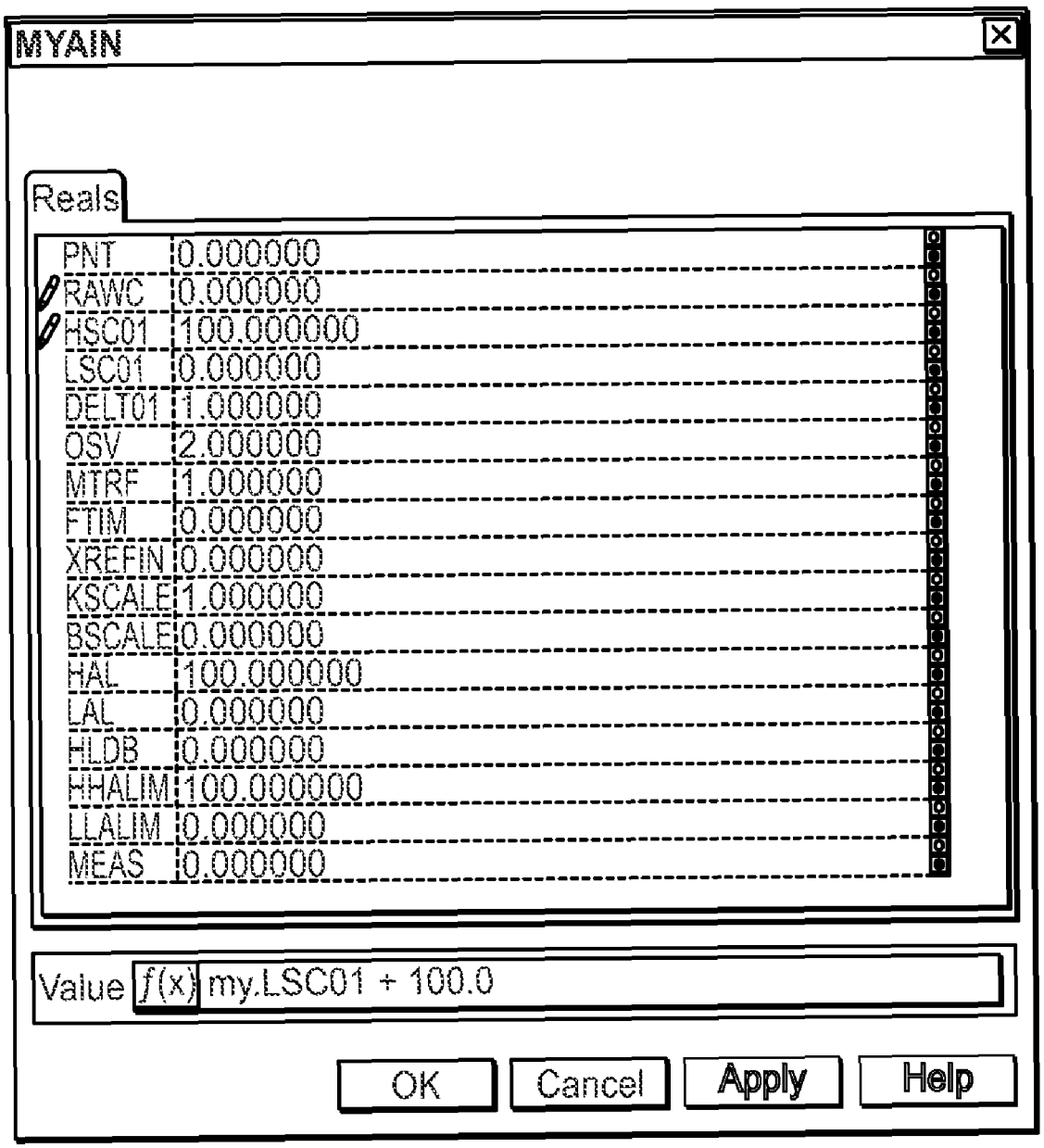
FIG. 80 depicts a parameter property sheet in a system according to the invention.

Using the dialog presented in FIG. 77, users can connect Block parameters in Simple Loops and Template-Derived Loops to parameters in other Blocks in the loop, parameters in blocks outside of the loop, I/O points from a Tag List, or "expose" the parameter as a tuning parameter of the loop. When the user is making connections within a Loop Template or Composite Block Definition, the connection definition portion of the Connection Dialog looks like FIG. 78. Users can only make internal connections or expose parameters as tuning parameters for templates and definitions. FIG. 79 shows the connection definition portion of the dialog when the user has decided to expose a parameter as a tuning parameter or for external connection for a Composite Block.

Connections between blocks and their respective source and sink parameters are indicated with arrows from source to sink parameter. External connections are displayed in the margins—inputs to the Loop, Block, or Composite Block are to the left and outputs are to the right. Connections to and from these blocks and placeholders are indicated in the same manner as internal connections. Connections to Blocks outside the loop or "exposed" parameters in Composite Blocks and Loop Templates are shown as Connections that come out of a Block Placeholder and terminate at a label a short distance from the point of origin. This label then appears in a table at the lower corner of the screen. Inputs are in a table in the lower left, outputs in the lower right. These tables contain the label and the actual C:B.P to which the point is connected.

Figure 81:
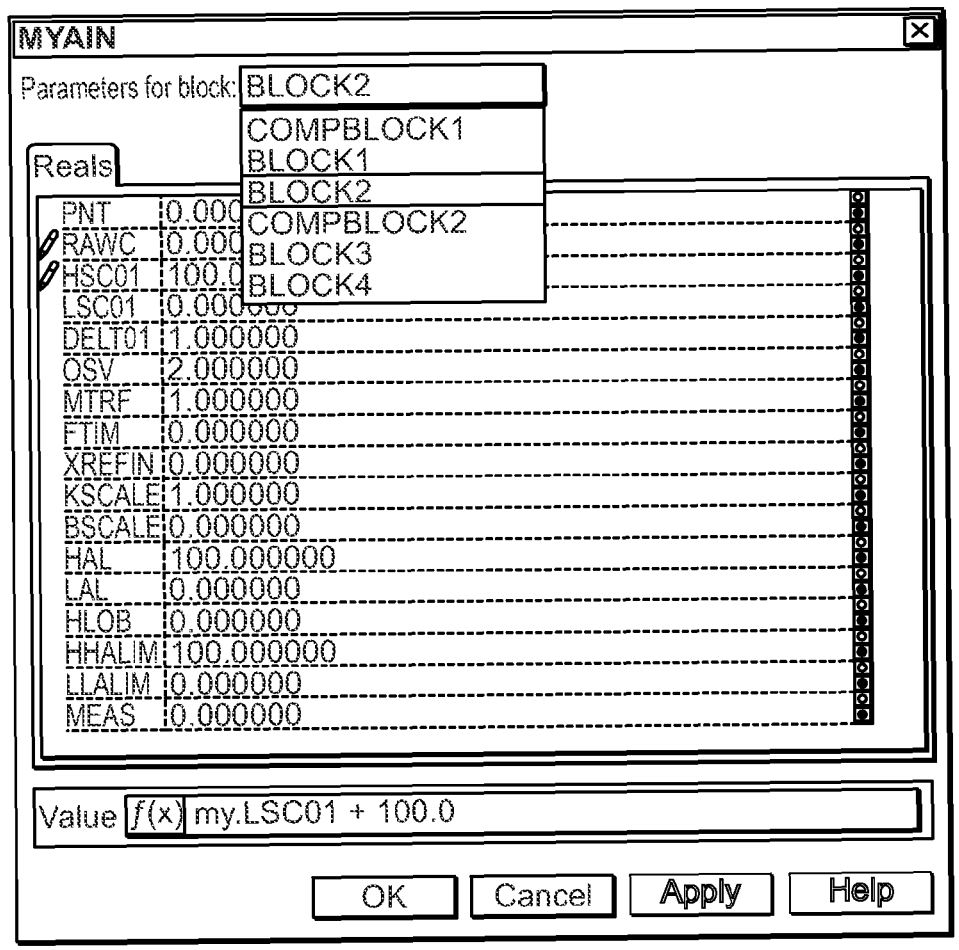
FIG. 81 depicts a composite block property sheet in a system according to the invention.

Users have full control over placement of blocks in the center region and ordering of connections in the source and sink parameter lists. Connection lines are automatically drawn. Blocks in the input and output margins can be reordered or moved between margins. Blocks, Loops, and Composite Blocks can be assigned to Compounds and downloaded via main menu or context menu picks on the individual blocks. Users may select "Edit Parameters . . . " from the context menu of any block. This brings up the property sheet for the block as shown in FIG. 70. From the Parameter Property Sheet, the user can modify values for the Parameters of the selected Block. For Composite Blocks and Template-derived Loops, the user is presented with a dialog like that in FIG. 81. From this dialog, the user can set values for the "exposed" parameters of any contained block. Refer to Part 1 for a more complete description of Property sheets. The pull-down list box shown on the Composite Block Property sheet is a shortcut to navigate to all the internal Block parameters which are exposed. An alternative to this approach is to group all the exposed parameters onto separate Property sheet pages, grouped by Block. The pull-down menu is also useful to incorporate in the Property sheet for Simple Loops, as a shortcut to access Block parameters without having to navigate the Loop drawing.

Figure 82:
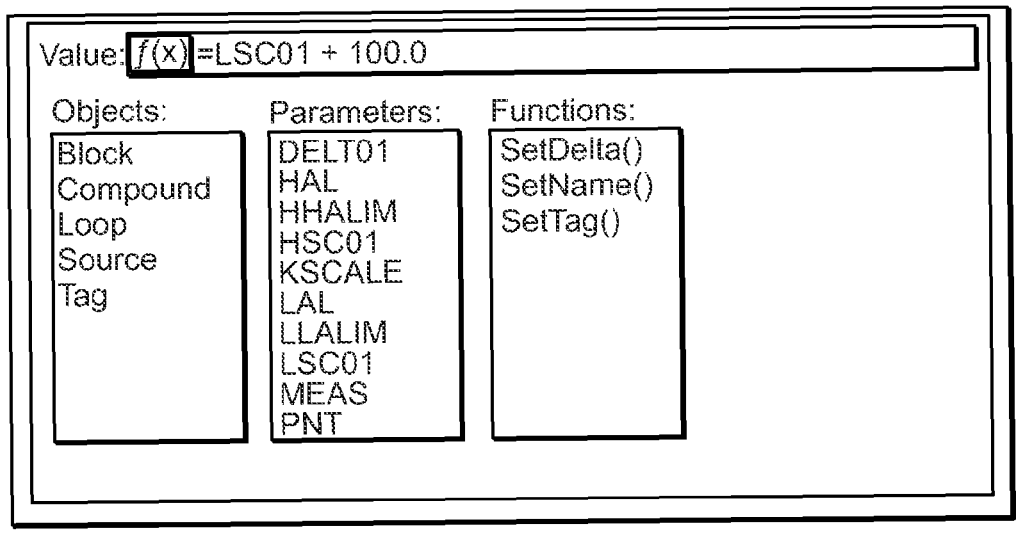
FIG. 82 depicts a parameter formula builder in a system according to the invention.

In addition to entering constant values, the user can enter formulas for Block Parameters to be calculated based on other Parameters, Tags, Connections, etc. as shown in FIG. 82. Refer to the discussion of this document on Smart Blocks for a more detailed description of these formulas.

2.3.2 Functions

The following sections describe functions that are implemented by the Control Algorithm Diagram Editor. Most graphical functions apply to all of the visual block/connection type objects which can be configured. Functions specific to the object being edited are in their respective sections.

2.3.2.1 General graphical Control Algorithm Diagram Editor functions
  Graphical functions
    Graphically create, view, and edit Composite Block Definitions, Composite Blocks, Loop Templates, Template-Derived Loops, Simple Loops
    Display status information (Editing template, editing loop X in C:B.P, online, offline, etc.)
    Undo/redo data or graphical changes, revert to previous version
    Provide standard diagramming and document functions like object alignment, snap to grid, cut, copy, paste, zoom, multiple selection
    Allow user placement of blocks on sheet
    Specify restrictions on instantiation of Loop Template or Composite Block Definition: blocks are preferably in the same compound, fixed block ordering, etc.
    Navigate to other block display by selecting referenced block in current display
    View and edit CALC Block calculations, PLB Block ladder logic, Sequence Block logic, and Logic Block logic.
    Create a Loop which spans multiple Loop Sheets
    Display Composite Block details on diagram.
    Invoke Block Property Sheets from Loop drawing
    Invoke Property Sheet for Block Collection objects (Loop, Loop Template, Composite Block Definition) from drawing sheet
    Display live values for parameters in blocks on current drawing. This can only be done when viewing checked-in copies of drawings, not on user workspace copies.
  Database functions
    Create and edit Composite Block Definitions, Composite Blocks, Loop Templates, Template-Derived Loops, Simple Loops
    Create instances of Blocks and Composite Blocks on a control algorithm diagram
    Connect parameters between blocks on diagram
    Move connections
    Generate Display file for loop or composite block
    Define parameters to display in block display, source and sink regions
    Enter diagram title, description, info, local block names
    Define general formulas used for all blocks in diagram
    Attach Modifier blocks to blocks in diagram or entire object
    Add, delete blocks to sheet
    Edit block parameters via property sheets
    Copy blocks from one instance of editor to another or within single editor via drag-drop.
    Create new loops, composite block definitions, loop templates from groups of selected blocks
    Maintain version history and audit trail of templates, definitions, instances
    Security based on default and administrator-configurable read, write, download, etc. permissions, as provided by Framework security functions
    Allow only authorized developers to modify implementation standard Block Definitions and Loop Templates
    Assign Blocks in Loops to different Compounds or all Blocks in Loops to a single Compounds
    Define block processing order for blocks in a loop. This value is a suggested order which can be overridden by actions in the Compound Editor.

Determine Block names at Loop instantiation time based on name macros, loop macros, and Modifier Blocks applied Download Blocks/Loops to CP Provide "Save As" functionality—Composite Block can be saved as Loop, vice-versa Ensure valid connections between blocks Assign Blocks to Compounds either individually or by Loop Provide back documentation capability in support of Import/Export Manager. This includes the ability to generate a default drawing layout for Loops and Loop Typical (templates) imported from FoxCAE.

Provide bulk Loop generation capability in support of Tag List Editor capability to generate Loops from the Tag List.

Import and export Blocks, Block Definitions, Composite Block Definitions, Loops, Loop Templates, Template-Derived Loops to/from diskette using IDA format Other general functions Print sheet Optionally show/print Sequence, CALC, and PLB Block Logic on secondary sheets Report on definitions, instances, connections, instances of specified definition or template Interact with other editors:

Invoke Block Definition Editor

Modify/create Block Definitions

Invoke Historian Collection Point Editor

Assign Parameters, Blocks, or Loops to Historian Collection Group

Invoke Import/Export Manager

Import and export Blocks, Block Definitions, Loops, Loop Templates to/from external packages Invoke Compound Editor Assign blocks to compounds Assign block ordering within compounds Invoke Download/Upload Manager Download Loop/Blocks to CP Upload current parameter values Invoke Enclosure Editor Assign Tags to FBM Modules Invoke Tag List Editor Assign tags to loops Generate loops from tags Automation Interface functions Create/delete Blocks, Template-Derived Loops Upload/download Blocks, Loops Set/get parameter values Get lists of available Blocks, Compounds, Loop Templates, etc.

2.3.2.2 Loop Template Unique Functions

Create Loop Template exposed parameters, connect internal Block parameters to exposed parameters Connect parameters to I/O Block Show blocks which are targets for external point connections on sheet, different from blocks contained in template Create "soft connections—Connections which are created based on Tag List information Example: Connect to shared MAIN block parameter based on correlation with tag associated with MAIN inputs from I/O Edit Loop Template which has instances Mark all derived instances of Template-Derived Loops as "needs to be downloaded"

Prompt to download all affected Template-Derived Loops

Figure 83:
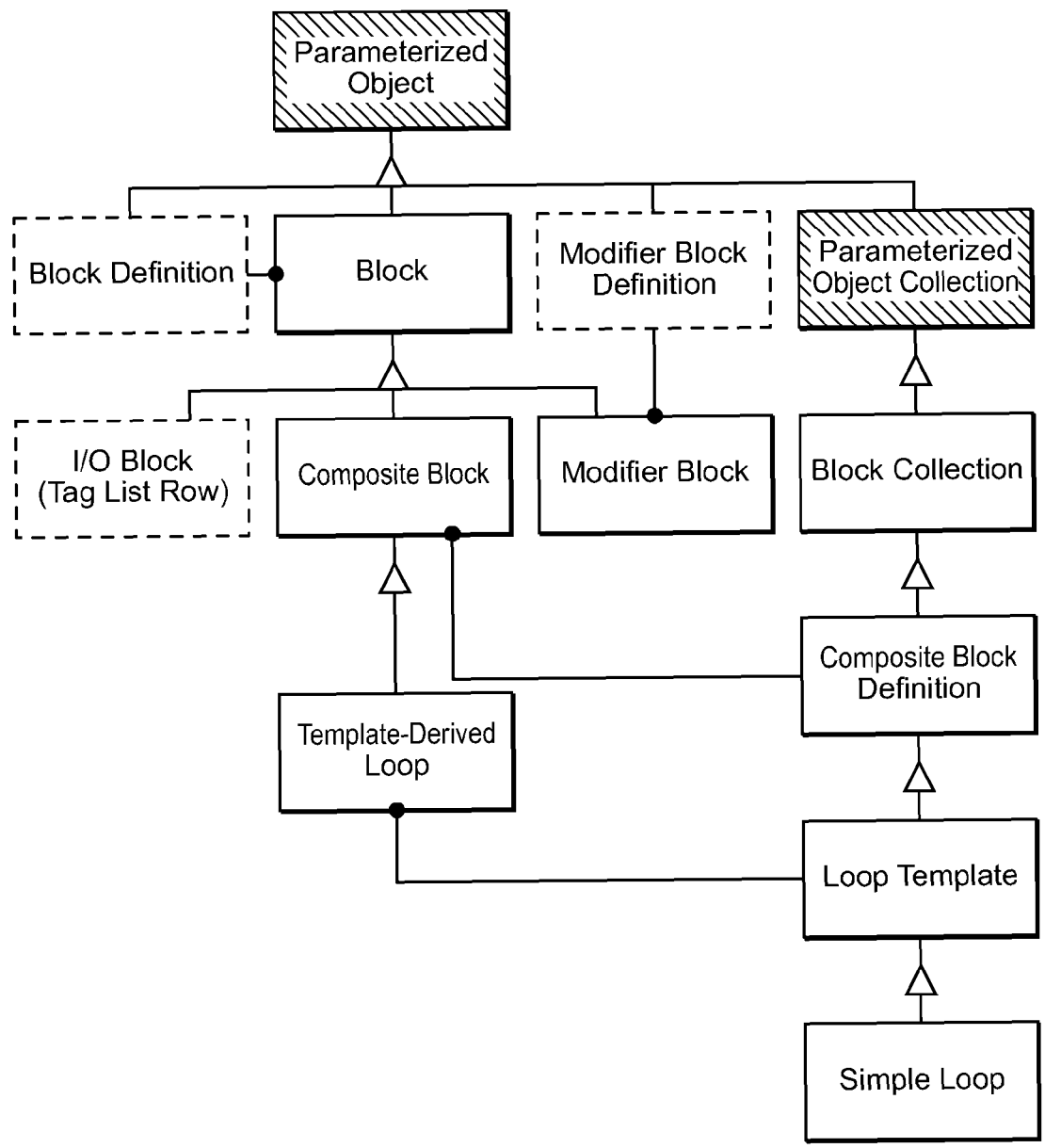
FIG. 83 depicts control object derivations in a system according to the invention.

Provide information on what blocks/compounds may be affected 2.3.2.3 Template-Derived Loop Unique Functions Connect parameters to I/O Block parameters Generate Template-Derived Loops from Loop Templates Assign I/O Block placeholders to Tags Override internal block parameter values on database upload, including parameters which are not exposed Disconnect from Loop Template—convert to Simple Loop 2.3.2.4 Composite Block Definition Unique Functions Create Composite Block exposed parameters, connect internal block parameters to exposed parameters Prohibit external parameter connections, all connections are preferably through exposed parameters 2.3.2.5 Composite Block Unique Functions Override internal block parameter values on database upload, including parameters which are not exposed Create instance of Composite Block in Simple Loop/Loop Template/Composite Block Definition, connect exposed points Show as single block or expanded block detail on sheet, including block structure and internal connections 2.3.2.6 Simple Loop Unique Functions Connect parameters to I/O Block parameters 2.3.3 Object Model The following sections describe the object model used by the Control Algorithm Diagram Editor. FIG. 83 shows the basic control objects and the Framework objects from which they are derived. These objects are shown in greater detail in later figures. Note that the I/O Block described in these sections is actually a Tag List Row, as described in the Tag List Editor section of this document.

Modifier Block Definitions, Composite Block Definitions, and Loop Templates are unique definitions in that unlike Block Definitions, other definitions cannot be derived from these objects. If a user wants to create a variant of these definitions, this can be done by copying the definition and then modifying the copy.

2.3.3.1 Block

Figure 84:
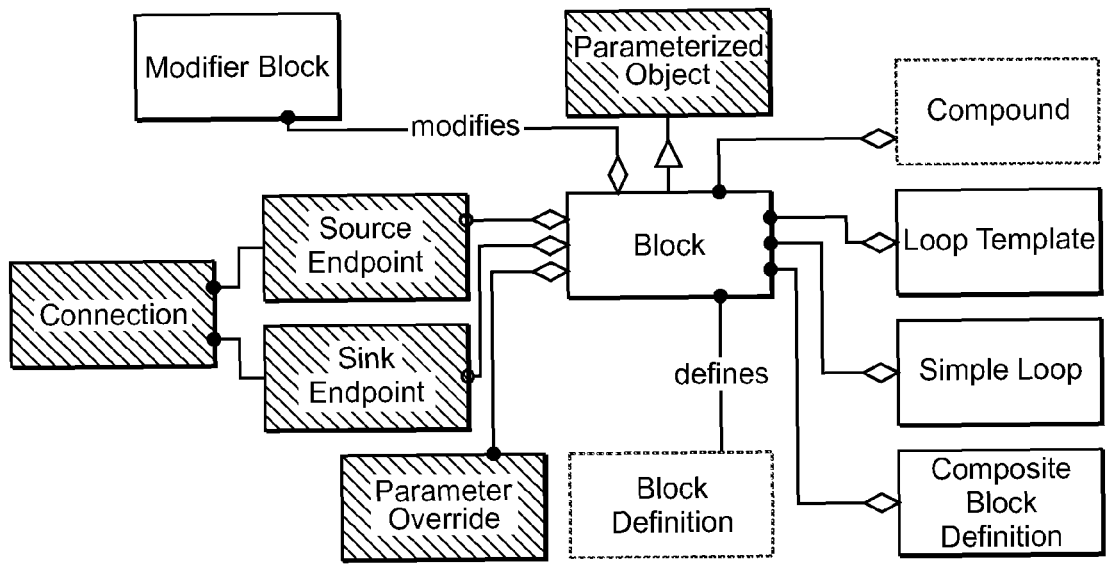
FIG. 84 depicts a block object model in a system according to the invention.

Referring to FIG. 84 Block is the foundation for all control on the IAS system. All of the control structures defined in this editor are based on Blocks and collections of Blocks. A Block is a container for Parameters. Each of these parameters has a type (float, string, integer, etc.) and attributes (connectable, high range, low range, length, etc.) which define the range of values it can contain. These parameters can also be connected to parameters in the same block or any other block in the system via the Source Endpoint and Sink Endpoint lists. Each Endpoint object represents a parameter in the current block. A single parameter can be the source for many other parameters, but may only be a sink of one parameter. Therefore, only one Sink Endpoint may exist for each parameter while many Source Endpoints can exist for each parameter. Blocks must preferably have a definition. A Block Definition defines the set of parameters names, types, attributes and values for a block. The set of parameters defines the block type. See Part 1 for a detailed description of Parameters, Parameter Definitions, and Parameter Overrides. The Block Definition can be a simple Block Definition, a derived Block Definition or a Block Instance. In any case, the Block contains a list of Parameter Overrides which override the default values in the definitions.

Blocks contain a list of Modifier Blocks which are applied to them. Modifier Blocks contain a list of parameter values. For any parameter values in the Modifier Block which have matching names, the values in the Modifier Block override the values in the Block.

When a Block's parameter values are needed, they are determined by the following algorithm. For each parameter defined in any parent Block Definition, all Modifier Blocks are searched for matching parameter names. If there is a match, the value is used. Otherwise, the heritage tree is searched for any overrides or default values. The exact logic is encapsulated into Parameters, described in the Part 1. If the root Block Definition for this Block is defined as an implementation standard Control Block, the control parameter values then can get installed to a IAS control station.

Blocks can be contained in Compounds, Loop Templates, Simple Loops, and Composite Block Definitions. Blocks are not actually contained, but logically contained in Composite Blocks and Template-Derived Loops by way of their parent definitions or templates. Blocks which are in Template-Derived Loops, Simple Loops, Composite Blocks, or single Blocks can be assigned to a Compound in an IAS system. When Blocks are installed, they are then contained by both the loop or composite block to which they belong and the Compound to which they are assigned.

Blocks contain lists of Source Endpoints, Sink Endpoints, Parameter Overrides, and Modifier Blocks. All of these lists and their handling are inherited from Parameterized Object. The list of Modifier Blocks inherited is a Parameterized Object list, Block enforces that only Modifier Blocks are placed in that list. Blocks are capable of interacting with the IAS via its application programming interface (FoxAPI) and the DB Installer. When a block is told to download or upload to/from a CP, it establishes a connection to the CP and performs the requested function. When viewing live data on a loop diagram in the future, the Block will be capable of creating an list via FoxAPI and retrieving live values for displayed parameters and connections.

Both Block and Block Definition are derived from Parameterized Object to take advantage of the services provided by that class. Block and Block Definition are separate classes because they perform different roles in the Control Algorithm Diagram object model. Block Definitions are static objects, which cannot be downloaded, can contain definitions of Parameters and Overrides, and can only reside in the Block Definition portion of the database. Blocks can be downloaded, can only contain Overrides, and reside in the Project portion of the database.

Class Relationships:
  The Block object maintains a reference to its Block Definition. This definition could also be another Block instance, which in turn, refers back to its Block Definition.
  Block is derived from Parameterized Object. It inherits its ability to maintain a list of parameters, be contained in a Parameterized Object Collection, maintain endpoints to connections, and keep a list of Modifier Blocks from this parent class.
  Block maintains a list of Parameter Overrides. These values override the values or default values of parent Block or Block Definition.
  Block maintains a list of Source Endpoints and Sink Endpoints for connections made between Parameterized Objects.
  Block can contain references to one or more Modifier Blocks. Modifier Block parameters act as overrides to the current Block.
  Blocks can be contained in Compounds, Loop Templates, Simple Loops and Composite Block Definitions. They are also logically contained in Composite Blocks and Template-Derived Loops via reference to their respective definitions or templates. Blocks maintain associations with their containers for use in "where used" reporting, supported as part of the Framework.

2.3.3.2 Modifier Block

Figure 85:
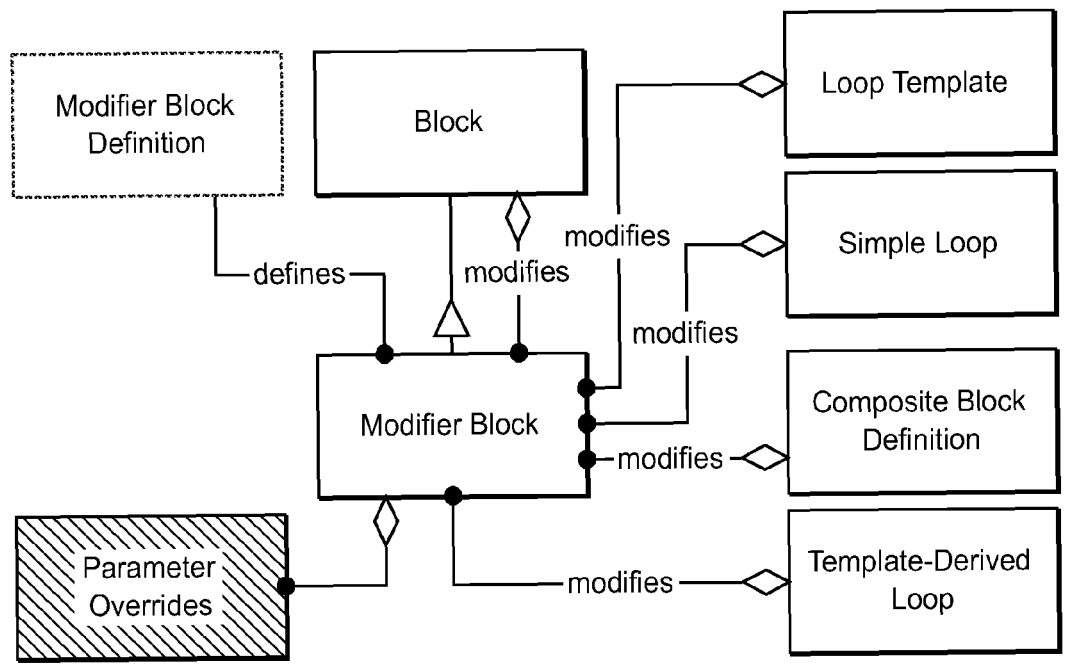
FIG. 85 depicts a modifier block object model in a system according to the invention.

Referring to FIG. 85 A Modifier Block is an object that modifies all matching parameters in an associated Block or block collection object. Whenever an object needs to reply to a request for parameter values, any associated Modifier Block parameter values override Block values and Block Definition default values. Handling of the Parameter Values is managed by the inherited Block class. No Source Endpoints or Sink Endpoints are used by Modifier Block. Connections cannot be made to parameters in a Modifier Block.

Like any Block, Modifier Blocks have definitions which give each Modifier Block its type. Modifier Block maintains a reference to its parent definition. This mechanism is identical to that of the Block object. Modifier Blocks can be attached to all types of block collection objects, but do not appear in Compounds. They contain parameters but do not get downloaded like other Block types. The Modifier Block parameters apply to the matching parameters of all Blocks or block collections which contain it. Modifier Blocks do not apply Parameter Overrides to Blocks within Composite Blocks or Template-Derived Loops. Parameters are preferably be exposed for Modifier Blocks to affect Parameters in Blocks inside the Composite Block or Loop. Parameter values for a block are determined by looking at related objects in the following order:

1. Block Definition Hierarchy
2. Global Modifier Block (attached to entire Loop)
3. Local Modifier Block (attached to specific Block)
4. Local Block Any values found along this path become the value for the Parameter. For example, if a Global Modifier Block contains MEAS=5 and a Block on the Loop has a value of MEAS explicitly set to 4, then MEAS=4 for that Block because the Local Block value overrides all other values.

Figure 86:
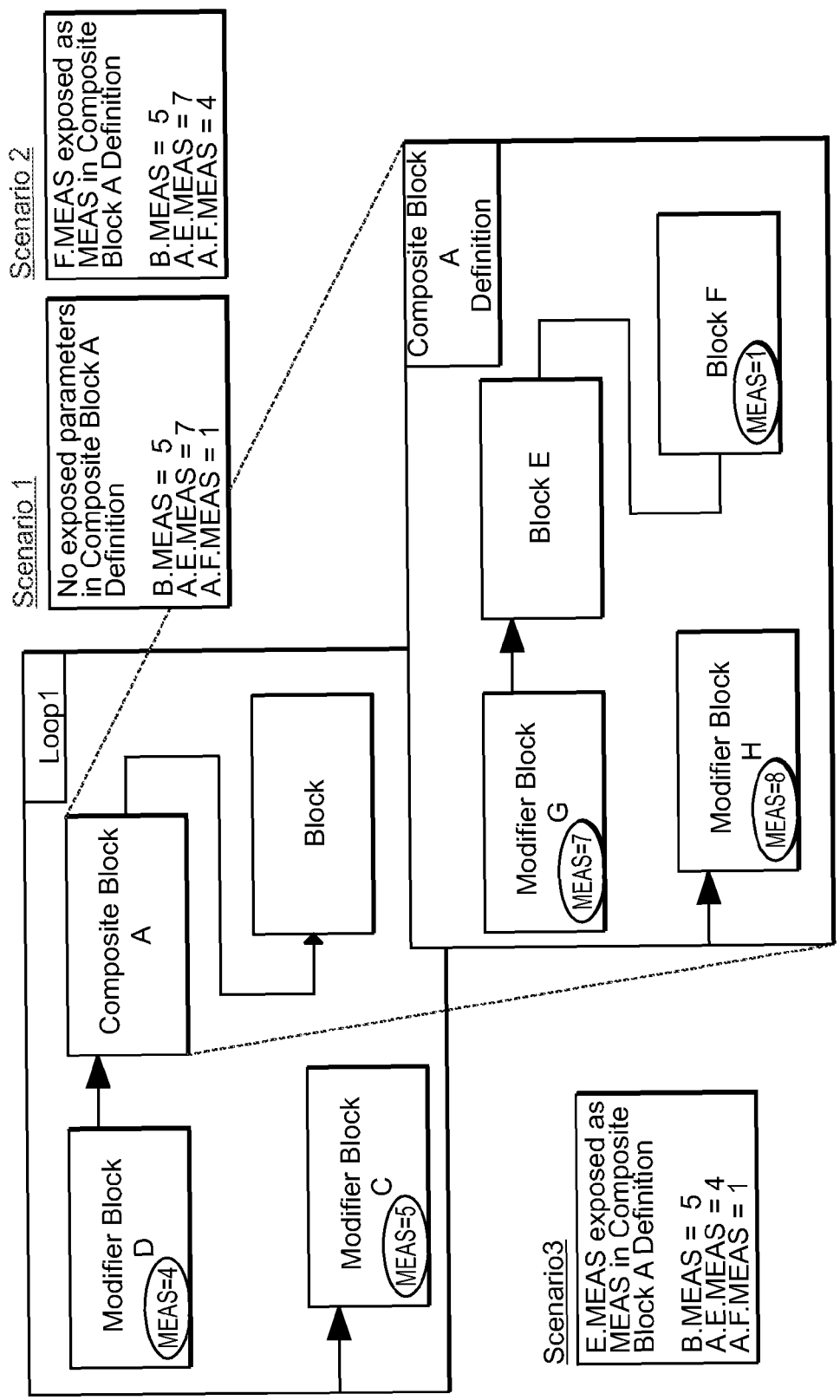
FIG. 86 depicts a modifier block parameter override precedence in a system according to the invention.

FIG. 86 presents a Simple Loop containing a Composite Block with several Modifier Blocks. Three scenarios are presented for the configuration.

Scenario 1: In this scenario, no parameters of Composite Block A are exposed. Therefore, Modifier Blocks in Loop1 can have no effect on Block E and Block F. Modifier Block H applies to both Block E and Block F, but Modifier Block G overrides this value.
  Scenario 2: In this scenario, the MEAS parameter of Block F is exposed in Composite Block A. This allows the Modifier Blocks in Loop1 to adjust the Parameter value. Again, the local Modifier Block (Modifier Block D) affects the value of MEAS.
  Scenario 3: In this scenario, the MEAS parameter of Block E is exposed in Composite Block A. The MEAS parameter of Block E now takes on the value of the local Modifier Block in Loop1.

Class Relationships:
- Modifier Block is derived from Block. From Block it inherits the ability to be contained in a block collection and its ability to manager Parameter Overrides.
- Multiple Modifier Blocks can be contained by Composite Block Definition-derived object or Block-derived objects.
- Modifier Block maintains a reference to its definition, if any, which can be an instance of a Modifier Block.

2.3.3.3 Composite Block Definition

Figure 87:
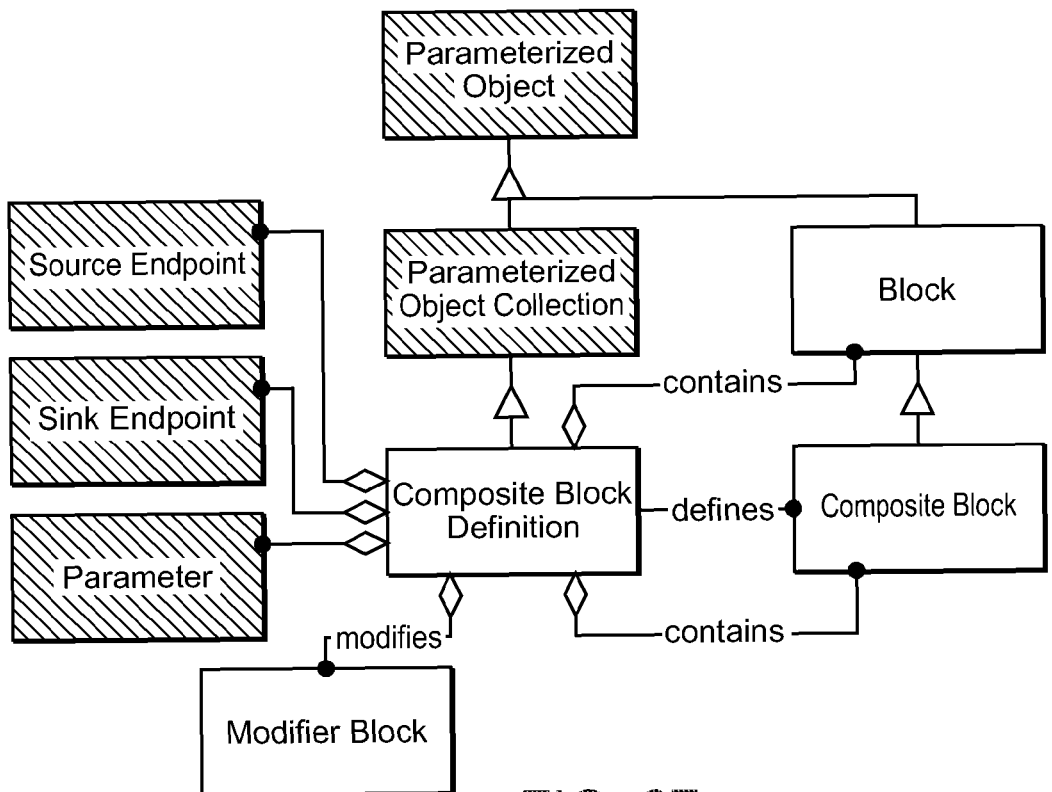
FIG. 87 depicts a composite block definition object model in a system according to the invention.

Referring to FIG. 87 Composite Block Definition is a Parameterized Object Collection derivative. Composite Block Definition provides the common functionality for all objects that contain collections of Block objects: Composite Block Definitions, Loop Templates, and Simple Loops. It is an extension of the Parameterized Object Collection class which restricts the Parameterized Objects it contains to objects derived from the Block class.

Composite Block Definition inherits from Parameterized Object Collection the ability to manage Parameterized Objects, (in this case, Blocks) its own parameters, (a Parameterized Object Collection is a Parameterized Object) attached Modifier Blocks, and its Connection Endpoints. Like the Block class, Composite Block Definition is responsible for ensuring that only Modifier Blocks are stored in the Modifier Block list. From Parameterized Object Collection it inherits the abilities to maintain lists of Connection Endpoints, Parameters, Modifier Blocks, and Blocks. To Parameterized Object Collection it adds special handling of the lists of Parameters and Connection Endpoints inherited from parent classes. Composite Block Definition defines Composite Blocks to be instantiated in other Composite Block Definition-derived Collections.

The Parameters that are owned by this class represent the "exposed" parameters of the Composite Block. These Parameters are linked to the parameters in the contained Blocks that they "expose" through the Connections maintained by this class. These parameters are the only parameters that any container of the instantiated Composite Block can access. The initial values for the attributes of the parameters are copied from the parameters they expose. These attributes can then be modified.

Composite Block Definition is not responsible for maintaining any Connections outside of this object. All Connections maintained in this object refer to "exposed" parameters. Connections can be made in instances of Composite Blocks from parameters defined here to other Blocks. With the "exposed" parameters defined and their values connected to internal parameters, the Composite Block defined looks like a Block to other Composite Block Definition-derived classes. The instantiated Composite Block derived from this definition can be used like any other block in Composite Block Definition-derived Classes.

Modifier Blocks contained by Composite Block Definition apply to all blocks contained by the object. Composite Block Definition is responsible for adding Modifier Block references to all of its contained Blocks when a Modifier Block is attached to it. This allows the Parameter Facade classes defined by the Framework to access Modifier Block parameters.

Composite Block Definitions can create instances of the Composite Blocks they define. These instances maintain a pointer to this class as their definition. These instances maintain overrides of the "exposed" parameters and of parameter value changes made via an Upload operation to retrieve current parameter values from the Control Processor. Composite Block Definitions supply their instances with the actual block names of "exposed" parameters on request. This is useful when displaying the value of a connected point or when the value must actually be placed in a running control system.

Class Relationships:
- Composite Block Definition is a Parameterized Object Collection. From Parameterized Object Collection it inherits the ability to manage parameters, connections, and Blocks.
- Composite Block Definition maintains a reference to a parent definition, if any. Many Composite Block Definitions can be derived from a single definition.
- Composite Block Definition can contain any number of Composite Blocks and Blocks.
- Modifier Blocks can be attached to Composite Block Definitions. When they are attached, the parameter value overrides of the Modifier Block apply to all blocks in the Composite Block Definition.
- A Composite Block Definition cannot contain a I/O Block
- Composite Block Definition maintains a list of Source Endpoints and Sink Endpoints. These are used to connect "exposed" Parameters to their actual points within the Composite Block Definition.
- Parameters are used to store the "exposed" parameter definitions for the defined Composite Block.
- The Composite Block Definition class can create Composite Blocks derived from itself. This ability is inherited from Parameterized Object Collection.

2.3.3.4 Loop Template

Figure 88:
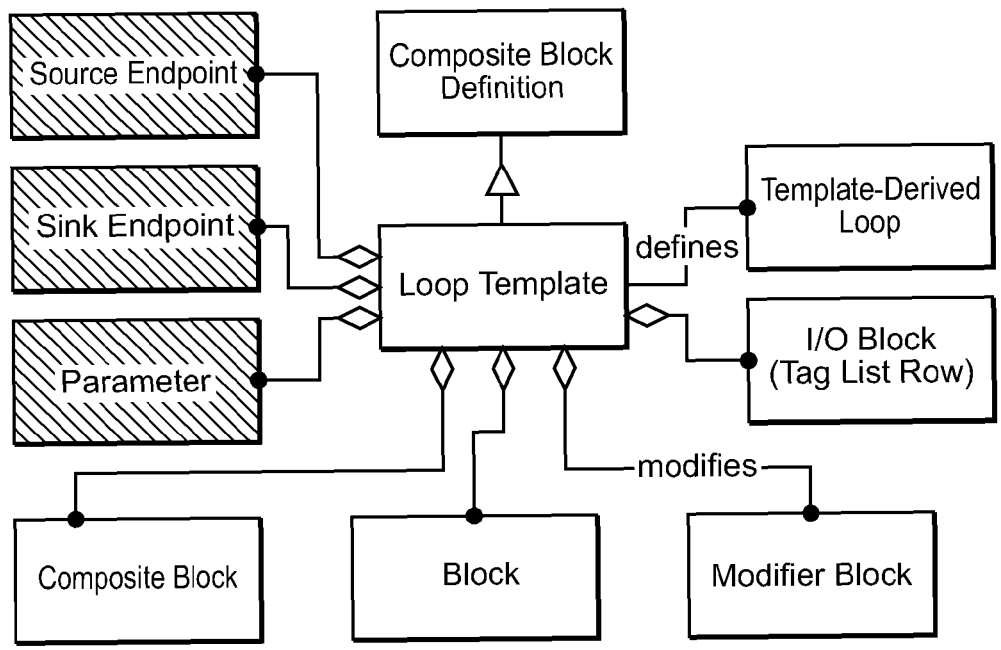
FIG. 88 depicts a loop template object model in a system according to the invention.

Referring to FIG. 88, Loop Template is a Composite Block Definition derivative. It defines the Blocks and Connections contained in a control loop. From Composite Block Definition and its ancestors it inherits the abilities to maintain lists of Connection Endpoints, Parameters, Modifier Blocks, and Blocks. It also inherits the ability to "expose" parameters of blocks in the loop from the Composite Block Definition class. These parameters are then available as tuning parameters or to connect to other Loops or Blocks. To Composite Block Definition it adds the ability to add I/O Blocks. The I/O Blocks added to a Loop Template do not represent real tag points, but are placeholders for actual Tags in the derived Template-Derived Loop instances.

The Parameters that are owned by this class represent the "exposed" parameters of the Loop. These Parameters are linked to the parameters in the contained Blocks that they "expose" through the Connections maintained by this class. These parameters are the only parameters that are available for tuning or external connections. The initial values for the attributes of the parameters are copied from the parameters they expose. These attributes can then be modified.

Loop Template is not responsible for maintaining any Connections outside of this object. All Connections maintained in this object refer to "exposed" parameters. Connections can be made in instances of Template-Derived Loops from parameters defined here to other Loops. With the "exposed" parameters defined and their values connected to internal parameters, the Template-Derived Loop defined looks like a Block to other Composite Block Definition-derived classes. This allows connections to be made into the Loop look like Composite Block connections. Modifier Blocks contained by Loop Template apply to all blocks contained by the object. Loop Template is responsible for adding Modifier Block references to all of its contained Blocks when a Modifier Block is attached to it. This allows the Parameter classes defined by the Framework to access Modifier Block parameters.

Like Composite Block Definitions, Loop Templates can create instances of the Template-Derived Loops they define. These instances maintain a pointer to this class as their definition. These instances can maintain overrides of the "exposed" parameters only. Instances which are created from this definition in the context of a definition library are allowed to override parameter attributes and values for "exposed" parameters. Instances created from this definition in a usage context as a stand-alone Template-Derived Loop can only override values. Class Relationships:

- Loop Template is a Composite Block Definition. From Composite Block Definition it inherits the ability to manage parameters, connections, and Blocks.
- Loop Template maintains a reference to a parent definition, if any. Many Loop Templates can be derived from a single definition.
- Loop Template can contain any number of Composite Blocks and Blocks.
- Modifier Blocks can be attached to Loop Templates. When they are attached, the parameter value overrides of the Modifier Block apply to all blocks in the Loop Template.
- Loop Template contains Source Endpoints and Sink Endpoints. These are used to connect "exposed" parameters to their actual points within the Loop Template.
- Parameters are used to store the "exposed" parameter definitions for the defined Loop. These are the parameters tunable in Loop instances.

2.3.3.5 Simple Loop

Figure 89:
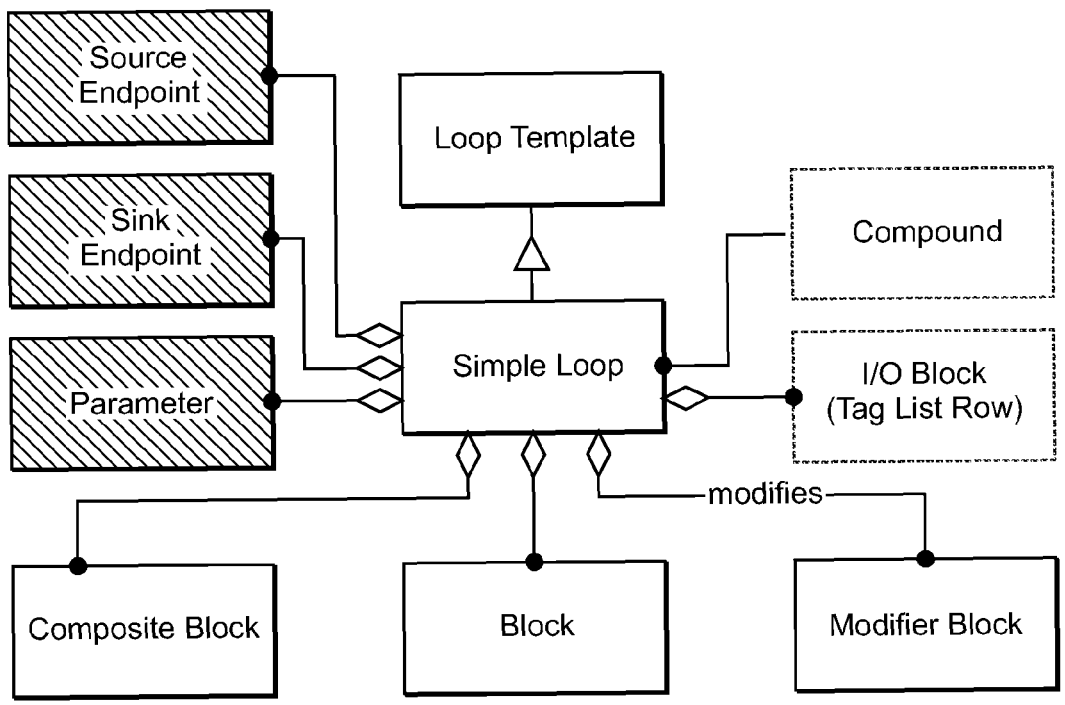
FIG. 89 depicts a simple loop object model in a system according to the invention.

Referring to FIG. 89, Simple Loop is derived from Loop Template. From Loop Template and its parent classes, Composite Block Definition and Parameterized Object Collection it inherits all of the collection and connection functionality of Loop Templates. Simple Loop adds to Loop Template the ability to connect to actual I/O Blocks and to install its Blocks into an online Compound. Class Relationships:

- Simple Loop is derived from Loop Template. It performs all of the same functions as a Loop Template with the additional capabilities of referencing real I/O Blocks and installing its contained Blocks to a Compound.
- Simple Loop can contain any number of Composite Blocks and Blocks.
- Modifier Blocks can be attached to Simple Loops. When they are attached, the parameter value overrides of the Modifier Block apply to all blocks in the Simple Loop.
- Loops can optionally be "assigned" to a Compound. This is a virtual assignment, since Compounds do not have any notion of what a Loop is and the Blocks in a Loop can be downloaded to different Compounds. This association is used as the default for assigning Blocks in a Loop to a Compound. When a Loop is assigned to a Compound, all unassigned Blocks within the Loop are assigned to the Compound, and all Blocks added to the Loop in the future are automatically assigned to the Compound. Blocks can be reassigned by selecting the Block and choosing the "Assign to Compound" menu selection.
- Parameters are used for user-customized purposes, such as value propagation to Block parameters within the Loop, or grouping commonly accesses Block Parameters onto the Loop Property sheet.

2.3.3.6 Composite Block

Figure 90:
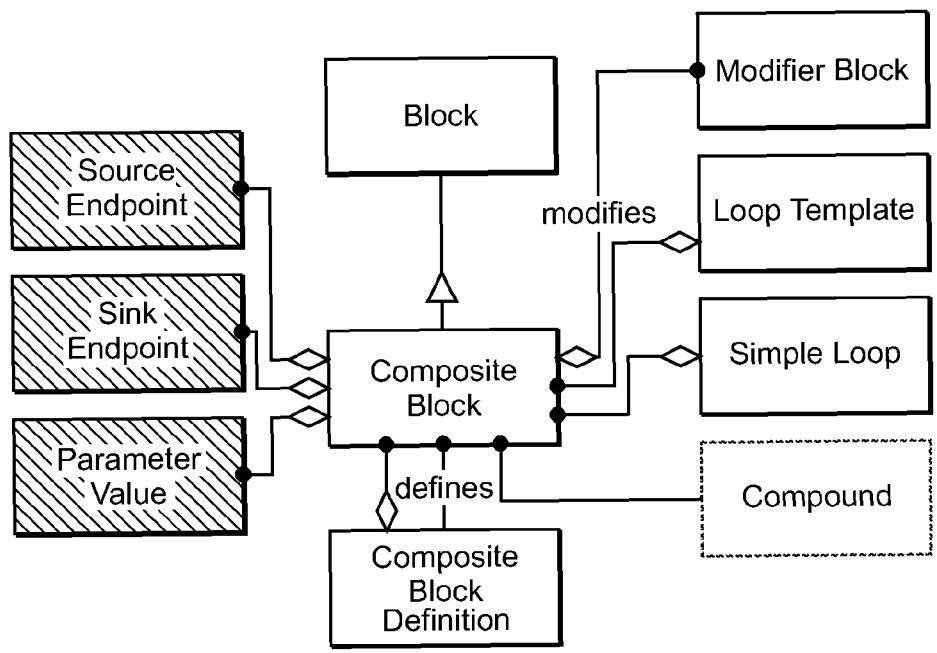
FIG. 90 depicts a composite block object model in a system according to the invention.

Referring to FIG. 90, A Composite Block is a Block. It can be inserted into any block collection as if it were a Block. It maintains a list of parameter overrides which, if present, override the default values and attributes of the Composite Block Definition "exposed" parameters, just like a Block. Connections can be made to parameters in the Composite Block, just like a Block.

A Composite Block uses the Parameter list inherited from Parameterized Object to maintain a mapping of internal block parameters to exposed parameters. A Composite Block instance simply overrides the values of the "exposed" parameters. It cannot add Blocks or Connections to the Composite Block definition. In the context of an upload of parameters from a running station, overrides can be attached to this object which override parameters in blocks contained in the Composite Block Definition. These overrides refer to the parameter in a hierarchical manner, using local block names. If a Composite Block Definition contains Blocks A and B, the Composite Block can override the value of the contained Block B by creating an override of "B.parm". This behavior is supported by the Framework. Class Relationships:

- Composite Block inherits from Block the ability to act like a block in Loops, other Composite Blocks, etc. as well as parameter and connection management.
- Composite Blocks can be contained in Loop Templates, Simple Loops, and Composite Block Definitions. In each instance, Composite Block looks just like a Block to the container.
- Modifier Blocks can be attached to Composite Blocks. When they are attached, the parameter value overrides of the Modifier Block apply to all blocks in the Composite Block.
- Composite Blocks contain Parameter Overrides, Source Endpoints, and Sink Endpoints just like Blocks. Their usage is identical.

2.3.3.7 Template-Derived Loop

Figure 91:
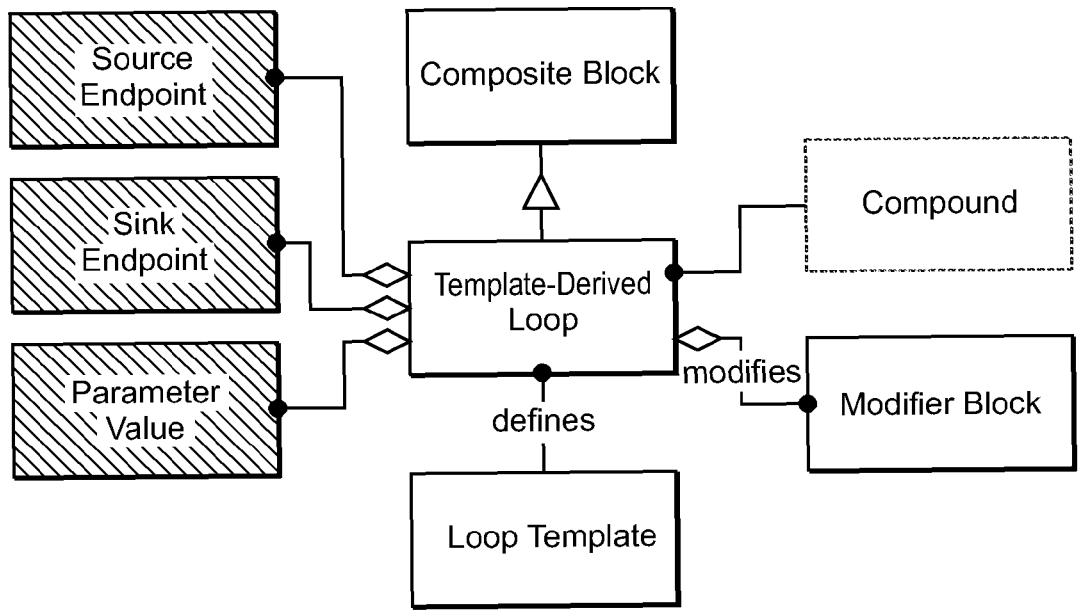
FIG. 91 depicts a template derived loop object model in a system according to the invention.

Referring to FIG. 91, Template-Derived Loop inherits all Parameter Override, external Connection handling, instantiation/definition relationship, and contained-Block name mapping functionality from Composite Block. Template-Derived Loops have the additional responsibility that they preferably manage the mapping of I/O Blocks to actual parameters. I/O Blocks contain the name of the point they represent, so mapping is preferably done from that point to a contained Block parameter, via the same mechanism outlined in the Composite Block description. Template-Derived Loops add the restriction that they cannot be contained in block collections. See the description of the Block class for how this is accomplished. Class Relationships:

- Template-Derived Loop is a Parameterized Object. From Parameterized Object it inherits the ability to manage parameters and connections. Compounds maintain a reference to Template-Derived Loops.
- Template-Derived Loop maintains a reference to a parent definition. Many Loop Templates can be derived from a single definition.
- Modifier Blocks can be attached to Template-Derived Loops. When they are attached, the parameter value overrides of the Modifier Block apply to all exposed Block parameters in the Template-Derived Loops.
- Template-Derived Loop contains Source Endpoints and Sink Endpoints. These are used to connect "exposed" parameters to other Loops.
- Parameters are used to store the "exposed" parameter definitions for the defined Loop. These are the parameters tunable in Loop instances.

2.3.3.8 Block Placeholder

Figure 92:
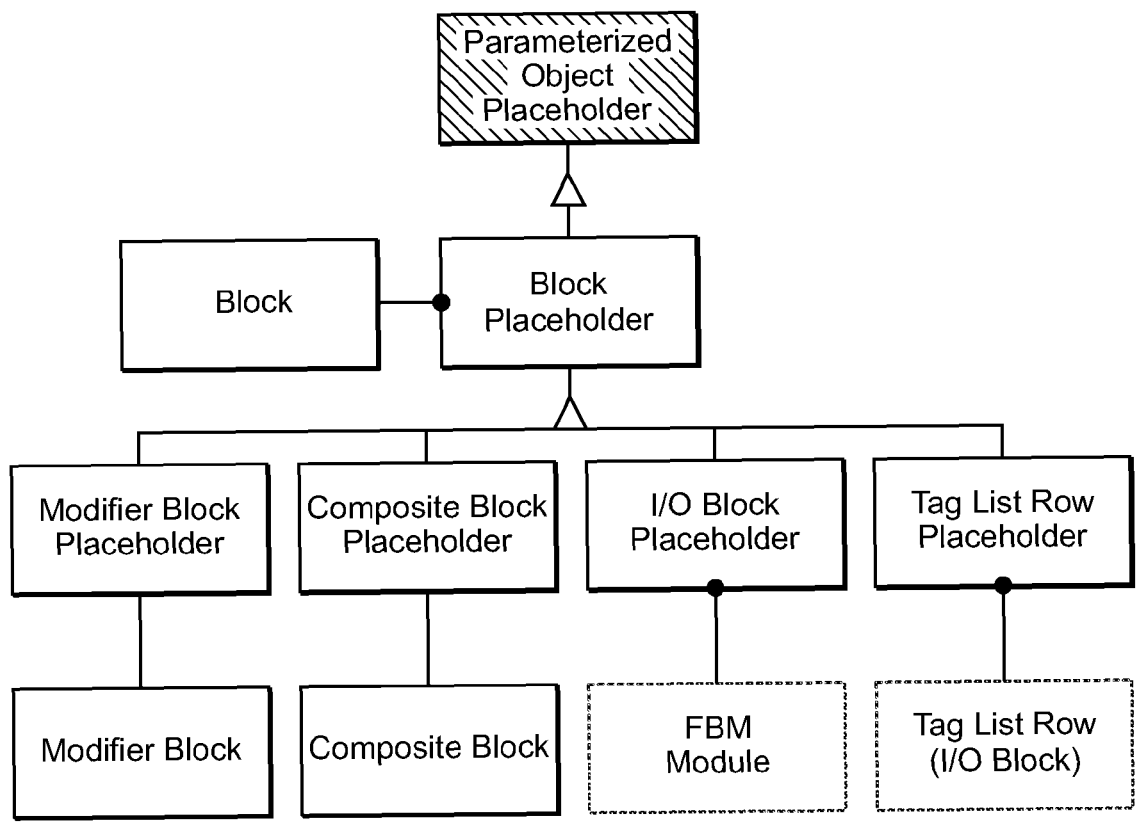
FIG. 92 depicts object placeholder derivations in a system according to the invention.

Block Placeholder is the base Placeholder class for all Block objects. It is derived from Parameterized object Placeholder. FIG. 92 shows an example of a graphical Block representation. Block Placeholder maintains the graphical representation of the rectangular dimensions of the block, the location for the associated Compound and Block names, the location for the Block type, the location and list of parameters displayed in the "relevant block parameters" section, and the location, order and list of parameters displayed in the source and sink sections.

The model shown in FIG. 92 shows the I/O Block Placeholder collecting the Tag List Row Placeholders that are associated with its related FBM Module. Alternate embodiments can allow for connecting Tag List Row Blocks to other Blocks (AIN, AOUT, etc.) before it is known which FBMs will be used. This requires the ability to integrate a number of existing Tag List Row Placeholders into a common I/O Block Placeholder rather than starting with the I/O Block Placeholder and adding Tag List Rows. Class Relationships:

Block Placeholder is the base class for all blocks placed on any control algorithm diagram.

Block Placeholder is derived from Parameterized Object Placeholder, from which it derives the ability to retrieve information from its associated Parameterized Object.

Block Placeholder maintains a reference to the Block it represents. Many placeholders can exist for any given Block. Each Block maintains references to its Placeholders.

2.3.3.9 Modifier Block Placeholder

This class inherits all functionality from Block Placeholder, except handling of source and sink parameters. Parameters in a Modifier Block are not connectable. Class Relationships:

Modifier Block Placeholder is derived from Block Placeholder.

Modifier Block Placeholder maintains a reference to the Modifier Block it represents. Many Modifier Block Placeholders can exist for any given Modifier Block.

2.3.3.10 Composite Block Placeholder

All functionality is inherited from Block Placeholder with no additions. Class Relationships:

Composite Block Placeholder is derived from Block Placeholder.

Composite Block Placeholder maintains a reference to the Composite Block it represents. Many Composite Block Placeholders can exist for any given Composite Block.

2.3.3.11 I/O Block Placeholder

This class inherits all functionality from Block Placeholder including the ability to manage Tag List Row Placeholders. Class Relationships:

I/O Block Placeholder is derived from Block Placeholder.

I/O Block Placeholder maintains a reference to the FBM it represents. Many I/O Block Placeholders can exist for any given FBM.

I/O Block Placeholder maintains references to Tag List Row Placeholders. These represent the I/O points for the FBM.

2.3.3.12 Tag List Row Placeholder

This class inherits all functionality from Block Placeholder with no additions. Class Relationships:

Tag List Row Placeholder is derived from Block Placeholder.

Tag List Row Placeholder maintains a reference to the I/O Block Placeholder which contains it.

Tag List Row Placeholder maintains a reference to the Tag List Row it represents. Many Tag List Row Placeholders can exist for a single Tag List Row (for example, when using a common hardware contact for multiple CIN Blocks).

2.3.3.13 Control Algorithm Diagram Document

Figure 93:
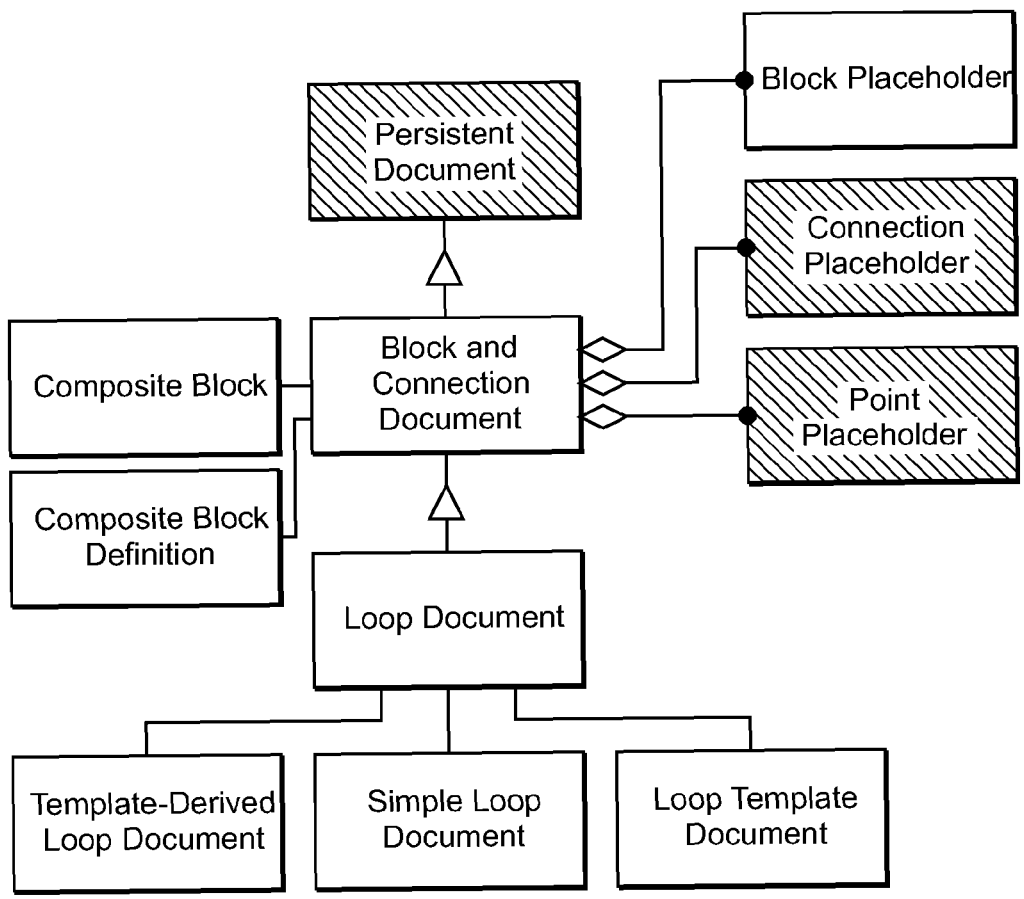
FIG. 93 depicts persistent document object derivations in a system according to the invention.

Control Algorithm Diagram Document is the basic Persistent Document class (see FIG. 93) for all graphical drawings of block collections. It derives its persistence and management of Placeholders from the Persistent Document Framework class. This class is responsible for maintaining all information necessary to graphically reproduce a Control Algorithm Diagram Document. Control Algorithm Diagram Document maintains information about the overall view of the block collection it represents. This information includes title, subtitle, and scale. Information about each individual object is stored in its respective placeholder. This information includes location, size, color, font, or any attribute which can be specified about an individual Control Algorithm Diagram object. Control Algorithm Diagram Document supplies lists of placeholders to the Control Algorithm Diagram Editor. The placeholders are then queried for specific drawing information.

This class is used as the persistent drawing class for Composite Block Definition drawings and Composite Block drawings.

The object model, as described above, provides Template-derived Loops and Composite Blocks with their own Control Algorithm Diagram Document objects. This allows more flexibility for adding Modifier Blocks and for repositioning Blocks defined in the definition objects. An alternative approach to consider during detailed design is to have Template-derived Loops and Composite Blocks use the document objects associated with the Loop Templates and Composite Block Definitions, instead of having their own documents. Class Relationships:

Control Algorithm Diagram Document derives from Persistent Document, from which it inherits persistence and handling of Placeholders.

All Control Algorithm Diagram drawings are derived from this class.

Control Algorithm Diagram Document contains Block Placeholders, Connection Placeholders, and Point Placeholders. These supply the base functionality for Block and Loop Documents.

2.3.3.14 Loop Document

Loop Document derives all Control Algorithm Diagram functionality from its parent class, Control Algorithm Diagram Document. This class adds management of two margin areas reserved for I/O Blocks. The ordered list of I/O Block Placeholders is maintained for both input and output margins. I/O Block placement within the margin is maintained by the I/O Block Placeholder. This class is used as the persistent drawing class for Loop Template drawings, Template-Derived Loop Documents, and Simple Loop Documents. Class Relationships:

Loop Document is a Control Algorithm Diagram Document, from which it inherits all of the standard block placement, movement and connection functions. Loop Document adds additional special handling for I/O Blocks.

All Loop Documents are derived from this class.

2.4 PLB Ladder Diagram Editor 2.4.1 Overview

Figure 94:
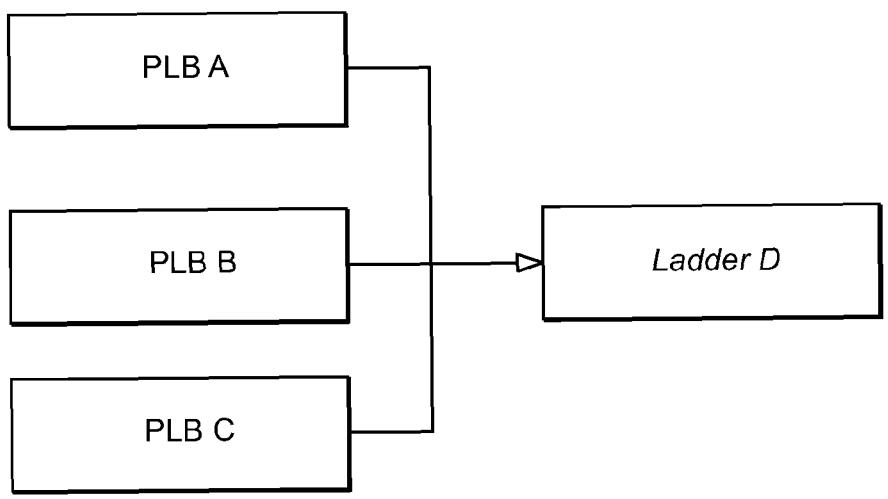
FIG. 94 depicts a PLB to ladder relationship in a system according to the invention.

The Programmable Logic Block (PLB) supports a ladder logic diagram program executing in a digital Field Bus Module. See FIG. 94. The PLB specifies the source for the Ladder Logic Diagram. The block is preferably created before the ladder diagram can be built. The block's parameters are configured through the Control Algorithm Diagram editor.

2.4.2 Ladder Diagram Editor Detailed Functionality

2.4.2.1 Ladder Diagram Editing Functions

Figure 95:
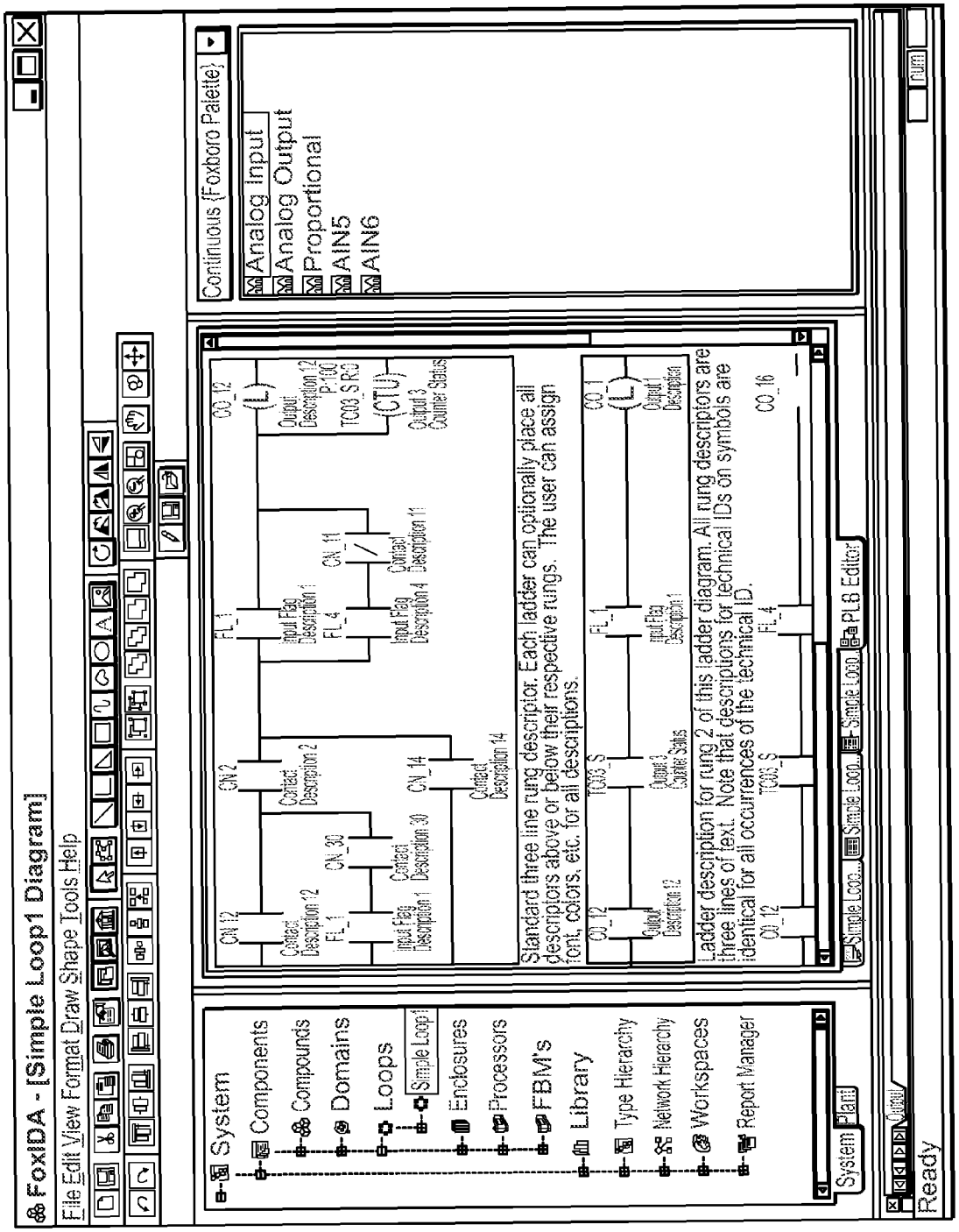
FIG. 95 depicts a ladder editor view in a system according to the invention.

Referring to FIG. 95 The PLB (Programmable Logic Block) Editor allows the user to graphically configure PLBs in a manner similar to the existing PLB Editor. The Ladder Diagram Editor consists of a graphical ladder editing window that works in conjunction with a palette/library used to store and retrieve sample source and a compiler output window used to list and locate ladder errors.

The ladder elements are selected from the palette view and placed onto a graphical representation of the ladder logic. The currently selected PLB element is highlighted. The user may alternately insert elements through keystrokes. Arrow keys may also be used to select different PLB elements in the view. The IDA main frame window provides menu items for the PLB editor. The PLB editor supports the following menu items:

| Menu | Item Name | Description |
| --- | --- | --- |
| File | Close | Close PLB editor |
|  | Compile | Compiles PLB ladder |
|  | Import | Prompts for a .p file to import |
|  | Download | Generates default displays then calls interface to download compiled ladder to FBM |
|  | Page Setup . . . | Allows printed page setup |
|  | Print Preview . . . | Allows preview of printed ladder |
|  | Print | Prints ladder |
| Edit | Undo | Undo last graphical edit of ladder |
|  | Redo | Redo what 'Undo' has done |
|  | Cut | Cuts selected element from ladder diagram to clipboard. |
|  | Copy | Copies selected element to clipboard. |
|  | Paste | Pastes element from clipboard to currently selected location in ladder diagram |
|  | Delete | Deletes currently selected element from. ladder |
|  | Select All | Selects all elements in the ladder. |
|  | Find | Finds a tag identifier or goes to a line number in a ladder |
| Help | Contents and Index . . . | Presents help documentation on the PLB Editor |
|  | What's This . . . | Allows use of mouse cursor to select elements in PLB editor and bring up online help on the element. |

All configured ladders are stored as parameters for their associated PLB in the IDA database. This is a many-to-one relationship. Many PLBs may be associated with one Ladder.

Ladders contain one or more rungs, with each rung consisting of one or more lines and rung descriptors. The lines in a rung can be either primary or secondary lines. To create a rung, the user selects a rung element from the palette or uses a predefined function key. The first line in a rung is the one and only primary line and all other lines are secondary lines. The primary line is the only line in a rung, which is connected from input power rail to the output power rail. All connections between lines are preferably made between the primary line and a secondary line. A user is able to enter optional descriptors for the rung. Each rung has an area associated with it that allows the user to enter separate comments for the operator and engineer. The comments are displayed after the last line of the rung with the operator comment above the engineer comment. The operator comment can be 3 lines of text each 60 characters in length.

Lines consist of up to eight symbols. The first seven symbols in a line can only be input symbols. The eighth (last) symbol in a line is preferably an output symbol. The primary line in a rung has an input symbol in the first slot and an output symbol in the last slot.

Symbols are entered into a rung via a palette selection or function key. They are entered through the palette by drag and drop. To enter a symbol via function key, the user selects an entry selection (1 of 8) in a ladder rung and enters a predefined function key.

Symbols have a logic type, a Tech ID, and Tech ID description and are shown for each symbol on the Ladder Editor view. Preset and reset counts are also shown for counter and timer symbols. The user assigns a Tech ID for a symbol from a list of valid Tech IDs through a context menu. The user can assign an optional description to each Tech ID via a menu pick which presents a list of Tech IDs and associated description fields which the user can edit.

Connections between symbols are made automatically for symbols placed in adjacent slots on a line. Connections between symbols on different lines are made by dragging and dropping symbol endpoints. Logic for valid connections is maintained by the editor application, since it is too intricate for static meta-data. The ladder editor allows separate operator and engineer commenting of a ladder. Operator comments are compiled with the ladder.

2.4.2.2 Ladder Compilation

The ladder logic syntax can be checked at anytime by selecting the 'compile' menu item. Note that this does not save the ladder. This action opens an output window for status and error messages associated with the compile, similar to the functionality of the Microsoft Visual C++ compiler. Selecting a compile error displayed in the output will position the editing cursor to the line or symbol containing the error (this is dependent upon the output of the compiler). If the user attempts to exit the editor without successfully compiling the source code, a dialog is displayed. This dialog prompts the user to name and save the ladder to the palette/library or discard it. Naming and saving the ladder to the palette allows the user to re-use the uncompiled ladder at a latter time. This action is necessary to keep the ladder representation and compiled code in sync for the PLB. When the PLB is subsequently opened for edit, the user is prompted to select either the temporary ladder logic or the last successfully compiled ladder logic. While modifying a ladder, the user can view the last successfully compiled ladder by initiating another session of the IDA configurator. This view is read-only but allows the user to copy elements from this view into the edited ladder. Interface between separate PLB compiler and framework output window to display compiler messages to the user.

2.4.2.3 Ladder Download

An installed ladder is part of a PLB and is assigned to an FBM via the Block and Connection Editor. Several individual ladders can be loaded into the same FBM. Once the Ladder logic is successfully compiled, it can be downloaded into its assigned FBMs in response to either a request from the Download Editor or from the file->download menu item. When downloaded, the editor stores the source and compiled code in the parameters of the PLB.

2.4.2.4 Ladder Diagram Reports

The PLB Editor provides the capability to generate a report for a defined ladder. The report is requested via standard IDA Reporting mechanisms. The content of the editors report is a graphical print out of the ladder as well as a cross reference of technical identifiers and their line locations with in the ladder.

2.4.2.4.1 Ladder Library

Individual rungs may be copied to other PLBs and can also be copied and stored in a library of ladder components for easy re-use through the palette. A user can interact with the define logical palette. This palette contains the standard elements that can become part of a PLB ladder. The user can drag and drop ladder components from the palette to the ladder window to create a PLB's ladder. The user can also define their own palette and store off ladder components (elements, lines or rungs) for latter use. When copying line or rungs to the palette, elements retain their technical identifiers and descriptions.

2.4.3 Object Models

Figure 96:
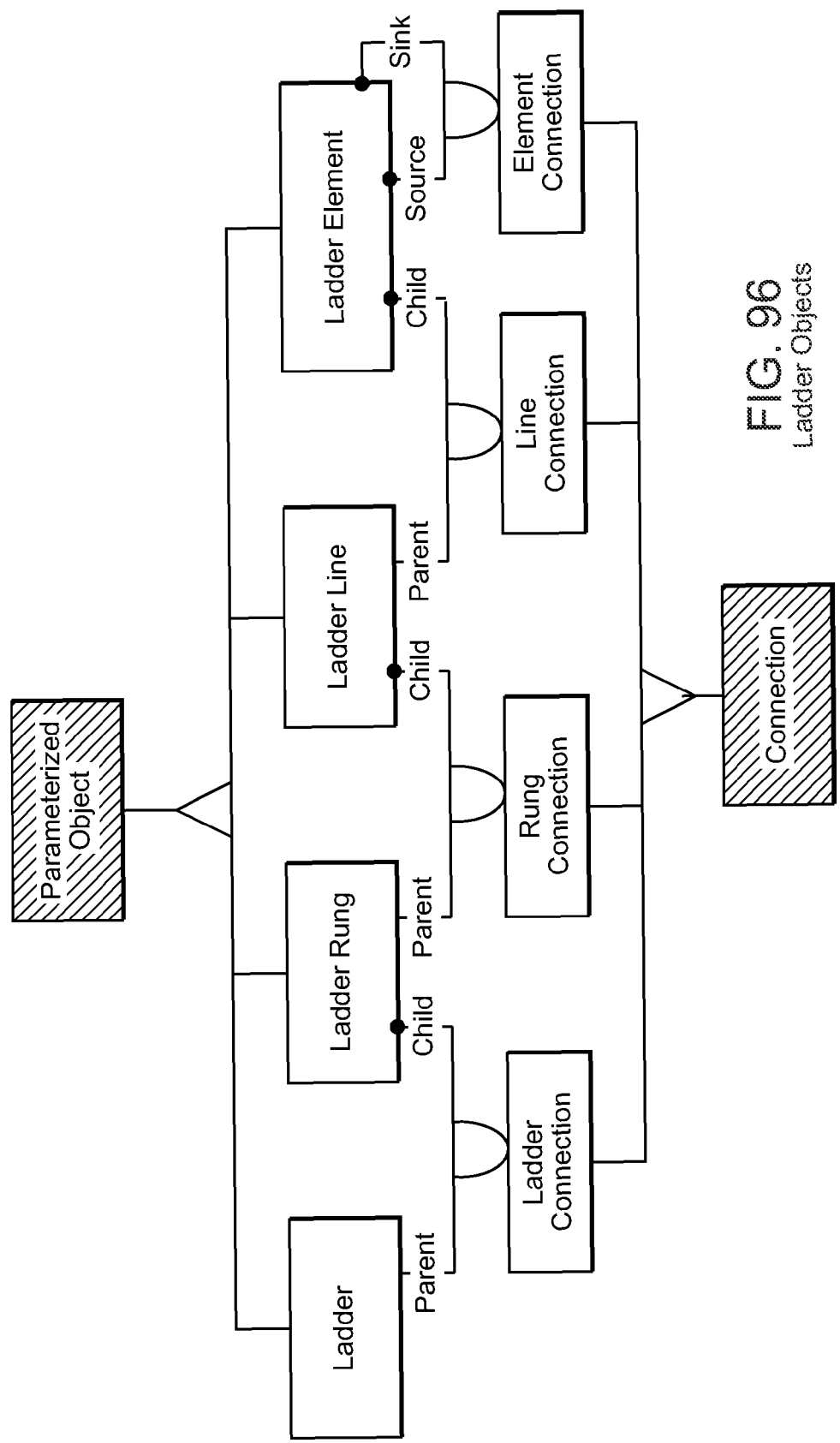
FIG. 96 depicts ladder objects in a system according to the invention.

This section describes the object models associated with the PLB Ladder Editor. Models are described for Ladders, Persistent Documents, and PLBs. The Ladder model shown in FIG. 96 is based on the Framework Connection Classes. A simplified version of the Ladder implementation of the Connection Framework model is shown in that the classes for Ladder Definition, Ladder Slot Definition, and Object and Connection Type Specifiers are not shown. Refer to Part 1 for an explanation and example of a Nest type Parent/Child Connection model and see the Enclosure Loading Editor section of this document for an example of how the Definition classes are used.

Figure 97:
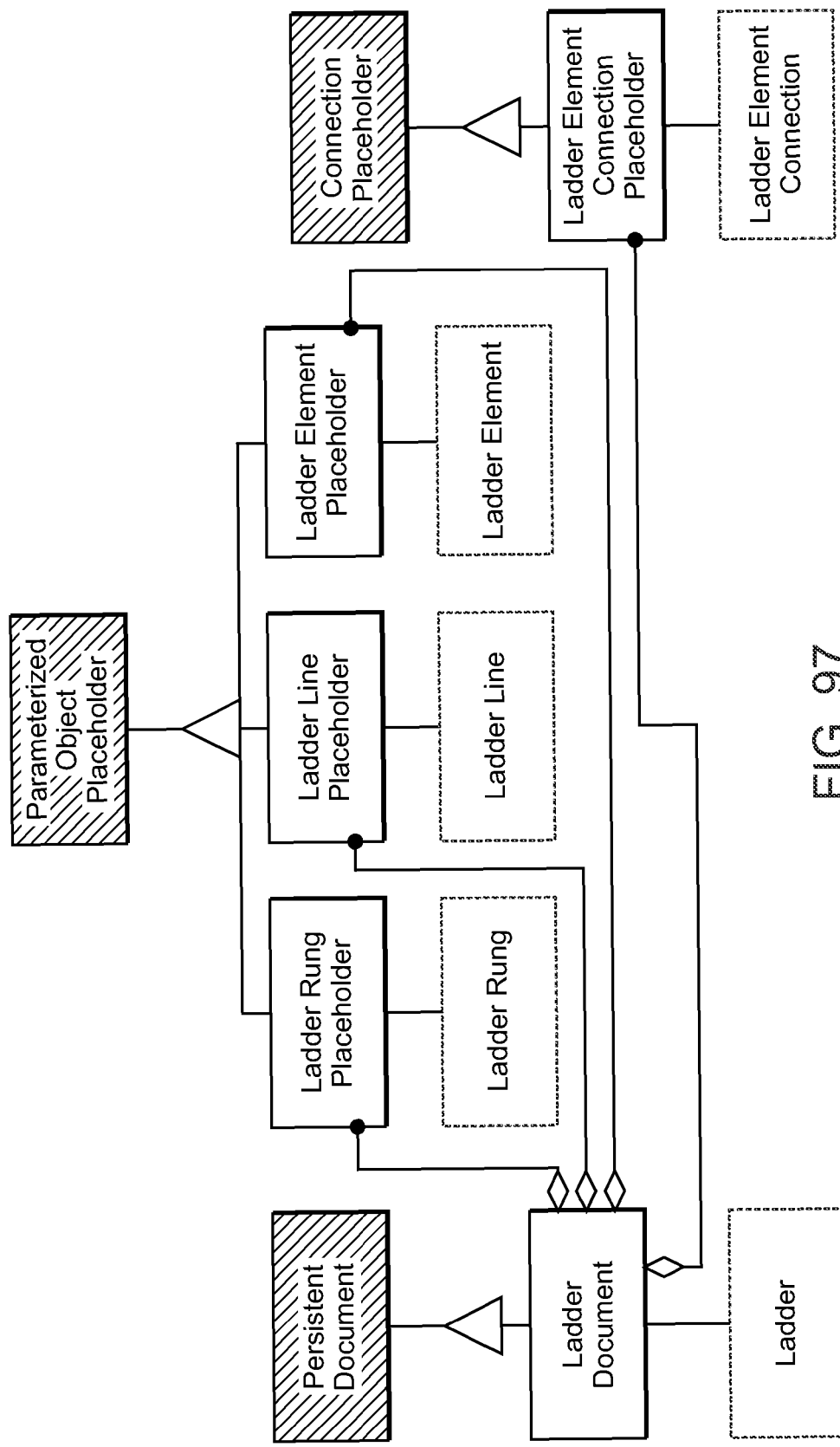
FIG. 97 depicts persistent document objects; in a system according to the invention.

The Persistent Document model shown in FIG. 97 is simplified in that it shows only the relationships from the Placeholders to their related Parameterized objects and not the relationships to other objects (Appearance, View Type, etc.) as described in Part 1.

2.4.3.1 Ladder

The Ladder class is the top level container for a PLB ladder. It contains an ordered set of connections to Ladder Rungs. The description, last modify date, compiled binary version of the ladder, and last compile date are all maintained as parameters of a Ladder. Only successfully compiled Ladders are stored to the database for later download. The last modify date and last compile dates can be compared before downloading as a validity check. TechIDs and their user-defined descriptions are maintained by this object. TechID descriptions can be modified in the context of any symbol on a ladder diagram. When the description is changed for one symbol, every symbol referencing the same TechID in the same ladder reflects the change. This class provides an interface for basic syntax checking for the ladder. It verifies that the ladder has a valid number of rungs (>0) and queries the rungs for validity. This class has the ability to generate a ladder source in an appropriate format for the existing ladder compiler. Class Relationships:

This class is referenced by PLBs supporting ladder logic (shown on the subsequent PLB Block model diagram).
This class is the container/parent for Ladder Rungs.
Ladder is derived from Parameterized Object, which supports connections through its parameters.
Ladder contains an ordered set of Ladder/Rung connections.

2.4.3.2 Ladder Rung

A Ladder Rung is the only component which can be connected to a Ladder. The Ladder Rung maintains connections to an ordered set of Ladder Lines. It also contains a string parameter which acts as a rung descriptor. A Ladder Rung consists of a primary line followed by zero or more secondary lines. The primary line consists of Ladder Elements connected from the left power rail to the right power rail in the diagram. Secondary lines can supply additional logic via "or" connections to the primary line. The top most line is preferably the primary line. This class provides basic syntax checking for the ladder rung. It verifies that the rung has a valid number of lines (>0) and queries the lines for validity, ensuring that the first line meets the criteria for a primary line. This class can provide data in the file format necessary for the existing ladder compiler. It supplies data specific to the rung and invokes similar methods on the contained lines. Class Relationships:

Ladder Rung is derived from Parameterized Object, which supports connections through its parameters.
Ladder Rungs are the only objects which are connected to Ladders. Ladders are comprised of 1 or more rungs.
Ladder Rungs contain an ordered set of Ladder Line connections. Primary or secondary lines are denoted only by location within the ordered list of lines, the first line being the primary.
An association with a Placeholder is also maintained to support supplying data for display purposes (see FIG. 97).

2.4.3.3 Ladder Line

The Ladder Line object represents one line of a rung in a ladder logic diagram. One or more Ladder Lines comprise a Ladder Rung and one or more Ladder Rungs comprise a Ladder. A Ladder Line can either represent a primary ladder line or a secondary ladder line. A primary ladder line is the logical first line of a rung and is indicated by a power connection from left power rail to right power rail. All connections to elements on secondary lines preferably branch from or join the primary line. Using the Ladder Line Parameter Connection Type Specifier, this class determines what types of elements can be dropped into a given slot on the line. Only Output Ladder Elements are allowed in slot 8 and only Input Ladder Elements are allowed in slots 1-7. This class provides syntax checking, based on whether it is a primary or secondary line. If this line is the first in a rung, Ladder Rung can query this class to validate that it is a primary line. For all other lines in a rung, this class would be queried by Ladder Rung to determine if it were a valid secondary line. This class can provide data in the file format necessary for the existing ladder compiler. It supplies data specific to the line and invokes similar methods on the contained elements. Class Relationships:

Ladder Line is derived from Parameterized Object, which supports connections through its parameters.
Ladder Lines are contained/connected only by Ladder Rungs.
Ladder Lines contain an ordered set of connections to Ladder Elements.
Only Ladder Element types can be dropped into a Ladder Line.
An association with a Placeholder is also maintained to support supplying data for display purposes (see FIG. 97).

2.4.3.4 Ladder Element

A Ladder Element represents a single logic symbol in a ladder diagram. It can represent either an input or output symbol, depending on the meta data contained in the object. Up to 8 Ladder Elements can be placed on a single line of a ladder diagram. The type of element which can be placed in any given socket of a line is determined by data stored in the Parameter Connection Type Specifier. The meta data stored in Ladder Elements determine if it is an Input Ladder Element or Output Ladder Element. Input Ladder Elements can appear in any of the first 7 columns of a line. Output Ladder Elements can appear only in the last column of a line, and preferably appear in the last column of a Primary Ladder Line. Ladder Elements can be queried to determine their element type. Ladder Elements contain parameters for TechID, and optionally, preset and reset counters. The TechID description is maintained by the Ladder object, so it need not be maintained by the Ladder Element. The description is retrieved from the list maintained by the Ladder object. Ladder Elements can provide data formatted appropriately for the existing ladder compiler. When ladder elements are substituted for one another in a diagram, all corresponding parameters will carry over to the new symbol. Values such as TechID, preset, and reset will carry over if the appropriate types are substituted. Any values which have no counterpart in the new symbol will be lost. Class Relationships:

- Ladder Element is derived from Parameterized Object, which supports connections through its parameters.
- Ladder Element contains a set of Source/Sink Connections for input and output connections. These can be used for multiple connections to other Ladder Elements.
- Ladder Elements are contained by a Ladder Line.
- Ladder Elements contain a set of Ladder Element Source connections. These are connections to elements which appear following this element
- Ladder Elements contain a list of Ladder Element Sink connections. These are connections to elements which appear prior this element
- An association with a Placeholder is also maintained to support supplying data for display purposes (see FIG. 97).

2.4.3.5 Ladder Element Connection

Ladder Connection encapsulates connection data between two symbols on a ladder diagram. These two symbols need not be on the same line. This class has no knowledge of whether the connection is valid or not. Verification of connections is done by the PLB compiler. Each symbol on a line of a ladder diagram, has Connection Endpoints for power input and output. The first symbol on a line has only 1 implied input connection from the power source and the last symbol on a line has only 1 implied output connection to the power sink. Neither of these implied connections is actually instantiated. Input and output can each have multiple connections, representing a logical "or." Connections can only be made between elements adjacent on a line or between elements in adjacent columns of the primary line and one other line. Class Relationships:

- Ladder Connection is derived from the framework class Source/Sink Connection.
- Ladder Connection references one power input and one power output from Ladder Elements.
- An association with a Placeholder is also maintained to support supplying data for display purposes (see FIG. 97).

2.4.3.6 Ladder, Rung, and Line Connections

Ladder, Rung and Line Connections are all Parent/Child Connections which connect the parent objects to one or more children objects contained by the parent. These three classes may all be implemented as a common "Nest" class if there is no distinguishing behavior among the classes. Class Relationships:

- These connections are derived from the Framework Parent/Child Connection class which, along with Parameterized Objects, provides the capability for to maintain ordered sets of connections to Child objects. Connections maintain relationships between the Parent (container) and Child (contained) objects.

2.4.3.7 Ladder Rung Placeholder

This class holds all of the data associated with the drawing of a Ladder Rung. Drawing information such as rung description location, scale and selection status are maintained in this class. Class Relationships:

- Ladder Rung Placeholder is derived from Parameterized Object Placeholder.
- Ladder Rung Placeholders are contained in the Ladder Document, the collection point for all drawing data for a ladder.
- Ladder Rung Placeholder maintains a reference its corresponding Ladder Rung, to retrieve the data to display the rung.

2.4.3.8 Ladder Line Placeholder

This class holds all of the data associated with the drawing of a Ladder Line. Drawing information such as scale and selection status are maintained in this class. Class Relationships:

- Ladder Line Placeholder is derived from Parameterized Object Placeholder.
- Ladder Line Placeholders are contained in the Ladder Document, the collection point for all drawing data for a ladder.
- Ladder Line Placeholder maintains a reference its corresponding Ladder Line, to retrieve the data to display the line.

2.4.3.9 Ladder Element Placeholder

This class holds all of the drawing data for a Ladder Element. This includes how to draw the symbol, where to place any associated text, etc. Class Relationships:

- Ladder Element Placeholder is derived from Parameterized Object Placeholder.
- Ladder Element Placeholders are contained in the Ladder Document, the collection point for all drawing data for a ladder.
- Ladder Element Placeholder maintains a reference its corresponding Ladder Element, to retrieve the data to display the element.

2.4.3.10 Ladder Element Connection Placeholder

This class holds all of the drawing data for a Ladder Element Connection. This includes how to draw the connection, where to connect to endpoint objects, where to place associated text, error indication (if connection is invalid), etc. Class Relationships:

- Ladder Element Connection Placeholder is derived from Connection Placeholder.
- Ladder Element Connection Placeholders are contained in the Ladder Document, the collection point for all drawing data for a ladder.
- Ladder Element Connection Placeholder maintains a reference its corresponding Connection, to retrieve the data to display the connection.

2.4.3.11 Ladder Document

This class encapsulates drawing information to draw an entire ladder diagram. This class contains information on scaling, orientation, and other style parameters. All other drawing information is maintained within the contained classes. Class Relationships:

- Ladder Document is derived from Persistent Document, from which it inherits its drawing object collection functions and the ability to be associated with a Sheet Template.

Ladder Document contains Ladder Connection Placeholders

Ladder Document contains Ladder Element Placeholders

Ladder Document contains Ladder Line Placeholders

Ladder Line Placeholder maintains a reference its corresponding Ladder to respond to display requests.

2.4.3.12 PLB Block

Figure 98:
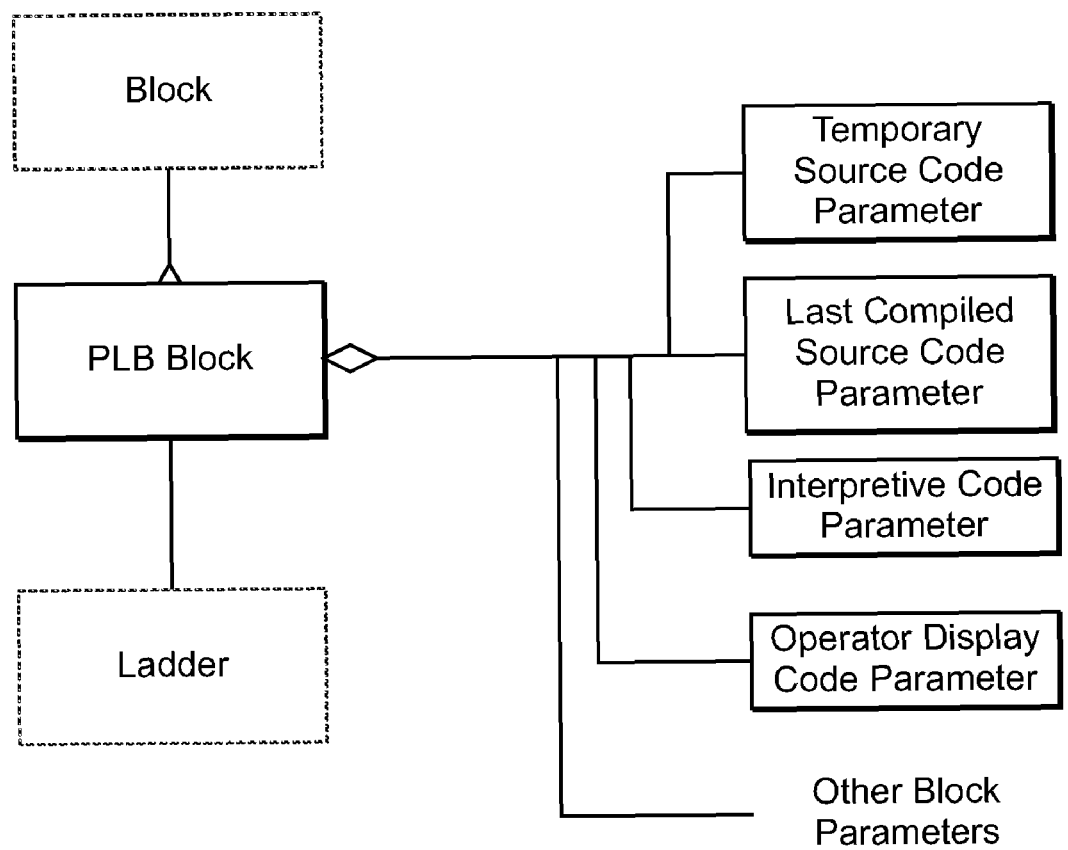
FIG. 98 depicts a PLB block model in a system according to the invention.

Referring to FIG. 98 this class contains standard Block methods and manages the parameters associated with PLB Blocks. Source code, interpretive code, and operator display code for the ladder are generated by the PLB Ladder editor and stored as Block parameters.

Class Relationships:

A PLB Block is derived from Block object, from which it inherits containment of parameters and the ability to connect to other Blocks.

The PLB Block maintains a relationship with its Ladder object which is used to relate the Ladder diagram to the PLB Block code parameters.

2.4.3.13 Temporary Source Code

This is a parameter which stores the logic source code of the associated Ladder while it is being edited and before it is successfully compiled. The PLB Ladder Editor presents the contents of this parameter for editing until it is successfully compiled, at which time the contents are copied into the Last Compiled Source Code parameter and deleted from this parameter. If Full Versioning is not implemented, the transfer of the contents of this parameter to the Last Compiled Source Code parameter may not take place until the code is successfully downloaded, in order to ensure that a copy of the source corresponding to the running Block is preferably always available.

2.4.3.14 Last Compiled Source Code

This is a parameter which stores the logic source code of the associated Ladder. This code representation is used to compile interpretive code for download to an FBM. This intermediate representation may not be needed if the compiler contains the logic to translate the ladder directly into interpretive code.

2.4.3.15 Interpretive Code

This is a parameter which stores the interpretive logic code of the associated PLB Block, which is downloaded to the FBM. This parameter is updated by the PLB Ladder Editor as the result of successfully compiled source code.

2.4.3.16 Operator Display Code

This is a parameter which stores the operator representation of the PLB Block default display. This parameter is updated by the PLB Ladder Editor following a successful compile of source code.

2.5 Swap Editor

The Swap Editor allows mapping parameters between different Block types. By dragging and dropping an Foundation Fieldbus Block from the Control Algorithm Diagram Editor palette and dropping it onto an IAS AIN Block in a Loop drawing, a user can convert the AIN to an AI Block. The Swap Editor functions include dialogs which allow mapping parameters between different Block types so that the proper conversions take place during swapping.

An object model supporting parameter swaps and conversions is readily apparent in view of the teachings herein. Thus, by way of example, a swap object model can parallel the connection object model discussed above and can reflect the permissibility of swapping between objects of different types. Use of that model can parallel the methodology described above in Section 1.3.6 (Establishing a Connection), Level 1—Object to Object. Unlike the connection object model (which retains information about objects that are currently connected), a swap object model need not retain information identifying objects that have been swapped: it need only reflect permissible swaps. Moreover, the connection object model need only reflect a single variety of swap types, not the multiple varieties provided for by the connection object model.

Likewise, a parameter swap type object model can parallel the object connection type object model described above and can identify specific parameters between which mappings exist. A methodology for this generally parallels that described above in Section 1.3.6 (Establishing a Connection), Level 2—Parameter to Parameter. Where applicable, parameter-to-parameter conversions can be maintained in parameter swap type object model, as well. As above, the parameter swap type object model need only reflect permissible mappings (not those that have already been made) and it need only reflect a single variety of mappings.

Data structures other than such can also be used to support parameter swaps and conversions. Thus, for example, mappings and conversions can be represented in tables associated with the respective object types or their instances.

The swap editor provides an interface to the above described object models or other data structures, permitting a user to create or edit permissible parameter mappings. The editor can utilize a graphical interface, e.g., similar to the control strategy editor, for this purpose. Alternatively, or in addition, it can use dialog boxes, list boxes, check boxes, combo boxes, or other such interfaces, of the type shown elsewhere herein, to allow the user to select mappings and specify conversions.

2.6 Block Execution Editor

2.6.1 Overview

The Block Execution Editor provides the capability to view and edit a control station's block processing order. This includes providing the capability to reorder blocks within a control level, reordering child control levels within a parent control level, and control levels within a control station. The Block execution Editor manipulates a single control station's block processing order per instance.

2.6.2 Block Execution Editor Detailed Functionality

The Block Execution Editor is invoked from the IDA Navigation Tree by selecting a control level or control station and selecting Block Execution Editor from the context popup menu. The Block Execution Editor provides a view of the control levels and blocks assigned to a selected control station. Only those control levels assigned to a single selected control station will be displayed. The Block Execution Editor provides controls necessary to allow the user to adjust the block processing order for a selected control level, as well as adjust the processing order of control levels within a control station. The Block Execution Editor provides automatic algorithms to optimize processing order, as well as validate processing order. Control station statistics for the selected control station are available upon user request. The Block Execution Editor also provides the capability to reassign blocks between different control levels as well as reassigning control levels to other control stations. The reassignment of blocks to control levels and control levels to control stations may be accomplished either by dragging a block from the editor to the IDA Navigation Tree, or by invoking the assignment editor on a selected block.

2.6.2.1 Block Execution Editor User Interface

Figure 99:
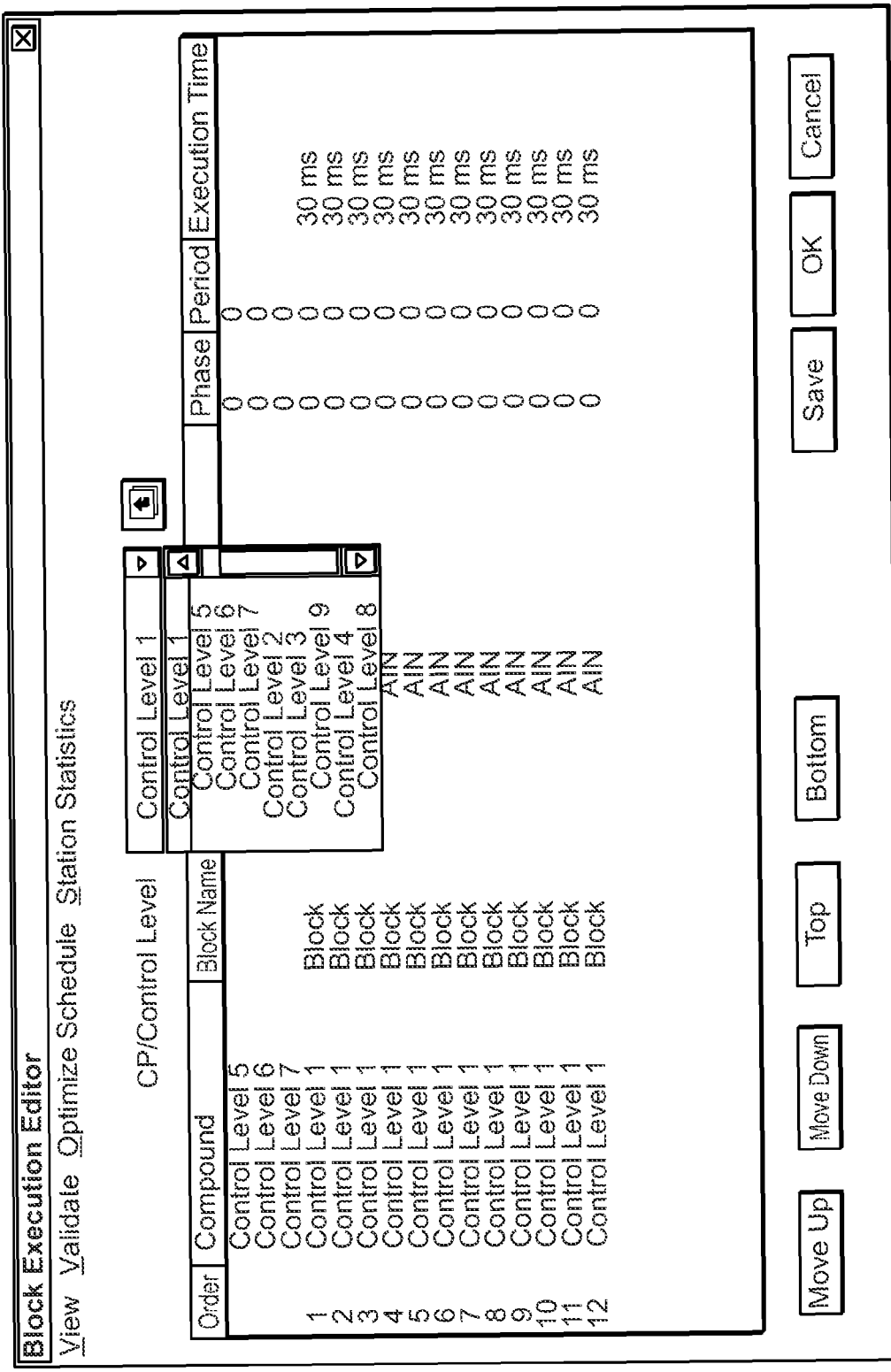
FIG. 99 depicts a block execution scheduler editor in a system according to the invention.

The default Block Execution Editor user interface is as presented in FIG. 99. The user interface is provided as an IDA Grid Editor view. The Block Execution Editor provides two distinct views of control levels and blocks in the tabular grid. The first view displays all blocks for a selected control level, as well as any child control levels of the selected control level which are assigned to the same CP as the selected control level. This view, which is referred to as the control level hierarchy view, is displayed when the Block Execution Editor is invoked from a control level in the IDA Navigation Tree. The second view displays all control levels assigned to a selected CP. This view, which is referred to as the CP Hierarchy view, is displayed when the Block Execution Editor is invoked form a CP in the IDA Navigation Tree.

2.6.2.2 Common User Interface

The user interface provides the name, type, phase, period, relative execution order, and estimated execution time for each block in the list. For each control level in the list, relative execution order, the phase, period, and execution time is displayed. Upon initialization of the Block Execution Editor, the blocks and control levels are sorted by execution order. The user is provided the capability to sort the rows of the grid by block type as well. Resorting is accomplished by selection of the tab at the top the block type or execution order column. Double clicking control level in the list of control levels results in display of that control level's blocks and child control levels. The previously selected control level's blocks and child control levels are removed from the display. The control level schedule editor provides a popup menu to allow the user to invoke the Control Algorithm Diagram Editor from any block in the tabular grid, as well as the property page for any control station, control level or block. Execution Order Modification. The Block Execution Editor provides the user the capability to manually and automatically modify the execution order of blocks and control levels within a CP.

2.6.2.2.1 Manual Modification of Block/Control Level Scheduling Order

The Block Execution Editor provides the user the capability to manually modify the execution order of blocks and control levels within a CP. This may be accomplished in several ways. First, the user may manually modify the period and phase of a selected block or control level or a group of blocks or control levels. This is accomplished by manually editing the period or phase field for the block or control level in the tabular grid. The grid allows inline editing of these fields. A second way to modify the scheduling order is by moving block and control level rows up and down in the grid. Selecting one or more rows in the grid and then selecting the move up, move down, top, or bottom buttons will accomplish this.

2.6.2.2.2 Schedule Optimization Algorithms

The Block Execution Editor will also provide automatic scheduling of blocks based on optimization algorithms. Execution of the schedule optimization algorithms will be user selectable via menu items. Optimization algorithms will include block type and signal flow.

Results of optimization algorithms are displayed in the IDA output window in its own tab. In addition, the Block Execution Editor provides algorithms to perform load leveling for a CP. The Block Execution Editor provides the capability to perform load leveling by compound.

2.6.2.3 Execution Order Validation

The Block Execution Editor provides the user the capability to validate the currently scheduled execution order. The validation is either by phase overrun or signal flow. Phase order validation predicts phase overruns, and reports any overruns to the user. Signal flow validation assesses the relationship of connections and scheduled execution order, and reports any possible conflicts. Problems detected by either type of validation do not prevent the user from assigning execution order, but instead are intended to provide warning of possible scheduling problems. The results of validation are displayed in the IDA output window in its own tab. Execution order validation is made available outside of the Block Execution Editor for use by other IDA applications, including but not limited to download services.

2.6.2.4 Reassignment of Blocks and Control Levels

The Block Execution Editor provides the capability to reassign blocks to different control levels, as well as reassign control levels to different control stations. This is accomplished by dragging the selected block or control level from the tabular grid and dropping it onto a control level or control station on the IDA Navigation Tree.

2.6.2.5 Station Statistics

Figure 100:
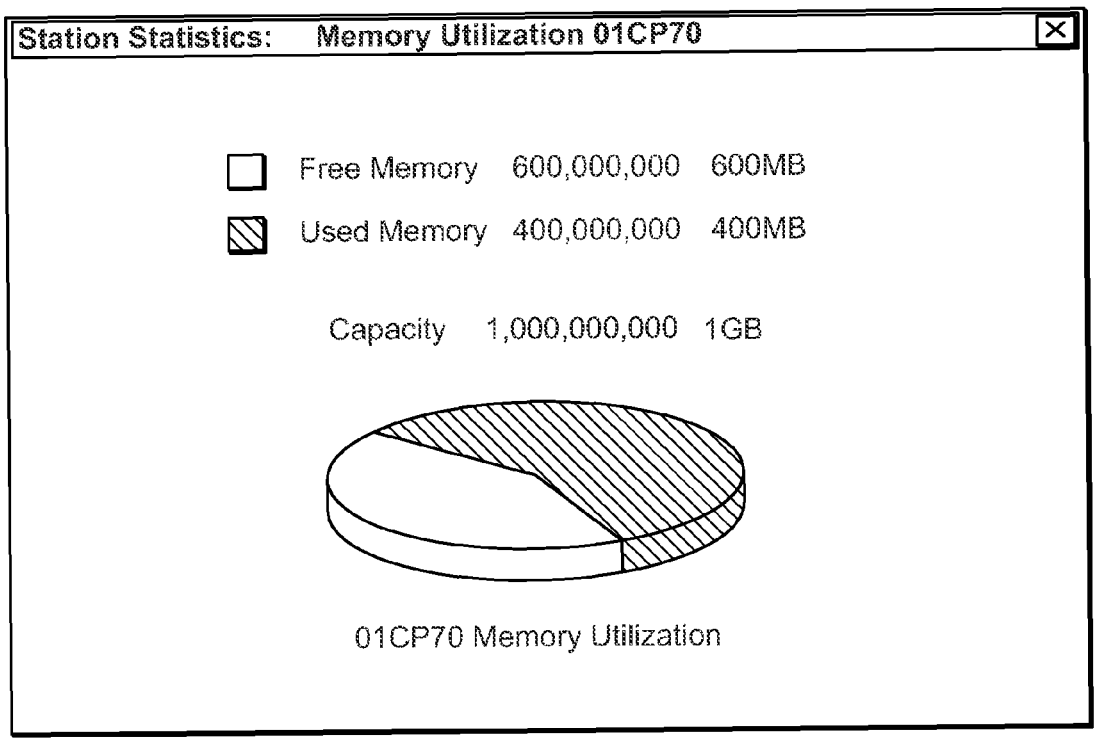
FIG. 100 depicts a station statistics dialog in a system according to the invention.

The Block Execution Editor provides the user the capability to view station statistics for the selected CP. Statistics include total, free, and used station memory (as depicted in FIG. 100), relative phase loading, overall processor load, BPC, and total blocks assigned to CP. The Block Execution Editor provides textual and graphical representation of station statistics.

2.6.3 Tutorials

Tutorials on adjusting the control levels and block process order and phasing are part of the editor.

2.6.4 Object Model

Figure 101:
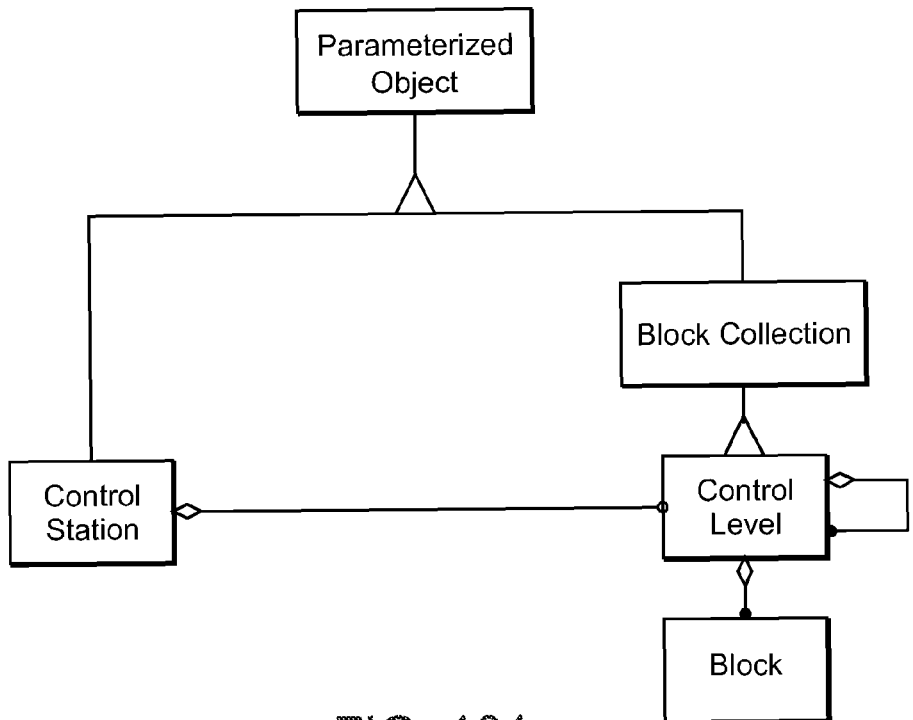
FIG. 101 depicts a block execution editor object model in a system according to the invention.

The object model for Control level and Control Stations/Processors is shown in FIG. 101.

2.6.4.1 Control Station

This class holds an ordered list of control levels associated with a Control Station. Class Relationships:

Control Station is derived from Parameterized Object Collection, from which it inherits the ability to maintain ordered lists.

Control Station maintains references to its associated Control levels, which are used to provide access to Control level data.

2.6.4.2 Control Level

This class holds an ordered list of Blocks associated with a Control level. The Block, Loop, and Block Collection classes are discussed in other sections of this document. Class Relationships:

Control level is derived from Block Collection, from which it inherits the ability to maintain ordered lists.

Control level maintains a reference to its one associated Control Processor.

Control level maintains references to an ordered list of associated Blocks, which are used to provide access to Block data.

Control levels maintain references to an ordered list of child control levels

Control levels maintain assigned execution order

Control level maintains references to associated Loops. This association is used by Loops to aid in bulk and default Block assignments to a Control level and by Control levels for "where used" reporting.

2.6.4.3 Blocks

This class holds a reference to the control level to which it is assigned. Blocks maintain a reference to the control level to which they are assigned

2.7 Tag List Editor

2.7.1.1 Overview

For the purposes of the following discussion, "tag list" refers either to the generic concept of tag lists or to the externally generated tag list being imported and exported from IDA while "Tag List" refers only to the IDA database object of that name. A tag list is a collection of data describing the physical I/O, its labeling, its connection with the DCS (Distributed Control System) and the loops involved in controlling the process using the I/O. It is sometimes the output from (or the input to) a Plant Design System, such as the InTools™ product of Intergraph Corporation. Since changes to this data can occur either within IDA or within the Plant Design System, it is necessary to be able to exchange this data in a suitable form. The most common format for data exchange is delimited ASCII files and this is one medium used by IDA. In addition, IDA can import and export tag list data in DBF format for compatibility with FoxCAE.

The Tag List Editor enables the user to create, import, merge, edit and export tag lists for use in the bulk generation of control loops and Blocks. A merge combines the changes made to an external tag list into the IDA Tag List, making edits and creating and deleting objects as required. An import operation replaces the IDA Tag List with the external tag list, again editing the IDA database as necessary. In either case, user permission is preferred before the edits are committed to the IDA database.

A tag list can be viewed as a collection of rows, similar to a spreadsheet or relational database table. Each row contains an ordered list of items which define some aspect of a control loop (input and output hardware addresses, loop name, Block descriptions, alarm limits, etc.). Every row in a given tag list is identical in structure; i.e. each row contains the same items (parameters) in the same order as every other row. However, not all items are required to have a value assigned to them. For example, if the tag list has two string items which are normally merged together to form a Block description, either or both items may contain a null value. As a result of this requirement, all tag list items, even those which represent numbers, may be stored with a Framework defined data type of NULL.

The purpose of the tag list is to provide data for the construction of control loops. The bulk loop generation facility (initiated from the Tag List Editor) uses items in the Tag List Rows as input. Normally, each row in the Tag List represents an input or output point in the plant, designated by FBM and point number. One column in the table identifies the Loop Template associated with this I/O point. Multiple rows which specify the same Loop Template are allowed.

The bulk generation process uses the specified Loop Template and the Tag List to construct the blocks which comprise the loop. When the user selects one or more Tag List rows and requests loop generation, the data contained in the Tag List is "attached" to the Loop Template(s) designated by the Tag List Row, the data contained in the row is propagated to the Blocks in the Loop Template using the rules specified by the Loop Template, the Blocks and Connections specified in the Template are generated and the result is stored as a "Template Derived Loop".

The Loop Template contains one or more "Blocks" which represent the data contained in a single Tag List Row. These "Blocks" represent Tag List Rows as sets of Parameters which can be used in connections to control Blocks. The bulk generation process performs a "mail merge"—like operation by substituting the data contained in each row into the appropriate Block in the Loop Template and generating instances of the Blocks specified in the Template. The data in the Tag List is propagated throughout the Loop. This process performs user defined string manipulations on the Tag List Items to create values for parameters of Blocks being built within the loop. For example, a Block description may be mapped directly from a specified Tag List Item to a specific Block (or Blocks) DESCRP parameter or a Block's high alarm limit may be set to 80 percent of the Tag List high scale item.

Like Blocks, Tag List Rows are homogeneous collection of Parameterized Objects where each Tag List Item within a row is a Parameter and the Parameter name defines the "column" name. For purposes of importing, editing and exporting tag lists, the Tag List is presented to the user in a data grid format where each Tag List Row is presented as a row in a data grid and each column represents a Tag List Item. This representation is used within the Tag List Editor.

The other "view" of a Tag List Row is that of a Block. This is the representation used by the Control Algorithm Diagram Editor to display a Tag List Row on a loop drawing. When this representation is in use, the values of the Tag List Items appear (and can be edited) as parameters of the "Block". Since Tag List Rows generally describe either a physical input or a physical output, IDA reserves the Block types TAGIN and TAGOUT to represent input rows and output rows, respectively. Editing these parameters in the Control Algorithm Diagram Editor is functionally equivalent to editing them in the Tag List Editor. When editing the Tag List Row Items in a Block view, the items are presented on a property sheet, similar to other Blocks.

When creating a simple (non Template-Derived) Loop, the user adds TAGIN and TAGOUT Blocks by dragging and dropping from a palette, similar to any other Block type. Dropping one of these Blocks onto a Loop drawing results in the automatic addition of a corresponding row in the Tag List. Tag List rows related to simple Loops have a blank value in the Loop Template element.

Since the main purpose of a Tag List is to be used in loop and Block generation, there is a minimum set of parameters to support that functionality within IDA. This starter set is supplied by IDA but may be modified by the user. In addition, the user may define additional Tag List Items for use in parameter propagation or documentation. However, only one Tag List definition (the names and order of parameters within a tag list row) is allowed per IDA configuration. The reason for this is to simplify managing Tag List information and maintaining synchronization with the as-built configuration.

As discussed, above, of the two representations used within IDA for a given Tag List Row; tabular and Block, the tabular view is the one used by the Tag List Editor. Using a tabular interface, like the one shown in the user can edit data in existing rows, add new rows or delete existing rows. The columns shown in the figure include (from left to right); the compound to which the generated blocks are currently assigned, the I/O tag (the user/customer name for the I/O signal), the Loop tag (name of the Template Derived Loop associated with these rows), two columns of descriptive text (used to propagate into the Block descriptions and alarm message text parameters), the type of block connected to the physical input or output, the instance of the specific block type in the Loop Template (if the Loop Template specifies two AIN Blocks, they are labeled A1 and A2), the IOM_ID is the primary letterbug of the FBM containing the point, and IOMIDE is the letterbug of the FBM extension. Not shown in the figure is the Loop Template column used to specify the association between these rows and the Template used to generate the Blocks. Users can sort the Tag List by selecting any of the column headings. Color or icons are used in the L-tag element fields to indicate if the Loop to which the Tag belongs has been built or generated.

Figure 103:
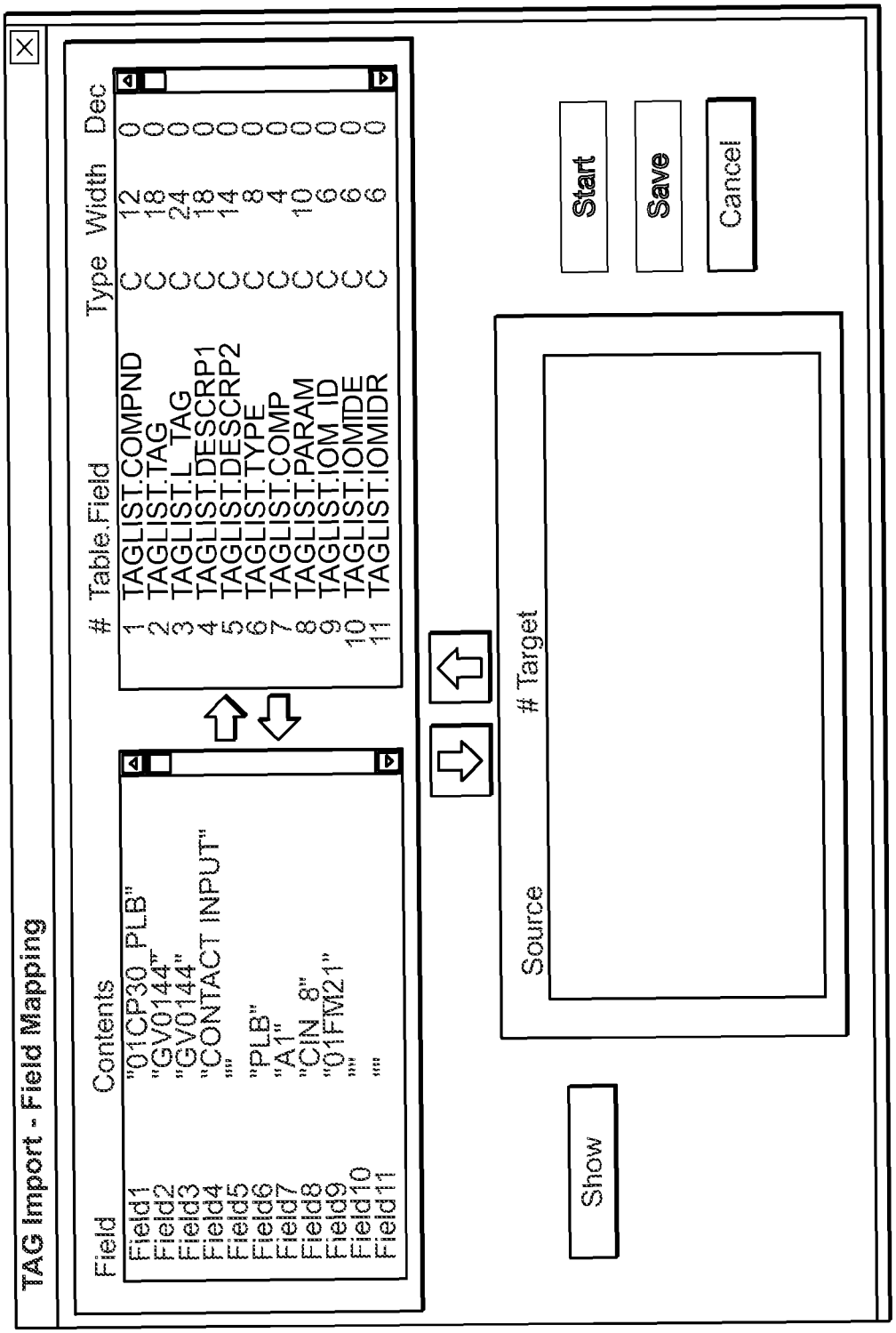
FIG. 103 depicts a tag list import from ASCII file in a system according to the invention.

For use in importing and exporting external databases, a dialog box based interface is used. Shown in the figures are examples of dialogs for mapping fields between ASCII input files or database tables and the tag list "fields". The displays shown FIG. 103 et seq., include those typically used with Plant Design Systems in general and InTools in particular (to preserve the existing FoxCAE functionality, InTools compatibility is a requirement). The dialog box shown in FIG. 103 is used to map an ASCII, delimited list into the appropriate Tag List Items. Once a text (ASCII) file is chosen, a count of the number of delimited fields per line is made and the input file is verified to contain exactly that many fields in every line. Next the upper left list in the dialog is generated, showing one line per field, numbering each field and showing the content of each field in the first line of the file. The upper right list shows the attributes of a each Tag List Item in a Tag List Row.

If a mapping exists between a field and a Tag List Item, selecting one of them from either list will scroll the opposite list and highlight the current mapping. Associations between the two lists are made by selecting an item from each list into the lower list using the up (or down) arrows. The bottom list shows the current mappings. The "Show" button shows a grid with the entire contents of either the Tag List or the ASCII file. The "Start" button causes the input file to be read and the data mapped to the Tag List as specified in the mapping. The "Save" button saves the mapping. The "Cancel" button cancels the operation. See the Import/Export Editor Section for further discussion on import/export files and mapping.

Figure 104:
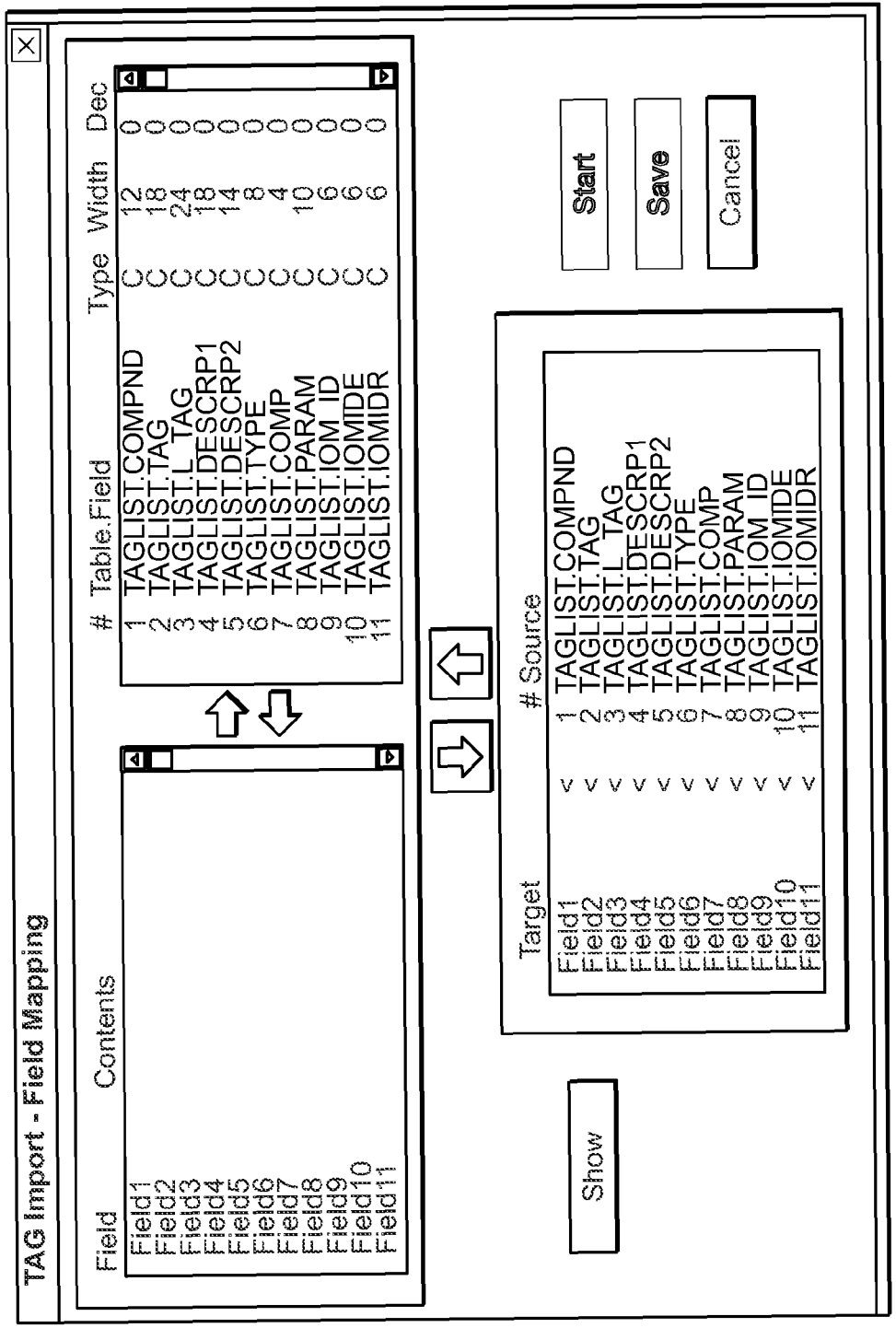
FIG. 104 depicts a tag list export to ASCII file in a system according to the invention.

FIG. 104 shows the selections used in the illustrated embodiment to export a Tag List in delimited ASCII format. In this example all of the Tag List Items have been assigned (mapped) to fields in the text output file. The human interface components have the same actions as described in the previous figure with the exception that the "Export" button causes the creation of the text output file.

Figure 105:
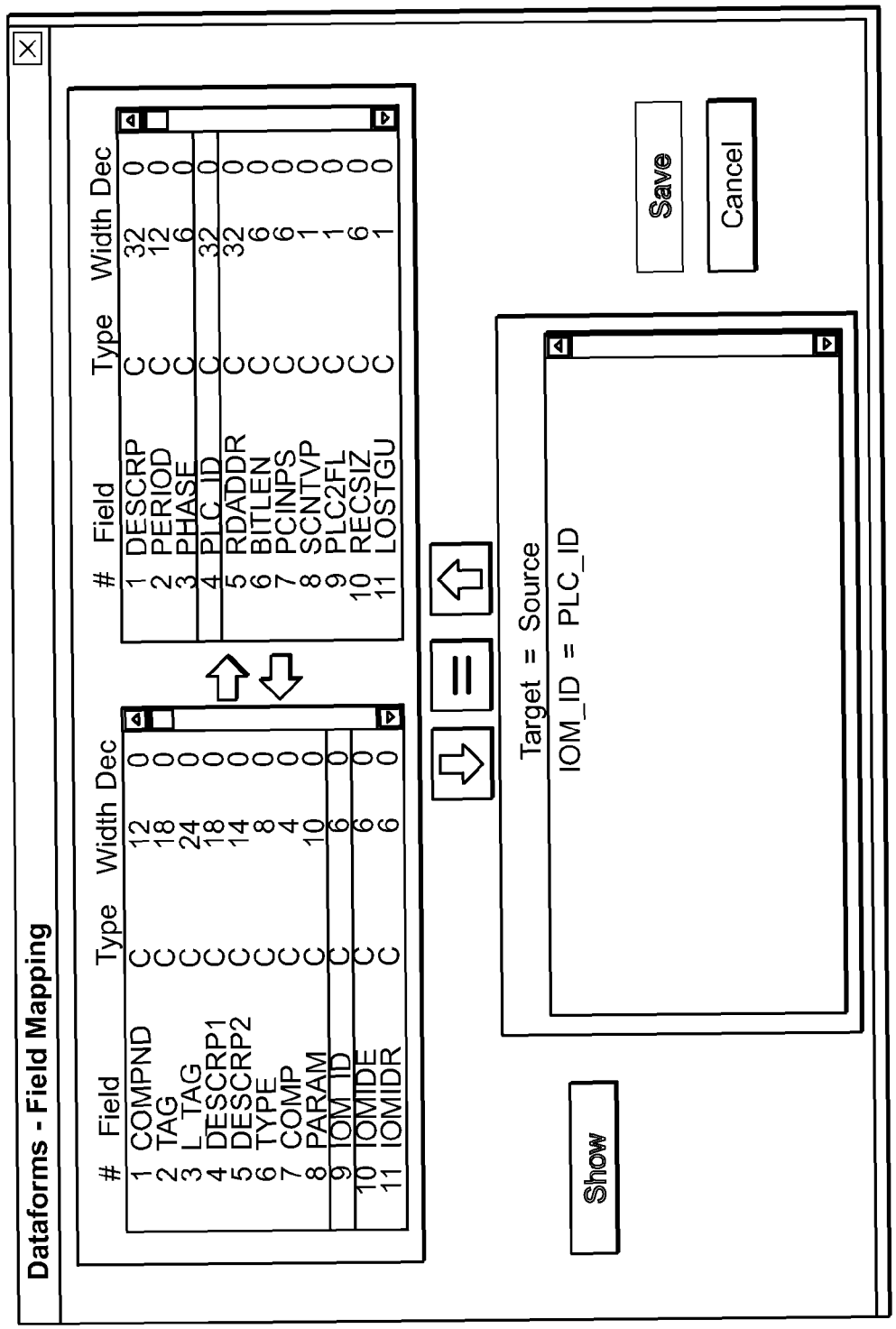
FIG. 105 depicts a tag list import/export from database table in a system according to the invention.

The dialog shown in FIG. 105 is used strictly to establish the mapping between the Tag List and external database tables. Its operation is similar to that described for previous dialogs but the actual importation of the external table data is done in a separate step from a different part of the user interface.

An interface for defining the Tag List Row structure by specifying the Tag List Items and their positions within the row is used. This interface is identical to that used by the Block Definition Editor since the Tag List Items are Parameter Definitions and the Tag List Row specification is actually a defining Block. The Tag List Editor will share the same dialog classes used to implement this functionality in the Block Definition Editor, with methods overridden, where necessary, to enforce the restrictions required in Tag List construction. As a result, the detailed interface description is the same as in the Block Definition Editor. It is not necessary that every Tag List Item be used within IDA. Some fields in external tag lists are used for documentary purposes by the Plant Design System using the list and may not be applicable to IDA. However, to preserve an interchangeable format with a Plant Design System, fields which are not accessed by IDA should still be defined as Tag List Items so that the export functionality preserves the Plant Design System fields intact. Users can add Tag List Items to the Tag List Definition, but only authorized developers are allowed to deleted or modify the implementation standard items.

2.7.1.2 Functions

The functionality of the Tag List Editor can be divided into five parts; creation, import, merge, edit and export. All import and export functions can use either delimited ASCII text files or database tables. The bulk database generation facility is accessible through the Tag List Editor. The user can select a loop (one or more Tag List Rows which share a common loop ID item), or a number of loops on the Tag List and invoke the generation of the associated control database elements. The human interface for this operation is a menu entry to invoke the feature, a dialog box showing the loops currently selected in the Tag List (and allowing modification of the selection) and a progress bar (with a cancel button) showing percent completed during the operation. If cancel is selected, the database is rolled back to its state prior to the operation.

2.7.1.3 Class Descriptions 2.7.1.3.1 Tag List

Figure 106:
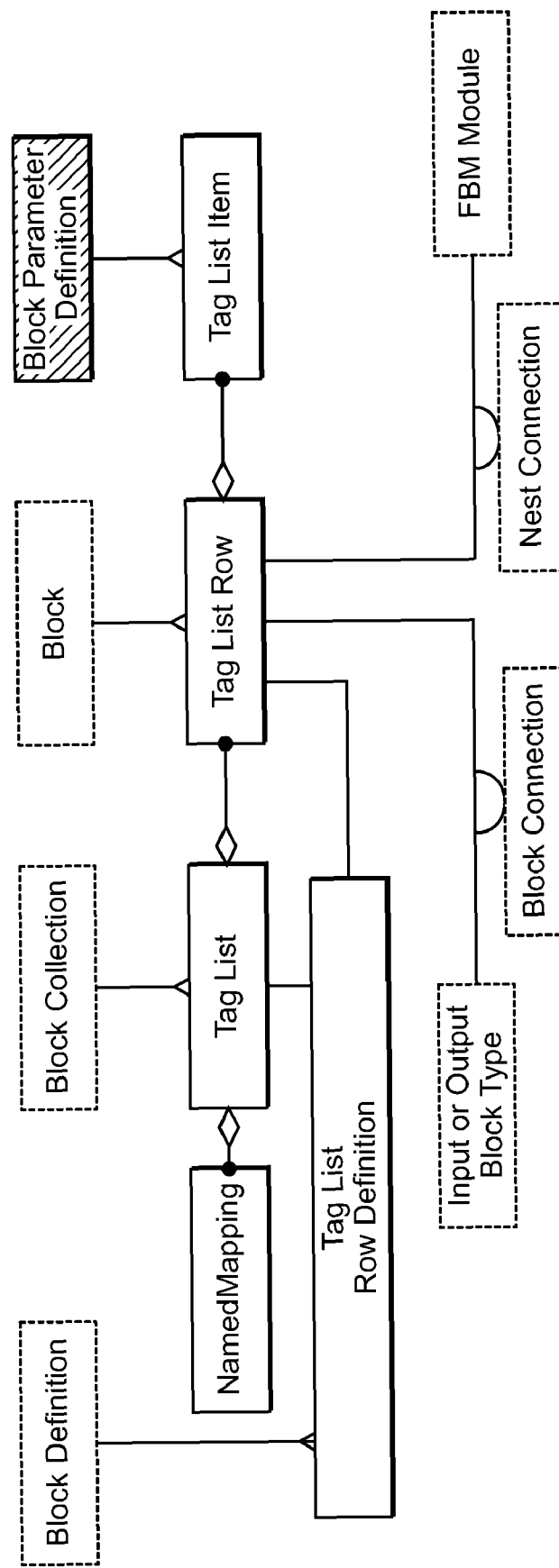
FIG. 106 depicts a tag list object model in a system according to the invention.

Referring to FIG. 106 a Tag List is responsible for containing and controlling access to Tag List Rows. It is derived from the Block Collection Application class. Class Relationships:

Tag List is derived from Block Collection (which, in turn, is derived from the Parameterized Object Collection Framework class) in order to present a "Block collection compatible" interface accessed as a Block collection by other IDA applications (including Placeholder relationships).

Tag List only allows "Blocks" of Type Tag List Row to be added to its collection, overriding the methods of its parent classes, where necessary.

Tag List delegates the balance of the maintenance of its collection of rows to its parent classes.

2.7.1.3.2 Named Mapping

A Named Mapping is responsible for correlating fields in an external data source with the names of Tag List Items. The relationship is used by the Import/Export Manager during its operation. The object is shown here as it is part of the Tag List object model. See the Import/Export Manager description, elsewhere in this document for details.

2.7.1.3.3 Tag List Row

A Tag List Row is responsible for containing and controlling access to all the Tag List Items, their definitions and their values. It is derived from the Block Application class. Class Relationships:

Tag List Row is derived from Block (which, in turn, is derived from Parameterized Object Framework class) in order to present a "Block compatible" interface when displayed on a loop drawing as a Block or accessed as a Block by other IDA applications. Other typical Block relationships, such as to Placeholders are maintained through this inheritance. See the Control Algorithm Diagram Editor section of this document for further description of Block relationships.

Tag List Row Definition is a "defining" Parameterized Object and contains no reference to a defining object. Methods in the parent classes are overridden to provide enforcement of this rule.

Tag List Row has only one parameter group, with the group name of "Row". All definitions are contained in this group. Methods in the parent classes are overridden to provide enforcement of this rule.

Tag List Row delegates the balance of its behavior, including parameter facade generation, and parameter value overriding to its parent classes.

Tag List Row maintains a Block Connection with one and only one I/O Block Type (AIN, AOUT, etc.), through which it associates a Block I/O parameter to an FBM point number. The I/O signal type match is the only Tag List Item which is strongly typed; all other items may be connected as the user sees fit. See the Control Algorithm Diagram Editor section of this document for further description of Block Connection relationships.

Tag List Row maintains a Nest Connection with an FBM Module, through which it associates an FBM point number to an Block I/O parameter. See the Enclosure Editor section of this document for further description of this relationship.

2.7.1.3.4 Tag List Row Definition

The Tag List Row Definition is a Tag List Row which acts as the definition for the entire project. Both the Tag List and the Tag List Row hold a reference to this definition. Only one Tag List Row Definition exists so that all rows have exactly the same "columns". Class Relationships:

Tag List Row Definition is derived from a Tag List Row. Since this derivation inherits from Block, some of its methods are overridden to allow enforcement of the rule that it be the only definition of a Tag List Row.

Tag List Row maintains a reference to Tag List Row Definition as does Tag List.

2.7.1.3.5 Tag List Item

A Tag List Item is a specialization of the Framework Parameter Definition class and contains all the behavior associated with that class. Class Relationships:

Tag List Item is derived from the Framework Parameter Definition class.

Any edit control or other Block related parameter attributes (besides type) are for use when the Tag List Row is being manipulated as a "Block" by other IDA applications, for instance, while using the property sheet view of the Tag List Row to modify parameters while editing a Loop drawing.

2.8 Download/Upload Manager 2.8.1 Overview

Configuration data needs to be exchanged between the Operator Interface (OI) applications of IAS and IDA. This involves loading control algorithms into control stations as well as loading configuration information into OI applications. Loading a list of collection points into a Historian is an example of loading configuration information into OI applications.

The context menu associated with IDA objects includes download selections for appropriate objects. The download selection invokes the Download Manager Editor to select targets for the download and to monitor the download process. Some objects may provide a second non-GUI selection. This non-GUI download function invokes the Download Manager who determines the download target from the selected object and does not provide validation or error recovery. The non-GUI download provides a quick download mechanism for simple downloads such as downloading a control algorithm to a control station.

The Download Manager is an IDA dialog editor. The Download Manager uses the context of the object from which it was selected to display a list of target systems. The Download Manager interacts with the user to select the download targets, validates configurations, and provides error recovery. The Download Manager uses the Download Service functions for executing the download. Since download involves data transmission either to control stations or OI applications, there are two Download Services, Download Service for Control Stations and Download Service for Applications. Separate sections in this document detail these services.

Similarly to the need to load configuration data into OI applications is the need to merge in OI modified data. The Security Subsystem provides an example of this need. Configuration of the IAS Security Subsystem is through IDA, using the download functions. However, the Security Subsystem contains the ability to change user passwords. The upload functions of the Download-Upload Manager provide the functionality for modifying IDA objects from external sources.

The download functionality requires IDA objects to be in a checked in state. A user preferably completes modifications to the IDA objects before downloading configuration data. Interactions with control stations in a simulation mode may be an exception to this rule. The upload functions similarly require IDA objects to be in a checked in state. However, the upload functions force a check out of the IDA object before merging in the uploaded data. The user is responsible for the check in of the modified objects, it is not done automatically by the Download-Upload Manager. See Part 1 for a more complete description of check-in, checkout, and versioning.

2.8.2 Functions

The Download-Upload Editor is divides into four related categories:

Interaction with the user to define a download.

Interaction with Download Agents to perform the download

Uploading external data, displaying differences, and providing merge functionality.

Error recovery

The following subsections describe the user interface displays and functional details.

2.8.2.1 User Interaction

IDA provides the ability to download and upload configuration data to/from applications running in the various hardware stations. Download functions are provided for downloading process displays, historian configuration data, and alarm configuration data to the appropriate stations/applications. Download functions provide options for downloading just the changes or downloading the entire object.

Figure 107:
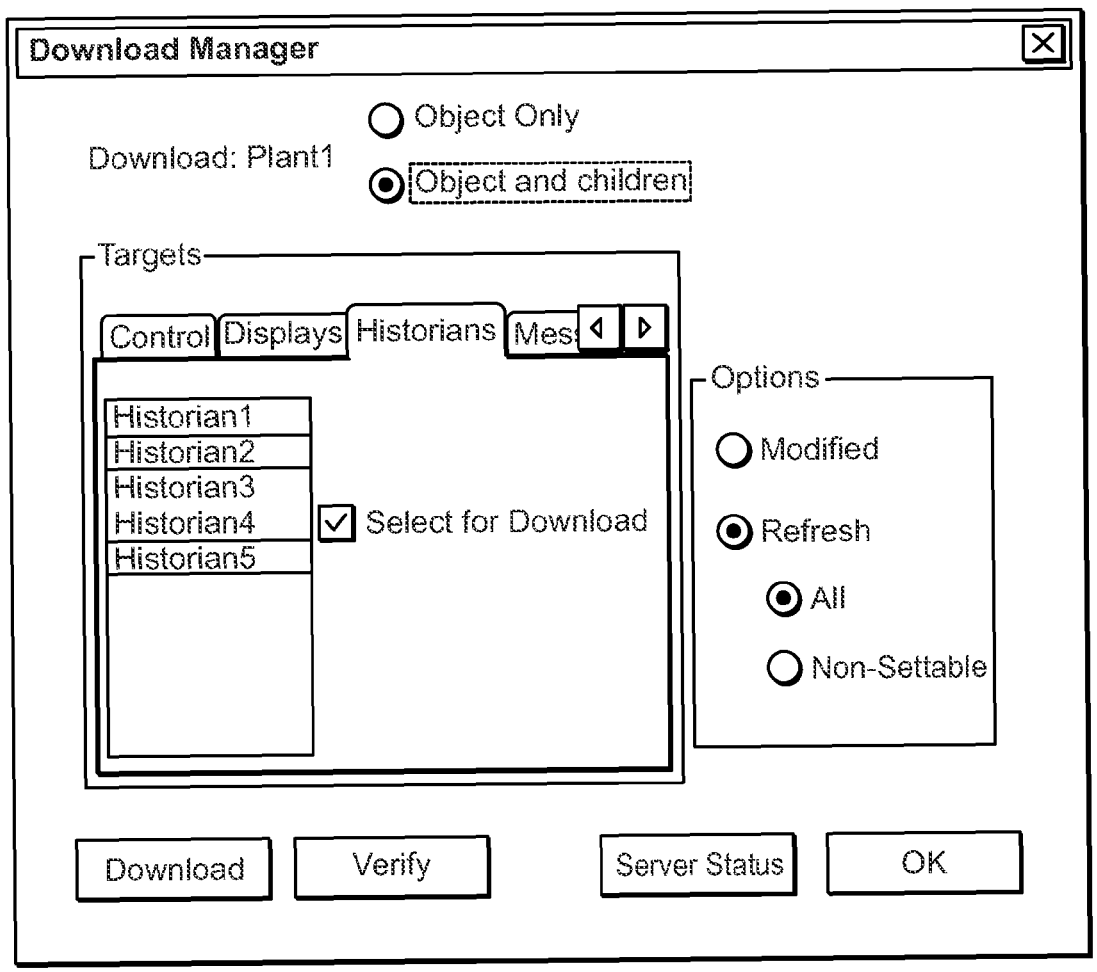
FIG. 107 depicts download target selection in a system according to the invention.

A dialog, such as in FIG. 107, displays the possible targets for downloading the selected object. The dialog is invoked either through a menu selection or through the context menu of an object. The dialog uses the currently selected object in the Navigation Tree to determine the download source. The dialog gives the user the option of downloading just the object selected or the object and all of its children. The object to download, or the object and its children, determine the possible download entities. These targets display as a tab control within the dialog. In FIG. 107 tabs show that control algorithms, FoxView displays, and Message Manager information is available from the Plant1 object or one of its children. Selecting the tab for a download target displays the possible targets for the download. In FIG. 107, a Historian download is selected, displaying a list of all configured Historians. From the list, the user selects the Historians to receive the download. A check box specifies that Historians will download. The user does not have to download to all possible targets or all possible types. If the "Select for Download" check box is unchecked, Historian information does not download. The dialog also allows the user to define what parameters to download, just modified parameters or all parameters. The all parameters choice provides a second choice between downloading all the parameters or downloading the non-user settable parameters. Through these selections the user controls the download process.

A download button initiates the download process. Part of the download process is the verification of the object to download. A second button provides the ability to invoke the object verification without performing a download. It is possible for a download to a target to not complete and remain pending. The Download Service servers maintain the list of pending request. Another button provides the ability to view the queue of pending requests in each server.

2.8.2.1.1 Validation

During the editing process, it is legal for information to be left incompletely defined. The connections between blocks in a loop may be linking to blocks not yet defined. Prior to downloading, the configuration must preferably be completed. The validation process requests each object to validate itself. A window displays information about validation failures. The validation process does not stop after errors are found; the process completes to find all errors. However, if validation finds any errors the download process does not initiate.

2.8.2.1.2 Download Agent—Control Stations

The Control Station Download Agent transmits control algorithms to control stations. The Download Manager invokes the Download Agent for each object to download to a control station. For control algorithms, the target is determined not by the user but by the block to compound assignment and by the compound to control station assignment. For control stations downloads the Download Manager only sends the Download Agent the object to download and the download options.

2.8.2.1.3 Download Agent—Operator Interface Applications

Operator Interface (OI) Download Agents provide extraction of data from IDA objects for download to Operator Interface (OI) applications. The Download Manager interacts with each OI Download Agent to determine whether the agent interacts with the selected IDA object. If the agent does not interact with the IDA object, then it will not appear in the target tabs. The Download Manager queries each OI Download Agent for a list of potential targets. These targets are displayed in the list control for the target tab. The Download Manager invokes each OI Download Agent selected with the source object and the selected target objects to perform the download.

2.8.2.1.4 Download Progress

As the Download Manager process each object, it provides the user information about the progress. In addition to displaying how many objects have been downloaded, the Download Manager interacts with the Download Agents to display the progress from the Download Agents in processing the requested object.

2.8.2.1.5 Download Server Status

The Download Agents rely on Download Servers to transmit the information to the target systems. A target system may not respond to the server. Rather than fail the entire download, servers may queue up download requests. Whenever the target system becomes available, they communicate with the server to request queued downloads. A dialog, displays the queued requests in a server. This dialog allows the user to remove requests from the pending queue. The dialog is provided by the Download Manager through interactions with the Download Agents.

2.8.2.2 Error Handling

During a download, if a Download Agent reports an error, the user is given the choice whether to continue with the download or whether to stop the download. The Download Manager maintains a record of all initiated downloads in the IDA database. In the event that IDA itself crashes during a download, during IDA startup, a message reports incomplete downloads. The message allows the user to restart the Download Manager with the interrupted request. Any objects successfully downloaded do not re-download. Status information in each IDA object indicates whether the download completed for that object.

2.8.3 Class Descriptions

Figure 108:
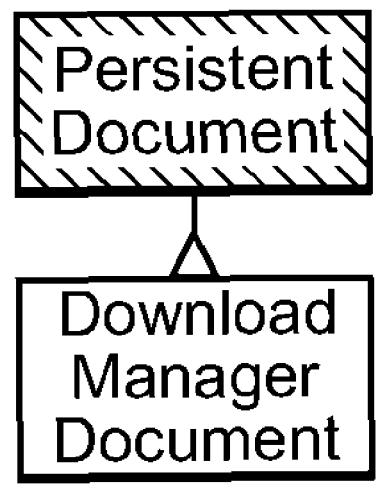
FIG. 108 depicts a download manager document object in a system according to the invention.

Referring to FIG. 108, the Download Manager maintains a persistent document derived from the framework Persistent Document object. The Download Manager Persistent Document maintains information about initiated downloads and their status. This information is used for error recovery. The Download Manager Persistent Document also contains parameters defining the relationship between download types and Download Agents. The Download Manager relies on the objects requesting download services to contain parameters specifying the download types and the OID to a download target.

2.9 Control Station Download Services

2.9.1 Overview

The Control Station Download Services is responsible for downloading control algorithms to IAS control stations. As changes are made to add, modify or delete Blocks, or Control Levels, action records are created by the Block and Control Level objects to keep track of what actions are required to download the changes. Download requests are handled by the Download Agent, which is a non-persistent object created by other objects which have download methods (Blocks, Control Stations, Control Areas). Once the Download Agent is created, the requesting object passes it an OID or a list of OIDs and an argument indicating what type of download operation to perform: download just the required changes, or download all parameters to refresh the Control Station data.

The Download Agent uses the OID(s) to create action records and obtain parameter values from the Control Levels and Blocks and builds an optimized ordered list of actions to ensure proper delete/add sequences and to group actions by Control Station and Control Level. The Agent then contacts the Download Service to request a reference to an ICCAPI object. The Download Service manages Control Station interfaces and creates request queues when there are concurrent download requests for the same Control Station. The Download Service returns either a busy indication (if another Download Agent is currently using the requested Control Station) or a reference to the ICCAPI object created by the Service for a specific Control Station. The Download Agent uses the reference to make the appropriate ICCAPI calls as it processes its Download list. If a busy indication is received (meaning the CP is being accessed by another process), the Download Agent will abort the download and inform the user. Likewise, if any Block download returns an error, the Download Agent will abort the download. The Download Manager will be responsible for querying the user for the next action to take—retry or abort altogether.

As each successful download action is completed, the Agent notifies the Control Level and Block to delete its action record. Upon completing the download request, the Download Agent returns a copy of the OID list to the original object which requested the download, indicating the success or failure of each requested download entry.

As a download is initiated, the Download Agent will mark the associated Control Station as "Downloading". If the download is successful, the Control Station state becomes "Downloaded". In the event of a download failure, the Control Station state will remain "Downloading". At IDA startup, a check of Control Stations will be made, and if any Control Station indicates a download failure (by having the Control Station state of "Downloading"), the user will be notified of the past download failure.

The Download Agent will also handle requests for Control Station checkpoints and initializations.

Download operations will fully comply with and support the versioning described in Part 1 as versioning becomes available.

2.9.2 Functionality

2.9.2.1 Download Agent

The Download Agent is a non-persistent object that is temporarily created by objects or IDA editors to process download requests to Control Stations. The Agent accepts download requests in the form of OIDs (a list of Block or Control Level OIDs, or a Control Area OID) and creates action record information from the Control Levels' Block list to build an optimized list for issuing ICCAPI calls to the respective IAS Control Station. Block ordering is a function of the Control Level. The download request also contains arguments indicating what type of download to perform. The download type argument is used to specify one of the following download actions:

only changes made since the last download all Block parameters

The Download Agent contacts the Download Service to obtain a reference for an ICCAPI object to use for each Control Station. The Agent formats ICCAPI instructions, based on the action records in its optimized list, and invokes the appropriate method of the ICCAPI object to process the actual download to the physical Control Station.

For successful download actions, the Download Agent notifies the respective Block to delete the action record and logs the action as successful in the download request list. Unsuccessful download actions are marked as failed in the download list and further processing is aborted. When the Download Agent is finished processing the download request it passes the original request list, with download status filled in for each entry, back to the original requestor. A successful download will be followed by a checkpoint of the Control Station. The Agent then notifies the Download Service when download processing is complete, so that the Service can delete the ICCAPI object.

The Download Agent will process one download request at a time. If the Download Agent is currently downloading, any subsequent attempts to download will be rejected until the current download is complete. To provide a means of recovery in the event of a system or Control Station failure during a download, the Download Agent will mark each object with a "Downloading" attribute just prior to calling the ICCAPI. Once the download of the object is successful, the "Downloading" attribute is cleared. If the download of the object fails, the "Downloading" attribute remains and the download is aborted.

2.9.2.2 Download Service

The Download Service is a service that runs on the IDA database server platform and manages requests to create ICCAPI objects to be used for issuing download actions to specific Control Stations. The Service keeps tracks of which Control Stations are currently in use by Download Agents. If multiple requests for the same Control Station are received, a "busy" error is returned. This error is returned to the calling object, allowing the object to query the user for what action to take—abort the download or wait for the current download for the given Control Station to complete. The Download Service creates ICCAPI objects for specific Control Stations and passes references to these objects back to the requesting Download Agents. Upon receiving notification that a Download Agent has completed its download tasks, it deletes the ICCAPI object. The Download Service processes multiple downloads to multiple different Control Stations at one time. In the event of a Download Agent or network failure, the Download Service terminates a Control Station connection if no communication is received from the station's Download Agent within the preceding three minutes.

2.9.3 Class Descriptions

Figure 109:
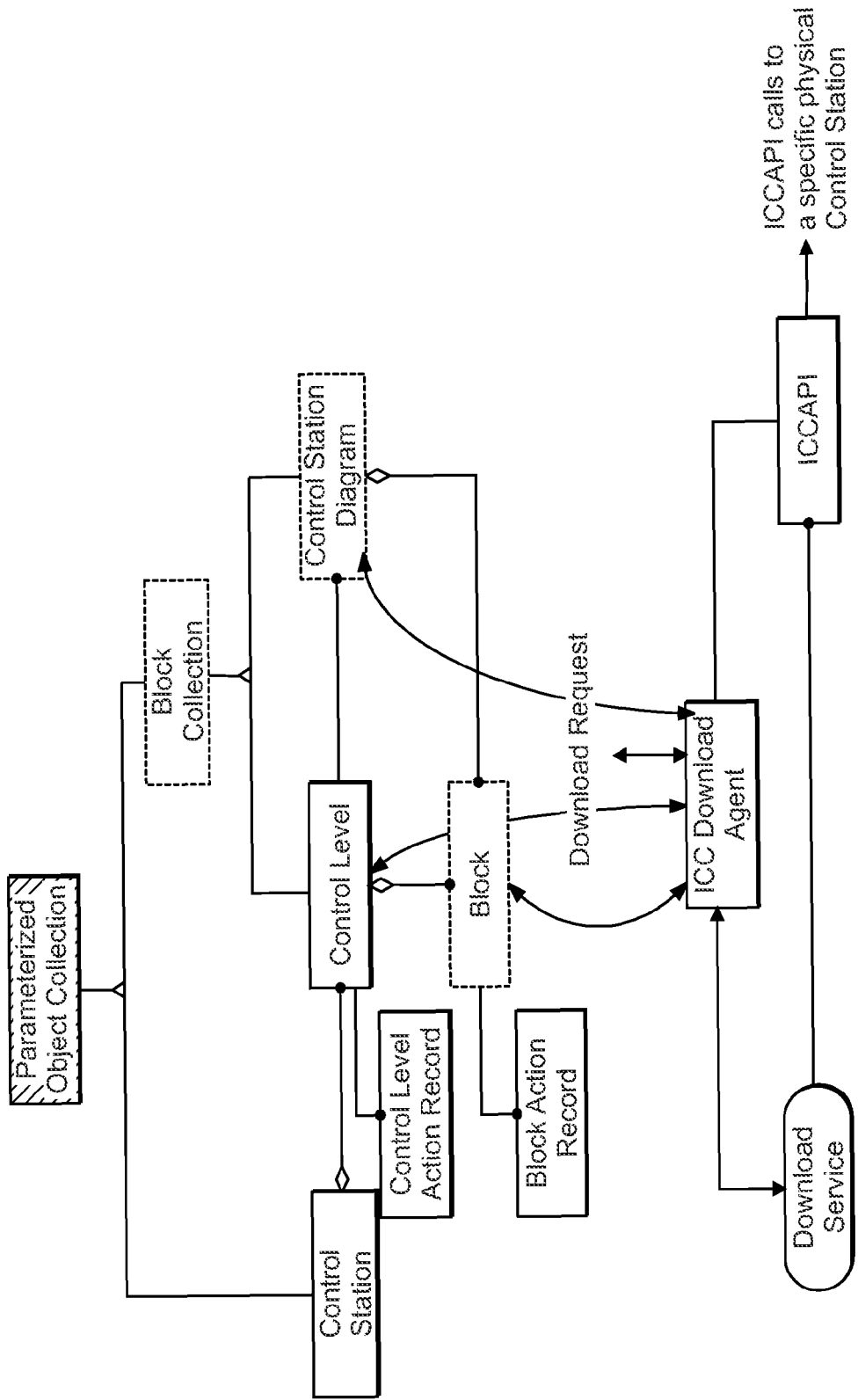
FIG. 109 depicts a download services object model in a system according to the invention.

Since the Download Services only reads and writes existing Application and Framework database objects, it has no object model (aside from the MFC objects used in its implementation and human interface). The verification features of the services use the Framework-supplied revision and change management functions of the objects involved in its operation. See FIG. 109.

2.9.3.1 Blocks

Blocks maintain a status attribute, indicating their current download state:

Downloaded—no modifications since last download

Added—not yet created in a physical Control Station

Deleted—deleted by user, but not yet deleted from the physical Control Station

Modified—changed since previous download

Moved—moved to another Control Level or renamed, but not yet deleted from the physical Control Station The status attribute is kept consistent with any existing action records and is used to indicate to other objects or applications if the Block needs to be downloaded, or if a special visual attribute needs to be set. For instance, the Project Manager would use a special icon on a Tree or List view to indicate that a Block had been deleted, but not yet downloaded.

Blocks add the appropriate action records in response to user actions, including:

Adding a Block

Deleting a Block

Modifying Block Parameters

Reassigning a Block to a different Control Level

Renaming a Block

Changing the Block processing order within a Control Level

Blocks also provide the appropriate parameter list and values in response to Download Client requests to download:

New actions—action records not yet processed

All parameters

All non-settable parameters—only those parameters which cannot be modified by operators at run-time Blocks have two-way associations with a Control Level. A Control Level uses its associations to keep an ordered list of its Blocks. A Block uses its association to identify the Control Level to which it is currently assigned. When a Block is re-assigned to another Control Level, it creates a Delete action record that contains the Name and OID of the old Control Level and deletes its association with the old Control Level. It then creates an association with the new Control Level and creates an Add action record with the Name and OID of the new Control Level. The old Control Level maintains its association with the Block until the reassignment is downloaded, at which time the Block notifies the old Control Level to delete its association.

2.9.3.1.1 Block Action Records

Action records are non-persistent objects created in response to users adding, deleting or modifying the Block. They are used to determine what actions are required in response to a download request. Each action record has attributes to indicate:

Action Type:
  Add—download all parameters
  Modify—download only parameters marked as modified since last download, including
  changed Block processing order within a Loop.
  Delete—delete block from the Control Level
  Block Name—needed to handle cases where Block name is changed
  Control Level Name
  Control Level OID
  Position—Block processing position within a Loop, used by the Download Agent
  to determine Block position within a Control Level.

Status:
  New—no download action initiated (default state when Record is created)
  Pending—download request is in progress but not yet successfully completed
  Control Level Name and Control Level OID are used to determine if a delete action requires deleting the Block from the database (Name and OID match) or if the Block should remain in the database, but needs to be deleted from an existing Control Level because the Block has been moved to another Control Level or the Control Level has been renamed (Name and OID do not match). Action record status is used to track progress of download requests. Status is changed from New to Pending when the Block responds to a request for download information from the Download Client.

Action records are deleted by the Block in response to notification from the Download Agent that the action has been successfully completed.

2.9.3.2 Control Levels

Control Levels contain status similar to Blocks and maintain associations with Control Stations similar to the associations Blocks maintain with Control Levels.

2.9.3.2.1 Control Level Action Records

Control Level action records are built similarly to those used for Blocks, except that the Control Station names and OIDs are used in place of the Control Level names and OIDs in the Block action records.

2.10 Operator Interface Applications Download Agent and Server

2.10.1 Overview

The Operator Interface (OI) Download Services are responsible for downloading IDA configuration information to IAS applications.

2.10.2 Functionality

2.10.2.1 Download Agents

The Download Agents interact with the Download Manager for user interactions in selecting targets, and providing progress information. The Download Agents rely on the Download Manager for error recovery.

The Download Agents provide a query function used by the Download Manager for determining whether the agent handles the selected source IDA object. The Download Manager passes in an OID for the selected IDA object. The OID's type is tested for determining whether the agent deals with the object. The agent also checks child collections of the object if the Download Manager specifies the children option.

For source objects which the Download Agent handles, the Download Agent returns the list of possible target stations. The Download Agents return either a string array of names or a list of IDA object definitions. If IDA object definitions are returned, the Download Manager displays all instances of the object definition.

Once a download initiates, the Download Agents interact with the source IDA objects to extract information as needed by the OI application. This information is replicated to all target systems using the Replication Server. During the download process, the Download Agents interact with the Download Manager to display progress information.

2.10.2.2 Download Service

The Download Service for OI downloads is comprised of two applications. The first application is a generic application which replicates data files, created by the Download Agents, to a specified list of targets. The second application is specific to OI applications and performs the needed functionality to import the replicated data into the OI application. The OI import application is specific to each OI application. Responsibility for the implementation of the import services resides with the OI application team. The Download Agent may interact directly with an OI Application Server to import the data, without invoking replication services, if appropriate.

2.10.3 Class Descriptions

The Download Agents are transient classes with no IDA object definitions. The interaction between the Download Agents and the IDA objects is through the parameterized object interface. Specific parameters are extracted from the IDA objects to create the OI Application data set. The parameters to extract are either predetermined by the Download Agent or specified as a parameter group in the IDA object.

2.11 Historian Collection Point Editor

2.11.1 Overview

The Historian Collection Point Editor is responsible for creating Historian configuration files which can be used to add collection points to IAS historians. The information used to configure a point for either Historical collection facility is the same. The information is a set of "fields", one set per parameter, which includes:

The complete name of the point to be collected which contains the compound name, block name and parameter name within the block.
  The delta (or amount of change in value) required to receive the point from the control station.
  The frequency with which the point is to be stored when it changes.
  The duration for which to store the values being collected or the number of values to be stored.
  A description of the point (similar to block description but on a per parameter collected basis).
  An assignment for historical collection can be made for any "connectable" IAS block parameter. Each assignment is made to a single Historian (one per configuration file). Any connectable parameter of any block may be designated for Historian assignment. The designation can be made to the Block Definition or to any Derived Block Definition (e.g. PIDA (default) vs. PIDA (Flow)) or to a specific block instance (the PIDA named XXX in the compound YYY). The designation is a data inherited feature. That is, if the measurement (MEAS) of the PIDA (default) is designated then so is the measurement of the Flow PIDA and all other descendants and instances of PIDA. If the designation is made to the Flow PIDA then all Flow PIDA instances will share the designation.

Historian names, types, servers and capacities are extracted from system configuration files or may be entered and edited manually. Manually entered information is not exportable back to the system configuration files. The Historian used for collection is selected on a per Compound basis. That is, all designated points in the blocks in the Compound are assigned to the Historian selected for that Compound. All the assignments for a given Historian are aggregated into a single configuration file. When Loops are assigned to a Compound all the Historian collection points in the Blocks in the Loop are assigned. This is true of both Template Derived Loops and Simple Loops. Individual instances of Blocks which have assignments will "inherit" the Historian assigned to their containing Compound.

2.11.2 User Interface

New Historians are created in one of two ways; importing the Historian configuration data via the Import/Export Manager or by selecting "New"-"Historian" from a menu pick. The information includes the Historian name and capacity. The Historians created or imported display on the Plant Tree View. A set of screens is provided to allow the user to define and manage Historian information (contained in the Historian class, below). These screens have options to import the Historian information from the system configuration or to enter the data manually. A dialog is provided to manage the assignment of Compounds to individual Historians. This operation is tied to Loop configuration/Loop assignment to Compounds and the dialog is accessible from the Control Algorithm Diagram Editor. It is also available as a right click option from several locations (anywhere a Compound is displayed for editing). It is also possible to do Compound assignment by dragging a Compound onto an Historian. Shown below is the interface used by FoxCAE to perform a similar function.

Figure 110:
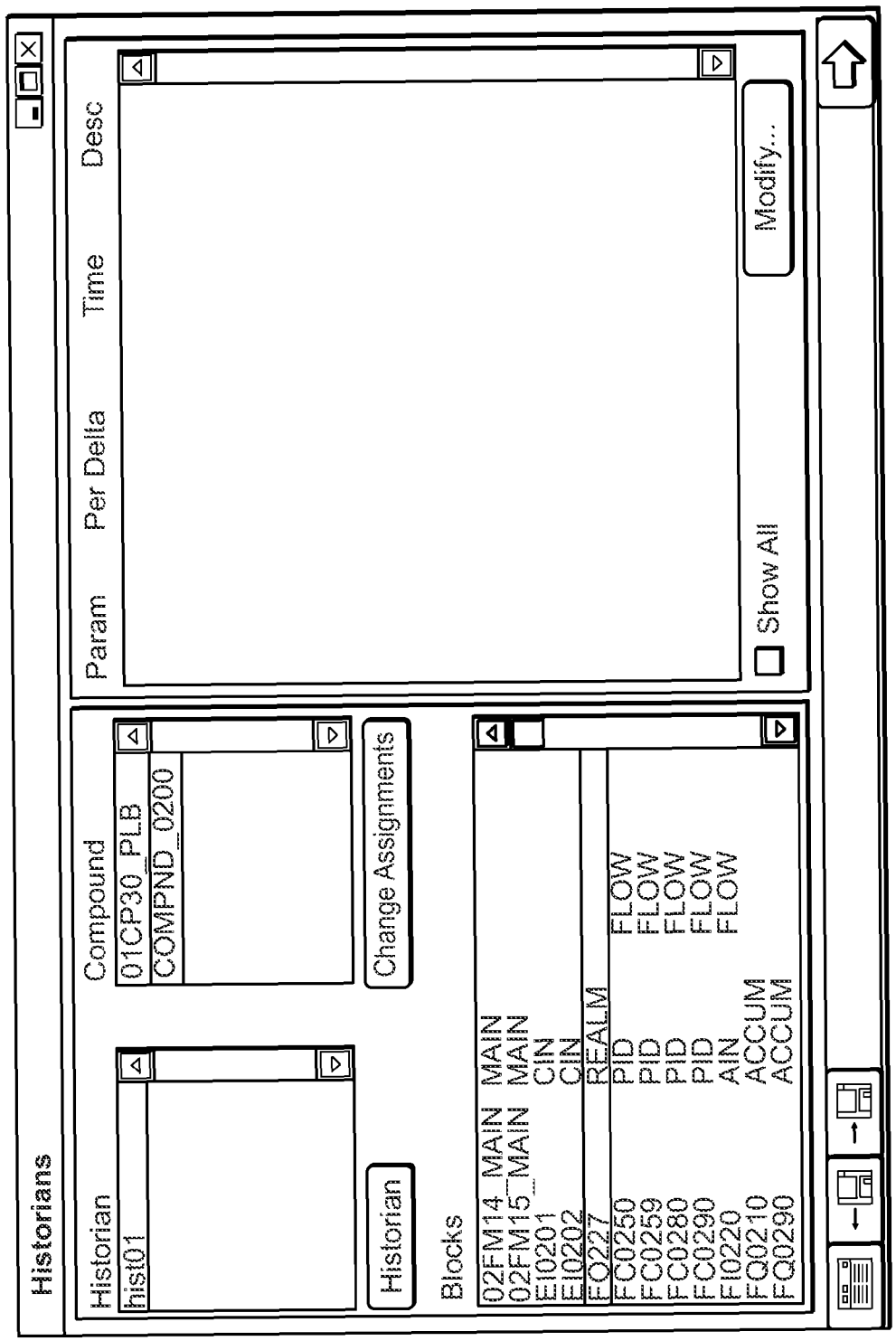
FIG. 110 is an historian assignment overview in a system according to the invention.

FIG. 110 is an overview display of the available Historians, the Compounds assigned to each and the Blocks within each compound. The Historian parameters for the selected Block is shown in the panel on the right. The lower left pane of the dialog shows the Blocks contained in the selected Compound. Each Block is shown with its name, type, and the name of its defining "parent". For example, the Block named FC0250 of Compound COMPND_0200 is an instance of a PID derived from the user defined parameter set for FLOW PID's.

If any parameters of the selected block had been assigned for historical data collection, the parameter name, the collection period, the change delta required to trigger collection, the duration of the historical collection (in hours) and the user's description of the point are shown on the pane on the right. The "Show All" checkbox controls whether all the Block's parameters are shown or just the ones which are currently assigned. The "Modify . . . " button invokes a dialog which allows editing of the selected parameter's collection specification.

Figure 111:
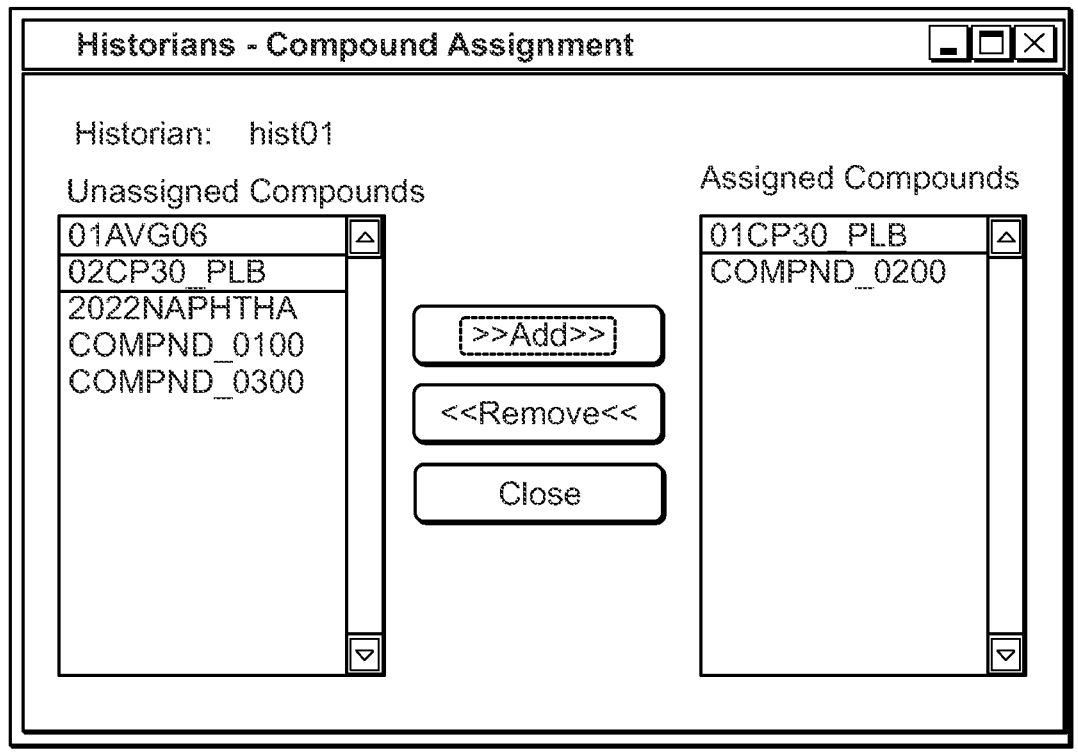
FIG. 111 depicts an individual compound assignment in a system according to the invention.
Figure 112:
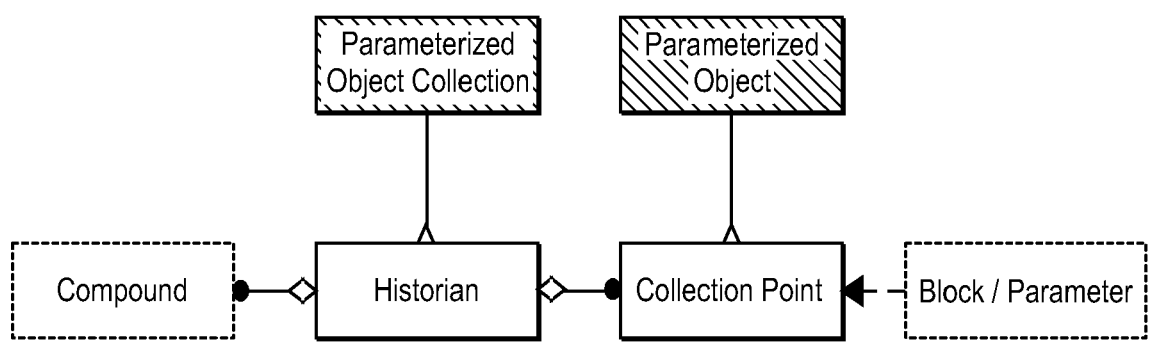
FIG. 112 depicts an historian object model in a system according to the invention.

Clicking on the "Change Assignments" button in the dialog box of FIG. 110 invokes the dialog shown in FIG. 111. Compounds can be added or removed from the selected Historian by selecting one or more Compounds from one of the lists and using the "Add" and "Remove" buttons. Similar dialogs are provided to allow assigning Block Definitions to Historians.

The dialog which is provided to designate which block parameters are to be assigned for collection and allow the entry and editing of the collection information is a variation of the standard Parameters Property Sheet. This dialog is available as an "Historian" tab from the Block Parameters Property Page dialog. The dialog shows a list of all connectable parameters for the block and allows the user to assign Historian Collection Point information on a per parameter basis and view which parameters have already been assigned.

2.11.3 Functions

The functionality of the Historian Collection Point Editor can be divided into four parts; import or creation of Historian system configurations, assignment of block parameters for historical collection, assignment of Compounds to Historians and creation of Historian configuration files.

2.11.3.1 Historian Configuration

Manually enter the Historian name, type, hosting server and capacity.

Import the Historian name, type, hosting server and capacity from existing system configuration files.

Expose Historian Configuration functionality for use by the Import/Export Manager.

2.11.3.2 Collection Assignment

Create a collection point assignment for any connectable block parameter.

Edit the assignment parameters

Delete a collection point assignment.

Expose collection point assignment creation functionality for use by the Import/Export Manager.

2.11.3.3 Compound Assignment

Assign a Compound to an Historian for collection

Delete a Compound from an Historian.

2.11.3.4 Configuration File Creation

Generate a configuration file for all the Compounds assigned to an Historian.

Generate a configuration file for selected Compounds assigned to an Historian.

Initiate the download of the configuration files to the selected Historian(s). There are three, user selectable, modes of download:
1. The existing configuration is forced to match the IDA version, deleting current Historian collection points where necessary.
2. Only add new collection points to the current Historian, leaving the existing points untouched (including those in which the IDA collection parameters differ from the current Historian ones).
3. Add the new collection points and modify the existing ones to match the IDA version, but does not delete any current Historian points)

2.11.4 Class Descriptions 2.11.4.1 Historian

Referring to FIG. 111, an Historian is responsible for containing and controlling access to the Collection Points assigned to it. It is derived from the Framework Parameterized Object Collection class and adds data members to contain the Historian Name, Historian Type, Historian Capacity and Host Server. Since Compounds are assigned to historians for collection, the Historian class also contains a list of references to its assigned Compounds. Class Relationships:

Historian only allows objects of type Collection Point to be added to its parameter collection.

Historian uses the Parameterized Object Collection method to provide iteration for the contained Collection Points.

Historian provides its own storage and method for iteration over the Compounds which are assigned to it, returning each assigned Compound in turn. The ordering of the list is to be determined.

2.11.4.2 Collection Point

A Collection Point is responsible for containing the parameters to configure a single block parameter for historical collection. It is derived from the Framework Parameterized Object class and is extended to contain a reference to the Historian which contains it. Class Relationships:

Collection Point contains the name of the compound, block and parameter, the change delta, the collection frequency, the storage duration, the number of values being stored and a user defined description of the point as parameters. As loop assignments to Compounds change, these parameters (particularly compound and block names) change as well to reflect the new names, if any. Each Collection Point is associated with only one Historian.

All the parameters are contained in a single parameter group.

The Block/Parameter shown in the model is used to generate the name information during collection point configuration generation. The blocks and parameters used to provide this information are extracted from the Compounds assigned to Historians. The Collection Point class retains this information, persistently, for purposes of reporting and display; there is no physical reference maintained, only compound, block and parameter name. Each Block/Parameter is associated with only one Collection Point.

2.12 Enclosure Editor 2.12.1 Overview

The Enclosure Loading Editor is responsible for presenting the user with a graphical or tabular view of I/A Enclosures to allow placement and documentation of Modules, including (but not limited to) FBMs, CPS, gateways, DNBIs, and FBIs, in specific Enclosures and to allow assigning I/O Tags to specific FBM points. The documentation is used at installation time to help set up the equipment properly. Several Enclosures can be associated with a Plant area by creating them on a common Enclosure Group drawing and then attaching the Enclosure Group to a branch on the Plant hierarchy tree. The Editor consists of two main views to accomplish these functions; the Enclosure Group view and the Enclosure Loading View. The IDA Framework standard list view can be used to examine Enclosure Group data and Enclosure Loading data in read only mode, and can be used to generate tabular reports.

2.12.2 Enclosure Editor Detailed Functionality 2.12.2.1 Enclosure Group View

The enclosure group view will allow adding and deleting Enclosure Group drawings. The enclosure group view will allow adding and deleting Enclosures from Enclosure Group drawings. The enclosure group view will allow adding, deleting, and modifying connections among Enclosures on Enclosure Group drawings. The enclosure group view will allow relocating Enclosures, either within a Group drawing or from the Project Manager Tree. The Enclosure Group view is used to create or modify a graphical drawing of enclosures that can be associated with a specific Plant area. The user selects an enclosure type from a palette and drops it onto a drawing view. Enclosures can be repositioned and "connected" (note that such a connection is for annotation purposes only) on the drawing view. An enclosure that already exists can be relocated by dragging it from the Project Manager Tree view and dropping it onto the drawing.

2.12.2.2 Enclosure Group View User Interface

Figure 113:
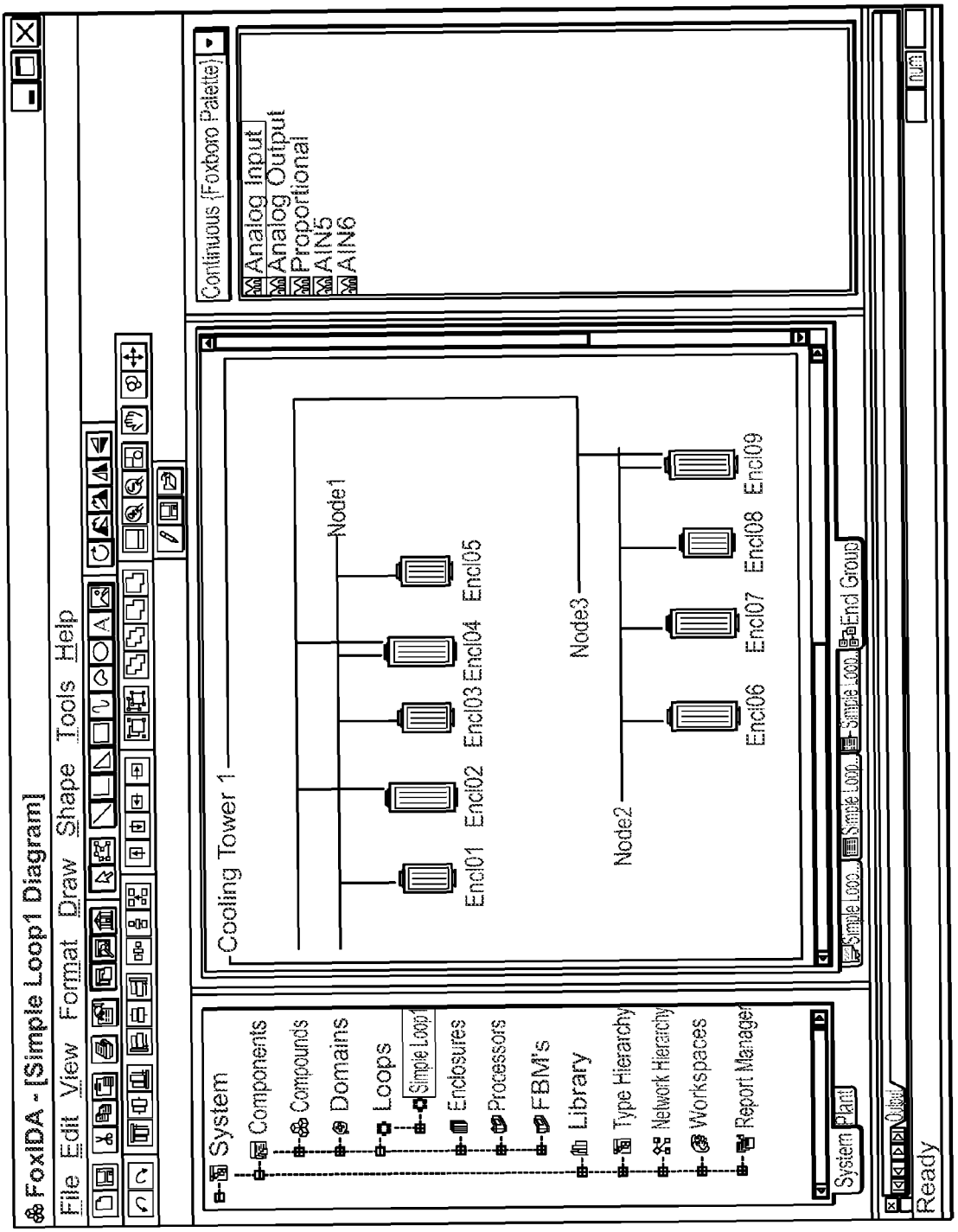
FIG. 113 depicts an enclosure group view in a system according to the invention.

Referring to FIG. 113, the Enclosure Group view is a documentation tool. The enclosure groups and their assigned enclosures are saved in the IDA database, but the Enclosure Editor does not check that all enclosures are assigned to a group or that an enclosure is assigned to only one group, for example. The text and lines used to annotate the enclosure group view are saved in the IDA database in graphical form only—the lines do not represent connections in the same sense that they do in other editors like the Loop Sheet Editor. The Enclosure Editor does not check whether the information configured by the user matches the physical layout of the system. The Enclosure Editor User Interface will follow Microsoft conventions. The Enclosure Group View supports the ability to find a particular Enclosure using standard Windows conventions. By double clicking on an individual enclosure, or by selecting an enclosure and using the context menu, the user can change the view from the Group view to the Loading view for the selected Enclosure.

2.12.2.3 Enclosure Loading View Module Assignment Functions

The Enclosure Loading View provides for adding and deleting Modules within Enclosures functions. It also provides for relocating Modules, either within an Enclosure Loading view or from the Project Manager Tree functions.

The Enclosure Loading view is used to assign FBMs to Enclosure slots and to assign I/O Tags to FBM points. The user can select an FBM type from the palette (the palette in the figure does not show this) and drop it onto an Enclosure slot. FBMs can be relocated in the following ways:

1. By dragging and dropping them to another slot.
2. An FBM that already exists can be relocated by dragging it from the Project Manager Tree view and dropping it onto one of the Enclosure slots.
3. By using standard Windows cut and paste.

In addition to FBMs, the Enclosure Editor allows the user to assign other module types, such as CPS, to slots. Such modules simply take up enclosure slots, as far as the Enclosure Editor is concerned, and are shown in a different color. The Enclosure Editor understands how to deal with module variations, such as redundant modules and module extenders, that occupy more than one slot.

2.12.2.4 Enclosure Loading View I/O Tag Assignment Functions

By selecting an FBM point in one of the Enclosure slots, a user can invoke the Tag Assignment dialog which allows assigning a specific I/O Tag to the point. The dialog displays a subset of the fields in the Tag List and only displays unassigned Tags. The user can locate a specific Tag either by scrolling the Tag list or by entering a Tag name in the "Find" text box. The list can be sorted by any of the column headings to aid in locating an existing Tag. If a Tag does not yet exist, the user can select the "New" button, which invokes the Tag List Editor.

Tags are added to FBM points by selecting a Tag list entry on the list and then dragging it onto an FBM point. This action causes the Tag name to appear next to the respective FBM point in the Enclosure Loading view. An error dialog box appears informing the user if there is a mismatch of FBM point type and the Block type of the Tag. If the user attempts to assign a Tag to an FBM point that has an incompatibility (such as attempting to assign a Tag associated with an AIN Block input to an FBM output point) an error dialog box appears explaining why the attempted action is not allowed.

Tags can be relocated, either within an enclosure or between enclosures several ways:
1. By dragging and dropping the Tag to another location in the same or a different FBM.
2. A Tag that already exists can be relocated by dragging it from the Project Manager Tree view and dropping it onto one of the FBM slots (note that this implies that the tree view can show details all the way down to the FBM point level).
3. By instantiating another copy of the Enclosure Editor in a separate IDA instance and dragging and dropping Tags between the windows.
4. By using standard Windows cut and paste.

Tags can also be attached to FBMs that exist in the Unassigned branch of the Project Manager Tree. These are FBMs that have been created but not yet assigned to a specific Enclosure slot. To attach Tags to one of these FBMs, the user selects the FBM on the Project Manager Tree and then invokes the Enclosure Loading Editor. The Editor then displays a view of FBMs identical to that shown on the Enclosure Loading view, but with just the single FBM. Tag list assignments are then made as described previously.

The Enclosure Loading View allows the user to find either a particular FBM or Tag, using standard Windows conventions.

2.12.2.5 Enclosure Loading View User Interface

Figure 114:
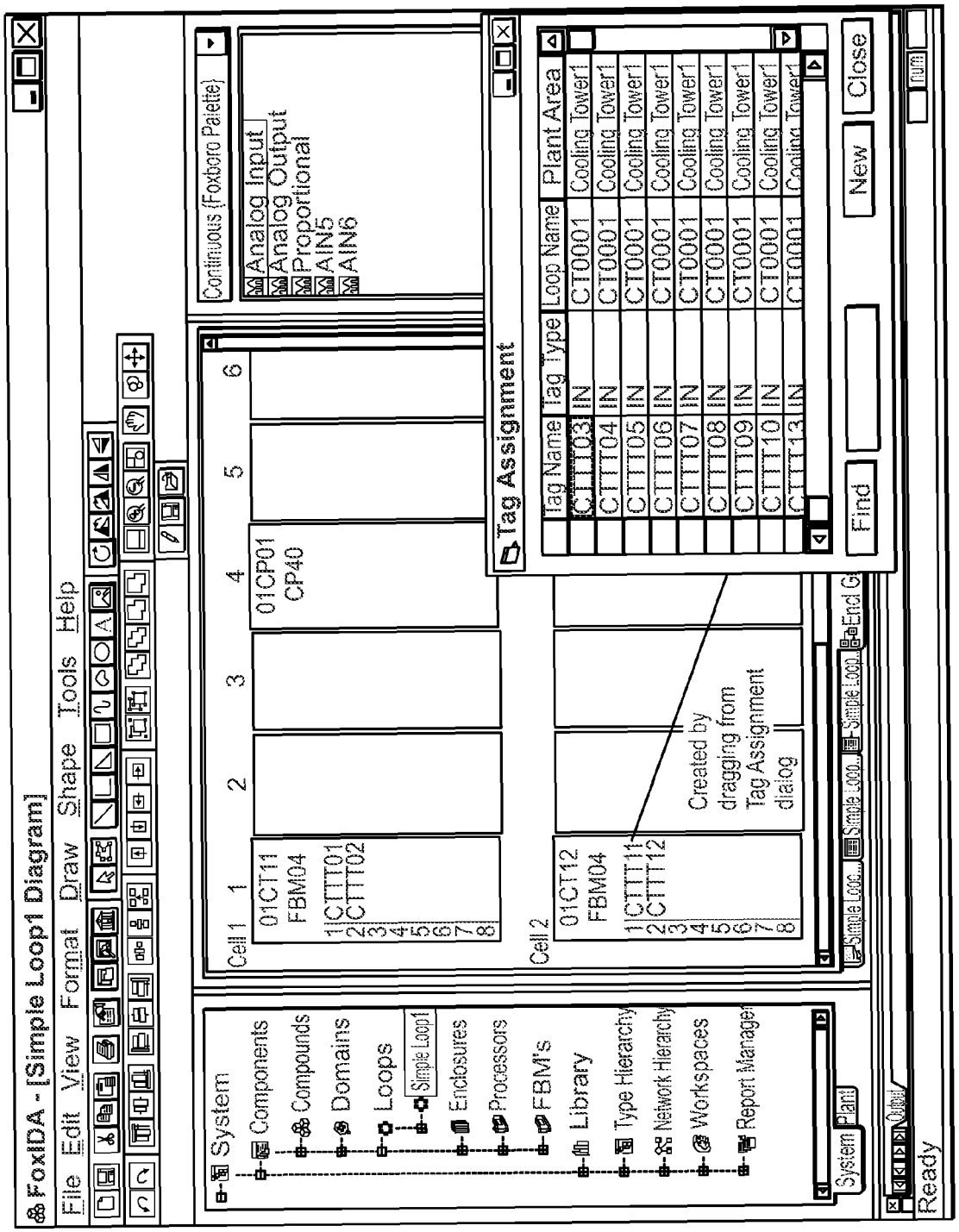
FIG. 114 depicts an enclosure loading view and tag assignment dialog in a system according to the invention.

Referring to FIG. 114, the Enclosure and Module types available on the Enclosure Element lists are implementation-standard. The user does not have the capability to add or modify these types of objects. Icons for Module types other than FBMs (such as a CP) are provided to enhance the documentation of occupied slots in the Enclosure cells.

Enclosures and loading configurations can be either built manually, as described above, or imported from System Configurator or FoxCAE files as described in the Import/Export Editor section of this document. Changes made to imported configurations do not update the original System configurator files.

2.12.2.6 Input/Output Termination View Functions

The Input/Output Termination View is used to document which termination point(s) to use for each FBM input and output. Each FBM Module has one of three types of termination blocks, used to connect the FBM to external devices. This view is used to document, for the installation electrician, which terminals to use when wiring the system. The I/O Termination View is automatically invoked whenever the Enclosure Loading editor is started. It shows a view of the Input/Output terminations used to connect signals to FBMs. It allows the user to change which of the possible termination points for each FBM is used for the connection. It does not allow the user to perform any of the Tag assignment tasks (i.e. drag and drop, cut and paste) that are possible in the Enclosure Loading view. It only allows the user to select which I/O contact point to use, of the available I/O contacts.

2.12.2.7 Input/Output Termination View User Interface

Figure 115:
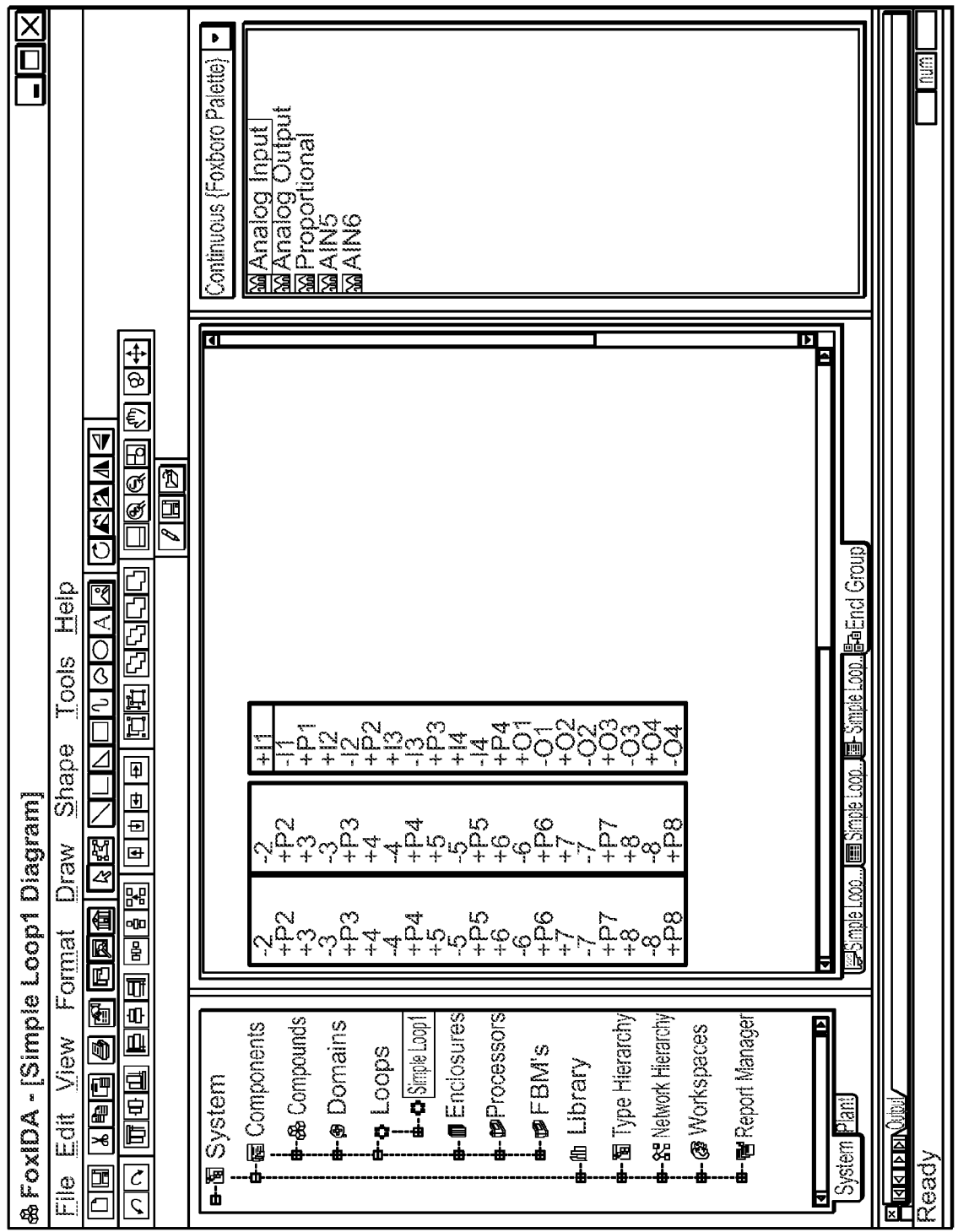
FIG. 115 depicts an enclosure input/output termination view in a system according to the invention.

Referring to FIG. 115 the Input/Output Termination View shows contacts for the corresponding Enclosure Loading View, grouped by FBM. The selected FBM point in the Enclosure Loading View and the selected I/O terminations in the I/O Termination View track each other when switching between these two views. Associated with the Enclosure Editors, and included with the shippable IDA, are IDA definitions that describe implementation-standard enclosures, cells and modules. Definitions for future and/or special enclosures, cells and modules can be generated. All of these definitions are created using the Definition Editor.

The Enclosure Editor provides functions for printing Enclosure drawings—both Enclosure Group drawings and Enclosure Loading drawings. It also provides functions for printing tabular enclosure reports. Each view in the Enclosure Editor represents a printable drawing. As such, it is associated with a sheet template that is assigned when the view is created. The aspect ratios of the associated sheet template are maintained during all zoom and pan operations. The user can zoom in and out, depending upon the desired level of detail. Scroll bars automatically appear and disappear as appropriate. The font used to show FBM information and tag names in the Enclosure Loading views is automatically scaled based on the current zoom magnification, and is chosen such that the tag names are as large as possible within their allotted spaces when the view is rendered as a drawing. If the current magnification is too low to render the scaled font, the text is not shown. The user can change the sheet template that is associated with a view, and if the sheet template is too small to allow tag names to be printed, the user is warned.

2.12.2.8 Configuration Check Functions

A check configuration function will be provided to check that all modules are assigned to enclosures, all I/O points are assigned to FBMs, etc. Type compatibility checking between FBM point types and Tags' associated input/output Block parameters. This validity checking is also used by the Block and Connection Editor when connecting Tags that have already been associated with FBMs to Blocks on a Loop drawing view.

2.12.2.9 Enclosure Editor Import/Export Functions

Standard IDA import and export functions are provided to back up and restore the database, or to transfer it to another IDA system. Functions to import enclosure information from a System Configurator File or from a FoxCAE database are also provided. All imported enclosures will be assigned to the components branch on the Project Manager Tree and can be subsequently added by hand to Enclosure Group drawings.

2.12.3 Object Models

This section describes the object models for Enclosure loading, including the placement of Modules in specific Cell/Slot positions within enclosures. Parameterized Objects, Parameterized Object Collections, and Connections are described in detail in the Part 1 and only a simplified model of the implementation of these classes is shown here. Tag List Row and Block objects are described elsewhere in this document. For clarity, the entire Definition models for Enclosure, Cells and Modules are not shown in FIG. 96. The full model for an Enclosure Definition is shown on the subsequent figure and applies for the other Definition classes as well. The last object model describes the use of persistent Document objects to display enclosure drawings.

2.12.3.1 Enclosure Group

Figure 116:
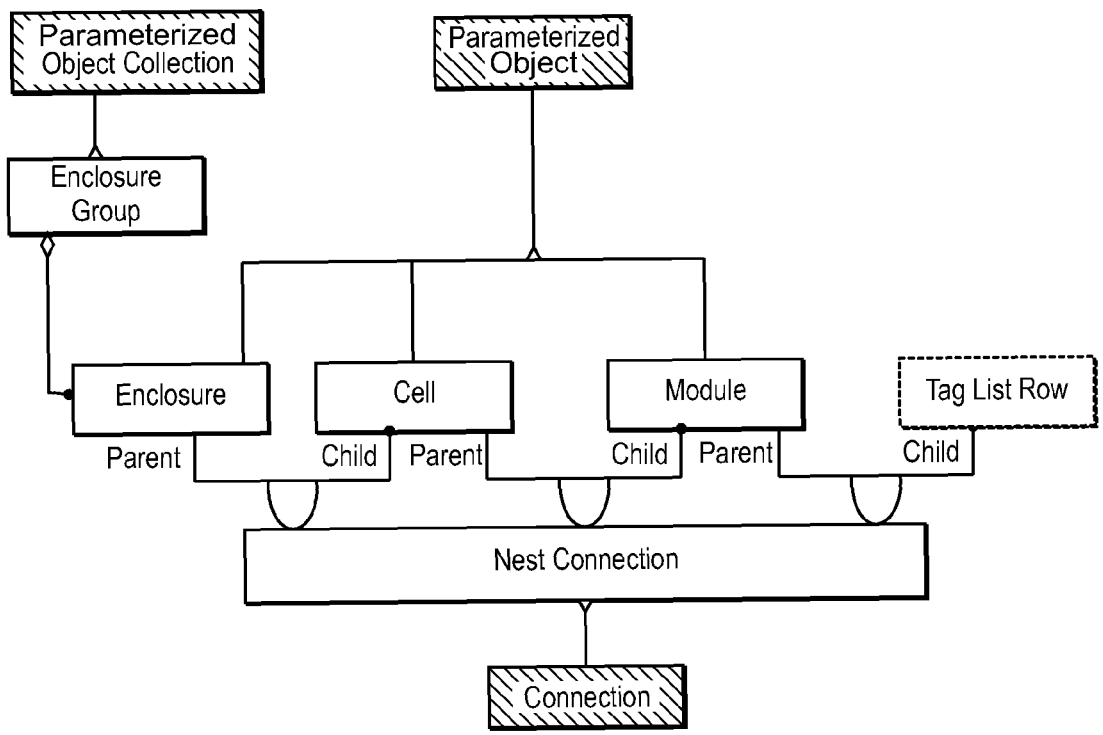
FIG. 116 depicts an enclosure loading model in a system according to the invention.

Referring to FIG. 116, an Enclosure Group provides a means to group Enclosures so they can be associated as a group with particular Plant Areas. Class Relationships:

An Enclosure Group is derived from Parameterized Object Collection, which provides the ability to manage collections.

An Enclosure Group maintains associations with Enclosures which are used to report on which Enclosures belong to the group.

2.12.3.2 Enclosure

Figure 117:
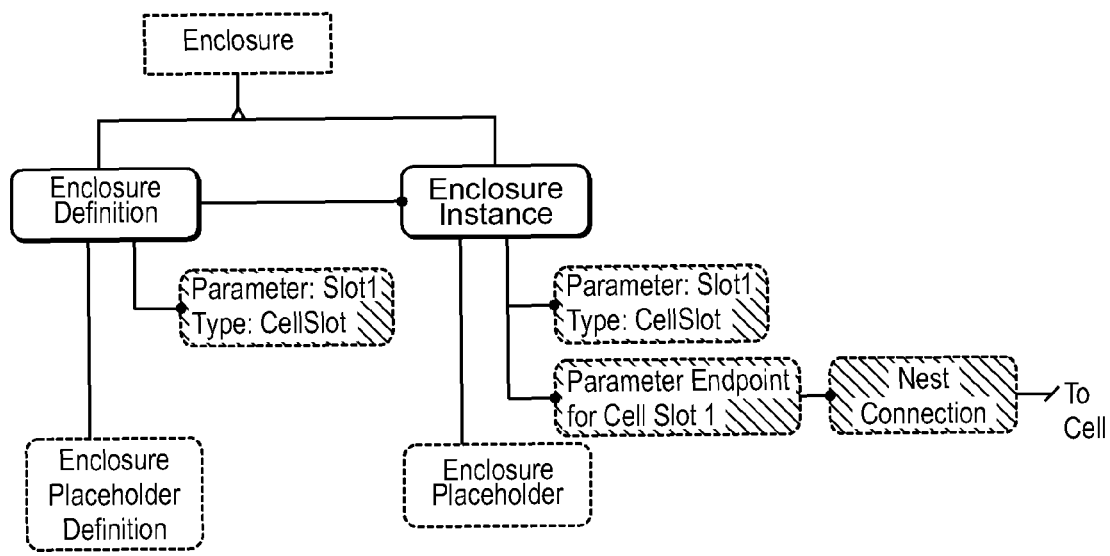
FIG. 117 depicts an enclosure definition detail model in a system according to the invention.
Figure 118:
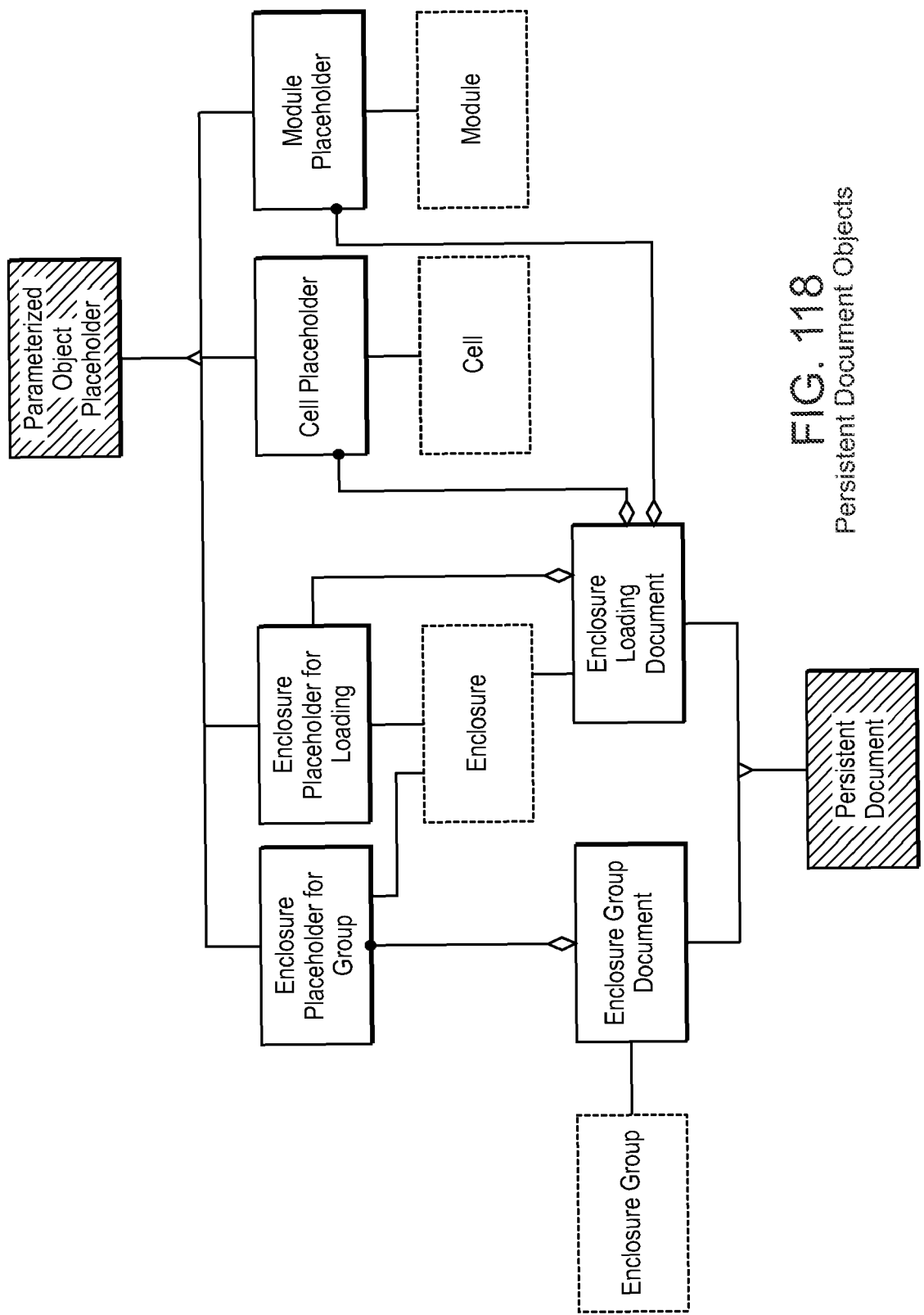
FIG. 118 depicts persistent document objects in a system according to the invention.

Enclosures serve as a physical housing for Cells, which are mounting structures for modules (such as FBMs). The Enclosure is capable of containing one or more Cells. The main function of this class is to keep track of which Cells it contains. Each I/A enclosure has pre-defined Cell types and both the Enclosure and its Cells are created when an instance of an Enclosure is created. Class Relationships:

- An Enclosure is derived from Parameterized Object, which supports connections through its parameters.
- An Enclosure is the container/parent for Cells and maintains an ordered set of Cell connections.
- An Enclosure can optionally be associated with an Enclosure Group.
- An Enclosure maintains an association with its Enclosure Definition for reporting purposes (see FIG. 117 and discussion below).
- An association with a Placeholder is also maintained to support supplying data for display purposes (see FIG. 118).

2.12.3.3 Cell

A Cell serves as a mounting structure for Modules (FBMs), and may belong to one, and only one, Enclosure. Modules are placed within specific sockets (or slots) which define the Cell. Each Module may "consume" one or more adjacent sockets within the Cell. The main function of this class is to keep track of which Modules are loaded in its slots. Class Relationships:

- An Cell is derived from Parameterized Object, which supports connections through its parameters.
- A Cell maintains a connection to its associated Enclosure.
- An Cell is the container/parent for Modules and maintains an ordered set of Module connections.
- A Cell maintains an association with its Cell Definition for reporting purposes, similar to Enclosures.
- An association with a Placeholder is also maintained to support supplying data for display purposes (see FIG. 118).

2.12.3.4 Module

A Module is control hardware and/or nd peripherals which occupy a physical location (socket, or slot) within a Cell. Note that such modules may mount directly in Cells or Enclosures. The main function of this class is to keep track of which Tag List Rows are loaded in its slots. Class Relationships:

- A Module is derived from Parameterized Object, which supports connections through its parameters.
- A Module maintains a connection to its associated Cell and/or Enclosure.
- An Module is the container/parent for Tag List Rows and maintains an ordered set of Tag List Row connections.
- A Module maintains an association with its Module Definition for reporting purposes, similar to Enclosures.
- An association with a Placeholder is also maintained to support supplying data for display purposes (see FIG. 118).

2.12.3.5 Tag List Row

A Tag List Row represents a physical I/O connection point on an FBM Module. It's primary function is to map I/O points to Block I/O parameters, such a an AIN MEAS input parameter.

Class Relationships:
- A Tag List Row is a Block, which supports connections through its parameters.
- A Tag List Row maintains a connection with a Module which is used to support reporting and display of Tag List Row Names and associated Input/Output Blocks.

2.12.3.6 Nest Connection

A Nest Connection is a type of Framework Connection Class which is used to implement the ability to contain objects within other objects in particular slot positions. Class Relationships:

- Nest Connection is derived from the Framework Parent/Child Connection Class.
- This class is used to implement Parent/Child relationships among the Enclosure-related classes.

2.12.3.7 Enclosure Definition

The Enclosure Definition class serves as a factory class to create instances of Enclosure objects in response to users dragging an Enclosure Type icon onto an Enclosure Group view in the editor. Since Enclosures also have pre-determined Cell Types, this class also initiates the creation of an Enclosure's associated Cells, when creating a new Enclosure object. An Enclosure Definition exists for each type of enclosure and contains specific parameters relating to the number of Cell slots supported by the enclosure. Enclosure Definitions are represented by icons on the Enclosure Editor palette and create Enclosure instances in response to users dragging icons from the palette onto the drawing view. A Placeholder object, describing the geometry of the Enclosure Cell slot array is also associated with each Definition. Class Relationships:

- An Enclosure Definition is derived from the Enclosure class, which provides the ability to maintain an ordered set of Cells.
- An Enclosure Definition maintains an ordered list of Cell Slot Parameters, but connections are not allowed to be made to these Definition parameters. Connections to Cells can only be made to Enclosure Instances.
- An Enclosure Definition maintains an association with a Placeholder, which it uses in creating the Placeholder for Enclosure Instances.
- An Enclosure Definition maintains associations with the Enclosures it creates to allow listing all Enclosures of its type in response to report requests or listing requests from the Project Manager Tree.

2.12.3.8 Enclosure Instance

An Enclosure Instance is an object generated by its related Enclosure Definition. Class Relationships:

- An Enclosure Instance is derived from the Enclosure class, which provides the ability to maintain an ordered set of Cells.
- An Enclosure Instance maintains an ordered list of Cell Slot Parameters, which are used to maintain connections to related Cells.
- An Enclosure Instance maintains an association with a Placeholder, which is used to represent the Enclosure Instance on Enclosure drawings.
- An Enclosure Instance maintains an association with its Definition.

2.12.3.9 Enclosure Placeholder for Loading

This class holds all of the data associated with the drawing of a Enclosure within an Enclosure Loading view. Drawing information such as location, scale and selection status are maintained in this class. The Enclosure Placeholder information cannot be modified by the user since Enclosures appear in a fixed location within the Enclosure Loading view. Class Relationships:

Enclosure Placeholder is derived from Parameterized Object Placeholder.

The Enclosure Placeholder is contained in the Enclosure Document, the collection point for all drawing data for an Enclosure Loading view. The Enclosure Document contains only one Enclosure Placeholder.

Enclosure Placeholder maintains a reference to its corresponding Enclosure, to retrieve the data to display the Enclosure.

2.12.3.10 Cell Placeholder

This class holds all of the data associated with the drawing of a Cell within an Enclosure Loading view. Drawing information such as location, scale and selection status are maintained in this class. The Cell Placeholder information cannot be modified by the user since Cells appear in a fixed location within the Enclosure Loading view. Class Relationships:

Cell Placeholder is derived from Parameterized Object Placeholder.

The Cell Placeholders are contained in the Enclosure Document, the collection point for all drawing data for an Enclosure Loading view.

Cell Placeholder maintains a reference its corresponding Cell, to retrieve the data to display the Cell.

2.12.3.11 Module Placeholder

This class holds all of the data associated with the drawing of a Module within an Enclosure Loading view. Drawing information such as location, scale and selection status are maintained in this class. The Module Placeholder information is updated in response to users relocating Modules within the Enclosure Loading view. The FBM Module Placeholders also display the Tag names associated with each FBM point and allow the user to call up the Tag Assignment Dialog by selecting one of the point locations on the Placeholder. Class Relationships:

Module Placeholder is derived from Parameterized Object Placeholder.

The Module Placeholders are contained in the Enclosure Document, the collection point for all drawing data for an Enclosure Loading view.

Module Placeholder maintains a reference its corresponding Module, to retrieve the data to display the Module.

2.12.3.12 Enclosure Loading Document

This class encapsulates the drawing information to draw an entire Enclosure Loading view. This class contains information on scaling, orientation, and other style parameters. All other drawing information is maintained within the contained classes. Class Relationships:

Enclosure Loading Document is derived from Persistent Document, from which it inherits its drawing object collection functions and the ability to be associated with a Sheet Template.

Enclosure Loading Document contains an Enclosure Loading Placeholder

Enclosure Loading Document contains Cell Placeholders

Enclosure Loading Document contains Module Placeholders

Enclosure Loading Document maintains a reference its corresponding Enclosure to respond to display requests.

2.12.3.13 Enclosure Placeholder for Group

This class holds all of the data associated with the drawing of a Enclosure within an Enclosure Group view. Drawing information such as location, scale and selection status are maintained in this class. The Enclosure Placeholder information cannot be modified by the user since Enclosures appear in a fixed location within the Enclosure Loading view. Note that connections between Enclosures shown on Enclosure Group drawings are not modeled as associations between Enclosure objects, but are simply line annotations the user constructs on the drawing.

Class Relationships:

Enclosure Placeholder is derived from Parameterized Object Placeholder.

The Enclosure Placeholder is contained in the Enclosure Document, the collection point for all drawing data for an Enclosure Loading view. The Enclosure Document contains only one Enclosure Placeholder.

Enclosure Placeholder maintains a reference its corresponding Enclosure, to respond to requests to display the Enclosure.

2.12.3.14 Enclosure Group Document

This class encapsulates the drawing information to draw an entire Enclosure Group view. This class contains information on scaling, orientation, and other style parameters. All other drawing information is maintained within the contained classes.

Class Relationships:

Enclosure Group Document is derived from Persistent Document, from which it inherits its drawing object collection functions and the ability to be associated with a Sheet Template.

Enclosure Group Document contains Enclosure Placeholders

Enclosure Placeholder maintains a reference its corresponding Enclosure Group to respond to display requests.

2.13 Reports

2.13.1 Overview

The Control Algorithm Configurator provides a set of predefined report templates, in addition to the general-purpose query and report capabilities provided by the Framework Print Manager. These reports provide users with the capability to quickly generate a variety of reports by selecting from a list of objects to which the reports apply. List boxes allow users to select a subset or all of the reportable objects for any report template. For instance, the Plant Area report dialog presents a list of all defined Plant Areas from which the user can select one, several, or all. Each report includes an optional cover sheet describing the name and description of the report and a table of contents if the report covers multiple items.

Report templates are provided for both tabular and graphical reports, such as Loop drawings. Using the Report Editor, users can copy the implementation-standard templates and modify them to create their own custom report templates by changing the object attributes, grouping, and filters applied to the report template queries. For example, users can generate a custom report template based on the Area Partial Detail template shown in the table below, but including only Parameter values (not formulas) and showing all parameters instead of only those with non-default values.

| Report Template | Select | Include | Group by | Filters |
|---|---|---|---|---|
| Area Summary | Plant Areas Sub-Areas | Loop names Enclosure Names Module names | Sub-Area Sub-Area Enclosure | |
| Area Partial Detail | Plant Areas Sub-Areas | Loop names, Loop Template name Block names, type Parameter names, value, formula Enclosure names, type Module names, Cell, Slot | Sub-Area Loop Block, Group Sub-Area Enclosure | Show only Parameters with non-default values |

Standard and user-defined Report Templates can be grouped together in user-created Group Templates to generate custom documentation books. Reports are structured so that they can be invoked from related editors to report on entire objects or just their associated components. For instance, from a Control Algorithm Diagram Editor Loop drawing, a user can generate a report of the entire Loop, or can select several Blocks and generate a Block report just for those Blocks.

| Report Templates | Contents |
|---|---|
| Composite Block Summary | Name, description, Block names, types |
| Composite Block Full Detail | Blocks, all Block Parameters |
| Composite Block Partial Detail | Blocks, Non-default Block Parameters |
| Composite Block Drawing Full Detail | Composite Block drawing, Ladder Logic, Sequence Code, Calculation Block Instructions |
| Composite Block Drawing Partial Detail | Composite Block drawing |

2.13.2 Loops

Reportable objects for this set of reports are chosen from a list of Loops.

| Report Templates | Contents |
|---|---|
| Loop Summary | Name, Template, description, Plant Area |
| Loop Full Detail | Blocks, all Block Parameters |
| Loop Partial Detail | Blocks, Non-default Block Parameters |
| Loop Drawing Full Detail | Loop drawing, Ladder Logic, Sequence Code, Calculation Block Instructions |
| Loop Drawing Partial Detail | Loop drawing |

2.13.3 Blocks

Reportable objects for this set of reports are chosen from a list of Blocks.

| Report Templates | Contents |
|---|---|
| Block Summary | Name, type, description, definition, Composite Block affiliation, Loop |
| Block Full Detail | all Block Parameters, drawings for Sequence, PLB, and Calculation Blocks |
| Block Partial Detail | Non-default Block Parameters |

| Report Templates | Contents |
|---|---|
| Block Drawing | Drawings for Sequence, PLB, and Calculation Blocks |

2.13.4 Compounds

Reportable objects for this set of reports are chosen from a list of Compounds.

| Report Templates | Contents |
|---|---|
| Compound Summary | Compound name, Control Processor, Compound Parameters |
| Compound Block Summary | Control Processor, Compound Parameters (including alarm groups), Block/ECB name, type, definition, Composite Block affiliation, Loop |
| Compound Block Full Detail | all Block parameters |
| Compound Block Partial Detail | Non-default Block Parameters |
| Compound Block Phasing | Block name, type, definition, Loop, Composite Block affiliation, period, phase, zone |

2.13.5 Control Processors

Reportable objects for this set of reports are chosen from a list of Control Processors, including AWs and APs running control.

| Report Templates | Contents |
|---|---|
| CP Summary | Name |
| CP Compound Summary | Compounds, parameters(including alarm groups) |
| CP Block Summary | Compounds, Compound parameters, Blocks, ECBs/FBMs, name, type, definition, Composite Block affiliation, Loop |
| CP Block Full Detail | all Block parameters |
| CP Block Partial Detail | Non-default Block Parameters |
| CP Loading | Phase loading per Block, compound time and size |
| CP Peer-to-Peer | Peer-to-peer connections |

2.13.6 Enclosures

Reportable objects for this set of reports are chosen from a list of Enclosures.

| Report Templates | Contents |
|---|---|
| Enclosure Summary | FBM names, types, Cell, Slot |
| Enclosure Detail | FBM names, types, Cell, Slot, Points, Tag assignments |
| Enclosure Loading Drawing | Enclosure Loading Drawing |

3 Framework Services

This section describes those Framework services which will be available to the application developer when creating IDA applications.

3.1 Generic Window Services for IDA Editors

The IDA configuration system's user interface relies on one or more Editors, each hosted in a Multiple Document Interface (MDI) style window frame (referred to as a main editor frame). The editors are used to modify the contents of the Document Objects that make up an I/A configuration. Document objects each represent containers of on-screen depictions of configurable objects. Document types in IDA are associated with one or more editors, one of which is the default editor.

For scalability, IDA editors are designed to be released as individual DLL's, all running under a single application. Each editor forms a Doc/Frame/View tuple (or Document Template) which has been written to edit specific object types in a certain way. In this manner, as new objects and/or editors are developed for IDA, only the DLL's dealing with the new editors need to be distributed to existing implementations.

The Framework provides two basic types of generic editors:

- Generic Graphical Editor—a Document Template which allows the developer to create a graphical editor in which objects are created via drag/drop from the System Tree, and connected by dragging one or more depictions of objects to a target object. This generic editor will also provide basic drawing capability, allowing the user to enhance the sheet with various annotations such as text blocks, shapes with varying fill and colors, and bitmaps. Two editors which could potentially use this generic editor include the loop sheet, and the enclosure drawing editors.
- Generic Grid Editor—a Document Template which presents a spreadsheet like view of objects to the user. Two editors potentially utilizing this type of generic editor might include the list view associated with each object type, and the Block Definition Editor.

Figure 119:
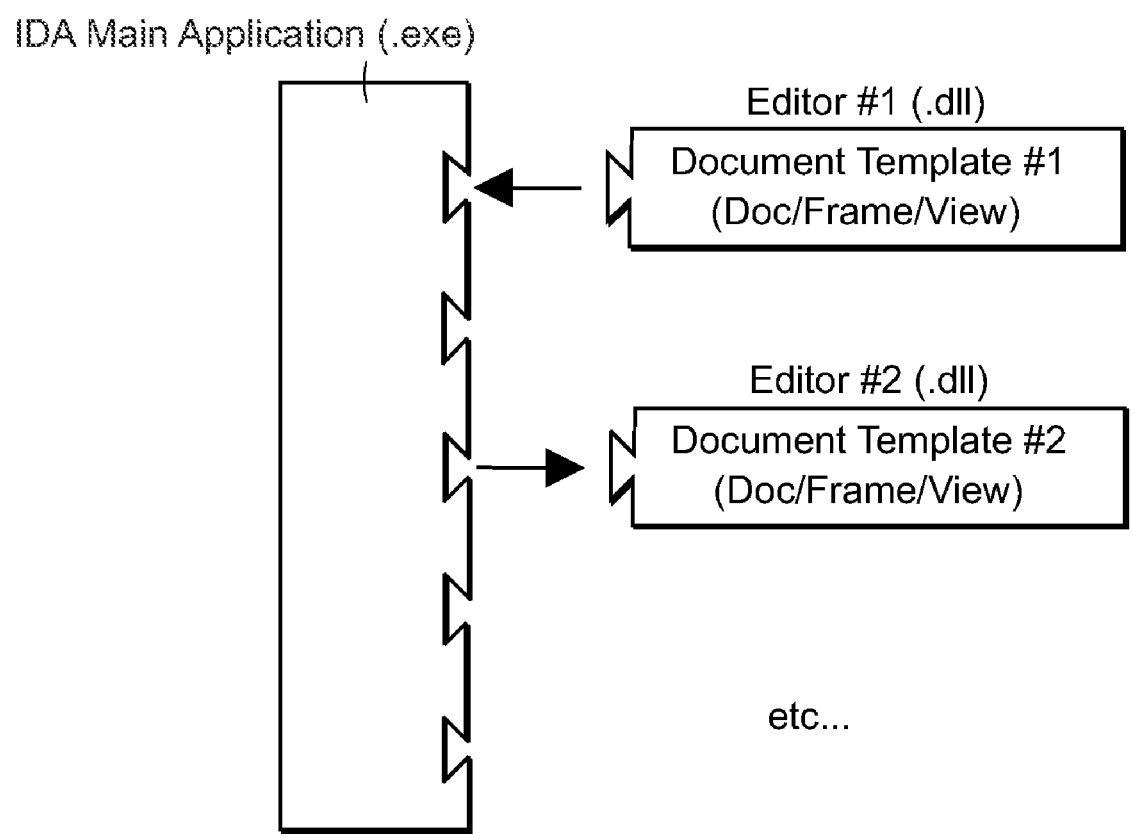
FIG. 119 depicts an IDA main application architecture in a system according to the invention.

As depicted in FIG. 119, as each editor is activated via an object selection (or some other means), it becomes the "active" Document Template for the particular editor frame. Only one Document Template can be "active" at a time. Each Document Template knows how to deal with the objects it is able to edit. The editors may present an edit capability to the user in a graphical format, in a grid (spreadsheet-like) format, or other appropriate format depending upon the object being edited, and the context it is being edited in.

Figure 120:
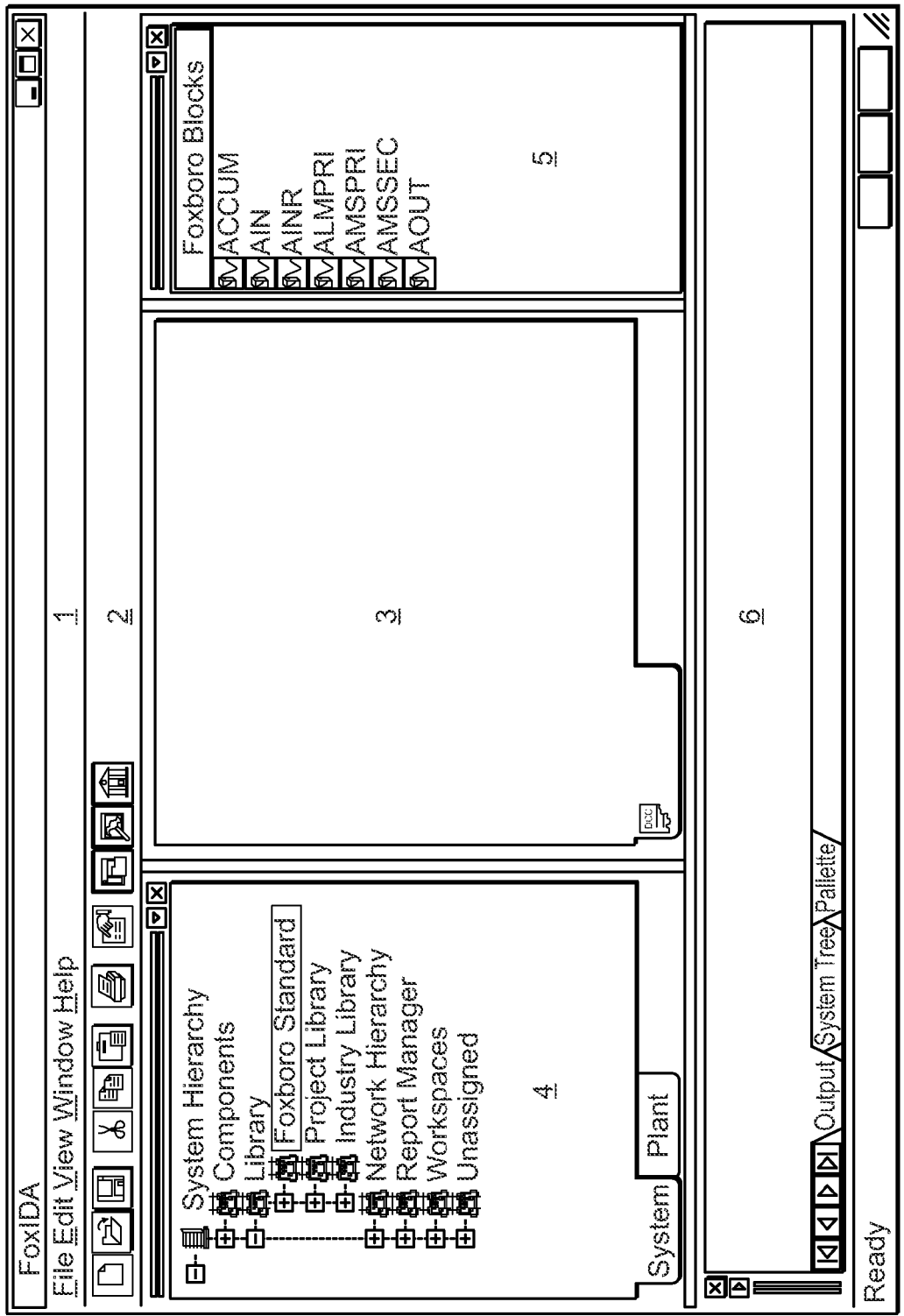
Figure 121:
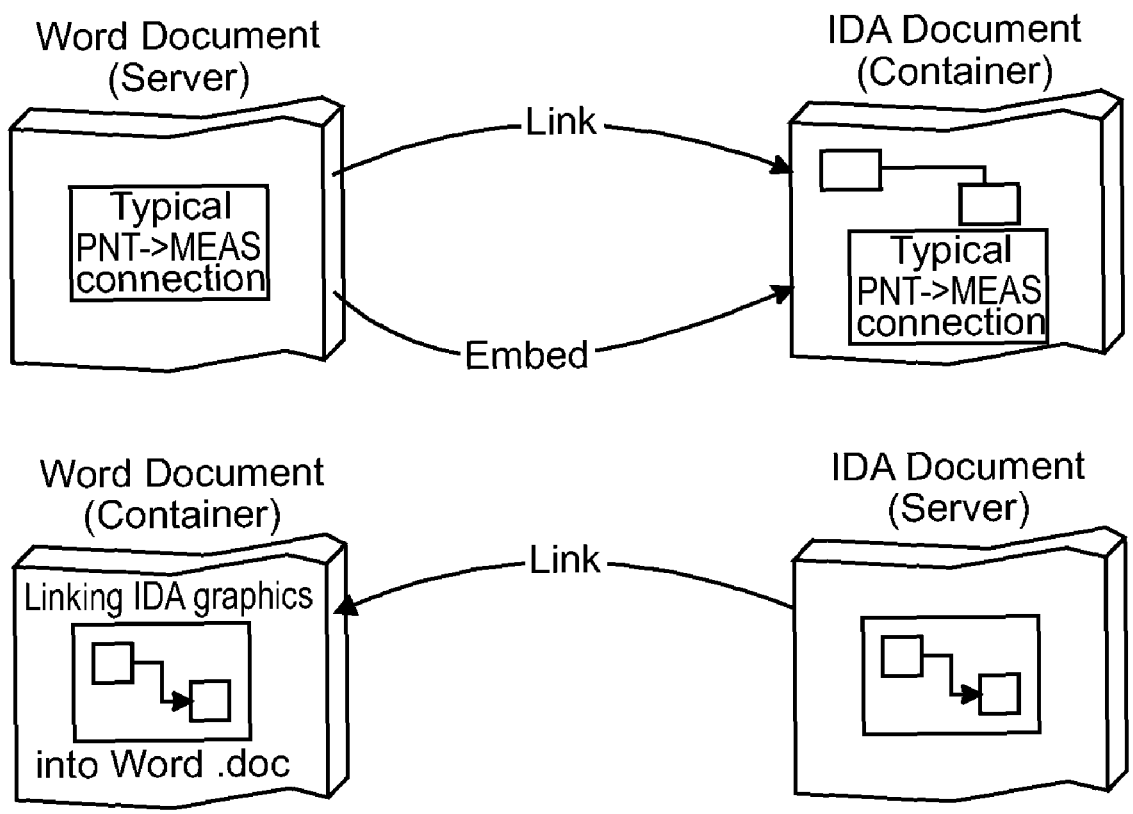

As depicted in FIG. 120, an IDA editor runs in a generic editor frame composed of six major GUI components: Menu bar; Toolbars; A tabbed editor window, or view; A tabbed tree control; Palette(s); Output/message window. All GUI components (with the exception of the menu bar and the editor window) are able to be toggled on/off by the user in order to maximize the screen "real estate" available for the editor.

3.1.1 Menu Bar

The menu bar (depicted as GUI component 1 in FIG. 120) allows the user to interact with, and issue commands to, the application. The menu bar provides a means for the user to view and select an action to perform relative to either the application, or the current editor. There are essentially two sets of menus—those menu selections which are normally considered part of the application, and those menu selections which are unique to the current editor. Each editor brings to the table its own unique set of menu selections. Whenever an editor is selected (refer to 3.1.3—Tabbed Editor Window), its unique menu selections are merged with those of the main application, resulting in a cohesive set of menu selections available to the user. When no editor is current, the menu selections which appear to the user are only those associated with the main application.

3.1.2 Toolbars

The toolbars (depicted as GUI component 2 in FIG. 120) provides the user with a shortcut to the menu command each toolbar button is associated with. As with menus, the main application has toolbars associated with it, as does each editor. When an editor is selected, the toolbar(s) associated with the editor are merged with the toolbar(s) associated with the main application, and the user is presented with a cohesive set of toolbar GUI components. Generally speaking, each menu selection potentially available via menu pulldown will also be available as a toolbar button.

While IDA includes default toolbars, users can customize their toolbars with the toolbar buttons they use most often. In addition, users can create their own toolbars, placing whatever toolbar buttons they want on their own toolbars. Toolbars may be hidden by the user by picking the appropriate menu selection from the main menu, or right mouse clicking on the toolbar, and selecting "Hide" on the resulting popup menu.

3.1.3 Tabbed Editor Window

The tabbed editor window (depicted as GUI component 3 in FIG. 120) allows the user to create and modify configuration objects in various ways.

The Framework provides the developer with a choice of two types of generic editors:

1. Graphics-based editor, allowing the user to manipulate objects in a graphical manner on a graphical "sheet", or canvas. Most operations are done via drag/drop, including the establishment of connections between objects. Depending on the editor, users can also add their own annotations to the sheet, in the form of text blocks, lines, bitmaps, and a variety of common shapes.
2. Grid-based editor, allowing the user to manipulate objects in a spreadsheet-like editor. Objects are represented as rows of data in the spreadsheet, and the user will be allowed to specify various properties such as sorting the data on particular columns, column widths, etc.

Each editor written for IDA is contained within its own .DLL. Object types within IDA are associated with one or more editors which are capable of modifying them. One of those editors will be that object type's default editor (e.g. the default editor for a loop might be a loop drawing).

When an object is selected in the System/Plant hierarchy (i.e., tree control), all the editors (i.e., .document templates) associated with that object's type are loaded into the application, and instantiated within the tab control representing the tabbed editor window. Each editor is associated with a separate tab. If a tab is selected, the window containing that associated editor's document template moves to the front, and that editor becomes the current editor.

While an editor is active, the user creates, modifies and deletes configuration components using that editor as a configuration tool. Each editor provides unique mechanisms, or methods, allowing the user to interact with configuration components in ways unique to that editor. When an editor becomes the current editor, menu and toolbar selections unique to that editor are merged with those of the main application's in order to present a cohesive set of menus and toolbars to the user. Conversely, when an editor is replaced by another editor, the original editor's menus and toolbars are removed from their respective GUI components.

3.1.4 Tabbed Tree Control

The tree control (depicted as GUI component 4 in FIG. 120) allows the user to quickly navigate to various portions of the configuration. IDA will initially be released with two tabs representing two different hierarchies with this GUI component:

1. System. This tab presents the System hierarchy to the user. There are many "sections" to the System hierarchy, and the user views items in a different context depending upon what section they are looking at. For example, under "Components", the user sees a mix of definitions and instances in order to accurately depict an inheritance chain, whereas under "Library", the user views definitions, since all portions of the "Library" are meant to only act as a means of accessing the definition of items that can be created. Even though the user can manually alter the contents of portions of the System hierarchy (e.g. drag a CP from one node to another), all portions of the System hierarchy are able to be constructed dynamically from data specified in the database.
2. Plant. This tab presents the Plant hierarchy to the user, and is constructed and maintained by the user. It will be delivered to the user with a single node (i.e., "The Plant"). Unlike the System hierarchy, there is no automated mechanism for placing configuration items in the Plant hierarchy other than by explicit assignment of those items to specific plant areas (probably via drag/drop). This hierarchy, while presenting configuration components in a different context, may be viewed simply an extension of the System hierarchy, using different nodes (or "folders") in the hierarchy to act as containers for configuration items.

The entire tabbed tree control can be hidden from view by choosing the appropriate menu selection, or by right clicking on the tree control (somewhere off the tree nodes themselves) and selecting "Hide". This will allow the user to maximize the amount of screen space available to the current editor.

3.1.5 Palette

The palette (depicted as GUI component 5 in FIG. 120) allows the user to place "favorite" definitions (those used most often) in various palettes so that they are available when needed. The palette provides a shortcut mechanism to configuration item creation, and allows the user to create items without having to do a lengthy search through the System hierarchy looking for the correct definition.

Definitions may be placed on the palette by dragging and dropping them from the appropriate definition within the System tree control. Multiple palettes can be created, allowing the user to place a variety of definitions into logical groups, such as "Common Blocks", or "Loop Templates". Once a palette is created, it may be shared among users, so that companies can standardize their palettes in whatever way they wish in order to make the configuration environment as efficient as possible. The entire palette control can be hidden from view by making the appropriate menu selection, or by right clicking on the palette (not on a palette item) and selecting "Hide". This allows the user to maximize the amount of screen space available to the current editor.

3.1.6 Output/Message Window

The output window (depicted as GUI component 6 in FIG. 120) allows the user to view messages associated with various processes that are meant to be informative, and let the user know about the state of certain operations as they are performed. An example of a process which utilizes the output window is the "Find" utility, which allows the user to find occurrences of a string within the database, given certain selection criteria. The "Find" utility opens its own output window, using a tab labeled "Find". Each time it located an object that satisfied the search criteria, it outputs a reference to that object in the output window. A further enhancement to the output window would be to allow the user to select, or double click, the object referenced, and activate the property pages associated with that object, allowing the user to view additional details about that object, or edit the object itself. The entire output window can be hidden from view by making the appropriate menu selection, or by right clicking on the output window and selecting "Hide". This will allow the user to maximize the amount of screen space available to the current editor.

Described above are methods and apparatus meeting the objects and goals set thereforth. Those skilled in the art will appreciate that the embodiments shown in the drawings and described in the accompanying text are merely examples and that other embodiments, incorporating modifications and changes therein, fall within the scope of the invention. Thus, by way of non-limiting example, it will appreciated that other programming constructs such as, by non-limiting example, records, "structs," arrays, and tables, may be utilized in place of the data structures referred to as "objects" above. By way of further non-limiting example, methods and apparatus according to the invention can be used to model and configure control systems other than those used for process control such as, by non-limiting example, environmental control systems. In view thereof.

What we claim is:

1. Apparatus for configuring a control system, comprising
   A. an editor that facilitates configuration of a control system and/or a system controlled thereby, the editor being coupled to the control system for at least receiving data therefrom,
   B. the editor displaying at least a portion of said configuration and including, in such display, one or more representations of entities in the control system and/or the system controlled thereby,
   C. the editor displaying, with one or more representations, process data received from the control system with respect to corresponding characteristics of the entities represented by those representations.

2. The apparatus according to claim 1, where the editor displays, with said one or more representations, process data received from the control system with respect to connections between entities represented by those representations and other entities in the control system.

3. The apparatus according to claim 1, wherein the editor facilitates any of creation and modification of a model representing said configuration, the model comprising a plurality of objects representing one or more entities the control system and/or system controlled thereby.

4. The apparatus according to claim 1, wherein the characteristics displayed by the editor include one or more physical characteristics of the entities represented by the respective representations.

5. The apparatus according to claim 1, wherein the characteristics displayed by the editor include unique identifiers of the entities represented by the respective representations.

6. The apparatus according to claim 1, wherein the characteristics displayed by the editor include one or more of inputs, outputs, alarm limits, and control functions, data type, behavior, and data value range.

7. The apparatus according to claim 1, wherein the process data is live data received from the control system.

8. The apparatus according to claim 1, wherein said representations of entities in the control system and/or the system controlled thereby are graphical representations.

9. The apparatus according to claim 1, wherein said representations of entities in the control system and/or the system controlled thereby are icons.

10. Apparatus for configuring a control system, comprising
   A. a plurality of objects representing one or more entities in any of the control system and a system controlled thereby,
   B. an editor that facilitates configuration of the control system and/or the system controlled thereby,
   C. the editor displaying at least a portion of said configuration and including, in such display, one or more representations of objects comprising that portion of the configuration,
   D. at least one of the objects that is represented by a said displayed representation being coupled to the control system for at least receiving process data therefrom,
   E. the editor displaying, with one or more representations, process data received by the corresponding objects from the control system with respect to characteristics of the entities represented by those objects.

11. The apparatus according to claim 10, wherein at least one of the objects that is coupled to the control system retrieves said process data therefrom.

12. The apparatus according to claim 11, wherein said at least one object retrieves data from the control system via an applications programming interface (API) thereof.

13. The apparatus according to claim 11, wherein said at least one object retrieves data from the control system via a database installer.

14. The apparatus according to claim 10, wherein the editor is a control loop diagram editor.

15. The apparatus according to claim 10, wherein said at least one object that is coupled to the control system represents a block.

16. The apparatus according to claim 10, wherein the editor facilitates any of creation and modification of a model that represents said configuration and that comprises a plurality of the objects.

17. The apparatus according to claim 10, wherein the characteristics displayed by the editor include one or more physical characteristics of the entities represented by the respective objects.

18. The apparatus according to claim 10, wherein the characteristics displayed by the editor include unique identifiers of the entities represented by the respective objects.

19. The apparatus according to claim 18, wherein the characteristics displayed by the editor include one or more of inputs, outputs, alarm limits, and control functions, data type, behavior, and data value range.

20. The apparatus according to claim 10, wherein the editor displays, with one or more representations, process data received by the corresponding objects from the control system with respect to connections between the entities represented by those objects and other entities in the control system and/or system controlled thereby.

21. The apparatus according to claim 10, wherein the process data is live data received from the control system.

22. The apparatus according to claim 10, wherein said representations of entities in the control system and/or the system controlled thereby are graphical representations.

23. The apparatus according to claim 10, wherein said representations of entities in the control system and/or the system controlled thereby are icons.

24. A method of operating an editor that facilitates configuration of a control system and/or a system controlled thereby, comprising
   A. displaying at least a portion of said configuration and including, in such display, one or more representations of entities in the control system and/or the system controlled thereby,
   B. displaying, with one or more representations, process data received from the control system with respect to corresponding characteristics of the entities represented by those representations.

25. The method according to claim 24, comprising displaying, with said one or more representations, process data received from the control system with respect to connections between entities represented by those representations and other entities in the control system.

26. The method according to claim 24, comprising facilitating, with the editor, any of creation and modification of a model representing said configuration, the model comprising a plurality of objects representing one or more entities the control system and/or system controlled thereby.

27. The method according to claim 24, comprising displaying one or more physical characteristics of the entities represented by the respective representations.

28. The method according to claim 24, comprising displaying characteristics that include unique identifiers of the entities represented by the respective representations.

29. The method according to claim 24, comprising displaying characteristics that include one or more of inputs, outputs, alarm limits, and control functions, data type, behavior, and data value range.

30. The method according to claim 24, wherein the process data is live data received from the control system.

31. The method according to claim 24, wherein said representations of entities in the control system and/or the system controlled thereby are graphical representations.

32. The method according to claim 24, wherein said representations of entities in the control system and/or the system controlled thereby are icons.

* * * * *